(12) United States Patent
Tanikella et al.

(10) Patent No.: US 12,473,475 B2
(45) Date of Patent: Nov. 18, 2025

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Brahmanandam V. Tanikella, Northborough, MA (US); Charles J. Gasdaska, Shrewsbury, MA (US); Michael J. Lemberger, Dudley, MA (US)

(73) Assignees: SAINT-GOBAIN ABRASIVES, INC., Worcester, MA (US); SAINT-GOBAIN SURFACE SOLUTIONS FRANCE, Conflans-Sainte-Honorine (FR)

(*) Notice: Subject to any disclaimer, the term of this patent is extended or adjusted under 35 U.S.C. 154(b) by 470 days.

(21) Appl. No.: 17/687,605

(22) Filed: Mar. 5, 2022

(65) Prior Publication Data
US 2022/0282144 A1    Sep. 8, 2022

Related U.S. Application Data

(60) Provisional application No. 63/266,282, filed on Dec. 30, 2021, provisional application No. 63/157,236, filed on Mar. 5, 2021.

(51) Int. Cl.
*C09K 3/14* (2006.01)
*B22F 10/38* (2021.01)
(Continued)

(52) U.S. Cl.
CPC .......... *C09K 3/1436* (2013.01); *C09K 3/1418* (2013.01); *C09K 3/1427* (2013.01)

(58) Field of Classification Search
CPC ...... C09K 3/1436; C09K 3/14; C09K 3/1409; C09K 3/1418; C09K 3/1427
See application file for complete search history.

(56) References Cited

U.S. PATENT DOCUMENTS

| 985,116 A | 2/1911 | Nichols |
| 2,242,877 A | 5/1941 | Albertson |
| (Continued) | | |

FOREIGN PATENT DOCUMENTS

| AU | 613584 B2 | 8/1991 |
| CA | 3109781 A1 | 2/2020 |
| (Continued) | | |

OTHER PUBLICATIONS

Jimenez et al. Parametric analysis to quantify process input influence on the printed densities of binder jetted alumina ceramics, Addit. Manuf., vol. 30, 100864. (Year: 2019).*

(Continued)

*Primary Examiner* — Amber R Orlando
*Assistant Examiner* — Anastasia A. Kuvayskaya
(74) *Attorney, Agent, or Firm* — Abel Schillinger, LLP; Arpan Ghosh

(57) ABSTRACT

A method for forming an abrasive article via an additive manufacturing technique including forming a layer of powder material comprising a precursor bond material and abrasive particles, compacting at least a portion of the layer to form a compacted layer, binding at least a portion of the compacted layer, and repeating the steps of forming, compacting, and binding to form a green body abrasive article.

20 Claims, 22 Drawing Sheets

(51) Int. Cl.
 *B33Y 10/00* (2015.01)
 *B33Y 80/00* (2015.01)

(56) References Cited

U.S. PATENT DOCUMENTS

| | | | |
|---|---|---|---|
| RE22,457 E | 3/1944 | Jeppson et al. |
| 2,367,404 A | 1/1945 | Kott |
| 3,023,551 A | 3/1962 | Osenberg |
| 3,123,948 A | 3/1964 | Kistler et al. |
| 3,144,739 A | 8/1964 | Brutvan et al. |
| 3,146,560 A | 9/1964 | Edward |
| 3,258,817 A | 7/1966 | Smiley |
| 3,477,180 A | 11/1969 | Robertson |
| 3,594,141 A | 7/1971 | Houston et al. |
| 3,609,925 A | 10/1971 | Comella-Riera |
| 3,650,714 A | 3/1972 | Farkas |
| 3,871,840 A | 3/1975 | Wilder et al. |
| 4,128,971 A | 12/1978 | Dunnington et al. |
| 4,164,098 A | 8/1979 | Akita |
| 4,211,294 A | 7/1980 | Multakh |
| 4,274,769 A | 6/1981 | Multakh |
| 4,314,827 A | 2/1982 | Leitheiser et al. |
| 4,369,046 A | 1/1983 | Bruschek et al. |
| 4,483,108 A | 11/1984 | Howard |
| 4,552,231 A | 11/1985 | Pay et al. |
| 4,574,003 A | 3/1986 | Gerk |
| 4,623,364 A | 11/1986 | Cottringer et al. |
| 4,661,126 A | 4/1987 | Inagami et al. |
| 4,744,802 A | 5/1988 | Schwabel |
| 4,770,671 A | 9/1988 | Monroe et al. |
| 4,881,951 A | 11/1989 | Wood et al. |
| 4,918,872 A | 4/1990 | Sato et al. |
| 4,923,512 A | 5/1990 | Timm et al. |
| 4,960,441 A | 10/1990 | Pellow et al. |
| 5,011,508 A | 4/1991 | Wald et al. |
| 5,067,969 A | 11/1991 | Matsuda |
| 5,090,968 A | 2/1992 | Pellow |
| 5,092,920 A | 3/1992 | Nakai et al. |
| 5,123,217 A | 6/1992 | Ishikawa et al. |
| 5,139,978 A | 8/1992 | Wood |
| 5,178,644 A | 1/1993 | Huzinec |
| 5,178,849 A | 1/1993 | Bauer |
| 5,201,916 A | 4/1993 | Berg et al. |
| 5,204,055 A | 4/1993 | Sachs et al. |
| 5,227,104 A | 7/1993 | Bauer |
| 5,252,264 A | 10/1993 | Forderhase et al. |
| 5,282,875 A | 2/1994 | Wood et al. |
| 5,354,155 A | 10/1994 | Adams |
| 5,366,523 A | 11/1994 | Rowenhorst et al. |
| 5,387,380 A | 2/1995 | Cima et al. |
| 5,429,647 A | 7/1995 | Larmie |
| 5,441,710 A | 8/1995 | Marois |
| 5,449,388 A | 9/1995 | Wiand |
| 5,490,882 A | 2/1996 | Sachs et al. |
| 5,498,269 A | 3/1996 | Larmie |
| 5,518,443 A | 5/1996 | Fisher |
| 5,547,479 A | 8/1996 | Conwell et al. |
| 5,551,963 A | 9/1996 | Larmie |
| 5,611,724 A | 3/1997 | Degraaff |
| 5,618,762 A | 4/1997 | Shirakawa et al. |
| 5,660,621 A | 8/1997 | Bredt |
| 5,725,162 A | 3/1998 | Garg et al. |
| 5,766,277 A | 6/1998 | DeVoe et al. |
| 5,776,214 A | 7/1998 | Wood |
| 5,868,125 A | 2/1999 | Maoujoud |
| 5,874,050 A | 2/1999 | Matias |
| 5,891,206 A | 4/1999 | Ellingson |
| 5,900,207 A | 5/1999 | Danforth et al. |
| 5,942,015 A | 8/1999 | Culler et al. |
| 5,976,205 A | 11/1999 | Andrews et al. |
| 5,996,571 A | 12/1999 | Jedick |
| 6,086,648 A | 7/2000 | Rossetti et al. |
| 6,123,744 A | 9/2000 | Huzinec |
| 6,146,567 A | 11/2000 | Sachs et al. |
| 6,192,875 B1 | 2/2001 | Koroku et al. |
| 6,209,420 B1 | 4/2001 | Butcher et al. |
| 6,354,362 B1 | 3/2002 | Smith et al. |
| 6,376,590 B2 | 4/2002 | Kolb et al. |
| 6,403,002 B1 | 6/2002 | van der Geest |
| 6,413,286 B1 | 7/2002 | Swei et al. |
| 6,416,560 B1 | 7/2002 | Palmgren |
| 6,511,265 B1 | 1/2003 | Mirchandani et al. |
| 6,551,366 B1 | 4/2003 | D'Souza et al. |
| 6,593,391 B2 | 7/2003 | Teutsch et al. |
| 6,645,412 B2 | 11/2003 | Priedeman, Jr. |
| 6,749,496 B2 | 6/2004 | Mota et al. |
| 6,767,499 B1 | 7/2004 | Hory et al. |
| 6,814,926 B2 | 11/2004 | Geving et al. |
| 6,858,050 B2 | 2/2005 | Palmgren |
| 7,015,268 B2 | 3/2006 | Manwiller et al. |
| 7,125,490 B2 | 10/2006 | Clendenning et al. |
| 7,311,752 B2 | 12/2007 | Tepper et al. |
| 7,332,140 B2 | 2/2008 | Matias |
| 7,497,977 B2 | 3/2009 | Nielsen et al. |
| 7,524,345 B2 | 4/2009 | Nevoret et al. |
| 7,867,302 B2 | 1/2011 | Nevoret et al. |
| 7,875,091 B2 | 1/2011 | Nevorct et al. |
| 7,883,563 B2 | 2/2011 | Kawata et al. |
| 7,887,608 B2 | 2/2011 | Schwabel et al. |
| 7,946,907 B2 | 5/2011 | Heyen |
| 8,109,177 B2 | 2/2012 | Kembaiyan |
| 8,252,087 B2 | 8/2012 | Burba, III et al. |
| 8,308,830 B2 | 11/2012 | Egan et al. |
| 8,486,490 B2 | 7/2013 | Fuwa et al. |
| 8,568,205 B2 | 10/2013 | Gosamo et al. |
| 8,597,088 B2 | 12/2013 | Hoang et al. |
| 8,668,859 B2 | 3/2014 | Pettis |
| 8,715,381 B2 | 5/2014 | Ramanath et al. |
| 8,778,252 B2 | 7/2014 | Mackie et al. |
| 8,870,571 B2 | 10/2014 | Lowder et al. |
| 8,991,211 B1 | 3/2015 | Arlotti et al. |
| 9,144,237 B2 | 9/2015 | Sakurada et al. |
| 9,156,999 B2 | 10/2015 | Ng et al. |
| 9,388,898 B2 | 7/2016 | Tokumo |
| 9,421,666 B2 | 8/2016 | Krishnan et al. |
| 9,456,884 B2 | 10/2016 | Uckelmann et al. |
| 9,545,669 B2 | 1/2017 | Åklint et al. |
| 9,597,730 B2 | 3/2017 | Mironets et al. |
| 9,731,982 B2 | 8/2017 | Adams |
| 9,776,304 B2 | 10/2017 | Schulze |
| 9,783,718 B2 | 10/2017 | Stevenson et al. |
| 9,815,029 B2 | 11/2017 | Zhong et al. |
| 9,822,291 B2 | 11/2017 | Erickson |
| 10,016,852 B2 | 7/2018 | Broda |
| 10,052,742 B2 | 8/2018 | Fukazawa et al. |
| 10,144,114 B2 | 12/2018 | Schulze |
| 10,183,329 B2 | 1/2019 | Gunther |
| 10,188,975 B2 | 1/2019 | Fu et al. |
| 10,189,211 B2 | 1/2019 | Volk et al. |
| 10,272,493 B2 | 4/2019 | Krebs et al. |
| 10,328,372 B2 | 6/2019 | Mazumder et al. |
| 10,399,201 B2 | 9/2019 | Ganapathiappan et al. |
| 10,682,702 B2 | 6/2020 | Haro Gonzalez et al. |
| 10,723,041 B2 | 7/2020 | Wang |
| 10,882,160 B2 | 1/2021 | Redfield et al. |
| 10,888,973 B2 | 1/2021 | Franke et al. |
| 11,203,162 B2 | 12/2021 | Wighton et al. |
| 11,577,458 B2 | 2/2023 | Rifaut et al. |
| 2002/0095875 A1 | 7/2002 | D'Evelyn et al. |
| 2003/0150442 A1 | 8/2003 | Boland et al. |
| 2004/0226405 A1 | 11/2004 | Geving et al. |
| 2004/0244540 A1 | 12/2004 | Oldham et al. |
| 2004/0248770 A1 | 12/2004 | Grau et al. |
| 2005/0101237 A1 | 5/2005 | Vecchiarelli et al. |
| 2006/0059785 A1 | 3/2006 | Sung |
| 2006/0162967 A1 | 7/2006 | Brackin et al. |
| 2006/0185255 A1 | 8/2006 | Nevoret et al. |
| 2006/0185256 A1 | 8/2006 | Nevoret et al. |
| 2006/0185257 A1 | 8/2006 | Nevoret et al. |
| 2006/0208388 A1 | 9/2006 | Bredt et al. |
| 2006/0231293 A1 | 10/2006 | Ladi et al. |
| 2007/0020457 A1 | 1/2007 | Adefris |
| 2007/0241482 A1 | 10/2007 | Giller et al. |
| 2008/0085660 A1 | 4/2008 | Orlhac |

(56) References Cited

U.S. PATENT DOCUMENTS

| | | |
|---|---|---|
| 2008/0182017 A1 | 7/2008 | Singh et al. |
| 2008/0187769 A1 | 8/2008 | Huzinec et al. |
| 2010/0035530 A1 | 2/2010 | Gosamo et al. |
| 2010/0193254 A1 | 8/2010 | Lind et al. |
| 2010/0193255 A1 | 8/2010 | Stevens et al. |
| 2010/0255254 A1 | 10/2010 | Culler et al. |
| 2010/0320005 A1 | 12/2010 | Burhan et al. |
| 2011/0243675 A1 | 10/2011 | Fach |
| 2011/0293918 A1 | 12/2011 | Lucas et al. |
| 2012/0298425 A1 | 11/2012 | Cuillier De Maindreville et al. |
| 2013/0052453 A1 | 2/2013 | Filou et al. |
| 2013/0168071 A1 | 7/2013 | Hugelier et al. |
| 2013/0240479 A1 | 9/2013 | Moriya et al. |
| 2013/0277891 A1 | 10/2013 | Teulet |
| 2013/0280994 A1 | 10/2013 | Kang |
| 2013/0283700 A1 | 10/2013 | Bajaj et al. |
| 2013/0316149 A1 | 11/2013 | Atkins et al. |
| 2014/0069023 A1 | 3/2014 | Hoang et al. |
| 2014/0163717 A1 | 6/2014 | Das et al. |
| 2014/0239527 A1 | 8/2014 | Lee |
| 2014/0255198 A1 | 9/2014 | El-Wardany et al. |
| 2014/0262541 A1 | 9/2014 | Parsana et al. |
| 2015/0008046 A1 | 1/2015 | Cuillier De Maindreville et al. |
| 2015/0029071 A1 | 1/2015 | Hwang et al. |
| 2015/0069649 A1 | 3/2015 | Bai et al. |
| 2015/0089881 A1 | 4/2015 | Stevenson et al. |
| 2015/0126099 A1 | 5/2015 | Krishnan et al. |
| 2015/0183089 A1 | 7/2015 | Iyengar |
| 2015/0259986 A1 | 9/2015 | Stockey |
| 2015/0290771 A1 | 10/2015 | Li |
| 2015/0306664 A1 | 10/2015 | Aklint et al. |
| 2015/0330154 A1 | 11/2015 | Pearce et al. |
| 2015/0360289 A1 | 12/2015 | Liou et al. |
| 2015/0375368 A1 | 12/2015 | Gosamo |
| 2016/0010469 A1 | 1/2016 | Guo |
| 2016/0038866 A1 | 2/2016 | Gibson et al. |
| 2016/0110479 A1 | 4/2016 | Li |
| 2016/0159699 A1 | 6/2016 | Lazur |
| 2016/0184972 A1 | 6/2016 | Serebrennikov et al. |
| 2016/0221122 A1 | 8/2016 | D'Orlando et al. |
| 2016/0271757 A1 | 9/2016 | Kanyanta et al. |
| 2016/0289520 A1 | 10/2016 | Bujnowski et al. |
| 2016/0332236 A1 | 11/2016 | Stoyanov |
| 2017/0050241 A1 | 2/2017 | Thomas et al. |
| 2017/0057011 A1 | 3/2017 | Hyatt et al. |
| 2017/0066873 A1 | 3/2017 | Gardet |
| 2017/0072469 A1 | 3/2017 | Maderud et al. |
| 2017/0136540 A1 | 5/2017 | Dods |
| 2017/0144242 A1 | 5/2017 | McQueen et al. |
| 2017/0216915 A1 | 8/2017 | Holcomb et al. |
| 2017/0232512 A1 | 8/2017 | Joerger |
| 2017/0291372 A1 | 10/2017 | Milshtein et al. |
| 2017/0297106 A1 | 10/2017 | Myerberg et al. |
| 2017/0342303 A1 | 11/2017 | Stevenson et al. |
| 2018/0001548 A1 | 1/2018 | Dietrich et al. |
| 2018/0104793 A1 | 4/2018 | Franke et al. |
| 2018/0117793 A1 | 5/2018 | Wang |
| 2018/0126515 A1 | 5/2018 | Franke et al. |
| 2018/0133803 A1 | 5/2018 | Karuppoor |
| 2018/0178348 A1 | 6/2018 | Xiao et al. |
| 2018/0178351 A1 | 6/2018 | Lindvall et al. |
| 2018/0214988 A1 | 8/2018 | Alves |
| 2018/0237329 A1 | 8/2018 | Drewnowski et al. |
| 2018/0305266 A1 | 10/2018 | Gibson et al. |
| 2018/0333781 A1 | 11/2018 | Ederer et al. |
| 2019/0022826 A1 | 1/2019 | Franke et al. |
| 2019/0047214 A1 | 2/2019 | Franke et al. |
| 2019/0112422 A1 | 4/2019 | Tallia et al. |
| 2019/0168305 A1 | 6/2019 | Boyle |
| 2019/0184641 A1 | 6/2019 | Swier et al. |
| 2019/0185351 A1 | 6/2019 | Huang et al. |
| 2019/0193159 A1 | 6/2019 | Gibson et al. |
| 2019/0243339 A1 | 8/2019 | Katogi et al. |
| 2020/0001429 A1 | 1/2020 | Rapaka et al. |
| 2020/0016725 A1* | 1/2020 | Adefris ............... B24D 3/06 451/553 |
| 2020/0016821 A1 | 1/2020 | Ohnishi |
| 2020/0070311 A1 | 3/2020 | Smithson et al. |
| 2020/0079028 A1 | 3/2020 | Miller et al. |
| 2020/0101534 A1 | 4/2020 | Gibson |
| 2020/0139507 A1 | 5/2020 | Yamamura et al. |
| 2020/0230695 A1 | 7/2020 | Protzmann et al. |
| 2020/0384694 A1 | 12/2020 | Ceriani |
| 2021/0001452 A1 | 1/2021 | Xiao et al. |
| 2021/0196436 A1 | 7/2021 | Raby et al. |
| 2021/0379836 A1 | 12/2021 | Fadurdo Orellana et al. |
| 2022/0203616 A1 | 6/2022 | Korten et al. |
| 2022/0282144 A1 | 9/2022 | Tanikella et al. |
| 2022/0332651 A1 | 10/2022 | Tanikella et al. |
| 2023/0111065 A1 | 4/2023 | Schumacher et al. |
| 2023/0211463 A1 | 7/2023 | Tanikella et al. |
| 2023/0211469 A1 | 7/2023 | Tanikella et al. |
| 2023/0211471 A1 | 7/2023 | Tanikella et al. |

FOREIGN PATENT DOCUMENTS

| | | |
|---|---|---|
| CN | 1147783 A | 4/1997 |
| CN | 1212494 C | 7/2005 |
| CN | 1640596 A | 7/2005 |
| CN | 1962061 A | 5/2007 |
| CN | 102233269 B | 11/2011 |
| CN | 101804603 B | 5/2012 |
| CN | 102462996 A | 5/2012 |
| CN | 102658528 A | 9/2012 |
| CN | 102824789 A | 12/2012 |
| CN | 102936141 A | 2/2013 |
| CN | 202777185 U | 3/2013 |
| CN | 103264361 A | 8/2013 |
| CN | 103748309 A | 4/2014 |
| CN | 104014215 A | 9/2014 |
| CN | 104047547 A | 9/2014 |
| CN | 102873401 B | 11/2014 |
| CN | 203944262 U | 11/2014 |
| CN | 203980474 U | 12/2014 |
| CN | 203984693 U | 12/2014 |
| CN | 104259892 B | 1/2015 |
| CN | 104531065 B | 4/2015 |
| CN | 104566665 A | 4/2015 |
| CN | 104908166 A | 9/2015 |
| CN | 104924499 A | 9/2015 |
| CN | 104990154 A | 10/2015 |
| CN | 105563352 A | 5/2016 |
| CN | 105921793 A | 9/2016 |
| CN | 106280528 A | 1/2017 |
| CN | 106312843 A | 1/2017 |
| CN | 106425898 A | 2/2017 |
| CN | 106553137 A | 4/2017 |
| CN | 106674876 A | 5/2017 |
| CN | 104285281 B | 6/2017 |
| CN | 106926446 A | 7/2017 |
| CN | 106938335 A | 7/2017 |
| CN | 107150154 A | 9/2017 |
| CN | 107206570 A | 9/2017 |
| CN | 105562825 B | 10/2017 |
| CN | 107538359 A | 1/2018 |
| CN | 107636109 A | 1/2018 |
| CN | 105649538 B | 2/2018 |
| CN | 105415216 B | 3/2018 |
| CN | 107825305 A | 3/2018 |
| CN | 107838820 A | 3/2018 |
| CN | 107866752 A | 4/2018 |
| CN | 107866753 A | 4/2018 |
| CN | 107900927 A | 4/2018 |
| CN | 107914216 A | 4/2018 |
| CN | 107921471 A | 4/2018 |
| CN | 108081158 A | 5/2018 |
| CN | 207415166 U | 5/2018 |
| CN | 108326764 A | 7/2018 |
| CN | 106493651 B | 10/2018 |
| CN | 108612482 A | 10/2018 |
| CN | 108620583 A | 10/2018 |
| CN | 108747868 A | 11/2018 |
| CN | 208132742 U | 11/2018 |

(56) References Cited

FOREIGN PATENT DOCUMENTS

| | | |
|---|---|---|
| CN | 208132743 U | 11/2018 |
| CN | 208132744 U | 11/2018 |
| CN | 109157296 A | 1/2019 |
| CN | 208543373 U | 2/2019 |
| CN | 109483418 A | 3/2019 |
| CN | 109534845 A | 3/2019 |
| CN | 110095530 A | 8/2019 |
| CN | 110340817 A | 10/2019 |
| CN | 210452395 U | 5/2020 |
| CN | 109366374 B | 11/2020 |
| DE | 3937697 A1 | 5/1991 |
| DE | 19834559 A1 | 2/2000 |
| DE | 19909882 A1 | 9/2000 |
| DE | 102009006189 A1 | 7/2010 |
| DE | 102015115406 A1 | 3/2017 |
| DE | 102017221111 A1 | 6/2018 |
| DE | 102017113369 A1 | 12/2018 |
| DE | 202018104180 U1 | 12/2018 |
| DE | 10-2019-219859 A1 | 6/2021 |
| DE | 10-2019-219867 A1 | 6/2021 |
| EP | 0127339 B1 | 3/1988 |
| EP | 1066134 B1 | 5/2002 |
| EP | 1878486 A1 | 1/2008 |
| EP | 3053677 A1 | 8/2016 |
| EP | 1778601 B1 | 9/2017 |
| EP | 3281695 A1 | 2/2018 |
| EP | 2025454 B1 | 4/2018 |
| EP | 3009233 A1 | 12/2018 |
| EP | 3418002 A1 | 12/2018 |
| EP | 3307483 B1 | 6/2020 |
| GB | 2527938 A | 1/2016 |
| JP | H02237759 A | 9/1990 |
| JP | H04372366 A | 12/1992 |
| JP | H05046404 U | 6/1993 |
| JP | H0691536 A | 4/1994 |
| JP | H0811051 A | 1/1996 |
| JP | H09309108 A | 12/1997 |
| JP | 2982661 B2 | 11/1999 |
| JP | H11322408 A | 11/1999 |
| JP | 3086103 B2 | 9/2000 |
| JP | 2002-248691 A | 9/2002 |
| JP | 2005199619 A | 7/2005 |
| JP | 2006187848 A | 7/2006 |
| JP | 2008119312 A | 5/2008 |
| JP | 2008-302454 A | 12/2008 |
| JP | 2010527888 A | 8/2010 |
| JP | 2014000155 A | 1/2014 |
| JP | 2014-221499 A | 11/2014 |
| JP | 2014529523 A | 11/2014 |
| JP | 2016049579 A | 4/2016 |
| JP | 5996195 B2 | 9/2016 |
| JP | 2016172306 A | 9/2016 |
| JP | 6010834 B2 | 10/2016 |
| JP | 2017-154411 A | 9/2017 |
| JP | 6643643 B2 | 2/2020 |
| KR | 10-0578045 B1 | 5/2006 |
| KR | 10-1062801 B1 | 9/2011 |
| KR | 20150117723 A | 10/2015 |
| KR | 101760271 B1 | 7/2017 |
| KR | 10-2018-0129059 A | 12/2018 |
| KR | 10-2323009 B1 | 11/2021 |
| WO | 93-25336 A1 | 12/1993 |
| WO | 94-02562 A1 | 2/1994 |
| WO | 96-33638 A1 | 10/1996 |
| WO | 98-56566 A1 | 12/1998 |
| WO | 99-15293 A1 | 4/1999 |
| WO | 99-48646 A1 | 9/1999 |
| WO | 01-72502 A1 | 10/2001 |
| WO | 2003026714 A1 | 4/2003 |
| WO | 2003092748 A1 | 11/2003 |
| WO | 03-106148 A1 | 12/2003 |
| WO | 2004-110719 A2 | 12/2004 |
| WO | 2005075000 A1 | 8/2005 |
| WO | 2007026387 A2 | 3/2007 |
| WO | 2009009558 A1 | 1/2009 |
| WO | 2010016959 A2 | 2/2010 |
| WO | 2013-026972 A1 | 2/2013 |
| WO | 2014-140689 A1 | 9/2014 |
| WO | 2014137890 A1 | 9/2014 |
| WO | 2014-165390 A1 | 10/2014 |
| WO | 2014161816 A2 | 10/2014 |
| WO | 2015-069849 A1 | 5/2015 |
| WO | 2016022449 A1 | 2/2016 |
| WO | 2016032883 A1 | 3/2016 |
| WO | 2016-058091 A1 | 4/2016 |
| WO | 2016123505 A1 | 8/2016 |
| WO | 2016-192140 A1 | 12/2016 |
| WO | 2016-209696 A1 | 12/2016 |
| WO | 2016-210057 A1 | 12/2016 |
| WO | 2017-007999 A1 | 1/2017 |
| WO | 2017034951 A1 | 3/2017 |
| WO | 2017-137482 A1 | 8/2017 |
| WO | 2017127887 A1 | 8/2017 |
| WO | 2017-173009 A1 | 10/2017 |
| WO | 2017214179 A1 | 12/2017 |
| WO | 2018010730 A2 | 1/2018 |
| WO | 2018-080778 A1 | 5/2018 |
| WO | 2018118566 A1 | 6/2018 |
| WO | 2018160297 A1 | 9/2018 |
| WO | 2019187112 A1 | 10/2019 |
| WO | 2019194823 A1 | 10/2019 |
| WO | 2019210111 | 10/2019 |
| WO | 2019230214 A1 | 12/2019 |
| WO | 2020012501 A1 | 1/2020 |
| WO | 2020102025 A1 | 5/2020 |
| WO | 2020-128779 A2 | 6/2020 |
| WO | 2020220143 A1 | 11/2020 |
| WO | 2021-001730 A1 | 1/2021 |
| WO | 2021-009673 A1 | 1/2021 |
| WO | 2021-038438 A1 | 3/2021 |
| WO | 2021-038465 A1 | 3/2021 |
| WO | 2021076986 A1 | 4/2021 |
| WO | 2021-116859 A1 | 6/2021 |
| WO | 2021119290 A1 | 6/2021 |
| WO | 2021119319 A1 | 6/2021 |
| WO | 2021156730 A1 | 8/2021 |
| WO | 2021221918 A1 | 11/2021 |
| WO | 2022006201 A1 | 1/2022 |
| WO | 2022-107038 A1 | 5/2022 |
| WO | 2022090904 A1 | 5/2022 |
| WO | 2022187721 A1 | 9/2022 |
| WO | 2023130059 A1 | 7/2023 |
| WO | 2023130082 A1 | 7/2023 |
| WO | 2023130088 A1 | 7/2023 |

OTHER PUBLICATIONS

SI, reported density/mass table (Year: 2019).*
Cao, S., et al., "Investigation on urea-formaldehyde resin as an in-powder adhesivefor the fabrication of Al2O3/borosilicate—glass composite parts bythree dimensional printing (3DP)", Journal of Materials Processing Technology 217 (2015) pp. 241-252.
Melcher, R., et al., "Fabrication of Al2O3-based composites by indirect 3D-printing", Materials Letters 60 (2006) pp. 572-575.
Seleznev, Maxim, et al., "Novel Near-Net-Shape Tool-Less Method for Manufacturing Cast Metal Matrix Composites: Three-Dimensional Printing of Ceramic Preforms Combined with Investment Casting Technology", SAE Transactions, vol. 109, Section 5: Journal of Materials & Manufacturing (2000), pp. 235-242.
Winkel, Alexander, et al., "Sintering of 3D-Printed Glass/Hap Composites", Journal of the American Ceramic Society, vol. 95, No. 11, Nov. 2012, pp. 3387-3393.
Zhang, Wei, et al., "Three-Dimensional Printing of Complex-Shaped Alumina/Glass Composites", Advanced Engineering Materials 2009, 11, No. 12, pp. 1038-1043.
Spierings, Adriaan Bernardus, et al., "Processing of metal-diamond-composites using selective laser melting", Rapid Prototyping Journal, vol. 21, No. 2, 2015, pp. 130-136.
Zocca, Andrea, et al., "Additive Manufacturing of Ceramics: Issues, Potentialities, and Opportunities", Journal of the American Ceramic Society, Jul. 2015, vol. 98, No. 7, pp. 1983-2001.

(56) References Cited

OTHER PUBLICATIONS

Guo, Nannan, et al., "Additive Manufacturing: technology, applications and research needs," Front. Mech. Eng., 2013, 8(3), pp. 215-243.

Yin, Xiaowei, et al., "Three-Dimensional Printing of Nanolaminated Ti3AlC2 Toughened TiAl3—Al2O3 Composites," Journal of the American Ceramic Society, Jul. 2007, vol. 90, No. 7, pp. 2128-2134.

Rosso, M., "Ceramic and metal matrix composites: route and properties", Polytechnic of Turin, Dep. of Material Science and Chemical Engineering, 12th International Scientific Conference: Achievements in Mechanical and Materials Engineering, 16 pages.

Bak, David, "Rapid prototyping or rapid production? 3D printing processes move industry towards the latter", Assembly Automation, 2003, vol. 23, No. 4, pp. 340-345.

3M Technology, "3D Printed Abrasives", YouTube Video, Uploaded Jun. 4, 2019, 1 page. <https://www.youtube.com/watch?v=TtYte1l-BsM>.

"New Infographic: How It Works . . . Software-Driven 3D Post-Printing with AUTOMAT3D™", Jun. 20, 2018, 5 pages.

Americamakes, "Success Story: Hybrid Direct Manufacturing: Integrating Additive and Subtractive Methods—Improving Productivity by Integrating Automatic Finishing with Direct Metal Additive Manufacturing," 2017, 2 pages.

Kumbhar_N.N. et al., "Post Processing Methods used to Improve Surface Finish of Products which are Manufactured by Additive Manufacturing Technologies: A Review", J. Inst. Eng. India Ser. C (Aug. 2018) 99(4):481-487, 7 pages.

International Search Report from PCT Application No. PCT/US2019/029239 dated Sep. 11, 2019, 5 pages.

International Search Report from PCT Application No. PCT/US2020/056111 dated Feb. 10, 2021, 5 pages.

International Search Report from PCT Application No. PCT/US2020/064322 dated Mar. 16, 2021, 5 pages.

International Search Report for PCT/US2021/028910 dated Aug. 5, 2021, 4 pages.

International Search Report for PCT/US2022/019047 dated Jun. 17, 2022, 5 pages.

International Search Report for PCT/US2022/019046 dated Jun. 17, 2022, 4 pages.

Beyer, Dr. Peter, "Exploring the New Dimensions of 3D Abrasives Technology," The Meister Toolbox, Jul. 7, 2016, 2 pages.

Lewis, Jennifer A., et al., "Direct Ink Writing of Three-Dimensional Ceramic Structures," J. Am. Ceram. Soc., 89 [12] 3599-3609, 2006, 11 pages.

Cabala et al., "Silver nanoparticle surface functionalized alumina filters for disinfection of potable water," Material Today: Proceedings 2 (2015) 321-330.

Wehling et al. "Silver nanoparticle-doped zirconia capillaries for enhanced bacterial filtration." Material Science and Engineering C 48 (2015) 179-187.

Yang et al., "Development and Characterization of Porous Silver-Incorporated Hydroxyapatite Ceramic for Separation and Elimination of Microorganisms." Published online Wiley InterScience Aug. 29, 2006.

International Search Report for Application No. PCT/US2020/064282 dated Apr. 8, 2021, 3 pages.

International Search Report & Written Opinion for PCT/US2017/058808, mailed Feb. 19, 2018, 12 pages.

International Search Report for Application No. PCT/US2022/082650 dated May 4, 2023, 4 pages.

International Search Report for Application No. PCT/US2022/082641 dated May 2, 2023, 4 pages.

International Search Report for Application No. PCT/US2022/082606 dated May 9, 2023, 4 pages.

ExOne Binder Jetting Technology, "What is Binder Jetting?", <https://www.exone.com/en-US/case-studies/what-is- binder-jetting>, retrieved Oct. 3, 2019, 2 pages.

Abrasive Technology—Current Development and Applications I, Proceedings of the Third International Conference on Abrasive Technology (ABTEC '99), Brisbane, Australia, Nov. 1999, 556 pages (Abstract).

Beyer, Dr. Peter, "Exploring the New Dimensions of 3D Abrasives Technology," The Meister Toolbox, Jul. 7, 2016, 2 pages, <https://meister-abrasives-toolbox.com/2016/07/07/exploring-the-new-dimensions-of-3d-abrasives-technology/>.

Ensoll Tools, "CBN Wire Loops or Diamond Wire Loops is Fit for Metal Cutting?", <http://www.ensolltools.com/en/news/new-88-81.html> Accessed May 12, 2022.

Tian, Chenchen, et al., "Study on design and performance of metal-bonded diamond grinding wheels fabricated by selective laser melting (SLM)", Materials and Design 156 (2018), pp. 52-61 <https://doi.org/10.1016/j.matdes.2018.06.029>.

Tian, Chenchen, et al., "The effect of porosity on the mechanical property of metal-bonded diamond grinding wheel fabricated by selective laser melting (SLM)", Materials Science & Engineering A 743 (2019), pp. 697-706 <https://doi.org/10.1016/j.msea.2018.11.138>.

Tian, Chenchen, et al., "Porous structure design and fabrication of metal-bonded diamond grinding wheel based on selective laser melting (SLM)", The International Journal of Advanced Manufacturing Technology (2019) 100: 1451-1462 <https://doi.org/10.1007/s00170-018-2734-y>.

Tian, Chenchen, et al., "Study on formability, mechanical property and finite element modeling of 3D-printed composite for metal-bonded diamond grinding wheel application", Journal of Manufacturing Processes 54 (2020), pp. 38-47 <https://doi.org/10.1016/j.jmapro.2020.02.028>.

Qiu, Yanfei, et al., "Effect of additive particles on the performance of ultraviolet-cured resin-bond grinding wheels fabricated using additive manufacturing technology", The International Journal of Advanced Manufacturing Technology (2018) 97: 9873-3882 <https://doi.org/10.1007/s00170-018-2231-3>.

Yang, Zhibo, et al., "A study on diamond grinding wheels with regular grain distribution using additive manufacturing (AM) technology", Materials and Design 104 (2016) pp. 292-297 <http://dx.doi.org/10.1016/j.matdes.2016.04.104>.

Du, Zhi-jun, et al., "Selective laser sintering and grinding performance of resin bond diamond grinding wheels with arrayed internal cooling holes", Ceramics International 45 (2019) pp. 20873-20881 <https://doi.org/10.1016/j.ceramint.2019.07.076>.

Search Results, Mar. 4, 2021, 14 pages.

3M, "3D Printed Superabrasives", 2024, 6 pages <https://www.3m.com/3M/en_US/metalworking-us/applications/grinding/precision-grinding/technology/superabrasives/precision-structured-wheels/>.

3M, "Precision Grinding and Microfinishing", 2024, 3 pages <https://www.3m.com/3M/en_US/metalworking-us/applications/grinding/precision-grinding/>.

3M, "Precision Grinding and Finishing Technology", 2024, 3 pages <https://www.3m.com/3M/en_US/metalworking-US/applications/grinding/precision-grinding/featured-technology/>.

Mishek, Danny, "Time and Money Saved with RP/RT Strategy", Apr. 1, 2007, 4 pages <https://www.moldmakingtechnology.com/articles/time-and-money-saved-with-rp-rt-strategy>.

Yang, Zhibo, et al., "Interface Microstructure and Formation Mechanism of Diamond Abrasives Laser Brazed with Ni—Cr Solder", Rare Metal Materials and Engineering, 45, 5, 1152-1156, 2016, Abstract Only.

Sears, James W., "Developing New Applications Based on Laser Additive Manufacturing of WC Cermets and WC Forming Alloys (Invited Paper)", Chinese Journal of Lasers, 36, 12, 3245-3250, 2009, Abstract Only.

Webster, J., et al., "Innovations in abrasive products for precision grinding", CIRP Annals-Manufacturing Technology, 53, 2, 597-617, 2004Conference: 54th General Assembly of CIRP, Krakow, Poland, Aug. 22-28, 2004, Abstract Only.

Maekawa, K., et al., "Fabrication of metal-bonded grinding/polishing tools by greentape laser sintering method", Precision Machining of Advanced Materials, 196, 133-140, 2001, Abstract Only.

(56) References Cited

OTHER PUBLICATIONS

Yang, Zhibo, et al., "3D Printing of Diamond Tools for Dental Ceramics Processing", Advanced Engineering Materials, 20, 3, 2018 Language: English, Abstract Only.
Peng, Ruitao, et al., "Performance of a pressurized internal-cooling slotted grinding wheel system", International Journal of Advanced Manufacturing Technology, 94, 5-8, 2239-2254, 2018, Abstract Only.
Stoyanov, Pantcho, et al., "Microstructural and mechanical characterization of Mo-containing Stellite alloys produced by three dimensional printing", Procedia CIRP 45 (2016) pp. 167-170.
Myers, Kyle, "Structure-Property Relationship of Binder Jetted Fused Silica Preforms to Manufacture Ceramic-Metallic Interpenetrating Phase Composites", Youngstown State University, May 2016, 252 pages.
Search Results, Apr. 19, 2019, 18 pages.
Search Results, May 2020, 11 pages.
Search Results, Nov. 2022, 7 pages.
Advanti Technology P L, "3D Metal Printer ExOne" May 1, 2014 <https://www.youtube.com/watch?v=ZqI0B0V-ttw>.
Xu, Xipeng, et al., "The fabrication of grinding wheels with 3-dimensional controllable abrasives arrangement using stereolithography apparatus method", Huaqiao University, China, 2nd International Conference on 3D Printing Technology and Innovations, 2018, abstract only.
Lu, Jing, et al., "Protecting diamond abrasive from being corroded in the vitrified bond wheel manufactured by 3D printing", Institute of Manufacturing Engineering, Huaqiao University, Xiamen, P.R. China, 2nd International Conference on 3D Printing Technology and Innovations, 2018, abstract only.
Yang, Zhibo, Li Kaiqiang, Hu Junchen, Zhang Shiyu. Temperature field simulation of grinding wheel preparation by selective laser sintering of nickel-based binder[J]. Heat Treatment of Metals, 2018, 43(10):210-216, abstract only.
Zhang, Shubo, et al., "The design and fabrication of porous sintered grinding wheel based on Selective Laser Melting technology", Journal of Physics: Conference Series, vol. 1074, 2018, 10 pages <DOI: 10.1088/1742-6596/1074/1/012157>.
Tanaka, T., et al., "New development of a grinding wheel with resin cured by ultraviolet light", Journal of Materials Processing Technology, vol. 113, Issues 1-3, Jun. 15, 2001, pp. 385-391, abstract only.
Tanaka, T., et al., "Development of Grinding Wheels by Stereolithography and Investigation of their Characteristics", Key Engineering Materials, Apr. 2003, 238-239:277-282, abstract only <DOI: 10.4028/www.scientific.net/KEM.238-239.277>.
Okushima, Kenichi, et al., "Development of resin-bonded grinding wheel by stereolithography", Journal of the Japan Society for Precision Engineering 69(10): 1459-1463, Oct. 2003, abstract only <DOI: 10.2493/jjspe.69.1459>.
Yamamoto, Daiki, et al., "ELID grinding wheel fabrication technology applying PELID and 3D printer" Journal of the Japan Society for Abrasive Technology, 2016, vol. 60, Issue 5, pp. 267-268, abstract only <DOI: https://doi.org/10.11420/jsat.60.267>.
Tsukada, Namiki, et al., "Construction of laminated grinding wheel production system using PELID", Jan. 2016, The Proceedings of the Conference on Information Intelligence and Precision Equipment IIP 2016:H-2-3, abstract only <DOI: 10.1299/jsmeiip.2016.H-2-3>.
Iinuma, Ryosuke et al., "Grinding wheel fabrication using twin nozzle PELID and its characteristics", Jan. 2017, The Proceedings of Ibaraki District Conference 2017.25:715, abstract only <DOI: 10.1299/jsmeibaraki.2017.25.715>.
Ohno, Ryouhei, et al., "Development of ELID grinding wheel using PELID and nano-diamond", 2016, 2 pages, English abstract.
Saito, Hiroki, et al., "Development of Resin ball grinding wheel using PELID", Jan. 2016, The Proceedings of Ibaraki District Conference 2016.24:709, abstract only <DOI: 10.1299/jsmeibaraki.2016.24.709>.
Yano, Toui, et al., "Development and evaluation of ELID grinding wheel using 3D printer and PELID", Jan. 2017, The Proceedings of Ibaraki District Conference 2017.25:714, Abstract only <DOI: 10.1299/jsmeibaraki.2017.25.714>.
Jimenez, Edgar Mendoza, et al., SI, "Parametric analysis to quantify process input influence on the printed densities of binder jetted alumina ceramics," Additive Manufacturing 39 (2019) 100864, SI, 5 pages.
Li Ming, et al., "Binder Jetting Additive Manufacturing of Metals: A Literature Review", vol. 1: Additive Manufacturing; Manufacturing Equipment and Systems; Bio and Sustainable Manufacturing, vol. 1, Jun. 10, 2019 (Jun. 10, 2019), XP055954813, DOI: 10.1115/MSEC2019-2994, ISBN: 978-0-7918-5874-5 *table 4*.
Li et al. "Removal and retention of viral aerosols by a novel alumina nanofiber filter." Aerosol Science 40 (2009) 65-71.
Negas et al., "Simple methods to incorporate silver and copper generate antmicrobial glasses and porous glass-bonded ceramics." ACS bulletin vol. 96, Jul. 2017, No. 5, 6 pages.
Tepper, et al., "Novel Nanofibre Filter Medium Attracts Waterborne Pathogens," Jul./Aug. 2002, www.filtsep.com, 4 pages.
Virus Absorbing Air Filter, 21.2, (1991), 521-523.
Doremalen, et al., "Aerosol and Surface Stability of SARS-CoV-2 as Compared with SARS-CoV-1", The New England Journal of Medicine, 382;16, Apr. 16, 2020, 4 pages <https://www.nejm.org/doi/full/10.1056/NEJMc2004973>.
Chaplin, Brian P., "Critical Review of Electrochemical Advanced Oxidation Proceses for Water Treatment Applications," Department of Chemical Engineering, University of Illinois at Chicago, Environmental Science: Processes and Impacts, The Royal Society of Chemistry, 2013, 24 pages.
Morawska, Lidia, et al., "Airborne transmission of SARS-COV-2: The world should face the reality", International Laboratory for Air Quality and Health, Environment International 139 (2020) 105730.
Olsen, Sonja J., et al., "Transmission of the Severe Acute Respiratory Syndrome on Aircraft", The New England Journal of Medicine, 349:25, Dec. 18, 2003.

* cited by examiner

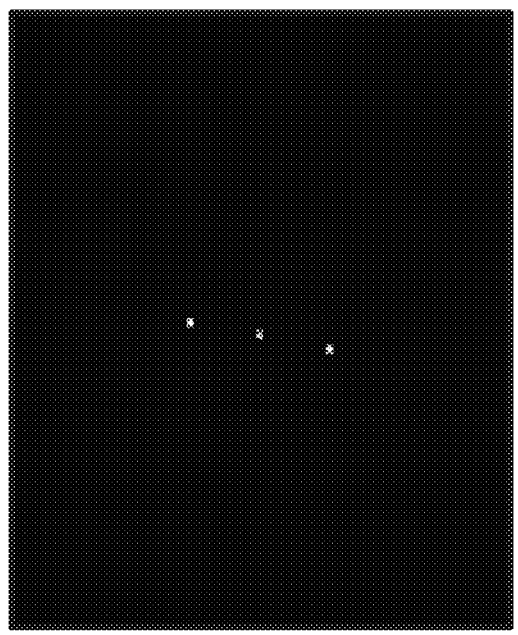
FIG. 4E
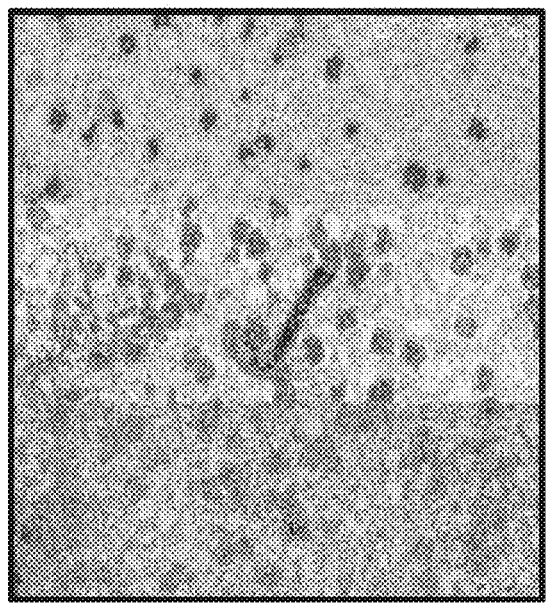 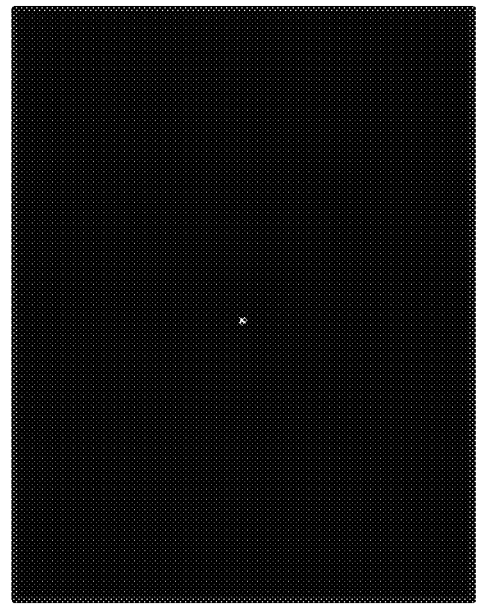
FIG. 5A    FIG. 5B

- Purpose: providing same amount of powder for primary roller to spread powder $$\text{Compaction ratio} = \frac{DT}{LT} - 1 = \frac{LT + \Delta r1 + \Delta r2}{LT} - 1 = \frac{\Delta r1 + \Delta r2}{LT}$$

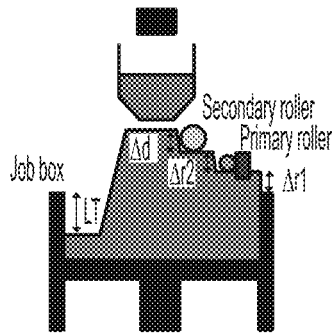
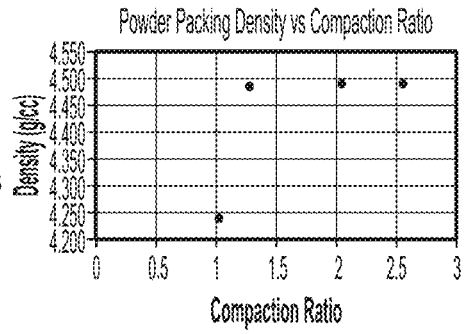

Δr1  Offset between primary roller and job box
Δr2  Offset between primary and secondary rollers
Δd   Extra powder height above secondary roller
LT   Layer thickness
DT   Leveled dispensed powder thickness

FIG. 14

CT  Compaction thickness
n   Compaction pass count

- Purpose: forcing powder downward by forward rotating roller

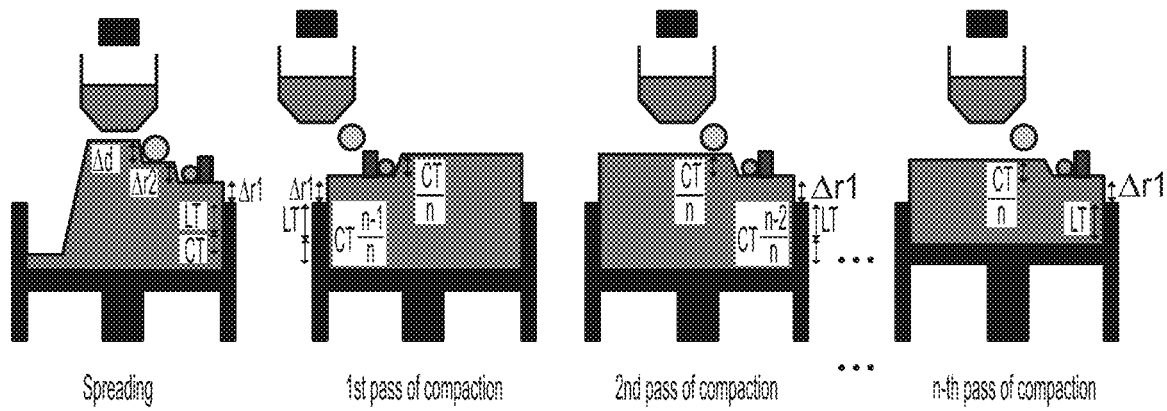

FIG. 15

Comparative sample 2
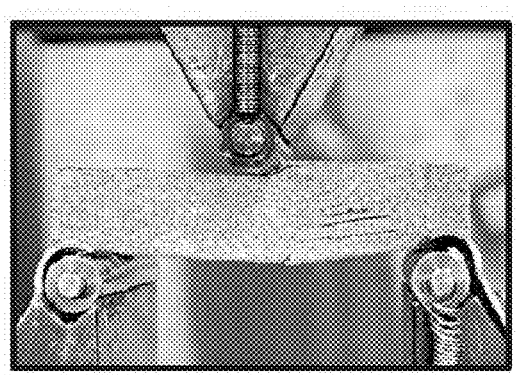
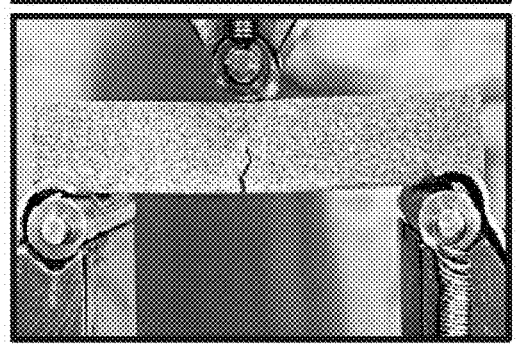
Comparative sample 5
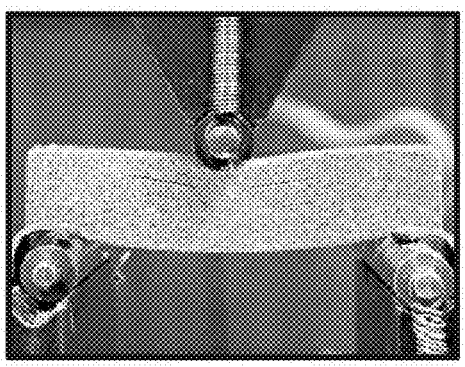
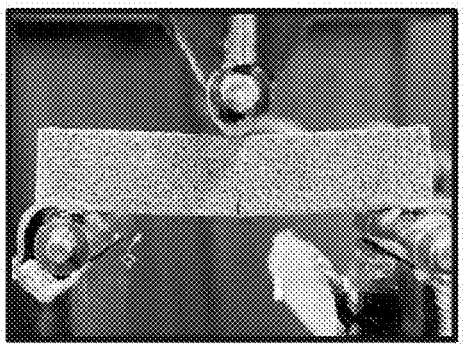
FIG. 16
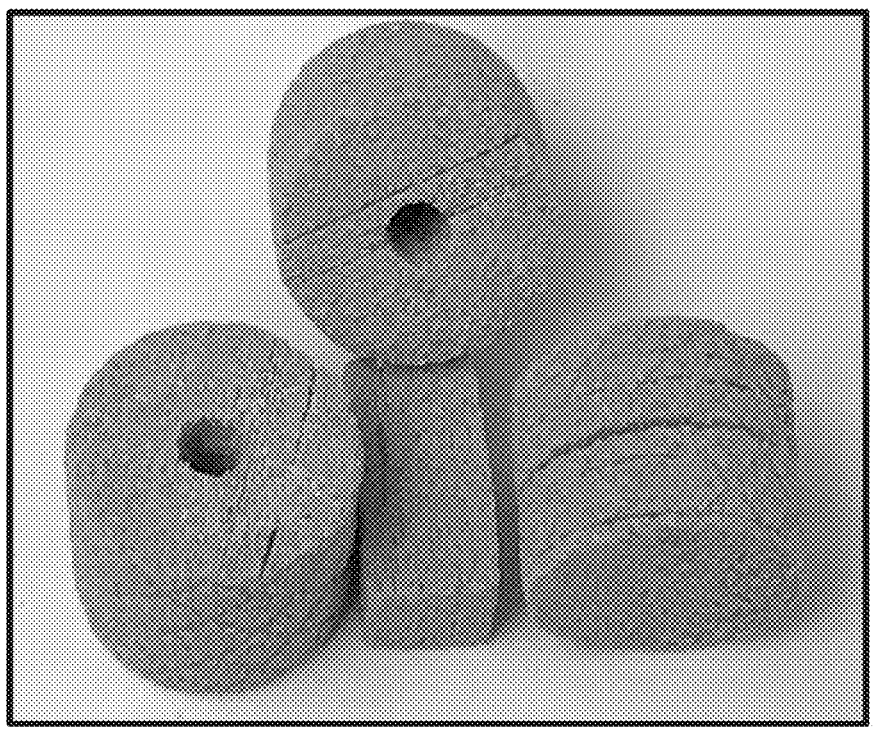
FIG. 17

ABRASIVE ARTICLES AND METHODS FOR FORMING SAME

CROSS-REFERENCE TO RELATED APPLICATION(S)

This application claims priority under 35 U.S.C. § 119 (e) to U.S. Provisional Patent Application No. 63/157,236, filed Mar. 5, 2021, by Brahmanandam V. TANIKELLA et al., entitled "ABRASIVE ARTICLES AND METHODS FOR FORMING SAME," and to U.S. Provisional Patent Application No. 63/266,282, filed Dec. 30, 2021, by Brahmanandam V. TANIKELLA et al., entitled "ABRASIVE ARTICLES AND METHODS FOR FORMING SAME," both of which are assigned to the current assignees hereof and incorporated herein by reference in their entireties.

FIELD OF THE DISCLOSURE

The present disclosure relates to forming abrasive articles and aspects of one or more green bodies and/or finally-formed abrasive articles.

BACKGROUND

Abrasive articles are used in material removal operations, such as cutting, grinding, or shaping various materials. Abrasive articles or green bodies of abrasive articles can be formed via additive manufacturing. There is a need to develop improved abrasive articles.

BRIEF DESCRIPTION OF THE DRAWINGS

Embodiments are illustrated by way of example and are not limited in the accompanying figures.

FIGS. 4A-E include processed cross-sections of abrasive articles according to an embodiment.

FIGS. 5A and 5B include images from a bonded abrasive formed through conventional processing techniques of hot pressing.

FIG. 14 includes a diagram of a method of forming an article according to an embodiment.

FIG. 15 includes a diagram of a method of forming an article according to an embodiment.

FIG. 16 includes images of abrasive articles undergoing flexural strength testing.

FIG. 17 includes images of a comparative sample.

DESCRIPTION

Figure 1A:
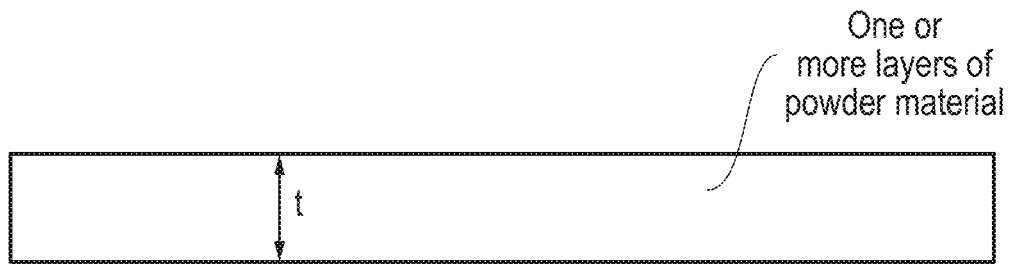
FIGS. 1A-E include illustrations of a process of forming an abrasive article according to an embodiment.

The present disclosure may be better understood, and its numerous features and advantages made apparent to those skilled in the art by referencing the accompanying drawings.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to methods for forming abrasive articles and the features of the resulting abrasive articles. While prior disclosures have provided some limited examples of forming abrasive articles via additive manufacturing, such abrasive articles are limited in their size, quantity, and quality. In fact, Applicants of the present disclosure have conducted notable empirical studies and have found that the knowledge necessary to create high quality abrasive articles according to conventional additive manufacturing techniques is noted, specifically in the context of dry powder layering and binding techniques. To-date, disclosures in the prior art are limited to micro-abrasive bodies. This is because formation of large-scale, high-quality abrasive articles via dry powder layering and binding techniques is not easily scalable. Numerous hurdles limit the advance of the technology, including but not limited to, the capability of creating dense parts, dimensional stability during and after forming, and the empirical studies needed to fully understand and appreciate the complexities of the process variables. Such process variables include, but is not limited to, composition of the powder material, flowability of the powder material, a force applied by a compaction object to the layer or a plurality of layers of powder, a traverse speed of a compaction object, average thickness of the layer prior to compaction, a particle size distribution of the powder, number of previously formed layers underlying the layer of powder, the number of compacted layers underlying the layer of powder, the density of any layers underlying the layer of powder, the amount of binder in any layers underlying the layer of powder, the relative dimensions of the layer relative to one or more layers underlying the layer, an average thickness of the layer prior to compaction, a printhead deposition resolution, saturation limits of the binder, composition of the binder material, and others. In a particular embodiment, the process can include repeating the method to form a batch of abrasive articles or green body abrasive articles.

FIG. 1A includes an illustration of a portion of the process including forming one or more layers of powder material that can include abrasive particles and may include a mixture of abrasive particles and precursor bond material. The layer of powder can have an average thickness (t). The layer of powder material can be dispensed as described in embodiments herein.

Figure 1B:
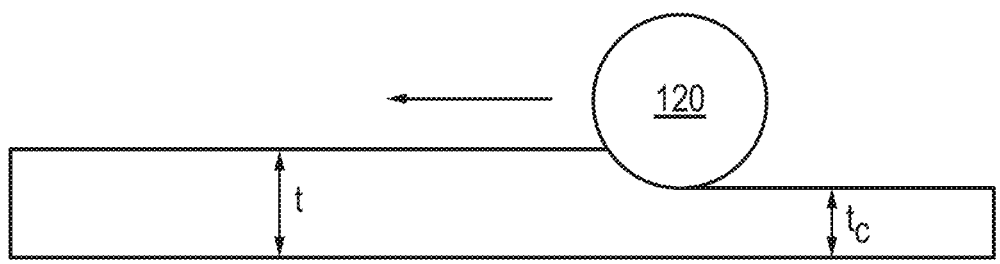

FIG. 1B includes an illustration of a process of compacting at least a portion of the layer with a compaction object (120). The compaction object 120 can traverse the layer and compact the layer to form a compacted layer having an average thickness (tc). The compacted layer thickness (tc) can be less than the layer thickness (t) prior to compaction as described according to embodiments herein. As will be appreciated, in some instances, multiple layers of powder material may be formed and compaction can be completed on more than one layer of powder material simultaneously. In some optional embodiments, a smoothing roller may traverse the surface of the layer of powder, but smoothing rollers do not apply sufficient force to cause compaction, rather they scrape the surface of the layer to remove and smooth any large undulations.

Figure 1C:
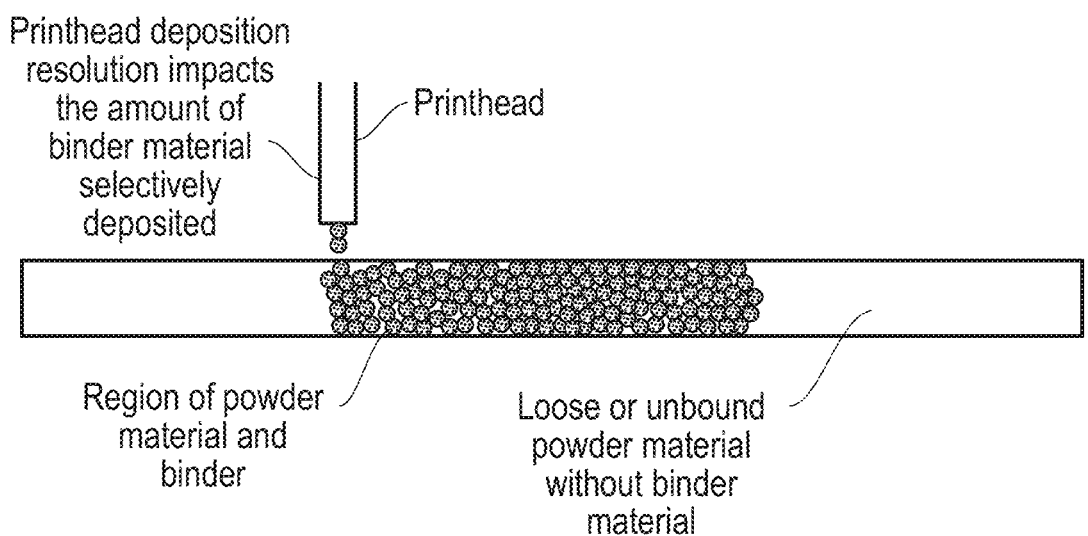

FIG. 1C includes binding at least a portion of the compacted layer of powder material with a binder material. The binder material can have any of the features described in the claims herein. The amount of binder material is sufficient to bind the powder material. The regions that do not include binder material can be loose or unbound powder, which may be removed and captured after processing is completed and used as recycled powder. Notably, at the edges of the region between the bound powder material and unbound powder material, the binder material may exist in some of the loose powder. Accordingly, as described in claimed embodiments herein, the recycled powder may include some content of organic material, such as binder material that was included in the captured loose or unbound powder material, particularly at the regions bordering the bound and unbound powder. Methods may be used to treat the loose powder material including organic material to remove a certain content of organic material prior to recycling the powder material and using in one or more subsequent additive manufacturing processes to form abrasive articles.

Figure 1D:
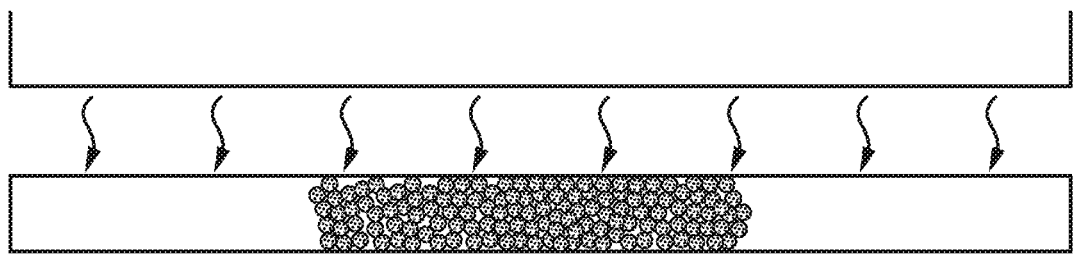

FIG. 1D includes a process for binding the powder material by treating the layer to convert the binder from a liquid material to a solid material to bind the powder material. The process can include curing of at least a portion of the binder material as claimed in embodiments herein.

Figure 1E:
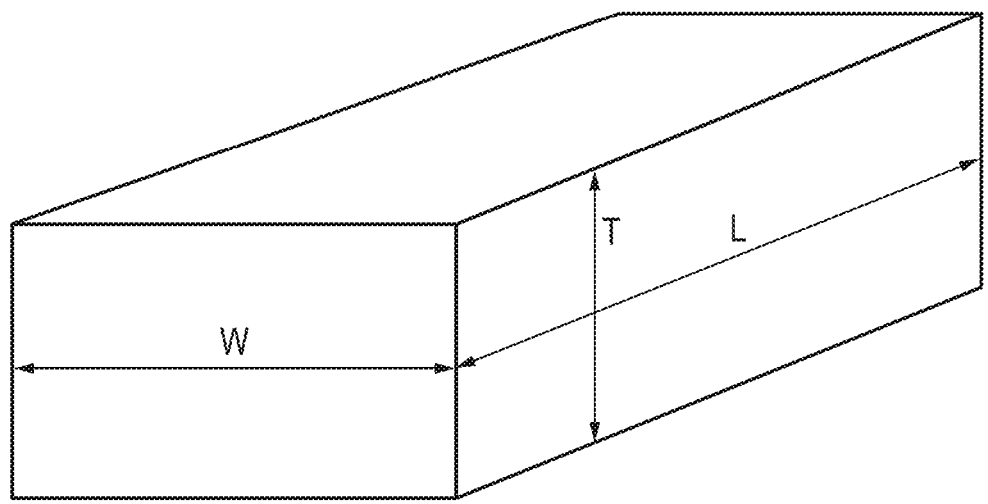

FIG. 1E is an illustration of an abrasive article, which may represent a green body or finally-formed abrasive article. It will be appreciated that the abrasive articles of the embodiments herein can have any three-dimensional shape and FIG. 1E is illustrative of only one possible shape. The length (L) defines the longest dimension of the body and the width (W) defines a dimension of the body substantially perpendicular to the length and may be a value less than the length and greater than the thickness (T). The thickness (T) of the body may extend in a direction perpendicular to a plane defined by the length and width. The dimensions of any body of embodiments herein may have a relationship of length, width, and thickness defined as L>W>T. In those instances wherein the body is in the form of a cylinder with the axial axis being the longest, the length is the longest dimension in the axial direction, the width can be a first diameter of an end surface, and the thickness can be another diameter. In the case of an abrasive article in the form of a disk, wherein the diameter is the greatest dimension, the diameter defines the length of the body, the width defines a diameter perpendicular to the length (and may be the same as the length, and the thickness defines the dimension of the body in an axial direction perpendicular to the plane of the circular end surface.

The abrasive articles can have contents and compositions of abrasive particles, bond material, precursor bond material, and any additives as described in the embodiments herein.

Figure 2A:
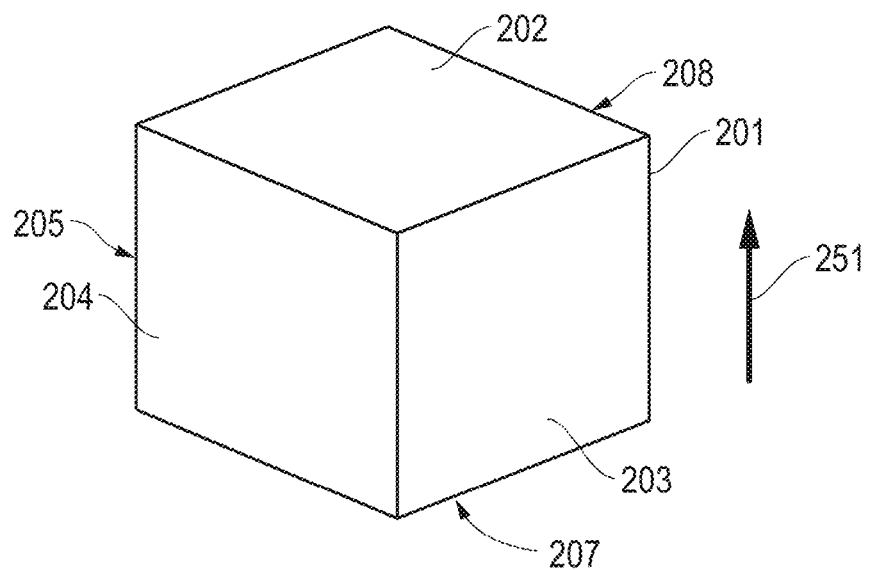
FIGS. 2A and 2B include perspective view illustrations of abrasive articles according to an embodiment.
Figure 2B:
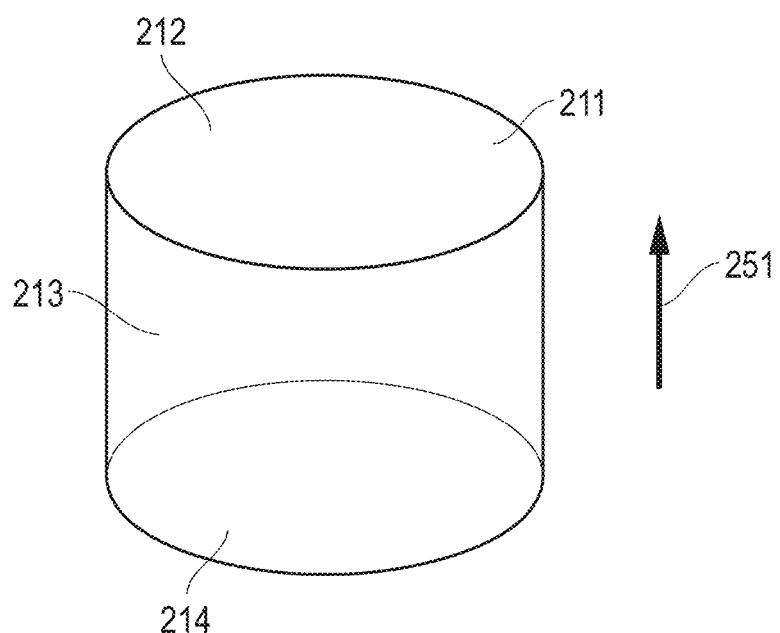

FIGS. 2A and 2B include perspective view illustrations of abrasive articles, which may be green bodies or finally-formed abrasive articles according to embodiments herein. The bodies of FIGS. 2A and 2B can be formed by any of the methods of the embodiments herein and formed in a build direction 251. The body 201 can have surfaces 208 203 204 204 that are transverse relative to the build direction and surfaces that are not transverse to the build direction 202 and 207. The body 211 can be in the shape of a cylinder having a surface 213 transversely relative to the build direction and surfaces 212 and 214 that are not transverse to the build direction. It will be appreciated that the abrasive articles may be in any number of shapes and not limited to those explicitly shown herein. It will be appreciated that the bodies may be formed using a variety of build directions. In certain embodiments, the build direction may impact certain features of the abrasive articles, as green body abrasive articles and/or finally-formed abrasive articles. In certain instances, the transverse surfaces may have a different Sdr than the other surfaces. In an embodiment, the transverse surfaces may have a higher Sdr than surfaces having a different orientation to the transverse surfaces, and more specifically, surfaces having different orientations relative to the build direction 251. It will be appreciated that the build direction may be manipulated to control which surfaces have a relatively high or low Sdr. For example, an abrasive may be constructed such that the smallest surfaces are not transverse to the build direction, minimizing the amount of surface area with a low Sdr. Different Sdr values may be valuable for different applications. For example, a high Sdr surface may be useful as an abrasive working surface in low pressure grinding applications. A high or low Sdr surface may also more easily bind or adhere to a substrate or another surface using a binder, an adhesive, or other coupling means, depending on the composition of the coupling means. In an embodiment, a transverse surface can be an abrasive working surface of the body. In another embodiment, a surface that is not a transverse surface can be an abrasive working surface of the body. In embodiments, either a transverse surface or a surface that is not transverse can be coupled to another surface via a binder or adhesive. In an embodiment, the transverse surfaces may have visible layering or roughness that is not present on the other surfaces.

Figure 3:
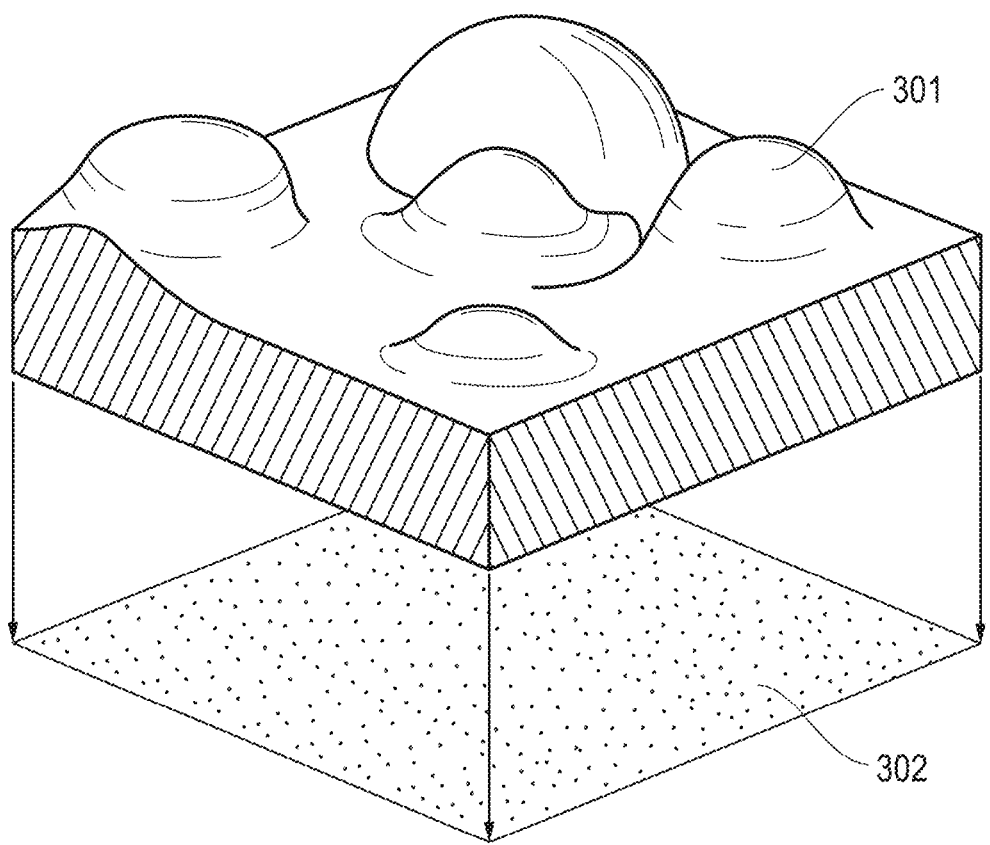
FIG. 3 includes an illustration of the measuring principle of the developed interfacial area ratio Sdr.

FIG. 3 includes an illustration of the measuring principle of the developed interfacial area ratio Sdr. The developed interfacial area ratio Sdr expresses the percent increase in surface area 301 (provided by the surface texture) in relation to a corresponding underlying projected area 302 (ideal flat plane) and was measured according to ISO standard method ISO25178-2:2012.

The developed interfacial area ratio Sdr expresses the percentage rate of an increase in a surface area $A_1$ 301 that is related to the surface texture in comparison to a projected area $A_0$ 702, wherein $A_0$ 302 corresponds to an ideal plane underneath the measured surface texture. An illustration of the relation of surface area $A_1$ 301 to projected area $A_0$ 302 is shown in FIG. 3. The Sdr measurements were conducted with an Olympus LEXT OLS5000 laser confocal microscope. The analyzed surface area was 257×257 µm, at a 50 times magnification, with a filter cylinder. Four measurements per sample were conducted at different locations and an average Sdr value was calculated according to the equation:

$$r = \frac{1}{A}\left[\int\int_A\left(\sqrt{\left[1+\left(\frac{\partial z(x,y)}{\partial x}\right)^2+\left(\frac{\delta z(x,y)}{\delta y}\right)^2\right]}-1\right)dxdy\right].$$

The Sdr can be also expressed by the following formula: Sdr=[($A_1/A_0$)−1]×100(%).

In an embodiment, the additive manufacturing process can be performed with a specific printer head deposition resolution that may result in improved manufacturing or performance of the abrasive body. It will be appreciated that the printhead deposition resolution may be between any of the minimum and maximum values claimed herein. Without wishing to be tied to one theory, some data suggests that manipulating the resolution may alter the Sdr on the surfaces of the body. A small resolution may lead to a smaller Sdr on surfaces transverse to the build direction, as well as a smaller difference in Sdr between transverse surfaces and surfaces that are not transverse to the build direction. The same may be true for the thickness of the layers before and/or after compaction.

In one aspect, the binder jetting can include using as starting material a powder material having a multi-modal particle distribution. The multimodal particle size distribution of the powder material may be related to different sizes of a single phase material or creation of a mixture from different powder components, including, for example, but not limited to, a mixture including a first particulate material (e.g., abrasive particles having a first particle size distribution) and a second particulate material (e.g., particulate bond material or bond material precursor having a second particle size distribution that is different from the first particle size distribution).

In one particular aspect, the powder material for the binder jetting can be bi-modal particle distribution, wherein a first plurality of particles can have an average particle size (D50) of at least 1 µm and not greater than 10 µm, and a second plurality of particles can have an average particle size (D50) of at least 20 µm and not greater than 50 µm.

In another aspect, a weight % ratio of the first plurality of particles to the second plurality of particles can be from 1:0.1 to 1:10. In certain aspects, the weight % ratio can be not greater than 1:0.3, or not greater than 1:0.5, or not greater than 1:1, or not greater than 1:2, or not greater than 1:3, or not greater than 1:4, or not greater than 1:5, or not greater than 1:6, or not greater than 1:7, or not greater than 1:8, or not greater than 1:9, or not greater than 1:10.

In an embodiment, the abrasive particles can include oxides, carbides, nitrides, borides, diamonds, or any combination thereof. In an embodiment, the abrasive particles can include alumina, zirconia, ceria, diamond, or any combination thereof.

In an embodiment, the abrasive body can include at least 2 vol % abrasive particles for a total volume of the body or at least 5 vol %, or at least 10 vol %, or at least 15 vol %, or at least 20 vol %, or at least 25 vol %, or at least 30 vol %, or at least 35 vol %, or at least 40 vol %, or at least 45 vol %, or at least 50 vol %, or at least 55 vol %, or at least 60 vol %, or at least 65 vol %, or at least 70 vol %, or at least 75 vol %, or at least 80 vol %, or at least 85 vol %, or at least 90 vol %. In an embodiment, the body can include not greater than 95 vol % abrasive particles for a total volume of the body or not greater than 90 vol %, or not greater than 85 vol %, or not greater than 80 vol %, or not greater than 75 vol %, or not greater than 70 vol %, or not greater than 65 vol %, or not greater than 60 vol %, or not greater than 55 vol %, or not greater than 50 vol %, or not greater than 45 vol %, or not greater than 40 vol %, or not greater than 35 vol %, or not greater than 30 vol %, or not greater than 25 vol %, or not greater than 20 vol %, or not greater than 15 vol %, or not greater than 10 vol %, or not greater than 5 vol %. It will be appreciated that the vol % of abrasive particles can be between any of the minimum and maximum values noted above.

In an embodiment, the body can include a bond material or bond material precursor comprising an organic material or inorganic material or any combination thereof. In an embodiment, the bond material can comprise thermoplastics, thermosets, resins, or any combination thereof. In an embodiment, the bond material can comprise phenolic resin, polyimides, polyamides, polyesters, aramids, epoxies, or any combination thereof. In an embodiment, the bond material can comprise a transition metal element. In an embodiment, the bond material can comprise an amorphous phase, polycrystalline phase, or any combination thereof. In an embodiment, the bond material can comprise ceramic material, vitreous material, or any combination thereof, or wherein the ceramic material is polycrystalline, or wherein the vitreous material is amorphous. In an embodiment, the bond material can comprise an oxide. In an embodiment, the bond material can comprise an alumina-containing vitreous material. In an embodiment, the bond material can comprise silica-containing vitreous material. In an embodiment, the bond material can comprise at least one of alumina, silica, boron oxide, bismuth oxide, zinc oxide, barium oxide, magnesium oxide, calcium oxide, lithium oxide, sodium oxide, potassium oxide, cesium oxide, strontium oxide, zirconium oxide, manganese oxide, or any combinations thereof.

In an embodiment, an abrasive body can have a first surface having a first (Sdr1) and a second surface having a second developed interfacial area ratio (Sdr2). In an embodiment, Sdr1 can be greater than Sdr2. In another embodiment, Sdr1 can be less than Sdr2. In an embodiment, the first surface can be a transverse surface relative to the build direction of the abrasive article.

In an embodiment, a certain percentage of the surface area of the body can be a relatively high Sdr surface. It will be understood that a surface with a relatively high Sdr has an Sdr greater than the average Sdr of the entire body. In an embodiment at least 5% of the exterior surface area of the body can be a relatively high Sdr surface, or at least 7%, or at least 10%, or at least 12%, or at least 14%, or at least 16%, or at least 20%, or at least 22%, or at least 24%, or at least 26%, or at least 28%, or at least 30%, or at least 32%, or at least 34%, or at least 36%, or at least 38%, or at least 40%, or at least 42%, or at least 44%, or at least 46%, or at least 48%, or at least 50%, or at least 52%, or at least 54%, or at least 56%, or at least 58%, or at least 60%, or at least 62%, or at least 64%, or at least 66%, or at least 68%, or at least 70%, or at least 72%, or at least 74%, or at least 76%, or at least 78%, or at least 80%, or at least 82%, or at least 84%, or at least 86%, or at least 88%, or at least 90%, or at least 93%, or at least 95%. In an embodiment not greater than 95% of the exterior surface area of the body can be a relatively high Sdr surface, or not greater than 93%, or not greater than 90%, or not greater than 88%, or not greater than 86%, or not greater than 84%, or not greater than 82%, or not greater than 80%, or not greater than 78%, or not greater than 76%, or not greater than 74%, or not greater than 72%, or not greater than 70%, or not greater than 68%, or not greater than 66%, or not greater than 64%, or not greater than 62%, or not greater than 60%, or not greater than 58%, or not greater than 56%, or not greater than 54%, or not greater than 52%, or not greater than 50%, or not greater than 48%, or not greater than 46%, or not greater than 44%, or not greater than 42%, or not greater than 40%, or not greater than 38%, or not greater than 36%, or not greater than 34%, or not greater than 32%, or not greater than 30%, or not greater than 28%, or at least 26%, or not greater than 24%, or not greater than 22%, or not greater than 20%, or not greater than 18%, or not greater than 16%, or not greater than 14%, or not greater than 10%, or not greater than 7%, or not greater than 5%. It will be appreciated that the percent of surface area with a relatively high Sdr can be between any of the minimum and maximum values noted above.

In an embodiment, the first surface may have a particular Sdr1 that may facilitate improved performance and/or manufacturing of the abrasive article. In an embodiment, Sdr1 may be at least 40%, or at least 42%, or at least 44%, or at least 46%, or at least 48%, or at least 50%, or at least 52%, or at least 54%, or at least 56%, or at least 58%, or at least 60%, or at least 62%, or at least 64%, or at least 66%, or at least 68%, or at least 70%. In another embodiment, Sdr1 is not greater than 140%, or not greater than 135%, or not greater than 130%, or not greater than 125%, or not greater than 120%, or not greater than 115%, or not greater than 110%, or not greater than 105%, or not greater than 100%, or not greater than 95%, or not greater than 90%, or not greater than 85%, or not greater than 80%. It will be appreciated that Sdr1 will be between any of the minimum and maximum values noted above.

In an embodiment, the abrasive body may have a second surface with a particular Sdr2 that may facilitate improved performance of the abrasive article. In an embodiment, Sdr2 may be not greater than 110%, or not greater than 105%, or not greater than 100%, or not greater than 95%, or not greater than 90%, or not greater than 85%, or not greater than 80%, or not greater than 75%. In another embodiment, Sdr2 is at least 5%, at least 10%, at least 15%, at least 20%, at least 25%, at least 30%, or at least 35%, or at least 40%, or at least 45%. It will be appreciated that Sdr2 will be between any of the minimum and maximum values noted above.

In an embodiment, a first surface can have an Sdr1 that is different than the Sdr2 of a second surface by a particular amount that may facilitate improved manufacturing or performance of the abrasives article. In one non-limiting embodiment, Sdr1 can have a value that is greater relative to Sdr2. In an embodiment, the first surface can have an Sdr1 that is at least 1% different than Sdr2, or at least 2%, or at least 3%, or at least 4%, or at least 5%, or at least 6%, or at least 7%, or at least 8%, or at least 9%, or at least 10%, different than the Sdr2 of the second surface. In another embodiment, the first surface can have an Sdr1 that is not greater than 25% different than Sdr2, or not greater than 24%, or not greater than 23%, or not greater than 22%, or not greater than 21%, or not greater than 20%, or not greater than 19%, or not greater than 18%, or not greater than 17%, or not greater than 16%, or not greater than 15% different than Sdr2. It will be appreciated that the percent difference between Sdr1 and Sdr2 can be between any of the minimum and maximum values noted above. It will be appreciated that there may be more than two surfaces with different Sdr values, and the differences noted above in Sdr1 and Sdr2 can be equally applicable between two or more surfaces (e.g., exterior surfaces) of a body.

In an embodiment, the ratio of Sdr1:Sdr2 can be not greater than 1:2, or not greater than 1:1.9, or not greater than 1:1.8, or not greater than 1:1.7, or not greater than 1:1.6, or not greater than 1:1.5, or not greater than 1:1.4, or not greater than 1:1.3. In an embodiment, the ratio of Sdr1:Sdr2 can be at least 1:1.01, or at least 1:1.03, or at least 1:1.05.

In an embodiment, the first surface, optionally a working surface, may be oriented at a particular angle relative to the second surface. The angle can be at least 2°, at least 5°, at least 8°, at least 10°, at least 12°, at least 15°, at least 18°, at least 19°, at least 20°, at least 22°, at least 25°, at least 27°, at least 30°, at least 33°, at least 35°, at least 37°, at least 40°, at least 41°, at least 43°, at least 45°, at least 47°, at least 48°, at least 50°, at least 52°, at least 55°, at least 58°, at least 60°, at least 62°, at least 64°, at least 66°, at least 68°, at least 70°, at least 72°, at least 74°, at least 76°, at least 78°, at least 80°, at least 82°, at least 85°, at least 88°, or at least 90°. In another embodiment, the angle can be at most 180°, at most 178°, at most 176°, at most 174°, at most 172°, at most 170°, at most 168°, at most 166°, at most 164°, at most 162°, at most 160°, at most 158°, at most 156°, at most 154°, at most 152°, at most 150°, at most 147°, at most 145°, at most 143°, at most 140°, at most 138°, at most 135°, at most 133°, at most 130°, at most 127°, at most 124°, at most 121°, at most 118°, at most 115°, at most 112°, at most 109°, at most 105°, at most 102°, at most 99°, at most 96°, at most 93°, at most 90°, such as at most 88°, at most 86°, at most 84°, at most 82°, at most 80°, at most 78°, at most 75°, at most 74°, at most 72°, at most 70°, at most 68°, at most 66°, at most 64°, at most 62°, at most 60°, at most 58°, at most 66°, at most 64°, at most 62°, at most 60°, at most 58°, at most 55°, at most 54°, at most 52°, at most 50°, at most 48°, at most 46°, at most 44°, at most 42°, at most 40°, at most 38°, at most 36°, at most 34°, at most 32°, or at most 30°. It will be appreciated that the angle between the first surface and the second surface may be between any of the minimum and maximum values noted above. In a non-limiting embodiment, the first surface and the second surface may be orthogonal to each other.

In an embodiment, the first surface may have a particular surface roughness (Sa1) that may facilitate improved performance and/or manufacturing of the abrasive body. In an embodiment, Sa1 may be at least 1 micron, or at least 1.5 microns, or at least 2 microns, or at least 2.5 microns, or at least 3 microns, or at least 3.5 microns, or at least 4 microns, or at least 4.5 microns, or at least 5 microns. In another embodiment, Sa1 may not be greater than 30 microns, not greater than 28 microns, not greater than 25 microns, not greater than 22 microns, not greater than 18 microns, or not greater than 15 microns. It will be appreciated that Sa1 may be between any of the minimum and maximum values noted above.

In an embodiment, the second surface may have a particular surface roughness (Sa2) that may facilitate improved performance and/or manufacturing of the abrasive body. In an embodiment, Sa2 may be at least 1 micron, at least 2 microns, at least 3 microns, at least 4 microns, or at least 5 microns. In another embodiment, Sa2 may not be greater than 25 microns, not greater than 23 microns, not greater than 21 microns, not greater than 19 microns, not greater than 17 microns, or not greater than 15 microns, or not greater than 14 microns, or not greater than 13 microns. It will be appreciated that Sa2 may be between any of the minimum and maximum values noted above.

In an embodiment, a first surface can have a Sa1 that is different than the Sa2 of a second surface by a particular amount that may facilitate improved manufacturing or performance of the abrasive article. In an embodiment, the first surface can have a Sa1 that is at least 0.2 microns different than the Sdr2 of the second surface, or at least 0.4 microns, or at least 0.6 microns, or at least 0.8 microns, or at least 1 micron. In another embodiment, the first surface can have a Sa1 that is not greater than 6 microns different than Sa2, or not greater than 5.5 microns, or not greater than 5 microns, or not greater than 4.5 microns, or not greater than 4 microns, or not greater than 3.5 microns, or not greater than 3 microns, different than Sa2. It will be appreciated that the percent difference between Sa1 and Sa2 can be between any of the minimum and maximum values noted above.

Figure 4A:
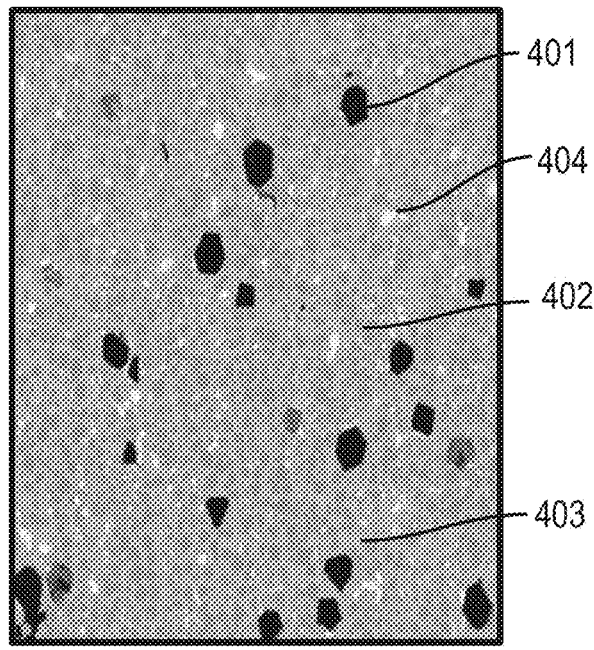
Figure 4B:
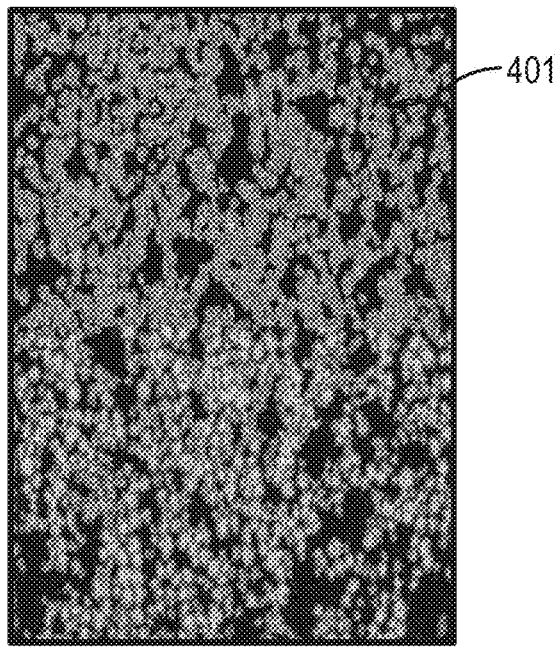
Figure 4C:
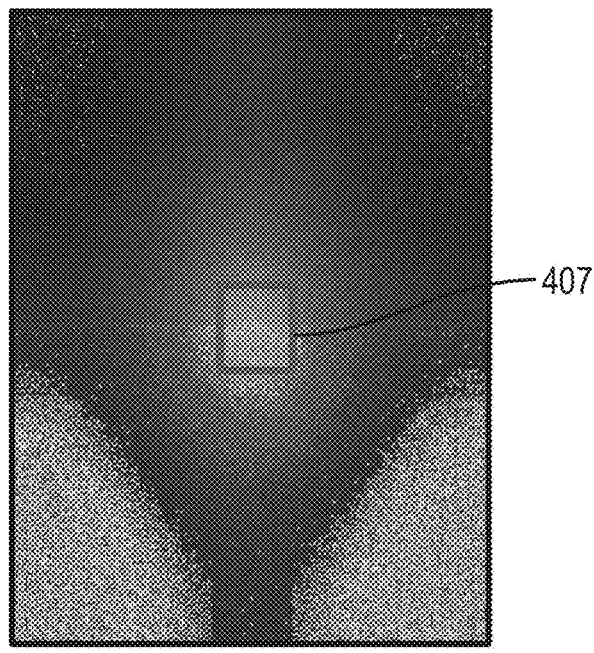
Figure 4D:
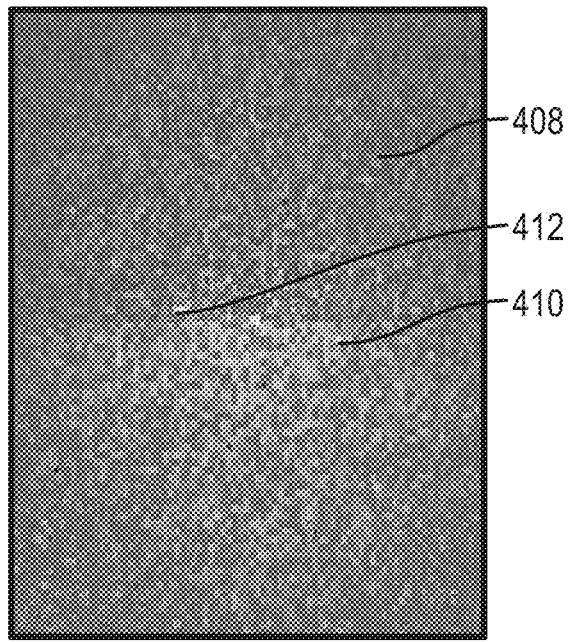

The frequency domain images are obtained by utilizing the Fourier Transform through Python to process the SEM images. Three SEM images of three cross-sections of a bonded abrasive body are taken. FIGS. 4A to 4E include images of a cross-section of a body of a finally-formed abrasive article formed in accordance with an additive manufacturing technique. FIG. 4A includes a scanning electron microscopic image of a cross-section of a body. As illustrated, the abrasive body can include abrasive particles 401 joined by a bond matrix including a bond material 402 and an infiltrant material 403, and a filler material 404. FIG. 4A can be processed by adjusting the threshold such that only the bond material remains present in the image of FIG. 4B. FIG. 4C includes an image that has been further processed by focusing on the center, the brightest area, of FIG. 4B. FIG. 4D is an image of the magnified area within the box 407 in FIG. 4C. As illustrated in FIG. 4D, noise 408 is in greyscale, and frequency signals 410 and 412 have brightness above the noise. Removing the noise from FIG. 4D, a frequency domain image is generated and illustrated in FIG. 4E. The bright dot in the center is the zero frequency component indicating the average brightness of the image in FIG. 4B and the other two symmetrically distributed bright dots represent the frequency of the bond material 402. The Fast Fourier Transform value refers to the average number of dots other than the zero frequency components shown in frequency domain images of at least three cross-sectional images from the same body. For example, the Microstructure Feature value can be determined by dividing the sum of the number of dots that are not the center dot of each frequency domain image by the total number of the frequency domain images.

In a further embodiment, the Microstructure Feature can include a Spacing Value. The abrasive body can include an average distance determined based on frequency domain images (i.e., the image of FIG. 4E) of at least three cross-sectional images of the body of an abrasive article. As used herein, the Spacing Value can be determined using the average distance. The average distance is an averaged value of the distance between the zero frequency component (i.e., the center dot) and one other dot of frequency domain images of at least three cross-sections of the abrasive body. For example, the average distance can be calculated by dividing the total of the distance between the center dot and one other dot of each of the frequency domain images by the number of the distances that make up the total. The Spacing Value of an abrasive body can be a relative value that can be obtained by dividing the average distance of the abrasive body by the average distance of an abrasive body having layers having the printed thickness of 120 microns.

More particularly, the Spacing Value can be determined as follows. The bonded abrasive body includes layers having a printed thickness of 120 microns. All the SEM images are processed to obtain images illustrated in FIG. 4E. As illustrated in the frequency domain image of FIG. 4E, the distance from the center of the center dot to the center of one other dot is measured using Image J for each of the frequency domain image. The average of the 3 distances is calculated and referred to as Da1. The average distance is then divided by itself to have a Spacing Value of the body.

FIGS. 5A and 5B represent images from a bonded abrasive formed through conventional processing techniques of hot pressing. FIG. 5A is a cross-sectional SEM image processed in the same manner as noted above according to the Fast Fourier Transform to obtain the image of FIG. 5B. The Microstructure Feature value of the sample is 1.

Figure 6A:
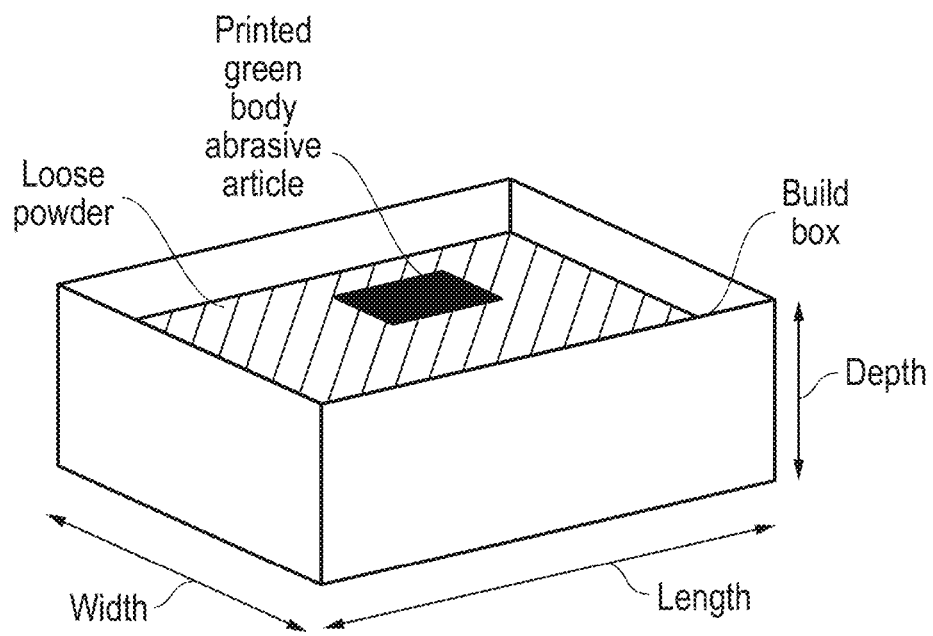
FIG. 6A includes an illustration of a build box including loose or unbound powder.

FIG. 6A includes an illustration of a build box including loose or unbound powder with a printed green body abrasive article contained in the loose powder before it is extracted from the powder bed.

Figure 6B:
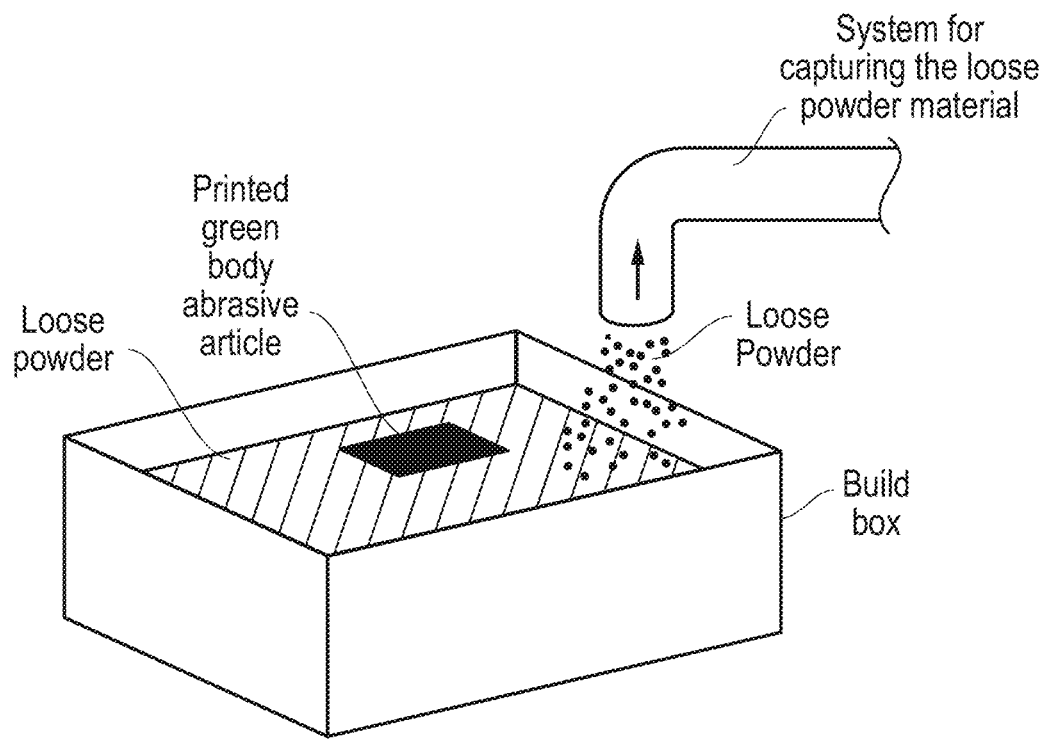
FIG. 6B includes an illustration of a process for capturing the loose powder after completing a forming operation.

FIG. 6B includes an illustration of a process for capturing the loose powder after completing a forming operation to form the green body abrasive article. The loose powder can be captured via suction or any other suitable means. The loose powder can be stored in a container. Additionally, or alternatively, the loose powder, which may include some content of organic materials from the forming process may be treated to remove a certain content of organic materials. Accordingly, the loose powder material can be recycled powder material that is suitable for use in a subsequent forming operation to form one or more green body abrasive articles.

Figure 6C:
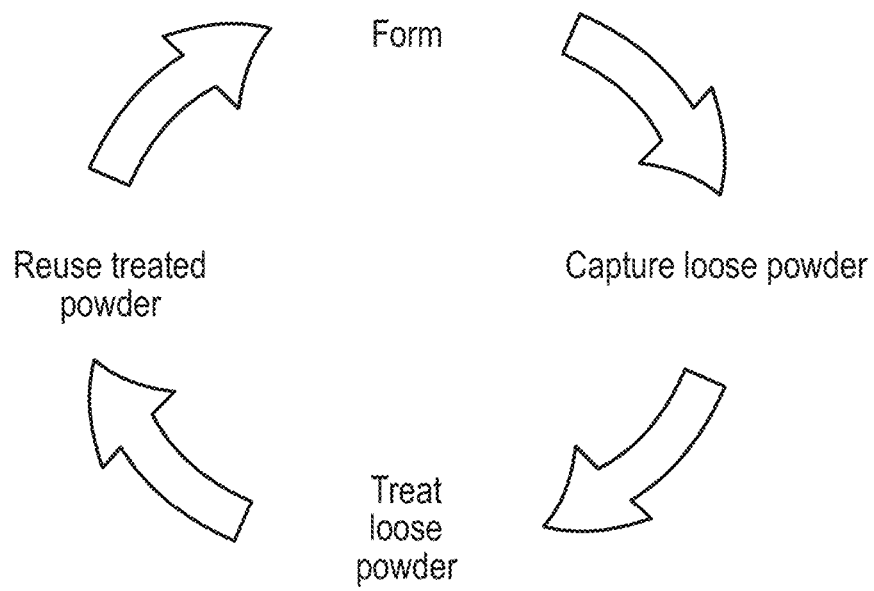
FIG. 6C is a graphic representation of the process for recycling the unused and loose powder material.

FIG. 6C is a graphic representation of the process for recycling the unused and loose powder material.

Figure 7A:
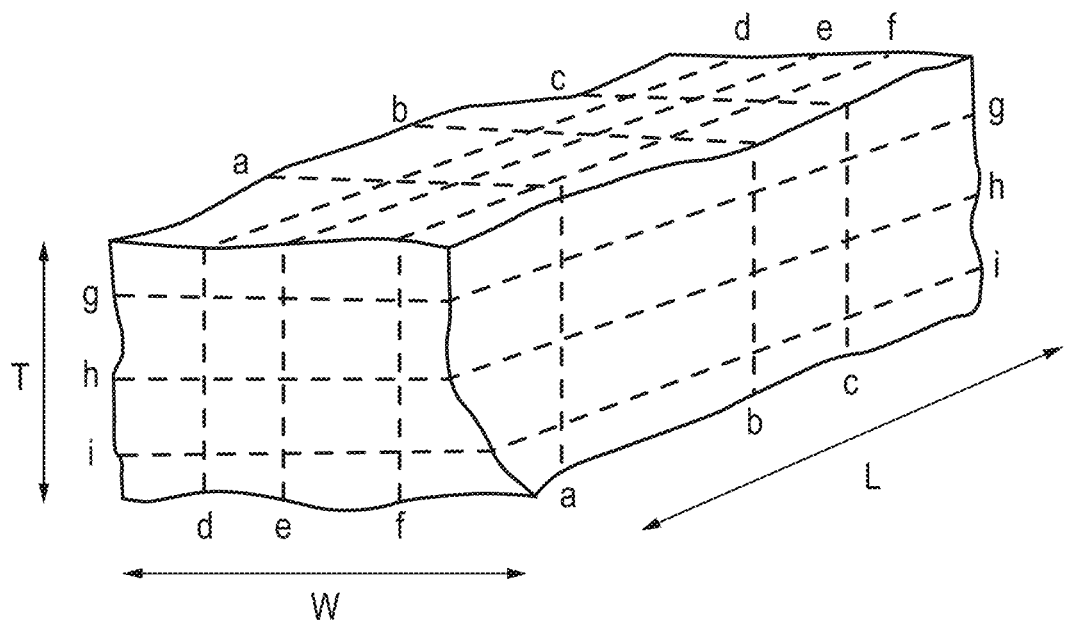
FIG. 7A is a perspective view illustration of a body of an abrasive article.
Figure 7B:
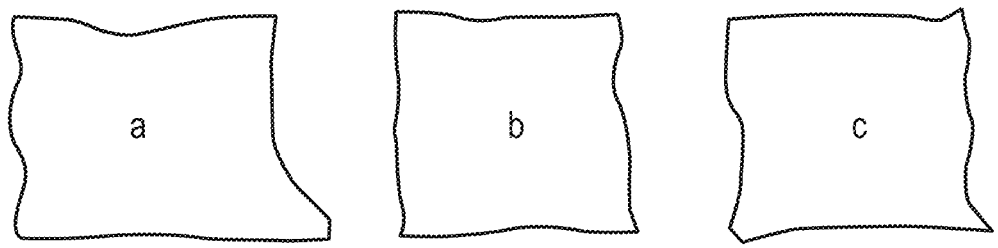
FIGS. 7B-D include cross-sectional images of the abrasive article of FIG. 7A.
Figure 7C:
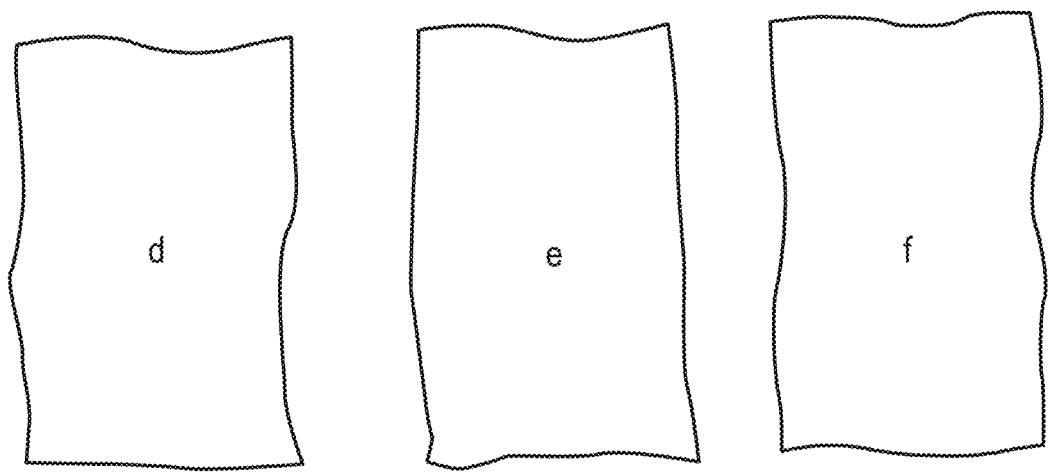
Figure 7D:
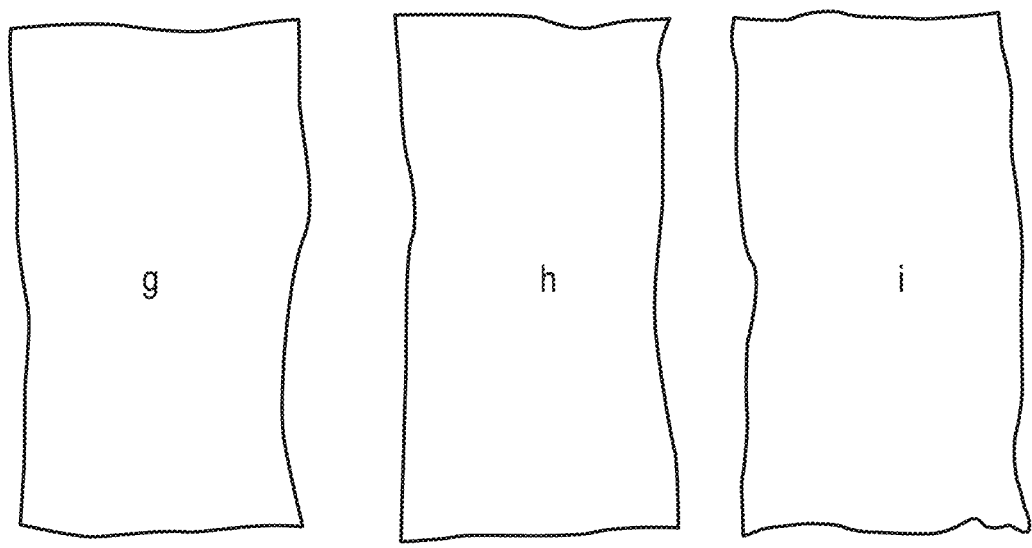

FIG. 7A is a perspective view illustration of a body of an abrasive article. As illustrated, the body has a length, width, and thickness and can be evaluated along any of these axes by destructive or non-destructive methods to evaluate one or more properties associated with the body. Such properties can include, but are not limited to, density variation-L, density variation-W, density variation-T, dimensional variation-L, dimensional variation-W, dimensional variation-T, hardness variation-L, hardness variation-W, hardness variation-T, MOR variation-L, MOR variation-W, MOR variation-T, MOE variation-L, MOE variation-W, and MOE variation-T. FIG. 7B includes three cross-sectional images of cross-sections "a", "b," and "c" along a length of the body. Such cross-sections can be generated by cutting the samples for evaluation of one or more properties claimed herein. Alternatively, the cross-sections may be generated from 3D scans of the body to evaluate certain dimensional features and evaluate the quality and consistency of the geometric features of the body. FIG. 7C includes three cross-sectional images of cross-sections "d," "e," and "f" along the width of the body. FIG. 7D includes three cross-sectional images of cross-sections "g," "h," and "i" along with the thickness of the body. In certain instances, the difference in cross-sectional area of each of the cross-sections may be used to quantify the geometric quality of the body.

Additionally, as illustrated, the body has four major planar surfaces and two end surfaces. Any of the four major planar surfaces extending between the two smaller end surfaces can be used to evaluate certain properties as claimed herein, including, for example, but not limited to, nWarp, nFlatness, nBow. In the instance of the property nDimensional variation, multiple measurements at random locations between two opposing major planar surfaces can be made to evaluate the nDimensional variation. Such a measurement can be made in the dimension of thickness in a direction generally perpendicular to the plane defined by the length and width of the body. A multitude of randomly selected points on the first major surface are selected and the shortest distance to the second major surface through the body is recorded as a dimension. The dimensions are averaged to define the average Dimensional variation. The average is then normalized to the surface area of the first major surface. If one of the major surfaces is smaller than the other, the smaller surface is used. The nDimensional variation is the average value of the dimensional variation normalized (divided) by the area of the smaller of the major planar surfaces.

In an embodiment, the body may include a major planar surface having a nWarp of not greater than 50 µm/cm², wherein nWarp is the warp of the major planar surface normalized for the surface area of the major planar surface. In a further embodiment, the body may include a major planar surface having a nFlatness of not greater than 50 µm/cm², wherein nFlatness is the flatness of the major planar surface normalized for the surface area of the major planar surface. In a further embodiment, the body may include a major planar surface having a nBow of not greater than 50 µm/cm², wherein nBow is the bow of the major planar surface normalized for the surface area of the major planar surface. In a further embodiment, the body may include a first major planar surface and a second major planar surface substantially parallel to the first major planar surface, wherein the distance between the first major planar surface and second major planar surface comprises a nDimension variation of not greater than 100 µm/cm², wherein nDimension variation is the variation in the dimension between the first and second major planar surfaces normalized to the area of the first or second major planar surfaces. In applications, any of these features may be measured from the 3D topography scan. All the features are being measured for certain samples of the Examples.

According to another embodiment, the body of an abrasive article, which may be in the form of a green body abrasive article or a finally-formed abrasive article may have a particular volumetric form factor that may be achieved through one or more forming processes of the embodiments herein and facilitate improved abrasive operations. In one embodiment, for a single abrasive article (green body or finally-formed body), the volumetric form factor can be a comparison between the shape of the body in three-dimensions as compared to an intended shape. In certain aspects, abrasive articles are intended to comply with strict dimensional tolerances, and deviations from the intended dimensional tolerances must be addressed by one or more methods, typically a post-forming subtractive process. In some instances, depending upon the severity of the deviation of the body from an intended shape, the body may be scrapped.

Figure 8A:
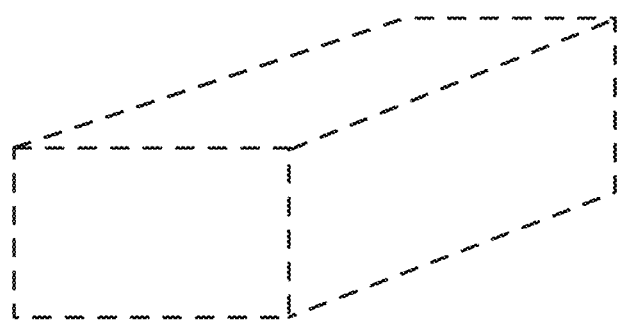
FIG. 8A includes a perspective view illustration of an intended shape of an abrasive article.
Figure 8B:
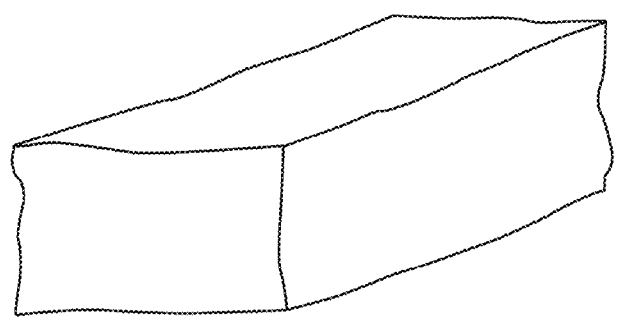
FIG. 8B includes a perspective view illustration of a formed abrasive article FIG. 8C includes a perspective view of a comparison of a formed abrasive article and an intended shape.
Figure 8C:
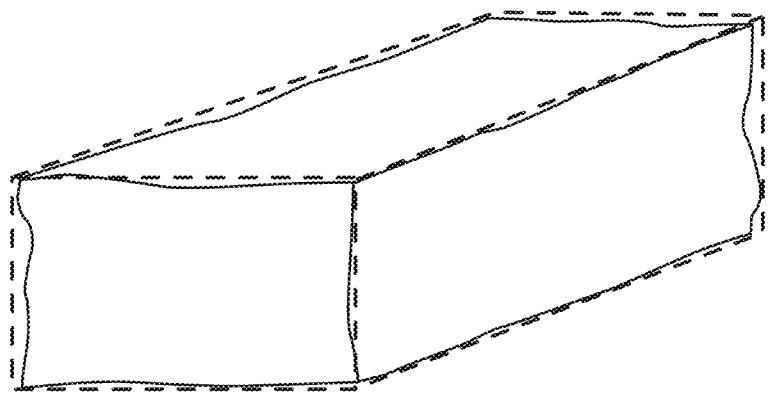

FIG. 8A includes a perspective view illustration of an intended shape of an abrasive article. The intended shape may be a well-known standard that may be stored as electronic data, such as in the form of a three-dimensional model on a computer-readable medium. FIG. 8B includes a perspective view illustration of a formed abrasive article. The volumetric form factor for a single abrasive article can be a value of how well the formed abrasive article (e.g., FIG. 8B) matches to the intended shape (e.g., FIG. 8A). One such comparison is illustrated as FIG. 8C.

According to one aspect, a detailed three-dimensional scan can be conducted on the body via 3D tomography with X-ray radiation to create a representative three-dimensional model of the abrasive article. The model of the abrasive article can be compared to the model of the intended shape. The model of the abrasive article can be compared to the model of the intended shape using slices of the body and measuring the deviations in one or more select planes through the model of the abrasive article. Additionally, or alternatively, the deviations between the two models may be evaluated for the whole of the volume.

Figure 9A:
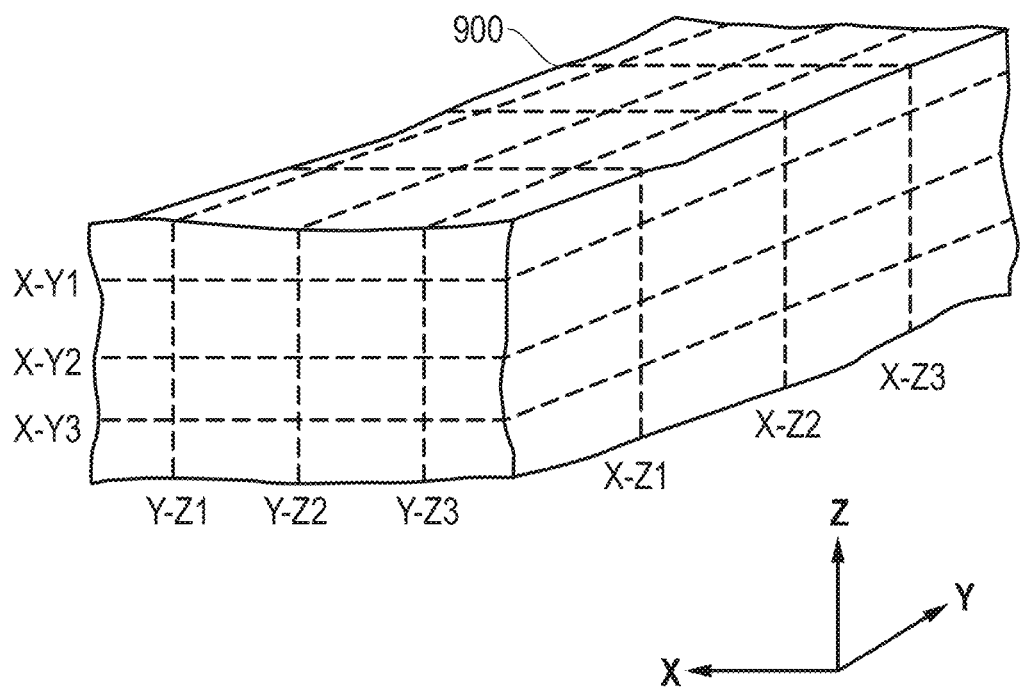
FIGS. 9A and 9B include scans of abrasive articles.
Figure 9B:
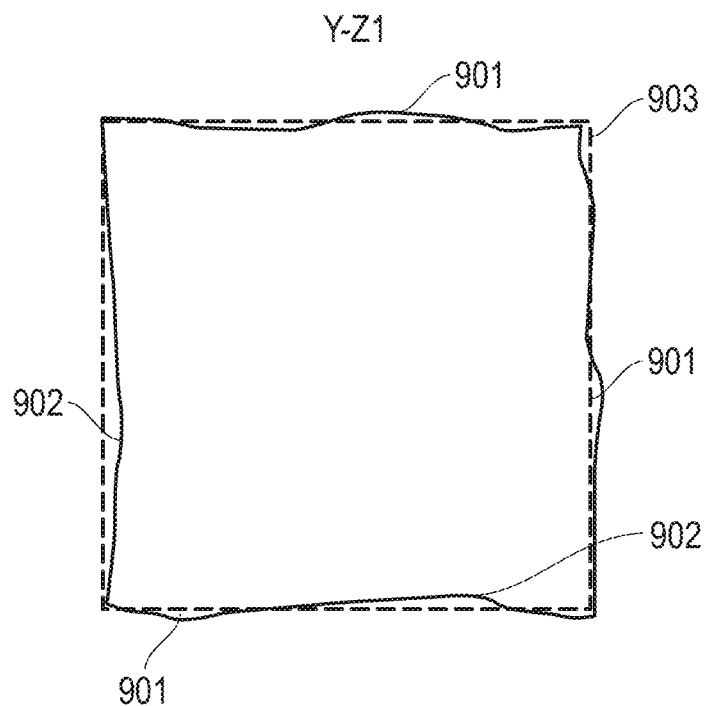

In one particular embodiment, at least three scans are completed in three different planes on the model of the abrasive article as shown in FIG. 9A. FIG. 9A illustrates nine total planes, spaced apart from each other, and cutting through the model of the abrasive article 900 for the planes X-Y, X-Z, and Y-Z. The scanned images can be extracted as 2D images of the body and can be compared to corresponding 2D data (e.g., 903) from the model of the intended shape. Image analysis software can compare the differences in the 2D images of the abrasive article and intended shape and evaluate the difference in area between the images for each of the nine planes. As shown in FIG. 9B, additional area 901 outside of an intended surface can be given a positive value. Negative area 902 on the model of the abrasive article relative to the model of the intended shape can be given a negative value. The total of positive and negative area is summed for each scan. The values for each of the nine scans are averaged and recorded as the average volumetric form value of the model of the abrasive article. The volumetric form factor is calculated as the absolute value of the ratio of the average volumetric form value divided by the volumetric form value of the model of the intended shape. That is, Vff=|Vav/Vmi|, wherein Vff represents the volumetric form factor, Vav represents the average volumetric form value and Vmi represents the volumetric form value of the model of the intended shape.

According to one embodiment, the Vff can be at least 0.1, such as at least 0.2, or at least 0.25, or at least 0.3, or at least 0.35, or at least 0.4, or at least 0.45, or at least 0.5, or at least 0.55, or at least 0.6, or at least 0.65, or at least 0.7, or at least 0.71, or at least 0.72, or at least 0.73, or at least 0.74, or at least 0.75, or at least 0.76, or at least 0.77, or at least 0.78, or at least 0.79, or at least 0.80, or at least 0.81, or at least 0.72, or at least 0.73, or at least 0.74, or at least 0.75, or at least 0.76, or at least 0.77, or at least 0.78, or at least 0.79, or at least 0.80, or at least 0.81, or at least 0.82, or at least 0.83, or at least 0.84, or at least 0.85, or at least 0.86, or at least 0.87, or at least 0.88, or at least 0.89, or at least 0.90, or at least 0.91, or at least 0.92, or at least 0.93, or at least 0.94, or at least 0.95, or at least 0.96, or at least 0.97, or at least 0.98, or at least 0.99, or at least 1.0, or at least 1.01, or at least 1.02, or at least 1.03, or at least 1.04, or at least 1.05, or at least 1.06, or at least 1.07, or at least 1.08, or at least 1.09, or at least 1.10, or at least 1.11, or at least 1.12, or at least 1.13, or at least 1.14, or at least 1.15, or at least 1.16, or at least 1.17, or at least 1.18, or at least 1.19, or at least 1.20, or at least 1.21, or at least 1.22, or at least 1.23, or at least 1.24, or at least 1.25, or at least 1.26, or at least 1.27, or at least 1.28, or at least 1.29, or at least 1.30, or at least 1.31, or at least 1.32, or at least 1.33, or at least 1.34, or at least 1.35, or at least 1.36, or at least 1.37, or at least 1.38, or at least 1.39, or at least 1.40, or at least 1.45, or at least 1.50, or at least 1.55, or at least 1.60, or at least 1.65, or at least 1.70, or at least 1.75, or at least 1.80, or at least 1.85, or at least 1.90, or at least 1.95, or at least 2.00. Still, in a non-limiting embodiment, the Vff can be not greater than 10, such as not greater than 9.5, or not greater than 9, or not greater than 8.5, or not greater than 8, or not greater than 7.5, or not greater than 7, or not greater than 6.5, or not greater than 6, or not greater than 5.5, or not greater than 5, or not greater than 4.5, or not greater than 4, or not greater than 3.5, or not greater than 3, or not greater than 2.5, or not greater than 2, or not greater than 1.5, or not greater than 1.45, or not greater than 1.40, or not greater than 1.39, or not greater than 1.38, or not greater than 1.37, or not greater than 1.36, or not greater than 1.35, or not greater than 1.34, or not greater than 1.33, or not greater than 1.32, or not greater than 1.31, or not greater than 1.30, or not greater than 1.29, or not greater than 1.28, or not greater than 1.27, or not greater than 1.26, or not greater than 1.25, or not greater than 1.24, or not greater than 1.23, or not greater than 1.22, or not greater than 1.21, or not greater than 1.20, or not greater than 1.19, or not greater than 1.18, or not greater than 1.17, or not greater than 1.16, or not greater than 1.15, or not greater than 1.14, or not greater than 1.13, or not greater than 1.12, or not greater than 1.11, or not greater than 1.10, or not greater than 1.09, or not greater than 1.08, or not greater than 1.07, or not greater than 1.06, or not greater than 1.05, or not greater than 1.04, or not greater than 1.03, or not greater than 1.02, or not greater than 1.01, or not greater than 1.00, or not greater than 0.99, or not greater than 0.98, or not greater than 0.97, or not greater than 0.96, or not greater than 0.95, or not greater than 0.94, or not greater than 0.93, or not greater than 0.92, or not greater than 0.91, or not greater than 0.90, or not greater than 0.89, or not greater than 0.88, or not greater than 0.87, or not greater than 0.86, or not greater than 0.85, or not greater than 0.84, or not greater than 0.83, or not greater than 0.82, or not greater than 0.81, or not greater than 0.80, or not greater than 0.79, or not greater than 0.78, or not greater than 0.77, or not greater than 0.76, or not greater than 0.75, or not greater than 0.74, or not greater than 0.73, or not greater than 0.72, or not greater than 0.71, or not greater than 0.70. It will be appreciated that the Vff can be within a range including any of the minimum and maximum values noted above, including for example, but not limited to at least 0.10, and not greater than 10, or within a range of at least 0.50, and not greater than 1.50, or within a range of at least 0.80, and not greater than 1.2, or within a range including at least 0.90, and not greater than 1.10, or even within a range including at least 0.95, and not greater than 1.05.

According to another aspect, a batch of abrasive articles, which may be green body abrasive articles or finally-formed abrasive articles may have a particular batch volumetric form factor variation. The batch volumetric form factor variation (batch Vff) can be the standard deviation of the volumetric form factor for a batch of abrasive articles. According to one embodiment, the batch Vff can be not greater than 0.30, such as not greater than 0.25, or not greater than 0.20, or not greater than 0.18, or not greater than 0.16, or not greater than 0.14, or not greater than 0.12, or not greater than 0.10, or not greater than 0.09, or not greater than 0.08, or not greater than 0.07, or not greater than 0.06, or not greater than 0.05, or not greater than 0.04, or not greater than 0.03, or not greater than 0.02, or not greater than 0.01, or not greater than 0.009, or not greater than 0.008, or not greater than 0.007, or not greater than 0.006, or not greater than 0.005. Still, in one non-limiting embodiment, the batch Vff can be at least 0.00001, or at least 0.0001, or at least 0.0005, or at least 0.001, or at least 0.01, or at least 0.1, or at least 0.2, or at least 0.4, or at least 0.6. It will be appreciated that the batch Vff can be within a range including any of the minimum and maximum values noted above, including, for example, but not limited to within a range of at least 0.00001, and not greater than 0.3, such as within a range of at least 0.00001 and not greater than 0.2, or within a range of at least 0.00001 and not greater than 0.05, or even within a range of at least 0.00001 and not greater than 0.01.

It will be appreciated that a single forming operation may form a plurality of discrete green body abrasive articles, which can be formed into a plurality of finally-formed abrasive articles. A plurality of abrasive articles may be referred to as a batch of abrasive articles and may be green bodies or finally-formed abrasive articles. In one embodiment, the abrasive articles of a batch can be formed in a single forming process within the same build box. The properties noted in the foregoing and claimed herein can be used to evaluate the abrasive articles on a batch basis. That is, evaluation of one or more geometric features and/or properties of each body within a batch can be compared to evaluate the quality of a batch as a whole. According to one embodiment, a batch may include a certain minimum size or volume of material, such as described in any of the embodiments herein. In another non-limiting embodiment, a batch may include a plurality of abrasive articles formed in a single additive manufacturing build cycle, which may include a plurality of abrasive articles (green or finally-formed) that are formed in the same build box during the same build cycle.

The embodiments herein are based on empirical studies. Significant challenges exist when using certain additive manufacturing processes, including, for example, binder jetting to form abrasive articles on a commercial scale. While prior disclosures have disclosed the formation of abrasive articles via additive manufacturing, such products are not widely available because of the notable difficulties in scaling the process. The embodiments here are specifically developed based on empirical studies to advance the technology of additive manufacturing into a commercially viable option.

According to one aspect, one embodiment is a method for forming a batch of abrasive articles, particularly in the context of commercial-scale sized batches that may also include large-sized abrasive articles. According to a particular embodiment, the process can include a binder jetting operation that may include at least the steps of a) forming a plurality of green body abrasive articles defining a batch, wherein each of the green body abrasive articles comprise a precursor bond material and abrasive particles, wherein forming is conducted by: i) creating one or more layers of powder material, ii) selectively binding portions of the one or more layers with a binder material, and iii) converting the binder material to at least partially solidify the binder material and bind portions of powder material from the one or more layers.

In another embodiment, the process may include moving a compaction object over the one or more layers of powder material to apply a force sufficient to compact the layer to a compacted layer thickness that is less than the thickness of the layer prior to compaction. Still, in another instance, the process may include controlling at least one of: a) a force applied by a compaction object to the layer or a plurality of layers of powder; b) a traverse speed of a compaction object; c) average thickness of the layer prior to compaction; d) a particle size distribution of the powder; e) number of previously formed layers underlying the layer of powder; f) the number of compacted layers underlying the layer of powder; g) the density of any layers underlying the layer of powder; h) the amount of binder in any layers underlying the layer of powder; i) the relative dimensions of the layer relative to one or more layers underlying the layer; and any combination of a)-i).

In one particular embodiment, the process may include controlling the operation of a compacting object relative to one or more variables in the forming process, including, for example, but not limited to, the average layer thickness of a single layer of raw material powder that may be deposited before a compaction operation. In the development of batches of abrasive articles in a commercially viable manner and scope, it has been found that the compaction operation may be controlled relative to one or more other process variables. The quality and properties of the abrasive articles (i.e., green or finally-formed abrasive articles or batches of the same) may be directly impacted by the relationship between the compaction operation and one or more variables. In a non-limiting embodiment, the process may include controlling the compaction percentage of the average original layer thickness of the layer of raw material powder to create an abrasive article having a suitable combination of features and/or properties.

Figure 10:
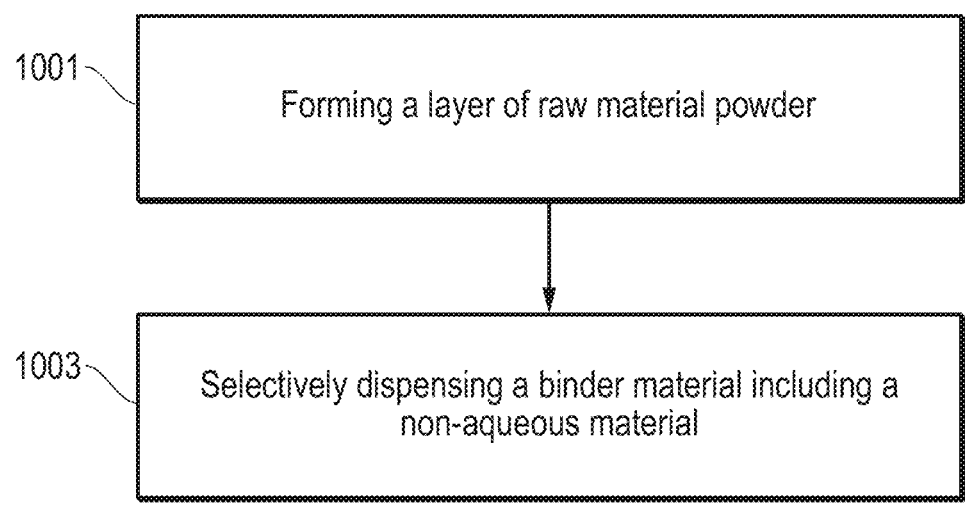
FIG. 10 includes a method for forming an abrasive article according to one embodiment.

FIG. 10 includes a method for forming an abrasive article according to one embodiment. The process may optionally include step 1001, which may include forming a layer of raw material powder, wherein the raw material powder can include abrasive particles and precursor bond material as described in any embodiments herein. The process for forming the layer can include any one or more features of any of the embodiments herein. It will be appreciated that any of the abrasive articles and/or batch of abrasive articles can have any one or a combination of features of any of the embodiments herein.

The process may optionally continue at step 1003, which may include compacting the layer of powder material by at least 1% and not greater than 99% of the average original layer thickness of the layer of raw material powder. For example, in one non-limiting embodiment, the process may include compacting the layer to a by at least 1.5% of the average original layer thickness (t) of the layer of raw material powder. Stated alternatively, the average compacted layer thickness (tc) may be at least 1.5% less than average original layer thickness (t), such that tc≤tc−(0.015 tc). According to another embodiment, the process may include compacting the layer of powder material by at least 2% of the average original layer thickness of the layer of raw material powder or at least 3% or at least 4% or at least 5% or at least 6% or at least 7% or at least 8% or at least 9% or at least 10% or at least 12% or at least 14% or at least 16% or at least 18% or at least 20% or at least 25% or at least 30% or at least 35% or at least 40% or at least 45% or at least 50% or at least 55% or at least 60% or at least 65% or at least 70% or at least 75% or at least 80% or at least 85%. Still, in another non-limiting embodiment, the process may include compacting the layer of powder material by not greater than 98% % of the average original layer thickness of the layer of raw material powder or not greater than 97% or not greater than 96% or not greater than 95% or not greater than 94% or not greater than 93% or not greater than 92% or not greater than 91% or not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15%. It will be appreciated that the process may include compacting the layer of powder material by a percentage within a range including any of the minimum and maximum percentages noted above, including for example, but not limited to within a range of at least 1% and not greater than 90% or within a range including at least 2% and not greater than 85% or within a range including at least 5% and not greater than 70%.

According to another non-limiting aspect, the process may also include measuring or calculating a relative humidity or a flow characteristic of the powder material. For example, in one embodiment, the process can include measuring or calculating the relative humidity of the raw material powder material prior to and/or during the deposition of the powder material into one or more layers. The value of the relative humidity or a flow characteristic that is used to calculate or approximate the relative humidity of the powder material may be used to control the layer thickness and/or the percentage of compaction of the layer.

In another embodiment, the process may optionally include controlling one or more compaction object control variables based upon a characteristic or property of the raw material powder or the average original layer thickness. In one non-limiting aspect, the one or more compaction object control variables can include, but it not limited to a force applied by the compaction object to the layer or plurality of layers of powder material, a traverse speed of a compaction object, a size of the compaction object, a weight of the compaction object, the ratio of layer thickness (LT) to compaction thickness (CT) offset between the primary roller and job box (or build box) (Δr1), offset between primary and secondary rollers (Δr2), extra powder height above secondary roller (Δd), leveled dispensed powder thickness (DT), compaction ratio (DT/LT), or any combination thereof. FIGS. 14 and 15 provide illustrations to further illustrate some of the compaction object control variables. For example, in one non-limiting instance, the process may include controlling a compaction force of the compacting object based upon a relative humidity or a flow characteristic of the powder material. In another non-limiting embodiment, the process may include changing the compaction force based upon a measured change in a relative humidity or a flow characteristic of the powder material. In another embodiment, the process may include controlling a compaction ratio based upon a relative humidity or a flow characteristic of the powder material. In still another embodiment, the process may include changing a target compaction ratio based upon a measured change in a relative humidity or a flow characteristic of the powder material. In one embodiment, a stepped compaction process is preferred over a two-roller compaction process.

According to one aspect, the process may include selecting a target average layer thickness for one or more layers as they are formed before compacting, and selecting a compacting object control variable (e.g., compacting force, traverse speed, etc.) based upon the target average layer thickness for the one or more layers. In one particular embodiment, the process may include measuring the average original thickness of the layer of powder material after forming the layer of powder material, and comparing the target average layer thickness to the measured average layer thickness, and calculating a difference. In one non-limiting embodiment, the process may include changing the compaction force, translation speed, or other compacting object control variable based upon a difference in the measured average height and target average height. In one non-limiting embodiment, an alert is generated if the difference between the measured and target extend beyond a threshold value.

In still another embodiment, the process may include changing a compacting object control variable between a first compacting process and a second compacting process conducted at a different time relative to the first compacting process. For example, in one instance, the process can include conducting more than one compacting process, wherein the compacting processes can be conducted at different times. In one particular embodiment, the process may include forming a first layer of the raw material powder, compacting the first layer at a first time with a compacting object, forming a second layer of raw material powder after compacting the first layer at the first time, and compacting the second layer at a second time with a compacting object. According to one optional embodiment, the process of compacting the first layer can be different from the process of compacting the second layer based on one or more compacting object control variables.

According to one embodiment, the process can include forming an abrasive article (e.g., green body abrasive article) having a flexural strength suitable for handling. For example, in one embodiment, the flexural strength can be at least 10 MPa as measured according to ASTM 1161. In another embodiment, the flexural strength may be not greater than 100 GPa. In one non-limiting embodiment, the flexural strength may be within a range including any of the minimum and maximum values noted above.

In an embodiment, the process may include forming a layer of raw material powder including a mixture including abrasive particles and including precursor bond material or bond material; and compacting the layer of powder material by a particular average original layer thickness of the layer of raw material powder that can facilitate improved formation of abrasive article and batch of abrasive articles. In an example, compacting the layer of powder material may include compacting by at least 1% of the original layer thickness, such as at least 2%, or at least 3%, or at least 4%, or a least 5%, or at least 6%, or at least 7%, or at least 8%, or at least 9%, or at least 10%, or at least 11%, or at least 12%, or at least 13%, or at least 14%, or at least 15%, or at least 18%, or at least 20%, or at least 22%, or at least 25%, or at least 28%, or at least 30%, or at least 32%, or at least 35%, or at least 38%, or at least 40%, or at least 42%, or at least 45%, or at least 48%, or at least 50%, or at least 52%, or at least 55%, or at least 58%, or at least 60%, or at least 62%, or at least 65%, or at least 67%, or at least 68%, or at least 70%, or at least 72%, or at least 75%, or at least 78%, or at least 80%, or at least 82%, or at least 85%, or at least 88%, or at least 90%, or at least 92%, or at least 95%, or at least 98% of the original layer thickness. In another example, compacting the layer of powder material may include compacting by not greater than 95% of the original layer thickness of the layer or not greater than 94% of the original layer thickness or not greater than 93%, or not greater than 92%, or not greater than 91%, or not greater than 90%, or not greater than 89%, or not greater than 88%, or not greater than 87%, or not greater than 86%, or not greater than 85%, or not greater than 84%, or not greater than 83%, or not greater than 82%, or not greater than 81%, or not greater than 80%, or not greater than 79%, or not greater than 78%, or not greater than 77%, or not greater than 76%, or not greater than 75%, or not greater than 74%, or not greater than 73%, or not greater than 72%, or not greater than 71%, or not greater than 70%, or not greater than 69%, or not greater than 68%, or not greater than 67%, or not greater than 66%, or not greater than 65%, or not greater than 64%, or not greater than 63%, or not greater than 62%, or not greater than 61%, or not greater than 60%, or not greater than 59%, or not greater than 58%, or not greater than 57%, or not greater than 56%, or not greater than 55%, or not greater than 54%, or not greater than 53%, or not greater than 52%, or not greater than 51%, or not greater than 50%, or not greater than 49%, or not greater than 48%, or not greater than 47%, or not greater than 46%, or not greater than 45%, or not greater than 44%, or not greater than 43%, or not greater than 42%, or not greater than 41%, or not greater than 40%, or not greater than 39%, or not greater than 38%, or not greater than 37%, or not greater than 36%, or not greater than 35%, or not greater than 34%, or not greater than 33%, or not greater than 32%, or not greater than 31%, or not greater than 30%, or not greater than 29%, or not greater than 28%, or not greater than 27%, or not greater than 26%, or not greater than 25%, or not greater than 24%, or not greater than 23%, or not greater than 22%, or not greater than 21%, or not greater than 20%, or not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2% of the original thickness of the layer. Moreover, compacting may include compacting the layer of raw powder material by the percentage of the original layer thickness in a range including any of the minimum and maximum percentages noted herein. For example, compacting the layer of raw powder material may include compacting by at least 1% to not greater than 99% of an average original layer thickness of the layer of raw material powder.

In a further embodiment, the layer of raw powder material may have an original average layer thickness of at least 50 microns or at least 75 microns or at least 100 microns or at least 125 microns or at least 150 microns or at least 175 microns. Additionally or alternatively, the layer of raw powder material may have an original average layer thickness of less than 400 microns or less than 350 microns or less than 300 microns or less than 250 microns. Moreover, the original average layer thickness may be in a range including any of the minimum and maximum values noted herein.

In a further embodiment, compacting the layer of powder material may include reducing the average original layer thickness of the layer by at least 1 micron by compaction, such as by at least 2 microns or at least 5 microns or at least 8 microns or at least 10 microns or at least 15 microns or at least 20 microns or at least 25 microns or at least 30 microns or at least 35 microns or at least 40 microns or at least 45 microns or at least 50 microns. Additionally or alternatively, compacting the layer of raw powder material may include reducing the average original layer thickness by less than 300 microns by compaction, such as by less than 275 microns or less than 250 microns or less than 225 microns or less than 200 microns or less than 175 microns or less than 150 microns or less than 125 microns. Moreover, compacting the layer of raw powder material may include reducing the average original layer thickness by a value in a range including any of the minimum and maximum values noted herein.

In an embodiment, the raw material powder may include at least 25% by weight of abrasive particles for a total weight of the mixture or at least 30 wt % or at least 35 wt % or at least 40 wt % or at least 45 wt % or at least 50 wt % or at least 55 wt % or at least 60 wt % or at least 65 wt % or at least 70 wt %. Alternatively or additionally, the raw material powder may include no greater than 95 wt % abrasive particles for a total weight of the mixture or no greater than 90 wt % or no greater than 85 wt % or no greater than 80 wt % or no greater than 75 wt %. Moreover, the raw material powder may include a content of abrasive particles in a range including any of the minimum and maximum percentages noted herein.

In a further embodiment, the precursor bond material or bond material may include a particular median particle size. For example, the precursor bond material or the bond material may include a median particle size of at least 25 microns or at least 30 microns or at least 40 microns or at least 50 microns or at least 60 microns or at least 70 microns or at least 80 microns or at least 90 microns or at least 100 microns or at least 115 microns. In another example, the median particle size may be less than 300 microns or less than 275 microns or less than 250 microns or less than 225 microns or less than 200 microns or less than 175 microns or less than 150 microns. Moreover, the median particle size may be in a range including any of the minimum and maximum percentages noted herein.

In a further embodiment, the raw material powder may include at least 2% by weight bond material for a total weight of the mixture or at least 4 wt % or at least 6 wt % or at least 8 wt % or at least 10 wt % or at least 12 wt % or at least 14 wt % or at least 16 wt % or at least 18 wt % or at least 20 wt %. Additionally or alternatively, the raw material powder may include no greater than 60 wt % of the precursor bond material and/or the bond material for a total weight of the mixture or no greater than 50 wt % or no greater than 40 wt % or no greater than 30 wt % or no greater than 25 wt %. In another example, the raw material powder may include a content of the bond material and/or precursor bond material in a range including any of the minimum and maximum percentages noted herein.

In an embodiment, the process can include sintering a green body abrasive article to form the finally-formed abrasive article. In an aspect, sintering can include sintering at a maximum temperature including at least 500 and not greater than 1500° C. In another aspect, sintering may include holding at the maximum temperature for at least 1 hour and no greater than 5 hours.

In an embodiment, the green body abrasive article may shrink in the process of forming the abrasive article. In a particular embodiment, the green body abrasive article may shrink in a controlled manner. For example, the green body abrasive article may shrink by less than 15 vol % or less than 14.5 vol % or less than 14 vol % or less than 13.5 vol % or less than 13 vol % or less than 12.5 vol % or less than 12 vol %. In another example, the green body abrasive article may shrink by at least 1 vol % or at least 2 vol % or at least 3 vol % or at least 4 vol % or at least 5 vol %. Moreover, the green body abrasive article may shrink by a volume percentage including any of the minimum and maximum percentages noted herein. Shrinkage can be calculated as (green body volume-sintered body volume)/green body volume.

In a particular example, the process may include forming a batch of green body abrasive articles, wherein each green body abrasive article may shrink by less than 15 vol % or less than 14.5 vol % or less than 14 vol % or less than 13.5 vol % or less than 13 vol % or less than 12.5 vol % or less than 12 vol %. In another particular example, each green body abrasive article in a batch may shrink by at least 1 vol % or at least 2 vol % or at least 3 vol % or at least 4 vol % or at least 5 vol %. Moreover, each green body abrasive article in a batch may shrink by a volume percentage including any of the minimum and maximum percentages noted herein.

In an example, the process may include forming a plurality of layers of raw powder material. More particularly, one or more of the plurality of layers may be compacted.

In an embodiment, the process may include moving a compaction object over the one or more layers of powder material to apply a force sufficient to compact at least some of the layers or all of the layers to a compacted average layer thickness that is less than the original average thickness of the layer prior to compaction.

In an embodiment, the process may include forming a green body abrasive article having a density of at least 1.5 g/cc or at least 1.51 g/cc or at least 1.52 g/cc or at least 1.53 g/cc or at least 1.54 g/cc or at least 1.55 g/cc or at least 1.56 g/cc or at least 1.57 g/cc or at least 1.58 g/cc or at least 1.59 g/cc or at least 1.60 g/cc or at least 1.61 g/cc or at least 1.62 g/cc or at least 1.63 g/cc or at least 1.64 g/cc or at least 1.65 g/cc or at least 1.66 g/cc or at least 1.67 g/cc or at least 1.68 g/cc or at least 1.69 g/cc or at least 1.70 g/cc. Additionally or alternatively, the process may include forming a green body abrasive article having a density of not greater than 3.00 g/cc or not greater than 2.95 g/cc or not greater than 2.90 g/cc or not greater than 2.85 g/cc or not greater than 2.80 g/cc or not greater than 2.75 g/cc or not greater than 2.70 g/cc or not greater than 2.65 g/cc or not greater than 2.60 g/cc or not greater than 2.55 g/cc or not greater than 2.50 g/cc or not greater than 2.45 g/cc or not greater than 2.40 g/cc or not greater than 2.35 g/cc or not greater than 2.30 g/cc or not greater than 2.25 g/cc or not greater than 2.20 g/cc or not greater than 2.15 g/cc or not greater than 2.10 g/cc or not greater than 2.05 g/cc or not greater than 2.00 g/cc. Moreover, the green body abrasive article may have a density in a range including any of the minimum and maximum values noted herein. As used herein, the measurements of density of green body abrasive article refer to geometric density measurements. The geometric volume of the green body abrasive article including porosity is calculated. The green body abrasive article is then weighed. The weight is divided by the geometric volume to arrive at density of green body abrasive article.

In an embodiment, the process may include forming a green body abrasive article having a length of at least 10 mm or at least 20 mm or at least 30 mm or at least 40 mm or at least 50 mm or at least 60 mm or at least 70 mm or at least 80 mm or at least 90 mm or at least 100 mm or at least 110 mm or at least 120 mm or at least 130 mm. Additionally or alternatively, the process may include forming a green body abrasive article having a length of not greater than 500 mm or not greater than 400 mm or not greater than 300 mm or not greater than 200 mm or not greater than 150 mm. Moreover, the green body abrasive article may have a length in a range including any of the minimum and maximum values noted herein.

In an embodiment, the process may include forming a green body abrasive article having a width of at least 1 mm or at least 2 mm or at least 3 mm or at least 4 mm or at least 6 mm or at least 8 mm or at least 10 mm or at least 15 mm or at least 20 mm or at least 30 mm. Additionally or alternatively, the process may include forming a green body abrasive article having a width of not greater than 150 mm or not greater than 120 mm or not greater than 100 mm or not greater than 80 mm or not greater than 60 mm or not greater than 50 mm. Moreover, the green body abrasive article may have a width in a range including any of the minimum and maximum values noted herein.

In an embodiment, the process may include forming a green body abrasive article having a thickness of at least 1 mm or at least 2 mm or at least 3 mm or at least 4 mm or at least 5 mm or at least 6 mm or at least 7 mm or at least 8 mm or at least 9 mm or at least 10 mm or at least 12 mm or at least 15 mm or at least 20 mm. Additionally or alternatively, the process may include forming a green body abrasive article having a thickness of not greater than 150 mm or not greater than 120 mm or not greater than 100 mm or not greater than 80 mm or not greater than 60 mm or not greater than 50 mm. Moreover, the green body abrasive article may have a thickness in a range including any of the minimum and maximum values noted herein.

In an embodiment, the process may include forming an abrasive article (e.g., a green body abrasive article or a finally-formed abrasive article) including a body having a particular Linear Feature Factor, such as at least 0.126 or at least 0.128 inches or at least 0.130 inches or at least 0.132 inches or at least 0.134 inches or at least inches or at least 0.136 inches or at least 0.138 inches or at least 0.140 inches. In another example, the body may include a Linear Feature Factor less than 1 inch or less than 0.5 inches or less than 0.4 inches or less than 0.3 inches or less than 0.2 inches or less than 0.15 inches. Moreover, the Linear Feature Factor may be in range including any of the minimum and maximum values noted herein. In particular embodiment, the body may be essentially free of linear features.

In another embodiment, the process may include forming a batch of abrasive articles, wherein each abrasive article including a body having a Linear Feature Factor of at least 0.126 or at least 0.128 inches or at least 0.130 inches or at least 0.132 inches or at least 0.134 inches or at least inches or at least 0.136 inches or at least 0.138 inches or at least 0.140 inches. In another example, each abrasive article may include a body including a Linear Feature Factor less than 1 inch or less than 0.5 inches or less than 0.4 inches or less than 0.3 inches or less than 0.2 inches or less than 0.15 inches. Moreover, the Linear Feature Factor may be in range including any of the minimum and maximum values noted herein. In particular embodiment, each abrasive article may be essentially free of linear features.

Linear Feature Factor can be measured as follows. A cross-sectional image of each sample was taken perpendicular to the direction of compaction. At least 10 lines are drawn across each cross-section perpendicular to the direction of compaction and any linear features seen. An example of such a line can be seen in FIG. 21 The spacing between pores along the lines is calculated and plotted in a separate distribution for each sample. If pores are arranged in rows, spacing will be uniform and standard deviation will be smaller. The standard deviation of each distribution is calculated and reported as a Linear Feature Factor.

According to another embodiment, the process may further include forming a finally-formed abrasive article including a body having a particular Archimedes density. In an example, the abrasive article may include an Archimedes density of at least 1 g/cc or at least 1.2 g/cc or at least 1.4 g/cc or at least 1.6 g/cc or at least 1.8 g/cc or at least 2.0 g/cc or at least 2.035 g/cc. In another example, the abrasive article has an Archimedes density of less than 3 g/cc or less than 2.8 g/cc or less than 2.6 g/cc or less than 2.4 g/cc or less than 2.2 g/cc or less than 2.0 g/cc. Moreover, the abrasive article may include an Archimedes density in a range including any of the minimum and maximum values noted herein. Unless otherwise noted, the density of a body of a finally-formed abrasive article refers to Archimedes density.

According to another embodiment, the process may further include forming a finally-formed abrasive article including a body having a particular porosity. In an example, the body may include a porosity of less than 50 vol % or less than 45 vol % or less than vol % or less than 40 vol % or less than 36 vol % for a total volume of the body. In another example, the body may include a porosity of at least 10 vol % or at least 15 vol % or at least 20 vol % or at least 25 vol % or at least 30 vol % for the total volume of the body. Moreover, the abrasive article may include a body including a porosity in a range including any of the minimum and maximum values noted herein.

Porosity values can be determined by the following calculation. Porosity=100*(1−geometric density/theoretical density).

According to another embodiment, the process may further include forming a finally formed abrasive article including a body having a particular average hardness. In an example, the body may include an average hardness of at least 50 HRL or at least 60 HRL or at least 70 HRL or at least 80 HRL or at least 90 HRL according to Rockwell hardness test L. In another example, the body may include an average hardness less than 150 HRL or less than 140 HRL or less than 130 HRL or less than 120 HRL or less than 110 HRL or less than 105 HRL according to Rockwell hardness test L. Hardness measurements are taken according to hardness Rockwell test L. Hardness values were taken from the surface of the article that was compacted during manufacturing. Moreover, the abrasive article may include a body including an average hardness in a range including any of the minimum and maximum values noted herein.

According to another embodiment, the process may further include forming a finally-formed abrasive article including a body having a particular hardness variation. Hardness variation is the standard deviation of hardness measurements taken on a single sample. In an example, the body the abrasive article may include a body including a hardness variation of less than 15 HRL or less than 14 HRL or less than 13 HRL or less than 12 HRL or less than 11 HRL or less than 10 HRL or less than 9 HRL or less than 8 according to at least 3 measurements according to Rockwell hardness test L. In another example, the hardness variation may be at least 50 HRL or at least 55 HRL or at least 60 HRL or at least 65 HRL or at least 70 HRL or at least 75 HRL or at least 80 HRL or at least 85 HRL or at least 90 HRL according to at least 3 measurements according to Rockwell hardness test L. Moreover, the abrasive article may include a body including a hardness variation in a range including any of the minimum and maximum values noted herein.

According to another non-limiting embodiment, the process may further include forming an abrasive article (e.g., a green body abrasive article) with a particular shrinkage that may facilitate control of shape defects and/or microstructural defects. In one embodiment, the body may undergo a volume shrinkage of not greater than 20% of the volume of the green body as removed from the process and prior to significant drying as compared to the volume of the body after final treatment to create the finally-formed abrasive article. In still another embodiment, the volume shrinkage may be not greater than 18%, such as not greater than 15% or not greater than 12% or not greater than 10% or not greater than 8% or not greater than 6% or not greater than 4%.

It will be appreciated that the foregoing processes may be used to form a batch of abrasive articles, and wherein the resulting batch of abrasive articles can have any one or combination of features of any of the embodiments herein.

In still another embodiment, any one or more processes herein can be assisted, controlled-in-part, or controlled in entirety by one or more computing objects that include hardware and/or software. In such embodiments, the hardware and/or software may include capabilities to measure, evaluate, characterize, compare and/or control any one or more aspects of the process and/or products herein. In one embodiment, the hardware and/or software may utilize artificial intelligence, such as machine learning algorithms configured to evaluate and improve one or more aspects of the process and/or products. It will also be appreciated that the one or more computing objects can be commutatively coupled to one or more networks and/or the additive manufacturing apparatus. The computing objects can be configured to interface with one or more users, and present modeling information and/or suggested changes to the process based upon evaluating one or more data sets having data related to the process variables, product characteristics, and/or properties, and other historical data.

Figure 11:
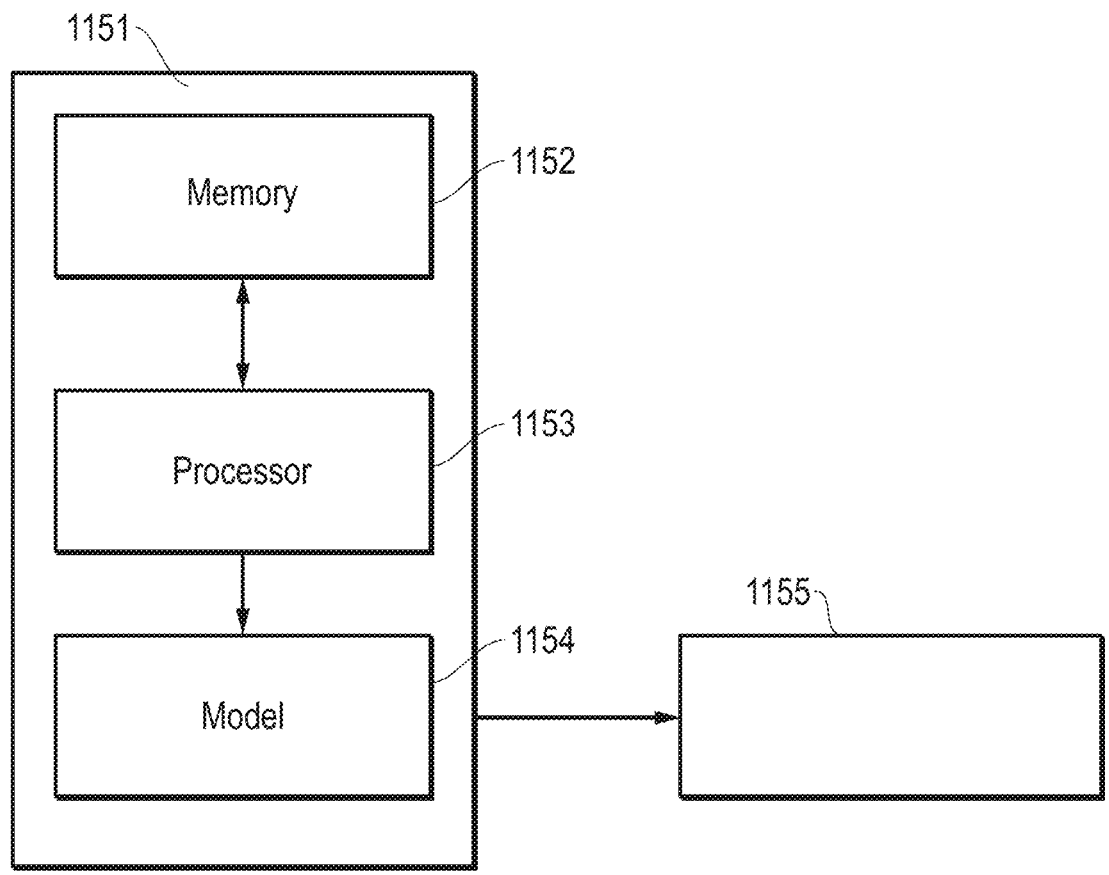
FIG. 11 includes a schematic of a system that may be used to facilitate formation of abrasive articles via additive manufacturing.

In certain instances, one or more aspects of the processes of the embodiments herein may be aided by a computing device. FIG. 11 includes a schematic of a system that may be used to facilitate formation of abrasive articles via additive manufacturing. FIG. 11 includes a computing device 1151, a memory 1152, a processor 1153, and a model 1154 that may be included as hardware or software in the computing device 1151. According to one embodiment, the memory 1152 and the processor 1153 may be communicatively coupled to an additive manufacturing apparatus and/or controller of an additive manufacturing device 1155 and configured to provide instructions or control one or more operations associated with the additive manufacturing process. For example, in one embodiment, the memory 1152 may store data related to the additive manufacturing process in a machine-readable format. In another embodiment, the processor 1153 may contain one or more computer programs that are configured to evaluate the data. In one non-limiting embodiment, the processor 1153 may be configured to compare the characteristic data of one or more of the abrasive articles to historical data to create a model 1154 for the batch of abrasive articles. According to another embodiment, a model for the batch of abrasive articles may be created based on the various aspects of the batch of abrasive articles (e.g., size, composition, target properties, raw material powder properties, and characteristics, etc.), historical data, apparatus data (e.g., size of the build box, capabilities of the additive manufacturing apparatus), and the like.

In yet another embodiment, the model may be used to control the additive manufacturing process, including but not limited to the placement and orientation of the abrasive articles relative to each other as formed in the build box and even details used to control process parameters, such as any compacting object control variables. In one instance, the model may be a scheme or plan used to build a batch of abrasive articles, and in particular, may include data on the placement and/or orientation of the abrasive articles relative to each other during the additive manufacturing process. In one embodiment, the model can be in a machine readable format and configured to be used by one or more controllers of the additive manufacturing process, including for example, but not limited to the movement and deposition characteristics of a printhead configured to selectively deposit binder material onto one or more layers of the powder material. In another non-limiting embodiment, the model can be in a machine readable format and configured to be used by one or more controllers of the additive manufacturing process, including, for example, but not limited to the force and transversing speed of a compacting object relative to a layer of raw material powder. In one instance, the model may also be presented in a format suitable for a person to evaluate and confirm the proposed scheme or plan prior to it being implemented by the additive manufacturing system.

In another non-limiting embodiment, the model may be developed or evolve via a machine learning algorithm or artificial intelligence. In one embodiment, the processor 1153 may use data related to the batch of abrasive articles to develop an initial model for forming the batch of abrasive articles. For another embodiment, the initial model may be compared to historical data, which may include data from prior models and data related to the resulting properties and characteristics of the abrasive articles formed therefrom. In certain optional instances, the processor 1153 may edit the initial model based on the historical data to develop a final model to be used to form the batch of abrasive articles.

According to one embodiment, the historical data may include information of prior additive manufacturing operations including data related to the features of the abrasive articles and properties of the abrasive articles. In a more particular embodiment, data related to features of the abrasive articles may include data related to the size, shape, composition, and microstructure of the abrasive articles. In another non-limiting embodiment, the properties of the abrasive articles may include data related to the density, strength, hardness, modulus, or rupture (MOR), volumetric form factor, and any other properties of the green bodies or finally-formed bodies according to the embodiments herein.

A green body abrasive article can include a body including abrasive particles contained in a bond material and/or a precursor bond material. In an embodiment, the body of the green body abrasive article may include one or more particular features that may facilitate improved formation and/or improved performance of the abrasive article. For instance, the body may include a particular microstructure Feature, one or more particular surface features, particular dimensions including length, width, thickness, or any combination thereof, or any combination thereof, that along or in combination can facilitate formation of the abrasive article and batches of abrasive articles having improved dimensional stability and/or consistency, improved microstructure stability and/or consistency, and/or improved consistency in properties and performance.

In an embodiment, the body of the green body abrasive article may include a particular Linear Feature Factor. For example, the body may include a Linear Feature Factor of at least 0.126. In a particular embodiment, the body of the green body abrasive article may be essentially free of linear features.

In an embodiment, the body of the green body abrasive article may include a microstructure Feature greater than 1.

In a further embodiment, the body of the green body abrasive article may include a first surface having a first developed interfacial area ratio (Sdr1) and a second surface having a second developed interfacial area ratio (Sdr2). In particular, the body may include a particular difference between Sdr1 and Sdr2 that can facilitate improved formation and/or improved performance of abrasive article and batches of abrasive articles. For example, the difference between Sdr1 and Sdr2 may be not greater than 25%.

In an embodiment, the body of the green body abrasive article may include an exterior surface having a first developed interfacial area ratio (Sdr) of at least 40%, such as at least 42%, or at least 44%, or at least 46%, or at least 48%, or at least 50%, or at least 52%, or at least 54%, or at least 56%, or at least 58%, or at least 60%, or at least 62%, or at least 64%, or at least 66%, or at least 68%, or at least 70%.

In another embodiment, the green body abrasive article can include a particular dimension including length, width, thickness, or any combination thereof.

In this disclosure, all dimension measurements can be determined using calipers. When measuring dimensions Length>=Width>=Thickness.

In an embodiment, the green body abrasive article may include a particular length. For example, the length may be at least 10 mm or at least 20 mm or at least 30 mm or at least 40 mm or at least 50 mm or at least 60 mm or at least 70 mm or at least 80 mm or at least 90 mm or at least 100 mm or at least 110 mm or at least 120 mm or at least 130 mm. In another example, the green body abrasive article may include a length of not greater than 500 mm or not greater than 400 mm or not greater than 300 mm or not greater than 200 mm or not greater than 150 mm or not greater than 140 mm or not greater than 130 mm. It is to be appreciated the green body abrasive article can include a length in a range including any of the minimum and maximum values noted herein.

In an embodiment, the green body abrasive article may include a particular width. For example, the green body abrasive article may include a width of at least 1 mm or at least 2 mm or at least 3 mm or at least 4 mm or at least 6 mm or at least 8 mm or at least 10 mm or at least 10 mm or at least 15 mm or at least 20 mm or at least 30 mm. In another example, the green body abrasive article may include a width of not greater than 150 mm or not greater than 140 mm or not greater than 130 mm or not greater than 120 mm or not greater than 100 mm or not greater than 80 mm or not greater than 60 mm or not greater than 50 mm. It is to be appreciated the green body abrasive article can include a width in a range including any of the minimum and maximum values noted herein.

In an embodiment, the green body abrasive article may include a particular thickness. For example, the thickness may be at least 1 mm or at least 2 mm or at least 3 mm or at least 4 mm or at least 5 mm or at least 6 mm or at least 7 mm or at least 8 mm or at least 9 mm or at least 10 mm or at least 12 mm or at least 15 mm or at least 20 mm. In another example, the green body abrasive article may include a thickness of not greater than 150 mm or not greater than 140 mm or not greater than 130 mm or not greater than 120 mm or not greater than 100 mm or not greater than 80 mm or not greater than 60 mm or not greater than 50 mm. It is to be appreciated the green body abrasive article can include a thickness in a range including any of the minimum and maximum values noted herein.

In an embodiment, the green body abrasive article may have a particular density that may facilitate improved formation and improved property and/or performance of the abrasive article and batches of abrasive articles. In an example, the density may be at least 1.5 g/cc or at least 1.51 g/cc or at least 1.52 g/cc or at least 1.53 g/cc or at least 1.54 g/cc or at least 1.55 g/cc or at least 1.56 g/cc or at least 1.57 g/cc or at least 1.58 g/cc or at least 1.59 g/cc or at least 1.60 g/cc or at least 1.61 g/cc or at least 1.62 g/cc or at least 1.63 g/cc or at least 1.64 g/cc or at least 1.65 g/cc or at least 1.66 g/cc or at least 1.67 g/cc or at least 1.68 g/cc or at least 1.69 g/cc or at least 1.70 g/cc. In another example, the density may be not greater than 3.00 g/cc or not greater than 2.95 g/cc or not greater than 2.90 g/cc or not greater than 2.85 g/cc or not greater than 2.80 g/cc or not greater than 2.75 g/cc or not greater than 2.70 g/cc or not greater than 2.65 g/cc or not greater than 2.60 g/cc or not greater than 2.55 g/cc or not greater than 2.50 g/cc or not greater than 2.45 g/cc or not greater than 2.40 g/cc or not greater than 2.35 g/cc or not greater than 2.30 g/cc or not greater than 2.25 g/cc or not greater than 2.20 g/cc or not greater than 2.15 g/cc or not greater than 2.10 g/cc or not greater than 2.05 g/cc or not greater than 2.00 g/cc. It is to be appreciated that the green body abrasive article may include a density in a range including any of the minimum and maximum values noted herein.

The green body abrasive article may include abrasive particles including superabrasive particles, such as diamond, cubic boron nitride, or the like, or any combination thereof. In another example, the abrasive particles may include a particular Mohs hardness, such as at least 7 or at least 8 or at least 9 or at least 10. In a particular embodiment, the abrasive particles can include cubic boron nitride. In more particular implementations, the abrasive particles may consist essentially of cubic boron nitride.

In an embodiment, the green body abrasive article may include abrasive particles including a particular median particle size. For instance, the abrasive particles can have a median particle size of at least 0.5 microns or at least 1 micron or at least 2 microns or at least 3 microns or at least 4 microns or at least 5 microns or at least 6 microns. In another instance, the abrasive particles can have a median particle size of less than 100 microns or less than 90 microns or less than 80 microns or less than 70 microns or less than 60 microns or less than 50 microns or less than 40 microns or less than 30 microns or less than 20 microns or less than 10 microns. Moreover, the abrasive particles may include a median particle size in a range including any of the minimum and maximum values noted herein.

In an embodiment, the bond or precursor bond material can include an inorganic material. An exemplary inorganic material may include a ceramic material, a vitreous material, oxides, a glassy material, a vitreous material, or any combination thereof. In another example, the bond or precursor bond material may include a material including a polycrystalline phase, a monocrystalline phase, an amorphous phase, or any combination thereof. In particular implementations, the bond material or precursor bond material may include a vitreous material. In a more particular implementation, the bond material or precursor material may be a vitreous bond material. In a further particular implementation, the bond material or precursor bond material may include one or more oxide. For example, an oxide can include one or more of alkaline earth metal elements, alkali metal elements, rare earth elements, transition metal elements, or any combination thereof. A more particular example of oxide may include aluminum oxide, silicon dioxide, boron oxide, zirconium oxide, magnesium oxide, lithium oxide, iron oxide, potassium oxide, or any combination thereof. In an even more example, oxide may include aluminum oxide, silicon dioxide, or any combination thereof.

In another embodiment, a batch of green body abrasive articles may include a plurality of green body abrasive articles having one or more of the features described in embodiments herein.

In a further embodiment, a plurality of batches of green body abrasive articles may include batches, wherein each batch may include a plurality of green body abrasive articles having one or more of the features described in embodiments herein. In particular embodiments, each green body abrasive article in a batch can include one or more of the features described in embodiments herein.

In a further embodiment, a batch of green body abrasive articles may include a low variation in one or more properties across the entire batch of green body abrasive articles. An exemplary property may include density, dimension, SDV, or any combination thereof.

In an embodiment, a batch of green body abrasive articles may include a particular batch density variation that may facilitate formation of a batch of abrasive articles having improved consistency in property and/or performance. For example, a batch of green body abrasive articles may include a batch density variation of less than 0.05 g/cc or less than 0.048 g/cc or less than 0.045 g/cc or less than 0.043 g/cc or less than 0.040 g/cc or less than 0.038 g/cc or less than 0.035 g/cc or less than 0.033 g/cc or less than 0.030 g/cc or less than 0.028 g/cc. As used herein, batch density variation is intended to refer to variation of density of green body abrasive articles cross the entire batch. In another example, a batch of green body abrasive articles may include a batch density variation of a batch density variation of at least 0.0001 g/cc or at least 0.0002 g/cc or at least 0.0003 g/cc. Moreover, the batch of green body abrasive articles may include a batch density variation in a range including any of the minimum and maximum values noted herein.

In an embodiment, a batch of green body abrasive articles may include a particular dimension variation-L that may facilitate formation of a batch of abrasive articles having improved consistency in property and/or performance. Dimension variation-L, as used herein, is intended to refer to variation of the length of green body abrasive articles of the entire batch. For example, a batch of green body abrasive articles may include a batch dimensional variation-L of at least 0.001 mm or at least 0.005 mm or at least 0.01 mm. In another instance, a batch dimensional variation-L of less than 0.25 mm or less than 0.2 mm or less than 0.1 mm or less than 0.09 mm or less than 0.08 mm or less than 0.07 mm or less than 0.06 mm or less than 0.05 mm. Moreover, the batch of green body abrasive articles may include a batch dimension variation-L in a range including any of the minimum and maximum values noted herein.

In this disclosure, batch dimensional variation-L is equal to the standard deviation of all length measurements in a batch. Batch dimensional variation-W and Batch dimensional variation-T are calculated the same way using width and thickness, respectively.

In an embodiment, a batch of green body abrasive articles may include a dimension variation-L of not greater than 0.5% of the length of the bodies or not greater than 0.45% of the length of the bodies or not greater than 0.40% of the length of the bodies or not greater than 0.35% of the length of the bodies or not greater than 0.30% of the length of the bodies or not greater than 0.25% of the length of the bodies or not greater than 0.20% of the length of the bodies. Additionally or alternatively, the batch of green body abrasive articles comprises a dimensional variation-L of at least 0.001% of the length of the bodies. Moreover, the batch of green body abrasive articles may include a batch dimension variation-L in a range including any of the minimum and maximum percentages noted herein.

In an embodiment, a batch of green body abrasive articles may include a particular dimension variation-W that may facilitate formation of a batch of abrasive articles having improved consistency in property and/or performance. Dimension variation-W, as used herein, is intended to refer to variation of the width of green body abrasive articles across the entire batch. For example, the batch of green body abrasive articles may include a batch dimensional variation-W of at least 0.001 mm or at least 0.005 mm or at least 0.01 mm. In another instance, the batch of green body abrasive articles may include a batch dimensional variation-W of less than 0.2 mm or less than 0.18 mm or less than 0.16 mm or less than 0.14 mm or less than 0.12 mm or less than 0.10 mm or less than 0.09 mm or less than 0.08. Moreover, the batch of green body abrasive articles may include a batch dimension variation-W in a range including any of the minimum and maximum values noted herein.

In an embodiment, a batch of green body abrasive articles may include a dimensional variation-w of less than 1.2% of the width of the bodies or less than 1.1% of the width of the bodies or less than 1.0% of the width of the bodies or less than 0.9% of the width of the bodies or less than 0.8% of the width of the bodies or less than 0.7% of the width of the bodies or less than 0.6% of the width of the bodies. Additionally or alternatively, the batch of green body abrasive articles comprises a dimensional variation-W of at least 0.001% of the width of the bodies. Moreover, the batch of green body abrasive articles may include a batch dimension variation-W in a range including any of the minimum and maximum percentages noted herein.

In an embodiment, a batch of green body abrasive articles may include a particular dimension variation-T that may facilitate formation of a batch of abrasive articles having improved consistency in property and/or performance. Dimension variation-T, as used herein, is intended to refer to variation of the thickness of green body abrasive articles across the entire batch. For example, the batch of green body abrasive articles may include a batch dimensional variation-T of at least 0.001 mm or at least 0.005 mm or at least 0.01 mm. In another example, the batch of green body abrasive articles may include a batch dimensional variation-T of less than 0.7 mm or less than 0.6 mm or less than 0.5 mm or less than 0.4 mm or less than 0.3 mm or less than 0.2 mm or less than 0.1 mm or less than 0.07 mm. Moreover, the batch of green body abrasive articles may include a batch dimension variation-T in a range including any of the minimum and maximum values noted herein.

In an embodiment, the batch of green body abrasive articles may include a dimensional variation-T of less than 9% of the thickness of the bodies or less than 8% of the thickness of the bodies or less than 7% of the thickness of the bodies or less than 6% of the thickness of the bodies or less than 5% of the thickness of the bodies or less than 4% of the thickness of the bodies or less than 3% of the thickness of the bodies or less than 2% of the thickness of the bodies or less than 1% of the thickness of the bodies. Alternatively or additionally, the batch of green body abrasive articles comprises a dimensional variation-T of at least 0.001% of the thickness of the bodies. Moreover, the batch of green body abrasive articles may include a batch dimension variation-T in a range including any of the minimum and maximum values noted herein.

In an embodiment, the batch of green body abrasive articles may include a volume standard deviation of less than 7% of the volume of the bodies or less than 6% of the volume of the bodies or less than 5% of the volume of the bodies or less than 4% of the volume of the bodies or less than 3% of the volume of the bodies or less than 2% of the volume of the bodies or less than 1% of the volume of the bodies. In another embodiment, the batch of green body abrasive articles may include a volume standard deviation at least 0.001% of the volume of the bodies. Moreover, the batch of green body abrasive articles may include a volume standard deviation in a range including any of the minimum and maximum values noted herein. Batch volume variation is the standard deviation of the volumes within a batch.

In an embodiment, a batch of green body abrasive articles may include a particular dimension variation-T that may facilitate formation of a batch of abrasive articles having improved consistency in property and/or performance. For example, the batch of green body abrasive articles can have a batch Volume variation of at least 1 mm$^3$ or at least 1.5 mm$^3$ or at least 2 mm$^3$. As used herein, batch Volume variation is intended to refer to the variation of the volumes of green body abrasive articles across the entire batch. In another example, the batch of green body abrasive articles may have a batch Volume variation of less than 350 mm$^3$ or less than 325 mm$^3$ or less than 300 mm$^3$ or less than 275 mm$^3$ or less than 250 mm$^3$ or less than 225 mm$^3$ or less than 200 mm$^3$ or less than 175 mm$^3$ or less than 150 mm$^3$ or less than 125 mm$^3$ or less than 100 mm$^3$ or less than 75 mm$^3$ or less than 50 mm$^3$. Moreover, the batch of green body abrasive articles may include a batch Volume variation in a range including any of the minimum and maximum values noted herein.

In an embodiment, each green body abrasive article of the batch of green body abrasive articles can include an SDV, and the batch of green body abrasive articles can include a particular highest SDV that may facilitate improved formation of a batch of abrasive articles. In a particular embodiment, the batch may include a green body abrasive article with the highest SDV having a particular value that may facilitate formation of a batch of abrasive articles with improved dimension consistency. In an example, the highest SDV may include an SDV of less than 0.0082 inches or less than 0.0080 inches or less than 0.0078 inches or less than 0.0076 inches or less than 0.0074 inches or less than 0.0072 inches or less than 0.0070 inches or less than 0.0068 inches or less than 0.0066 inches or less than 0.0064 inches or less than 0.0062 inches or less than 0.0060 inches or less than 0.0058 inches or less than 0.0056 inches or less than 0.0054 inches or less than 0.0052 inches. In another example, the highest SDV may include an SDV of at least 0.001 inches or at least 0.002 inches. Moreover, the batch of green body abrasive articles may include a highest SDV in a range including any of the minimum and maximum values noted herein.

In a particular embodiment, the batch of green body abrasive articles may include a particular mean SDV of all green body abrasive articles that may facilitate formation of a batch of abrasive articles with improved dimension consistency. In an example, the mean SDV of all green body abrasive articles in the batch may be less than 0.0063 inches or less than 0.0062 inches or less than 0.0061 inches or less than 0.0060 inches or less than 0.0059 inches or less than 0.0058 inches or less than 0.0057 inches or less than 0.0056 inches or less than 0.0055 inches or less than 0.0054 inches or less than 0.0053 inches or less than 0.0052 inches or less than 0.0051 inches or less than 0.0050 inches or less than 0.0049 inches or less than 0.0048 inches or less than 0.0047 inches or less than 0.0046 inches or less than 0.0045 inches or less than 0.0043 inches or less than 0.0042 inches or less than 0.0041 inches. In another example, the mean SDV of all green body abrasive articles in the batch may be at least 0.001 inches or at least 0.002 inches or at least 0.003 inches or at least 0.004 inches. Moreover, the batch of green body abrasive articles may include a mean SDV of all green body abrasive articles in the batch in a range including any of the minimum and maximum values noted herein.

Figure 12:
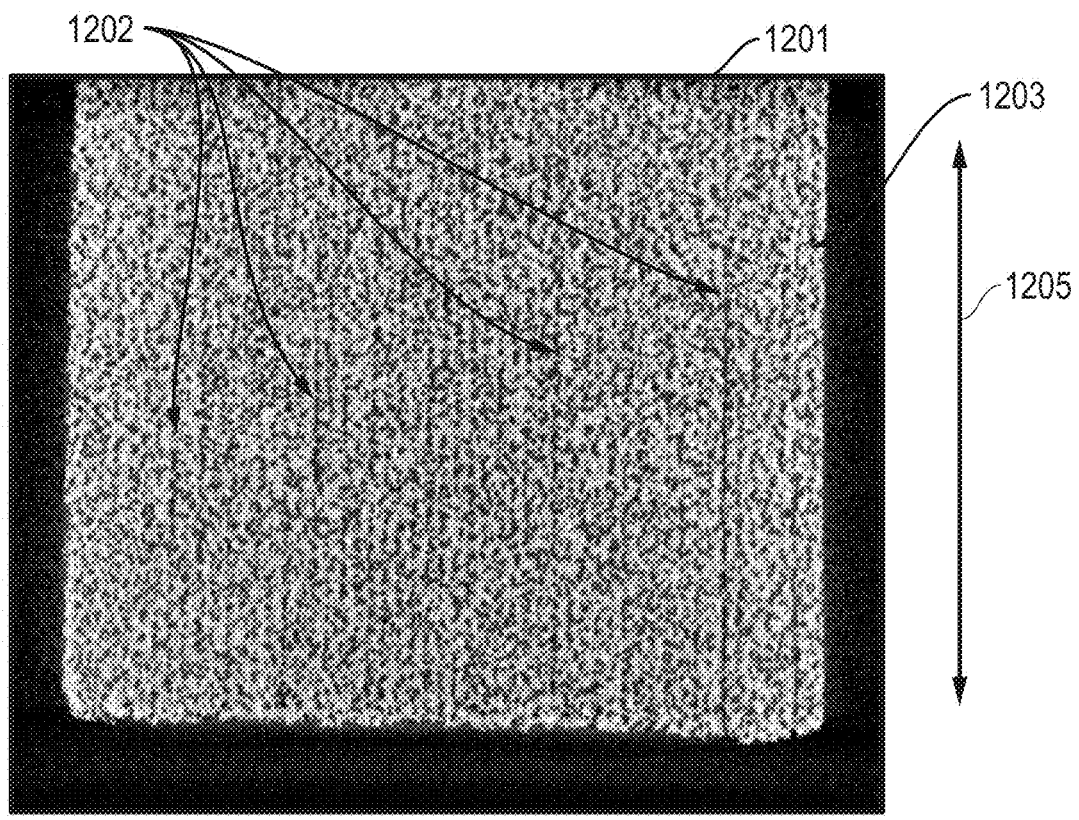
FIG. 12 includes a cross-sectional image of an abrasive article.
Figure 13:
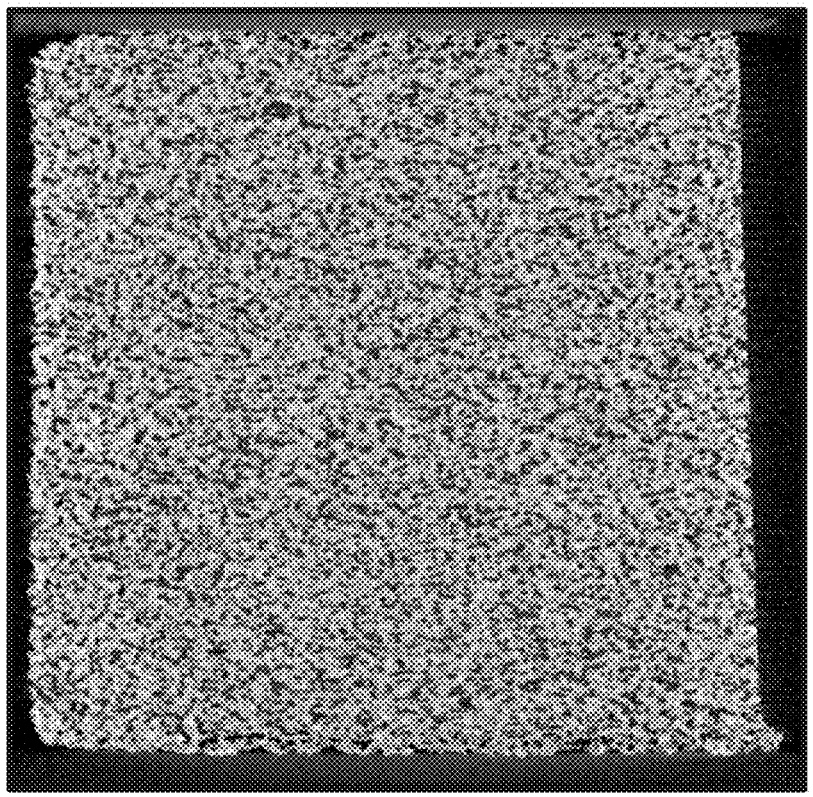
FIG. 13 includes a cross-sectional image of an abrasive article sample formed according to an embodiment.

In another aspect, the processes of the embodiments herein may facilitate the formation of abrasive articles or batches of abrasive articles having a suitable microstructure. In certain instances, uncontrolled compaction has been shown to result in one or more unsuitable microstructural features. In one embodiment, the body of an abrasive article may have a particular Linear Feature Factor, which is a measure of the homogeneity of the microstructure. FIG. 12 includes a cross-sectional image of an abrasive article formed under certain conditions as provided in the Examples. As illustrated in FIG. 12, the cross-sectional image of the body of the abrasive article has evidence of lines associated with porosity that has been aligned substantially perpendicular to an applied force of compaction during the forming process. FIG. 13 includes a cross-sectional image of an abrasive article sample formed according to an embodiment having less evidence of lines of porosity extending through the body and having a more uniform microstructure and a different Linear Feature Factor.

According to one embodiment, the body of the abrasive article may have a Linear Feature Factor that is notably less than a body formed through an uncontrolled compaction process. See, for example, the differences depicted in a comparison of abrasive articles from FIGS. 12 and 13, wherein the abrasive article of FIG. 12 demonstrates a higher degree of lines and linearity of pores in the body due to a poor compaction process as compared to the microstructure of the body of FIG. 13.

The Linear Feature Factor can be measured according to the following sample preparation and testing conditions. The process would start with images taken in 3 planes, or alternatively, with X-ray CT scans of the body. Image analysis could be done in 3D or 2D. In one instance, the process includes picking a plurality of random points in the body (or plane) and then count the number and size of intersections with porosity. In an isotropic body, there would be no dependence of the average size/number of pores on direction. Where there is alignment of pores, the analysis demonstrates a statistically significant peak along certain directions.

In one aspect, the abrasive article or batch of abrasive articles formed according to the embodiments herein may have suitable homogeneity of microstructure. In one embodiment, the body may be essentially free of one or more Linear Features as viewed in cross-section. For example, the body of sample in FIG. 13 is essentially free of one or more Linear Features, whereas the body of the sample in FIG. 12 demonstrates a plurality of Linear Features. In certain instances, the Linear Features appear as lines or alignment of elongated pores giving the microstructure the appearance of layers or having lines as viewed in cross-section, which is a plane that is perpendicular to the length of the body.

According to another embodiment, the body of an abrasive article or a batch of abrasive articles may have a particular type of porosity having a particular shape. In certain instances, it has been observed that elongated porosity may be created by certain compacting processes. In certain instances, the elongated porosity may be beneficial. However, in other instances, it may not be suitable. In one embodiment, the shape and orientation of the porosity in the body may be controlled by controlling the placement and/or orientation of the body relative to the compacting process.

In one embodiment, the abrasive article or batch of abrasive articles may have porosity having an average aspect ratio (L:W) of not greater than 100 as viewed in cross-section, such as not greater than 90 or not greater than 80 or not greater than 70 or not greater than 60 or not greater than 50 or not greater than 40 or not greater than 30 or not greater than 20 or not greater than 10. In one non-limiting embodiment, the average aspect ratio of the porosity as viewed in cross-section can be at least 1 or at least 1.2 or at least 1.5 or at least 1.8 or at least 2 or at least 2.5 or at least 3 or at least 3.5 or at least 4. It will be appreciated that the average aspect ratio can be within a range including any of the minimum and maximum values noted above.

The average aspect ratio of the porosity in the body may be evaluated by obtaining 3 or more randomly selected cross-sectional images and using imaging analysis software to isolate the pores as viewed from the cross-sectional images and measure the length and width of the pores. The average length and average width of the pores can be used to calculate the average aspect ratio of the porosity in the body.

In another embodiment, the placement and/or orientation of the abrasive article or batch of abrasive articles in the build bed and the compacting process may be controlled to control the orientation of the porosity in the body. In some instances, some alignment of the porosity may be desired and the process of placement and/or orientation and the compacting process may be controlled to create some alignment of the porosity in the body. In still another embodiment, the porosity may be substantially randomly oriented porosity as viewed in cross-section.

According to one aspect, the body of an abrasive article or a batch of abrasive articles may have not greater than 80% of the porosity having a longitudinal axis within +−5 degrees of a direction parallel to any surface of the body as viewed in cross-section. For example, turning to FIG. 12, the pores 1202 or the body 1201 are extending generally in the direction 1205, which is substantially parallel to the surface 1203 of the body 1201. In one embodiment, the surface 1203 and direction 1205 may be substantially perpendicular to the direction of force applied by the compacting object during a compaction process, such that the force applied created a certain content of elongated porosity within the body 1201 having longitudinal axes substantially parallel to the surface 1203 and in the direction 1205. According to one non-limiting embodiment, the not greater than 70% of the porosity may have a longitudinal axis within +− (plus or minus) 5 degrees of a direction parallel to any surface of the body, such as not greater than 60% or not greater than 50% or not greater than 40% or not greater than 30% or not greater than 20% or not greater than 10% or not greater than 5%. Still, in another non-limiting embodiment, the percentage of porosity in the body having a longitudinal axis aligned with a direction parallel to any surface of the body may be at least 1% or at least 3% or at least 5% or at least 10% or at least 15% or at least 20% or at least 25% or at least 30% or at least 35% or at least 40% or at least 45% or at least 50% or at least 60% or at least 70% or at least 80%. It will be appreciated that the percentage of porosity in the body having a longitudinal axis aligned with a direction parallel to any surface of the body may be within a range including any of the minimum and maximum percentages noted above.

According to another embodiment, the abrasive article is part of a batch, and wherein the batch of abrasive articles comprise an average batch Linear Feature Factor that is notable improved as compared to a batch of abrasive articles formed using a poorly controlled compaction process.

According to another embodiment, the abrasive article may be part of a batch, and wherein the batch of abrasive articles comprise an average batch flexural strength within a range of at least 10 MPa according to the ASTM standard noted herein. In one non-limiting embodiment, the average batch flexural strength can be not greater than 100 GPa. It will be appreciated that the average batch flexural strength can be within a range including any of the minimum and maximum values above.

The abrasive article or a batch of abrasive articles may include a body including abrasive particles contained in a bond material. An exemplary abrasive particle may include superabrasive particles, such as diamond, cubic boron nitride, or the like, or any combination thereof. In another example, the body may include abrasive particles having a Mohs hardness of at least 7 or at least 8 or at least 9 or at least 10. In particular implementations, the abrasive particles may include cubic boron nitride. In more particular implementations, the abrasive particles may consist essentially of cubic boron nitride.

The abrasive particles may have certain median particle size. In an embodiment, the body may include abrasive particles having a median particle size of at least 0.5 microns or at least 1 micron or at least 2 microns or at least 3 microns or at least 4 microns or at least 5 microns or at least 6 microns. Additionally or alternatively, the abrasive particles may have a median particle size of less than 100 microns or less than 90 microns or less than 80 microns or less than 70 microns or less than 60 microns or less than 50 microns or less than 40 microns or less than 30 microns or less than 20 microns or less than 10 microns. Moreover, the body may include abrasive particles having a median particle size in a range including any of the minimum and maximum values noted herein.

In a further embodiment, the body may include a bond material including an inorganic material. In particular examples, the bond material may consist essentially of inorganic material. A further example of the bond material may include a material including a monocrystalline phase, a polycrystalline phase, an amorphous phase, or any combination thereof. In another example, the bond material may include a vitreous bond material, a glassy material, a ceramic material, or any combination thereof. In an even more particular example, the bond material can consist essentially of the vitreous bond material.

In a particular embodiment, the bond material may include an oxide including alkaline earth metal elements, transition metal elements, rare earth elements, alkali metal elements, or any combination thereof. For example, the bond material may include aluminum oxide, silicon dioxide, potassium oxide, magnesium oxide, zirconium oxide, lithium oxide, calcium oxide, boron oxide, or any combination thereof. In particular examples, the bond material may include aluminum oxide, silicon dioxide, or any combination thereof.

In an embodiment, the body of the abrasive article may include one or more particular features including microstructure Feature, surface features, or any combination thereof.

In an embodiment, the body of the abrasive article may include a particular Linear Feature Factor. For example, the Linear Feature Factor may be at least 0.126. In another embodiment, the body may be essentially free of Linear Feature Factor. In another particular embodiment, the body of the abrasive article may be essentially free of linear features.

In a further embodiment, the abrasive article or a batch of abrasive articles may include a body including a particular microstructure Feature. For example, the microstructure Feature may be greater than 1.

In a further embodiment, the body of the abrasive article may include a first surface having a first developed interfacial area ratio (Sdr1) and a second surface having a second developed interfacial area ratio (Sdr2). In a particular embodiment, the body may include a particular difference between Sdr1 and Sd42. For example, the difference between Sdr1 and Sdr2 may be not greater than 25%.

In a further embodiment, the body of the abrasive article may include a particular first developed interfacial area ratio (Sdr1), such as at least 40%.

In an embodiment, the abrasive article or a batch of abrasive articles may include a body including particular dimensions including length, width, thickness, or any combination thereof. In a further embodiment, the body of the abrasive article may include a length of at least 10 mm or at least 20 mm or at least 30 mm or at least 40 mm or at least 50 mm or at least 60 mm or at least 70 mm or at least 80 mm or at least 90 mm or at least 100 mm or at least 110 mm or at least 120 mm or at least 130 mm. Alternatively or additionally, the length may be not greater than 500 mm or not greater than 400 mm or not greater than 300 mm or not greater than 200 mm or not greater than 150 mm or not greater than 145 mm. Moreover, the body can include the length in a range including any of the minimum and maximum values noted herein.

In another embodiment, abrasive article or a batch of abrasive articles may include a body including a width of at least 1 mm or at least 2 mm or at least 3 mm or at least 4 mm or at least 6 mm or at least 8 mm or at least 10 mm or at least 15 mm or at least 20 mm or at least 30 mm. Alternatively or additionally, the width may be not greater than 150 mm or not greater than 145 mm or not greater than 120 mm or not greater than 100 mm or not greater than 80 mm or not greater than 60 mm or not greater than 50 mm. Moreover, the body can include the width in a range including any of the minimum and maximum values noted herein.

In another embodiment, the abrasive article or a batch of abrasive articles may include a body including a thickness of at least 1 mm or at least 2 mm or at least 3 mm or at least 4 mm or at least 5 mm or at least 6 mm or at least 7 mm or at least 8 mm or at least 9 mm or at least 10 mm or at least 12 mm or at least 15 mm or at least 20 mm. Alternatively or additionally, the thickness may be not greater than 150 mm or not greater than 145 mm or not greater than 120 mm or not greater than 100 mm or not greater than 80 mm or not greater than 60 mm or not greater than 50 mm. Moreover, the body can include the thickness in a range including any of the minimum and maximum values noted herein.

In another embodiment, the abrasive article or a batch of abrasive articles may include a body including a particular porosity that may facilitate improved performance of the abrasive article or the batch of abrasive articles. In an example, the body may include a porosity of less than 50 vol % or less than 45 vol % or less than vol % or less than 40 vol % or less than 36 vol %. In a further example, the body may include a porosity of at least 10 vol % or at least 15 vol % or at least 20 vol % or at least 25 vol % or at least 30 vol %. Moreover, the body can include porosity in a range including any of the minimum and maximum percentages noted herein.

In another embodiment, the abrasive article or a batch of abrasive articles may include a body including a particular density that may facilitate improved performance of the abrasive article or the batch of abrasive articles. In an embodiment, the body may include a particular Archimedes density. For example, the body may include an Archimedes density of at least 1 g/cc or at least 1.2 g/cc or at least 1.4 g/cc or at least 1.6 g/cc or at least 1.8 g/cc or at least 2.0 g/cc or at least 2.035 g/cc. In another example, the body may include an Archimedes density of less than 3 g/cc or less than 2.8 g/cc or less than 2.6 g/cc or less than 2.4 g/cc or less than 2.2 g/cc or less than 2.0 g/cc. Moreover, the body can include an Archimedes density in a range including any of the minimum and maximum values noted herein.

In an embodiment, the abrasive article or the batch of abrasive articles may include a body including a particular hardness that may facilitate improved performance of the abrasive article or the batch of abrasive articles. In an example, the body may include an average hardness of at least 50 HRL or at least 60 HRL or at least 70 HRL or at least 80 HRL or at least 90 HRL, according to Rockwell hardness test L. In another example, the body may include an average hardness of less than 150 HRL or less than 140 HRL or less than 130 HRL or less than 120 HRL or less than 110 HRL or less than 105 HRL, according to Rockwell hardness test L. Moreover, the body can include an average hardness in a range including any of the minimum and maximum values noted herein.

In an embodiment, the abrasive article or the batch of abrasive articles may include a body including a particular hardness variation that may facilitate improved performance of the abrasive article or the batch of abrasive articles. In an example, the body may have a hardness variation of less than 15 HRL or less than 14 HRL or less than 13 HRL or less than 12 HRL or less than 11 HRL or less than 10 HRL or less than 9 HRL or less than 8 according to at least 3 measurements according to Rockwell hardness test L. In another example, the body may include a hardness variation of at least 50 HRL or at least 55 HRL or at least 60 HRL or at least 65 HRL or at least 70 HRL or at least 75 HRL or at least 80 HRL or at least 85 HRL or at least 90 HRL according to at least 3 measurements according to Rockwell hardness test L. Moreover, the body can include a hardness variation in a range including any of the minimum and maximum values noted herein.

In an embodiment, a batch of abrasive articles may include a plurality of abrasive articles, wherein each of the abrasive articles may include a body including one or more of the features noted in embodiments herein.

In another embodiment, the batch of abrasive articles may have improved variation of one or more property across the entire batch of abrasive articles. An exemplary property may include density, dimension, hardness, porosity, distribution of porosity, microstructure features, or any combination thereof. In another embodiment, the batch of abrasive articles may have improved consistency of performance across the entire batch of abrasive articles.

In an embodiment, the batch of abrasive articles may include a dimensional variation-L of less than 0.8% of the length of the bodies or less than 0.75% of the length of the bodies or less than 0.70% of the length of the bodies or less than 0.65% of the length of the bodies or less than 0.60% of the length of the bodies or less than 0.55% of the length of the bodies or less than 0.50% of the length of the bodies or less than 0.45% of the length of the bodies or less than 0.40.

In another embodiment, the batch of abrasive articles may include a dimensional variation-L of at least 0.001% of the length of the bodies. Moreover, the batch of abrasive articles comprises a dimensional variation-L in a range including any of the minimum and maximum values noted herein.

In an embodiment, the batch of abrasive articles may include a dimensional variation-W of less than 0.3% of the width of the bodies or less than 0.25% of the width of the bodies or less than 0.20% of the width of the bodies or less than 0.15% of the width of the bodies or less than 0.10% of the width of the bodies. In another embodiment, the batch of abrasive articles may include a dimensional variation-W of at least 0.001% of the width of the bodies. Moreover, the batch of abrasive articles may include a dimensional variation-W in a range including any of the minimum and maximum values noted herein.

In an embodiment, the batch of abrasive articles may include a dimensional variation-T of less than 0.9% of the thickness of the bodies or less than 0.8% of the thickness of the bodies or less than 0.7% of the thickness of the bodies or less than 0.6% of the thickness of the bodies or less than 0.5% of the thickness of the bodies or less than 0.4% of the thickness of the bodies or less than 0.3% of the thickness of the bodies or less than 0.2% of the thickness of the bodies or less than 0.1% of the thickness of the bodies. In another embodiment, the batch of abrasive articles may include a dimensional-T of at least 0.001% of the width of the bodies. Moreover, the batch of abrasive articles may include a dimensional variation-T in a range including any of the minimum and maximum values noted herein.

In an embodiment, the batch of abrasive articles may include a batch volume variation of less than 8% of the volume of the bodies or less than 7% of the volume of the bodies or less than 6% of the volume of the bodies or less than 5% of the volume of the bodies or less than 4% of the volume of the bodies or less than 3% of the volume of the bodies or less than 2% of the volume of the bodies or less than 1% of the volume of the bodies. In another embodiment, the batch of abrasive articles may include a batch volume variation of at least 0.001% of the volume of the bodies. Moreover, the batch of abrasive articles may include a batch volume variation in a range including any of the minimum and maximum values noted herein.

The processes of the embodiments herein are developed by empirical studies that have identified certain elements leading to improved abrasive articles. One non-limiting example of a property of the abrasive articles (green or finally-formed) that may be improved includes batch density variation. According to one embodiment, the process may facilitate formation of a batch of abrasive articles having a batch density variation of not greater than 20% of an average density value of the batch or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. The batch density variation can be measured using the techniques described herein.

The method for forming a batch of abrasive articles as described in the embodiments herein may also be suitable for minimizing a batch volumetric form factor. Some data indicates that the batch volumetric form factor of the abrasive articles may be impacted by the position and/or orientation of the abrasive articles relative to each other and/or the position and/orientation of the abrasive articles relative to the walls of the build box. According to one embodiment, the embodiments herein may faciltiate formation of a batch of abrasive articles having a batch volumetric form factor (batch Vff) of not greater than 0.30, such as not greater than 0.25, or not greater than 0.20, or not greater than 0.18, or not greater than 0.16, or not greater than 0.14, or not greater than 0.12, or not greater than 0.10, or not greater than 0.09, or not greater than 0.08, or not greater than 0.07, or not greater than 0.06, or not greater than 0.05, or not greater than 0.04, or not greater than 0.03, or not greater than 0.02, or not greater than 0.01, or not greater than 0.009, or not greater than 0.008, or not greater than 0.007, or not greater than 0.006, or not greater than 0.005. Still, in another non-limiting embodiment, the batch Vff can be at least 0.00001, or at least 0.0001, or at least 0.0005, or at least 0.001, or at least 0.01, or at least 0.1, or at least 0.2, or at least 0.4, or at least 0.6. It will be appreciated that the batch Vff can be within a range including any of the minimum and maximum values noted above, including for example, but not limited to within a range of at least 0.00001, and not greater than 0.3, such as within a range of at least 0.00001 and not greater than 0.2, or within a range of at least 0.00001 and not greater than 0.05, or even within a range of at least 0.00001 and not greater than 0.01. The batch Vff can be measured as described herein.

In a particular embodiment, each abrasive article of a batch of abrasive articles may include an SDV, and the batch may include the highest SDV. For example, the abrasive article with the highest SDV may include an SDV of less than 0.0082 inches or less than 0.0080 inches or less than 0.0078 inches or less than 0.0076 inches or less than 0.0074 inches or less than 0.0072 inches or less than 0.0070 inches or less than 0.0068 inches or less than 0.0066 inches or less than 0.0064 inches or less than 0.0062 inches or less than 0.0060 inches or less than 0.0058 inches or less than 0.0056 inches or less than 0.0054 inches or less than 0.0052 inches. In another example, the batch may include the abrasive article with the highest SDV including an SDV of at least 0.001 inches or at least 0.0015 inches or at least 0.002 inches. Moreover, the batch may include the abrasive article with the highest SDV in a range including any of the minimum and maximum values noted herein.

SDV can be measured as follows. Samples are analyzed by a Zeiss M800130 tomograph in order to generate 3d models of each sample. The models of samples are averaged to create an average model for the batch. The models of each sample are compared to the average model and the surface deviation was measured in inches and surface deviation distributions were plotted. For each surface deviation distribution, the width of an interval including 90% of the area of the distribution was calculated and will be referred to herein as SDV (surface deviation value). SDV serves as a quantification of the consistency of the shape of the samples within a batch.

In a particular embodiment, each abrasive article of the batch may include an SDV, and the batch of abrasive articles may include a mean SDV of all abrasive articles in the batch. In an example, the mean SDV may be less than 0.0063 inches or less than 0.0062 inches or less than 0.0061 inches or less than 0.0060 inches or less than 0.0059 inches or less than 0.0058 inches or less than 0.0057 inches or less than 0.0056 inches or less than 0.0055 inches or less than 0.0054 inches or less than 0.0053 inches or less than 0.0052 inches or less than 0.0051 inches or less than 0.0050 inches or less than 0.0049 inches or less than 0.0048 inches or less than 0.0047 inches or less than 0.0046 inches or less than 0.0045 inches or less than 0.0043 inches or less than 0.0042 inches or less than 0.0041 inches. In another example, the mean SDV of all abrasive articles in the batch may be at least 0.001 inches or at least 0.002 inches or at least 0.003 inches or at least 0.004 inches. Moreover, the batch may include the median SDV of all the abrasive articles in the batch within a range including any of the minimum and maximum values noted herein.

In an embodiment, the batch of abrasive articles may include a batch Archimedes density variation of at least 0.0001 g/cc, such as at least 0.0001 g/cc. As used herein, batch Archimedes density variation is intended to refer to variation of Archimedes density across the entire batch. Additionally or alternatively, the batch of abrasive articles may have a batch Archimedes density variation of less than 0.034 g/cc or less than 0.032 g/cc or less than 0.030 g/cc or less than 0.028 g/cc. Moreover, the batch Archimedes density variation may be within a range including any of the minimum and maximum values noted herein.

In an embodiment, the batch of abrasive articles may include a batch porosity variation of at least 0.001 vol %, such as at least 0.002 vol % or at least 0.003 vol %. As used herein, batch porosity variation is intended to refer to variation of porosity across the entire batch of abrasive articles. Additionally or alternatively, the batch of abrasive articles may include a batch porosity variation of less than 1 vol % or less than 0.9 vol % or less than 0.8 vol % or less than 0.7 vol % or less than 0.6 vol % or less than 0.5 vol % or less than 0.4 vol % or less than 0.3 vol % or less than 0.2 vol % or less than 0.1 vol % or less than 0.05 vol %. Moreover, the batch porosity variation may be with in a range including any of the minimum and maximum values noted herein. Batch porosity variation can be measured by calculating the standard deviation in porosity of samples within a batch.

In an embodiment, the batch of abrasive articles may have a batch hardness variation of at least 1 HRL, such as at least 2 HRL or at least 3 HRL or at least 4 HRL or at least 5 HRL. As used herein, batch hardness variation is intended to refer to variation of average hardness of each abrasive article across the entire batch of abrasive articles. The average hardness can be determined by at least 3 measurements according to Rockwell hardness test L. Additionally or alternatively, the batch of abrasive articles may include a batch hardness variation of less than 20 HRL or less than 19 HRL or less than 18 HRL or less than 17 HRL or less than 16 HRL or less than 15 HRL or less than 14 HRL or less than 13 HRL. Moreover, the batch hardness variation may be within a range including any of the minimum and maximum values noted herein. Batch hardness variation is the standard deviation of hardness measurements taken across a batch of multiple samples.

In an embodiment, the batch of abrasive articles may include a batch Dimensional variation-L of less than 0.3 mm, such as less than 0.29 mm or less than 0.28 mm or less than 0.27 mm or less than 0.26 mm or less than 0.25 mm or less than 0.24 mm or less than 0.23 mm or less than 0.22 mm or less than 0.21 mm or less than 0.20 mm or less than 0.19 mm or less than 0.18 mm or less than 0.17 mm. As used herein, batch Dimensional variation-L is intended to refer to variation of length of each abrasive article across the entire batch of abrasive articles. Additionally or alternatively, the batch of abrasive articles may include a batch Dimensional variation-L of at least 0.01. Moreover, the batch Dimension variation-L may be within a range including any of the minimum and maximum values noted herein.

In an embodiment, the batch of abrasive articles may have a batch Dimensional variation-W of less than 0.3 mm, such as less than 0.29 mm or less than 0.28 mm or less than 0.27 mm or less than 0.26 mm or less than 0.25 mm or less than 0.24 mm or less than 0.23 mm or less than 0.22 mm or less than 0.21 mm or less than 0.20 mm or less than 0.19 mm or less than 0.18 mm or less than 0.17 mm. As used herein, batch Dimensional variation-W is intended to refer to variation of width of each abrasive article across the entire batch of abrasive articles.

Additionally or alternatively, the batch of abrasive articles may include a batch Dimensional variation-W of at least 0.001. Moreover, the batch Dimension variation-W may be within a range including any of the minimum and maximum values noted herein.

In an embodiment, the batch of abrasive articles may have a batch Dimensional variation-T of less than 0.9 mm or less than 0.85 mm or less than 0.80 mm or less than 0.75 mm or less than 0.70 mm or less than 0.65 mm or less than 0.60 mm or less than 0.55 mm or less than 0.50 mm or less than 0.45 mm or less than 0.40 mm or less than 0.35 mm or less than 0.30 mm or less than 0.25 mm or less than 0.20 mm or less than 0.15 mm or less than 0.10 mm or less than 0.05 mm. As used herein, batch Dimensional variation-T is intended to refer to variation of thickness of each abrasive article across the entire batch of abrasive articles. Additionally or alternatively, the batch of abrasive articles may have a batch Dimensional variation-T of at least 0.001 mm. Moreover, the batch Dimension variation-T may be within a range including any of the minimum and maximum values noted herein.

In an embodiment, the batch of abrasive articles has a batch Volume variation of at least 1 $mm^3$. As used herein, batch volume variation is intended to refer to variation of volume of each abrasive article across the entire batch of abrasive articles. Additionally or alternatively, the batch of abrasive articles may have a batch Volume variation of less than 400 $mm^3$ 350 $mm^3$ or less than 325 $mm^3$ or less than 300 $mm^3$ or less than 275 $mm^3$ or less than 250 $mm^3$ or less than 225 $mm^3$ or less than 200 $mm^3$ or less than 175 $mm^3$ or less than 150 $mm^3$ or less than 125 $mm^3$ or less than 100 $mm^3$ or less than 75 $mm^3$ or less than 60 $mm^3$. Moreover, the batch volume variation may be within a range including any of the minimum and maximum values noted herein.

In an embodiment, the batch of abrasive articles may include an average length of the abrasive articles in the batch, such as at least 10 mm or at least 20 mm or at least 30 mm or at least 40 mm or at least 50 mm or at least 60 mm or at least 70 mm or at least 80 mm or at least 90 mm or at least 100 mm or at least 110 mm or at least 120 mm or at least 130 mm. In another embodiment, the average length may be not greater than 500 mm or not greater than 400 mm or not greater than 300 mm or not greater than 200 mm or not greater than 150 mm. Moreover, the average length may be in a range including any of the minimum and maximum values noted herein.

In an embodiment, the batch of abrasive articles may include an average width of the abrasive articles in the batch, such as at least 1 mm or at least 2 mm or at least 3 mm or at least 4 mm or at least 6 mm or at least 8 mm or at least 10 mm or at least 15 mm or at least 20 mm or at least 30 mm. In another embodiment, the average width of not greater than 150 mm or not greater than 120 mm or not greater than 100 mm or not greater than 80 mm or not greater than 60 mm or not greater than 50 mm. Moreover, the average width may be in a range including any of the minimum and maximum values noted herein.

In an embodiment, the batch of abrasive articles may include an average thickness of the abrasive articles in the batch, such as at least 1 mm or at least 2 mm or at least 3 mm or at least 4 mm or at least 5 mm or at least 6 mm or at least 7 mm or at least 8 mm or at least 9 mm or at least 10 mm or at least 12 mm or at least 15 mm or at least 20 mm. In another embodiment, the average thickness may be not greater than 150 mm or not greater than 120 mm or not greater than 100 mm or not greater than 80 mm or not greater than 60 mm or not greater than 50 mm. Moreover, the average thickness may be in a range including any of the minimum and maximum values noted herein.

According to one embodiment, the process may include using at least 10% of the total volume of powder material in the build box to form a batch of abrasive articles while minimizing at least one of a batch density variation and/or a batch volumetric form factor of the batch of abrasive articles. In another embodiment, the method for forming the batch of abrasive articles may include using at least 15% of the total volume of the powder material in the build box to form the batch, such as at least 20% or at least 25% or at least 30% or at least 35% or at least 40% or at least 45% or at least 50% or at least 55% or at least 60% or at least 65% or at least 70% or at least 75% or at least 80% or at least 85%. Still, in one non-limiting embodiment, the method may include using not greater than 99% of the total volume of powder material in the build box to form a batch of abrasive articles, such as not greater than 95% or not greater than 90% or not greater than 85% or not greater than 80%. It will be appreciated that the volume of powder material used to form the batch of abrasive articles may be within a range including any of the minimum and maximum percentages noted above.

In one non-limiting embodiment, the method may include controlling the position and/or orientation of two or more abrasive articles of a batch relative to each other in the build box and more particularly with respect to a direction of translation of a compacting object. It will be appreciated that for any of the embodiments herein a compaction object can be configured to traverse one or more layers of powder material and apply a force sufficient to compact the one or more layers and reduce the thickness of the one or more layers. As used herein, a direction of translation of the compacting object is generally in a direction that is parallel to the length of the build box or in a direction that is parallel to a width of the build box.

According to one embodiment, the process can include forming one or more bodies each having a longitudinal axis that is substantially parallel to a direction of translation of a compaction object. Still, in an alternative embodiment, one or more bodies may each have a longitudinal axis that is substantially perpendicular to a direction of translation of a compaction object. Substantially perpendicular is used to mean the same thing as described in other embodiments herein.

In another non-limiting embodiment, the distribution of any one or more features of the abrasive articles can be evaluated. The shape of the distribution for such measured features, particularly dimensional features, may be evaluated via kurtosis.

The methods of the embodiments herein facilitate improved formation of abrasive articles. Notably, the empirical studies conducted by the Applicant facilitate methods that have a superior forming ratio (Add/Sub), which can define the ratio of the material added to form the body versus the material subtracted in any post-forming finishing techniques. The methods of the embodiments herein facilitate a forming ratio that is advantageous compared to conventional forming techniques and/or less sophisticated additive manufacturing techniques.

The improvement in forming ratio is also evident in the limited residual stress and/or subsurface damage on one or more exterior surfaces of the finally-formed abrasive articles. Given the enhancements in the forming process, much less effort, if any, is needed to finish the abrasive articles to suitable shapes and/or tolerances for their intended applications. Accordingly, the amount of residual stress and/or subsurface damage in the finally-formed abrasive articles is less as compared to conventional products or other less sophisticated additive manufacturing techniques.

The foregoing properties of the abrasive articles of the embodiments herein provide various methods to define the quality and size of the abrasive articles capable of being formed using the methods of the embodiments herein.

EMBODIMENTS

Embodiment 1. A method for forming an article comprising:
a) forming a layer of powder material comprising a precursor bond material and abrasive particles;
b) compacting at least a portion of the layer to form a compacted layer;
c) binding at least a portion of the compacted layer; and
d) repeating steps a)-c) to form a green body abrasive article with the exception that step a) may be repeated itself more than one time before conducting steps b) and c).

Embodiment 2. The method of Embodiment 1, further comprising treating the green body abrasive article to form a finally-formed abrasive article.

Embodiment 3. The method of Embodiment 1, wherein the precursor bond material comprises one of an organic material, an inorganic material, a metal, a metal alloy, a ceramic, an oxide, a carbide, a nitride, a boride, an amorphous material, a crystalline material, or any combination thereof.

Embodiment 4. The method of Embodiment 1, wherein the precursor bond material may be converted chemically or undergo a phase change during processing from a precursor bond material to a bond material of a finally-formed abrasive article.

Embodiment 5. The method of Embodiment 1, wherein the precursor bond material does not necessarily undergo any physical or chemical changes during processing and is present as a bond material in the finally-formed abrasive article.

Embodiment 6. The method of Embodiment 1, wherein the abrasive particles include abrasive particles or superabrasive particles having a Mohs hardness of at least 6 or at least 7 or at least 8 or at least 9.

Embodiment 7. The method of Embodiment 1, wherein the abrasive particles comprise at least one of an oxide, a carbide, a nitride, a boride, diamond, or any combination thereof.

Embodiment 8. The method of Embodiment 1, wherein the abrasive particles comprise an average particle size (D50) of at least 0.1 microns, or at least 0.5 microns, or at least 0.8 microns, or at least 1 micron, or at least 2 microns, or at least 3 microns, or wherein the abrasive particles comprise an average particle size (D50) of at least any integer value up to 500 microns.

Embodiment 9. The method of Embodiment 1, wherein the abrasive particles comprise an average particle size (D50) of not greater than 1000 microns, or not greater than 800 microns, or not greater than 600 microns, or not greater than 500 microns, or not greater than 400 microns, or not greater than 300 microns, or wherein the abrasive particles comprise an average particle size (D50) of not greater than any integer value to 5 microns.

Embodiment 10. The method of Embodiment 1, wherein the green body comprises at least 1 vol % abrasive particles for a total volume of the green body or at least 2 vol %, or at least 3 vol %, or at least 4 vol %, or at least 5 vol %, or at least 6 vol %, or at least 7 vol %, or at least 8 vol %, or at least 9 vol %, or at least 10 vol %, or at least 11 vol %, or at least 12 vol %, or at least 13 vol %, or at least 14 vol %, or at least 15 vol %, or at least 16 vol %, or at least 17 vol %, or at least 18 vol %, or at least 19 vol %, or at least 20 vol %, or at least 21 vol %, or at least 22 vol %, or at least 23 vol %, or at least 24 vol %, or at least 25 vol %, or at least 26 vol %, or at least 27 vol %, or at least 28 vol %, or at least 29 vol %, or at least 30 vol %, or at least 31 vol %, or at least 32 vol %, or at least 33 vol %, or at least 34 vol %, or at least 35 vol %, or at least 36 vol %, or at least 37 vol %, or at least 38 vol %, or at least 39 vol %, or at least 40 vol %, or at least 41 vol %, or at least 42 vol %, or at least 43 vol %, or at least 44 vol %, or at least 45 vol %, or at least 46 vol %, or at least 47 vol %, or at least 48 vol %, or at least 49 vol %, or at least 50 vol %, or at least 51 vol %, or at least 52 vol %, or at least 53 vol %, or at least 54 vol %, or at least 55 vol %, or at least 56 vol %, or at least 57 vol %, or at least 58 vol %, or at least 59 vol %, or at least 60 vol %, or at least 61 vol %, or at least 62 vol %, or at least 63 vol %, or at least 64 vol %, or at least 65 vol %, or at least 66 vol %, or at least 67 vol %, or at least 68 vol %, or at least 69 vol %, or at least 70 vol %, or at least 71 vol %, or at least 72 vol %, or at least 73 vol %, or at least 74 vol %, or at least 75 vol %, or at least 76 vol %, or at least 77 vol %, or at least 78 vol %, or at least 79 vol %, or at least 80 vol %.

Embodiment 11. The method of Embodiment 1, wherein the green body comprises not greater than 90 vol % abrasive particles for a total volume of the green body or not greater than 85 vol %, or not greater than 80 vol %, or not greater than 75 vol %, or not greater than 70 vol %, or not greater than 69 vol %, or not greater than 68 vol %, or not greater than 67 vol %, or not greater than 66 vol %, or not greater than 65 vol %, or not greater than 64 vol %, or not greater than 63 vol %, or not greater than 62 vol %, or not greater than 61 vol %, or not greater than 60 vol %, or not greater than 59 vol %, or not greater than 58 vol %, or not greater than 57 vol %, or not greater than 56 vol %, or not greater than 55 vol %, or not greater than 54 vol %, or not greater than 53 vol %, or not greater than 52 vol %, or not greater than 51 vol %, or not greater than 50 vol %, or not greater than 49 vol %, or not greater than 48 vol %, or not greater than 47 vol %, or not greater than 46 vol %, or not greater than 45 vol %, or not greater than 44 vol %, or not greater than 43 vol %, or not greater than 42 vol %, or not greater than 41 vol %, or not greater than 40 vol %, or not greater than 39 vol %, or not greater than 38 vol %, or not greater than 37 vol %, or not greater than 36 vol %, or not greater than 35 vol %, or not greater than 34 vol %, or not greater than 33 vol %, or not greater than 32 vol %, or not greater than 31 vol %, or not greater than 30 vol %, or not greater than 29 vol %, or not greater than 28 vol %, or not greater than 27 vol %, or not greater than 26 vol %, or not greater than 25 vol %, or not greater than 24 vol %, or not greater than 23 vol %, or not greater than 22 vol %, or not greater than 21 vol %, or not greater than 20 vol %, or not greater than 19 vol %, or not greater than 18 vol %, or not greater than 17 vol %, or not greater than 16 vol %, or not greater than 15 vol %, or not greater than 14 vol %, or not greater than 13 vol %, or not greater than 12 vol %, or not greater than 11 vol %, or not greater than 10 vol %, or not greater than 9 vol %, or not greater than 8 vol %, or not greater than 7 vol %, or not greater than 6 vol %, or not greater than 5 vol %.

Embodiment 12. The method of Embodiment 1, wherein the green body comprises at least 1 vol % precursor bond material for a total volume of the green body or at least 2 vol %, or at least 3 vol %, or at least 4 vol %, or at least 5 vol %, or at least 6 vol %, or at least 7 vol %, or at least 8 vol %, or at least 9 vol %, or at least 10 vol %, or at least 11 vol %, or at least 12 vol %, or at least 13 vol %, or at least 14 vol %, or at least 15 vol %, or at least 16 vol %, or at least 17 vol %, or at least 18 vol %, or at least 19 vol %, or at least 20 vol %, or at least 21 vol %, or at least 22 vol %, or at least 23 vol %, or at least 24 vol %, or at least 25 vol %, or at least 26 vol %, or at least 27 vol %, or at least 28 vol %, or at least 29 vol %, or at least 30 vol %, or at least 31 vol %, or at least 32 vol %, or at least 33 vol %, or at least 34 vol %, or at least 35 vol %, or at least 36 vol %, or at least 37 vol %, or at least 38 vol %, or at least 39 vol %, or at least 40 vol %, or at least 41 vol %, or at least 42 vol %, or at least 43 vol %, or at least 44 vol %, or at least 45 vol %, or at least 46 vol %, or at least 47 vol %, or at least 48 vol %, or at least 49 vol %, or at least 50 vol %, or at least 51 vol %, or at least 52 vol %, or at least 53 vol %, or at least 54 vol %, or at least 55 vol %, or at least 56 vol %, or at least 57 vol %, or at least 58 vol %, or at least 59 vol %, or at least 60 vol %, or at least 61 vol %, or at least 62 vol %, or at least 63 vol %, or at least 64 vol %, or at least 65 vol %, or at least 66 vol %, or at least 67 vol %, or at least 68 vol %, or at least 69 vol %, or at least 70 vol %, or at least 71 vol %, or at least 72 vol %, or at least 73 vol %, or at least 74 vol %, or at least 75 vol %, or at least 76 vol %, or at least 77 vol %, or at least 78 vol %, or at least 79 vol %, or at least 80 vol %.

Embodiment 13. The method of Embodiment 1, wherein the green body comprises not greater than 90 vol % precursor bond material for a total volume of the green body or not greater than 85 vol %, or not greater than 80 vol %, or not greater than 75 vol %, or not greater than 70 vol %, or not greater than 69 vol %, or not greater than 68 vol %, or not greater than 67 vol %, or not greater than 66 vol %, or not greater than 65 vol %, or not greater than 64 vol %, or not greater than 63 vol %, or not greater than 62 vol %, or not greater than 61 vol %, or not greater than 60 vol %, or not greater than 59 vol %, or not greater than 58 vol %, or not greater than 57 vol %, or not greater than 56 vol %, or not greater than 55 vol %, or not greater than 54 vol %, or not greater than 53 vol %, or not greater than 52 vol %, or not greater than 51 vol %, or not greater than 50 vol %, or not greater than 49 vol %, or not greater than 48 vol %, or not greater than 47 vol %, or not greater than 46 vol %, or not greater than 45 vol %, or not greater than 44 vol %, or not greater than 43 vol %, or not greater than 42 vol %, or not greater than 41 vol %, or not greater than 40 vol %, or not greater than 39 vol %, or not greater than 38 vol %, or not greater than 37 vol %, or not greater than 36 vol %, or not greater than 35 vol %, or not greater than 34 vol %, or not greater than 33 vol %, or not greater than 32 vol %, or not greater than 31 vol %, or not greater than 30 vol %, or not greater than 29 vol %, or not greater than 28 vol %, or not greater than 27 vol %, or not greater than 26 vol %, or not greater than 25 vol %, or not greater than 24 vol %, or not greater than 23 vol %, or not greater than 22 vol %, or not greater than 21 vol %, or not greater than 20 vol %, or not greater than 19 vol %, or not greater than 18 vol %, or not greater than 17 vol %, or not greater than 16 vol %, or not greater than 15 vol %, or not greater than 14 vol %, or not greater than 13 vol %, or not greater than 12 vol %, or not greater than 11 vol %, or not greater than 10 vol %, or not greater than 9 vol %, or not greater than 8 vol %, or not greater than 7 vol %, or not greater than 6 vol %, or not greater than 5 vol %.

Embodiment 14. The method of Embodiment 1, further comprising smoothing an upper surface of the layer with a smoothing roller that is configured to contact the upper surface of the layer sufficiently to spread the powder material and smooth the upper surface after forming the layer.

Embodiment 15. The method of Embodiment 1, wherein forming the layer comprises depositing the powder material from a container via agitation of the powder material in the container, which then flows through a screen in the container, and wherein the powder material drops from the container via gravity into a build box or a previously deposited layer of powder material.

Embodiment 16. The method of Embodiment 1, wherein the method of agitation and the screen size are selected based upon the particle size distribution of the powder.

Embodiment 17. The method of Embodiment 1, wherein the powder is a mixture of discrete particles of precursor bond material and discrete abrasive particles.

Embodiment 18. The method of Embodiment 1, wherein the powder is an agglomerated mixture comprising granules containing a mixture of at least precursor bond material, the abrasive particles, and one or more optional additives such as a binder, fillers, and the like.

Embodiment 19. The method of Embodiment 1, wherein compacting is conducted by applying a compacting object, which may be in the form of a roller, that traverses the layer and applies a force sufficient to compact the layer to a compacted layer thickness that is less than the thickness of the layer prior to compaction.

Embodiment 20. The method of Embodiment 19, wherein the compaction object is different from a smoothing roller configured to smooth the surface of the layer.

Embodiment 21. The method of Embodiment 1, further comprising controlling at least one of:
  a force applied by a compaction object to the layer or a plurality of layers of powder;
  a traverse speed of a compaction object;
  average thickness of the layer prior to compaction;
  a particle size distribution of the powder;
  number of previously formed layers underlying the layer of powder;
  the number of compacted layers underlying the layer of powder;
  the density of any layers underlying the layer of powder;
  the amount of binder in any layers underlying the layer of powder;
  the relative dimensions of the layer relative to one or more layers underlying the layer; and
  any combination of a)-i).

Embodiment 22. The method of Embodiment 19, further comprising controlling the compaction thickness relative to at least one of:
  an average thickness of the layer prior to compaction;
  a particle size distribution of the powder in the layer;
  a printhead deposition resolution;
  any combination of a)-c).

Embodiment 23. The method of Embodiment 21, wherein controlling includes taking into consideration one or more of the elements a)-i) to control the quality of the green body abrasive article and a finally-formed abrasive article formed by treating the green body.

Embodiment 24. The method of Embodiment 1, wherein the method includes binder jetting.

Embodiment 25. The method of Embodiment 1, wherein compaction can be conducted on one layer or a plurality of layers.

Embodiment 26. The method of Embodiment 1, wherein forming includes forming a layer having an average thickness of not greater than 500 microns, or not greater than 400 microns, or not greater than 300 microns, or not greater than 200 microns, or not greater than 100 microns, or not greater than 90 microns, or not greater than 80 microns, or not greater than 70 microns, or not greater than 60 microns, or not greater than 50 microns, or not greater than 40 microns, or not greater than 30 microns, or not greater than 20 microns.

Embodiment 27. The method of Embodiment 1, wherein forming includes forming a layer having an average thickness of at least 1 micron, or at least 5 microns, or at least 10 microns, or at least 15 microns, or at least 20 microns, or at least 25 microns.

Embodiment 28. The method of Embodiment 1, wherein compacting includes compacting the layer to an average compacted layer thickness of not greater than 400 microns, or not greater than 300 microns, or not greater than 200 microns, or not greater than 100 microns, or not greater than 90 microns, or not greater than 80 microns, or not greater than 70 microns, or not greater than 60 microns, or not greater than 50 microns, or not greater than 40 microns, or not greater than 30 microns, or not greater than 20 microns, or not greater than 15 microns, or not greater than 10 microns, or not greater than 8 microns, or not greater than 5 microns, or not greater than 3 microns, or not greater than 1 micron, or not greater than 0.8 microns.

Embodiment 29. The method of Embodiment 1, wherein compacting includes compacting the layer to an average compacted layer thickness of at least 0.1 microns, or at least 0.5 microns, or at least 0.8 microns, or at least 1 micron or at least 2 microns, or at least 3 microns, or at least 4 microns, or at least 5 microns, or at least 6 microns, or at least 7 microns, or at least 8 microns, or at least 9 microns, or at least 10 microns, or at least 11 microns, or at least 12 microns, or at least 13 microns, or at least 14 microns, or at least 15 microns, or at least 16 microns, or at least 17 microns, or at least 18 microns, or at least 19 microns, or at least 20 microns, or at least 21 microns, or at least 22 microns, or at least 23 microns, or at least 24 microns, or at least 25 microns, or at least 26 microns, or at least 27 microns, or at least 28 microns, or at least 29 microns, or at least 30 microns, or at least 31 microns, or at least 32 microns, or at least 33 microns, or at least 34 microns, or at least 35 microns, or at least 36 microns, or at least 37 microns, or at least 38 microns, or at least 39 microns, or at least 40 microns, or at least 41 microns, or at least 42 microns, or at least 43 microns, or at least 44 microns, or at least 45 microns, or at least 46 microns, or at least 47 microns, or at least 48 microns, or at least 49 microns, or at least 50 microns, or at least 51 microns, or at least 52 microns, or at least 53 microns, or at least 54 microns, or at least 55 microns, or at least 56 microns, or at least 57 microns, or at least 58 microns, or at least 59 microns, or at least 60 microns, or at least 65 microns, or at least 70 microns, or at least 75 microns, or at least 80 microns, or at least 85 microns, or at least 90 microns, or at least 95 microns, or at least 100 microns, or at least 110 microns, or at least 120 microns, or at least 130 microns, or at least 140 microns, or at least 150 microns, or at least 160 microns, or at least 170 microns, or at least 180 microns, or at least 190 microns, or at least 200 microns, or at least 210 microns, or at least 220 microns, or at least 230 microns, or at least 240 microns, or at least 250 microns.

Embodiment 30. The method of Embodiment 1, wherein compacting includes increasing the density of the compacted layer by at least 2% as compared to the layer prior to compacting or at least 3%, or at least 4%, or at least 5%, or at least 6%, or at least 7%, or at least 8%, or at least 9%, or at least 10%, or at least 11%, or at least 12%, or at least 13%, or at least 14%, or at least 15%, or at least 18%, or at least 20%, or at least 22%, or at least 25%, or at least 28%, or at least 30%, or at least 32%, or at least 35%, or at least 38%, or at least 40%, or at least 42%, or at least 45%, or at least 48%, or at least 50%, or at least 52%, or at least 55%, or at least 58%, or at least 60%, or at least 62%, or at least 65%, or at least 67%, or at least 68%, or at least 70%, or at least 72%, or at least 75%, or at least 78%, or at least 80%, or at least 82%, or at least 85%, or at least 88%, or at least 90%, or at least 92%, or at least 95%, or at least 98%, or at least 100%, or at least 102%, or at least 105%, or at least 108%, or at least 110%, or at least 115%, or at least 120%, or at least 125%, or at least 130%, or at least 140%, or wherein compacting includes increasing the density of the compacted layer by at least 150% as compared to the layer prior to compacting.

Embodiment 31. The method of Embodiment 1, wherein compacting include compacting the layer of powder material by at least 1% to not greater than 95% of the original layer thickness of the layer, such as compaction of at least 2% of the original layer thickness of the layer prior to compaction or at least 3%, or at least 4%, or at least 5%, or at least 6%, or at least 7%, or at least 8%, or at least 9%, or at least 10%, or at least 11%, or at least 12%, or at least 13%, or at least 14%, or at least 15%, or at least 16%, or at least 17%, or at least 18%, or at least 19%, or at least 20%, or at least 21%, or at least 22%, or at least 23%, or at least 24%, or at least 25%, or at least 26%, or at least 27%, or at least 28%, or at least 29%, or at least 30%, or at least 31%, or at least 32%, or at least 33%, or at least 34%, or at least 35%, or at least 36%, or at least 37%, or at least 38%, or at least 39%, or at least 40%, or at least 41%, or at least 42%, or at least 43%, or at least 44%, or at least 45%, or at least 46%, or at least 47%, or at least 48%, or at least 49%, or at least 50%, or at least 51%, or at least 52%, or at least 53%, or at least 54%, or at least 55%, or at least 56%, or at least 57%, or at least 58%, or at least 59%, or at least 60%, or at least 61%, or at least 62%, or at least 63%, or at least 64%, or at least 65%, or at least 66%, or at least 67%, or at least 68%, or at least 69%, or at least 70%, or at least 71%, or at least 72%, or at least 73%, or at least 74%, or at least 75%, or at least 76%, or at least 77%, or at least 78%, or at least 79%, or at least 80%, or at least 81%, or at least 82%, or at least 83%, or at least 84%, or at least 85%, or at least 86%, or at least 87%, or at least 88%, or at least 89%, or at least 90%, or at least 91%, or at least 92%, or at least 93%, or at least 94%.

Embodiment 32. The method of Embodiment 31, wherein compacting include compacting the layer of powder material by at least 1% to not greater than 95% of the original layer thickness of the layer, such as compaction of not greater than 94% of the original layer thickness of the layer prior to compaction or not greater than 93%, or not greater than 92%, or not greater than 91%, or not greater than 90%, or not greater than 89%, or not greater than 88%, or not greater than 87%, or not greater than 86%, or not greater than 85%, or not greater than 84%, or not greater than 83%, or not greater than 82%, or not greater than 81%, or not greater than 80%, or not greater than 79%, or not greater than 78%, or not greater than 77%, or not greater than 76%, or not greater than 75%, or not greater than 74%, or not greater than 73%, or not greater than 72%, or not greater than 71%, or not greater than 70%, or not greater than 69%, or not greater than 68%, or not greater than 67%, or not greater than 66%, or not greater than 65%, or not greater than 64%, or not greater than 63%, or not greater than 62%, or not greater than 61%, or not greater than 60%, or not greater than 59%, or not greater than 58%, or not greater than 57%, or not greater than 56%, or not greater than 55%, or not greater than 54%, or not greater than 53%, or not greater than 52%, or not greater than 51%, or not greater than 50%, or not greater than 49%, or not greater than 48%, or not greater than 47%, or not greater than 46%, or not greater than 45%, or not greater than 44%, or not greater than 43%, or not greater than 42%, or not greater than 41%, or not greater than 40%, or not greater than 39%, or not greater than 38%, or not greater than 37%, or not greater than 36%, or not greater than 35%, or not greater than 34%, or not greater than 33%, or not greater than 32%, or not greater than 31%, or not greater than 30%, or not greater than 29%, or not greater than 28%, or not greater than 27%, or not greater than 26%, or not greater than 25%, or not greater than 24%, or not greater than 23%, or not greater than 22%, or not greater than 21%, or not greater than 20%, or not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%.

Embodiment 33. The method of Embodiment 32, wherein the percentage of compaction is within a range including any of the minimum and maximum values noted in Embodiments 31 and 32.

Embodiment 34. The method of Embodiment 1, further including any other aspects of methods embodied or disclosed herein.

Embodiment 35. The method of Embodiment 1, wherein the green body and/or finally-formed abrasive article includes any one or more features of the green body and/or finally-formed abrasive article embodied or disclosed herein.

Embodiment 36. A method for forming an article comprising:
  forming a layer of powder material comprising a precursor bond material and abrasive particles;
  binding at least a portion of the compacted layer with a printhead having a dispensing resolution of not greater than 55 picoliters; and
  repeating steps a) and b) to form a green body abrasive article.

Embodiment 37. The method of Embodiment 36, wherein the dispensing resolution of the printhead is not greater than 50 picoliters, or not greater than 45 picoliters, or not greater than 40 picoliters, or not greater than 35 picoliters, or not greater than 30 picoliters, or not greater than 25 picoliters, or not greater than 20 picoliters, or not greater than 15 picoliters, or not greater than 10 picoliters, or not greater than 5 picoliters, or not greater than 1 picoliter, or not greater than 0.5 picoliters, or not greater than 0.1 picoliters.

Embodiment 38. The method of Embodiment 36, wherein the dispensing resolution of the printhead is at least 0.0001 picoliters, or at least 0.001 picoliters, or at least 0.01 picoliters, or at least 0.1 picoliters, or at least 0.5 picoliters, or at least 1 picoliter.

Embodiment 39. The method of Embodiment 36, further including any other features of methods embodied or disclosed herein.

Embodiment 40. The method of Embodiment 36, wherein the green body and/or a finally-formed abrasive article formed from the green body includes any one or more features of the green body and/or finally-formed abrasive article embodied or disclosed herein.

Embodiment 41. A method for forming an article comprising:
 providing a build box configured to hold powder material during an additive manufacturing process, wherein the build box has at least one of:
  i. a length of at least 150 mm;
  ii. a width of at least 60 mm;
  iii. a depth of at least 60 mm; and
  iv. a combination of any of i., ii., and iii;
 b) forming a layer of powder material comprising a precursor bond material and abrasive particles;
 c) binding at least a portion of the layer; and
  i. d) repeating steps a) and b) to form a green body abrasive article.

Embodiment 42. The method of Embodiment 41, wherein the length of the build box is at least 160 mm, or 170 mm, or at least 180 mm, or at least 190 mm, or at least 200 mm, or at least 210 mm, or at least 220 mm, or at least 230 mm, or at least 240 mm, or at least 250 mm, or at least 260 mm, or at least 270 mm, or at least 280 mm, or at least 290 mm, or at least 300 mm, or at least 310 mm, or at least 320 mm, or at least 330 mm, or at least 340 mm, or at least 350 mm, or at least 360 mm, or at least 370 mm, or at least 380 mm, or at least 390 mm, or at least 400 mm.

Embodiment 43. The method of Embodiment 41, wherein the length of the build box is not greater than 3000 mm, or not greater than 2000 mm, or not greater than 1000 mm.

Embodiment 44. The method of Embodiment 41, wherein the width of the build box is at least 65 mm, or at least 70 mm, or at least 80 mm, or at least 90 mm, or at least 100 mm, or at least 110 mm, or at least 120 mm, or at least 130 mm, or at least 140 mm, or at least 150 mm, or at least 160 mm, or at least 170 mm, or at least 180 mm, or at least 190 mm, or at least 200 mm, or at least 210 mm, or at least 220 mm, or at least 230 mm, or at least 240 mm, or at least 250 mm.

Embodiment 45. The method of Embodiment 41, wherein the width of the build box is not greater than 2000 mm, or not greater than 1500 mm, or not greater than 1000 mm.

Embodiment 46. The method of Embodiment 41, wherein the depth of the build box is at least 65 mm, or at least 70 mm, or at least 80 mm, or at least 90 mm, or at least 100 mm, or at least 110 mm, or at least 120 mm, or at least 130 mm, or at least 140 mm, or at least 150 mm, or at least 160 mm, or at least 170 mm, or at least 180 mm, or at least 190 mm, or at least 200 mm, or at least 210 mm, or at least 220 mm, or at least 230 mm, or at least 240 mm, or at least 250 mm.

Embodiment 47. The method of Embodiment 41, wherein the depth of the build box is not greater than 2000 mm, or not greater than 1500 mm, or not greater than 1000 mm.

Embodiment 48. The method of Embodiment 41, wherein the green body has a volume that is at least 1% of the volume of the build box or at least 2%, or at least 3%, or at least 4%, or at least 5%, or at least 6%, or at least 7%, or at least 8%, or at least 9%, or at least 10%, or at least 11%, or at least 12%, or at least 13%, or at least 14%, or at least 15%, or at least 18%, or at least 20%, or at least 22%, or at least 25%, or at least 28%, or at least 30%, or at least 32%, or at least 35%, or at least 38%, or at least 40%, or at least 42%, or at least 45%, or at least 48%, or at least 50%, or at least 52%, or at least 55%, or at least 58%, or at least 60%, or at least 62%, or at least 65%, or at least 67%, or at least 68%, or at at least 70%, or at least 72%, or at least 75%, or at least 78%, or at least 80%, or at least 82%, or at least 85%, or at least 88%, or at least 90%, or at least 92%, or at least 95%, or at least 98% of the volume of the build box.

Embodiment 49. The method of Embodiment 41, wherein the green body has a volume that is at least 1% and not greater than 60% of the volume of the build box.

Embodiment 50. The method of Embodiment 41, further comprising forming a plurality of discrete green body abrasive articles in a single forming process of steps a)-c), wherein the plurality of discrete green body abrasive articles define a batch having a total volume of solid material that is at least 1% of the volume of the build box or at least 2%, or at least 3%, or at least 4%, or at least 5%, or at least 6%, or at least 7%, or at least 8%, or at least 9%, or at least 10%, or at least 11%, or at least 12%, or at least 13%, or at least 14%, or at least 15%, or at least 18%, or at least 20%, or at least 22%, or at least 25%, or at least 28%, or at least 30%, or at least 32%, or at least 35%, or at least 38%, or at least 40%, or at least 42%, or at least 45%, or at least 48%, or at least 50%, or at least 52%, or at least 55%, or at least 58%, or at least 60%, or at least 62%, or at least 65%, or at least 67%, or at least 68%, or at least 70%, or at least 72%, or at least 75%, or at least 78%, or at least 80%, or at least 82%, or at least 85%, or at least 88%, or at least 90%, or at least 92%, or at least 95%, or at least 98% of the volume of the build box.

Embodiment 51. The method of Embodiment 50, wherein the batch has a volume of at least 1% and not greater than 98% of the volume of the build box.

Embodiment 52. The method of Embodiment 41, further including any other features of methods embodied or disclosed herein.

Embodiment 53. The method of Embodiment 41, wherein the green body and/or a finally-formed abrasive article formed from the green body includes any one or more features of the green body and/or finally-formed abrasive article embodied or disclosed herein.

Embodiment 54. A method for forming an article comprising:
 a) forming a layer of powder material comprising a precursor bond material and abrasive particles;
 b) binding at least a portion of the layer; and
 c) repeating steps a) and b) to form a green body abrasive article having at least one of:
  i. a length of at least 6 cm;
  ii. a width of at least 2.8 cm;
  iii. a solid volume of at least 9 $cm^3$; and
  iv. a combination of any one of i., ii., and iii.

Embodiment 55. The method of Embodiment 54, wherein the green body comprises a thickness of at least 1 mm and not greater than 50 cm.

Embodiment 56. The method of Embodiment 54, wherein the green body comprises a thickness of not greater than 0.9 mm and at least 0.1 microns.

Embodiment 57. The method of Embodiment 54, wherein the length of the green body is at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm, or at least 18 cm, or at least 20 cm.

Embodiment 58. The method of Embodiment 54, wherein the length of the green body is not greater than 100 cm, or not greater than 90 cm, or not greater than 80 cm, or not greater than 70 cm, or not greater than 60 cm, or not greater than 50 cm, or not greater than 40 cm, or not greater than 30 cm, or not greater than 25 cm.

Embodiment 59. The method of Embodiment 54, wherein the width is at least 3 cm, or at least 3.5 cm, or at least 4 cm, or at least 4.5 cm, or at least 5 cm, or at least 5.5 cm, or at least 6 cm, or at least 6.5 cm, or at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm.

Embodiment 60. The method of Embodiment 54, wherein the width of the green body is not greater than 500 cm, or not greater than 450 cm, or not greater than 400 cm, or not greater than 350 cm, or not greater than 300 cm, or not greater than 250 cm, or not greater than 200 cm, or not greater than 150 cm, or not greater than 100 cm.

Embodiment 61. The method of Embodiment 54, wherein the green body has a primary aspect ratio (length:width) of at least 1:1, or at least 1.1:1, or at least 1.2:1, or at least 1.3:1, or at least 1.4:1, or at least 1.5:1, or at least 1.8:1, or at least 2:1, or at least 3:1, or at least 4:1, or at least 5:1, or at least 6:1, or at least 7:1, or at least 8:1, or at least 9:1, or at least 10:1.

Embodiment 62. The method of Embodiment 54, wherein the green body has a primary aspect ratio (length:width) of not greater than 10000:1, or not greater than 5000:1, or not greater than 1000:1, or not greater than 500:1, or not greater than 200:1, or not greater than 100:1, or not greater than 50:1.

Embodiment 63. The method of Embodiment 54, wherein the green body has a secondary aspect ratio (length:thickness) that is the same as any of the ratios for primary aspect ratio provided in any one of Embodiments 61 and 62.

Embodiment 64. The method of Embodiment 54, wherein the green body has a tertiary aspect ratio (width:thickness) that is the same as any of the ratios for primary aspect ratio provided in any one of Embodiments 61 and 62.

Embodiment 65. The method of Embodiment 54, wherein the volume is at least 10 $cm^3$, or at least 11 $cm^3$, or at least 12 $cm^3$, or at least 13 $cm^3$, or at least 14 $cm^3$, or at least 15 $cm^3$, or at least 16 $cm^3$, or at least 17 $cm^3$, or at least 18 $cm^3$, or at least 19 $cm^3$, or at least 20 $cm^3$, or at least 21 $cm^3$, or at least $cm^3$, or at least 23 $cm^3$, or at least 24 $cm^3$, or at least 25 $cm^3$, or at least 26 $cm^3$, or at least 27 $cm^3$, or at least 28 $cm^3$, or at least 29 $cm^3$, or at least 30 $cm^3$, or at least 31 $cm^3$, or at least 32 $cm^3$, or at least 33 $cm^3$, or at least 34 $cm^3$, or at least 35 $cm^3$, or at least 36 $cm^3$, or at least 37 $cm^3$, or at least 38 $cm^3$, or at least 39 $cm^3$, or at least 40 $cm^3$, or at least 42 $cm^3$, or at least 44 $cm^3$, or at least 46 $cm^3$, or at least 48 $cm^3$, or at least 50 $cm^3$.

Embodiment 66. The method of Embodiment 54, wherein the volume is not greater than 5000 $cm^3$, or not greater than 4000 $cm^3$, or not greater than 3000 $cm^3$, or not greater than 2000 $cm^3$, or not greater than 1000 $cm^3$, or not greater than 800 $cm^3$, or not greater than 600 $cm^3$, or not greater than 500 $cm^3$.

Embodiment 67. The method of Embodiment 54, wherein the green body comprises a length, a width, and a thickness, and wherein length>width>thickness.

Embodiment 68. The method of Embodiment 54, further comprising treating the green body abrasive article to form a finally-formed abrasive article.

Embodiment 69. The method of Embodiment 68, wherein the finally-formed abrasive article has any of the features of the green body abrasive article as provided in any one of Embodiments 54-67.

Embodiment 70. The method of Embodiment 54, wherein further including any other features of methods embodied or disclosed herein.

Embodiment 71. The method of Embodiment 54, wherein the green body and/or a finally-formed abrasive article formed from the green body includes any one or more features of the green body and/or finally-formed abrasive article embodied or disclosed herein.

Embodiment 72. A method for forming an article comprising:
 a) forming a layer of powder material comprising recycled powder material, wherein the recycled powder material includes precursor bond material, abrasive particles, and an organic material;
 b) binding at least a portion of the layer with a binder material; and
 c) repeating steps a) and b) to form a green body abrasive article.

Embodiment 73. The method of Embodiment 72, wherein the organic material of the recycled powder material is cured binder material used in a prior binding operation but not part of a green body abrasive article.

Embodiment 74. The method of Embodiment 72, wherein binding includes converting the binder from a liquid to a solid or semi-solid state to bind particles of the powder material.

Embodiment 75. The method of Embodiment 72, wherein binding includes at least one of evaporation, thermal curing, chemical curing, radiation curing, or any combination thereof.

Embodiment 76. The method of Embodiment 72, wherein the binder material includes a liquid vehicle and a polymer material contained therein, wherein the polymer material can be dissolved in the liquid vehicle.

Embodiment 77. The method of Embodiment 76, wherein the liquid vehicle includes one or more organic solvents and/or water.

Embodiment 78. The method of Embodiment 77, wherein the organic solvents include at least one of alcohols (e.g., butanol, ethylene glycol monomethyl ether), ketones, ethers, or any combination thereof.

Embodiment 79. The method of Embodiment 77, wherein the organic solvents have a flash point above 100° C.

Embodiment 80. The method of Embodiment 77, wherein the one or more organic solvents are configured to control drying speed of the liquid vehicle, to control surface tension of the liquid vehicle, to allow dissolution of an ingredient (e.g., of a surfactant).

Embodiment 81. The method of Embodiment 77, wherein the one or more organic solvents include alcohols such as methyl alcohol, ethyl alcohol, n-propyl alcohol, isopropyl alcohol, n-butyl alcohol, sec-butyl alcohol, t-butyl alcohol, and isobutyl alcohol; ketones or ketoalcohols such as acetone, methyl ethyl ketone, and diacetone alcohol; esters such as ethyl acetate and ethyl lactate; polyhydric alcohols such as ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, trimethylolpropane ethoxylate; lower alkyl ethers such as ethylene glycol methyl or ethyl ether, diethylene glycol ethyl ether, triethylene glycol methyl or ethyl ether, ethylene glycol n-butyl ether, diethylene glycol n-butyl ether, diethylene glycol methyl ether, ethylene glycol phenyl ether, propylene glycol methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, tripropylene glycol n-propyl ether, propylene glycol n-butyl ether, dipropylene glycol n-butyl ether, tripropylene glycol n-butyl ether, propylene glycol phenyl ether, and dipropylene glycol dimethyl ether; nitrogen-containing compounds such as 2-pyrrolidinone and N-methyl-2-pyrrolidinone; sulfur-containing compounds such as dimethyl sulfoxide, tetramethylene sulfone, and thioglycol; and combinations of any of the foregoing.

Embodiment 82. The method of Embodiment 72, wherein the binder material includes a polymer including at least one of polyvinyl pyrrolidones, polyvinyl caprolactams, polyvinyl alcohols, polyacrylamides, poly(2-ethyl-2-oxazoline) (PEOX), polyvinyl butyrate, copolymers of methyl vinyl ether, and maleic anhydride, certain copolymers of acrylic acid and/or hydroxyethyl acrylate, methyl cellulose, natural polymers (e.g., dextrin, guar gum, xanthan gum).

Embodiment 83. The method of Embodiment 72, wherein the binder material may further include one or more free-radically polymerizable or otherwise radiation-curable materials, including at least one of acrylic monomers and/or oligomers and/or epoxy resins, a photoinitiator, and/or photocatalysts for curing the free-radically polymerizable or otherwise radiation-curable materials may also be included.

Embodiment 84. The method of Embodiment 72, wherein the organic material in the recycled powder material includes one or more materials from the binder material provided in any one of Embodiments 77-83.

Embodiment 85. The method of Embodiment 72, wherein the recycled powder includes at least 0.1 wt % organic material for a total weight of the recycled powder or at least 0.5 wt %, or at least 1 wt %, or at least 2 wt %, or at least 3 wt %, or at least 4 wt %, or at least 5 wt %, or at least 6 wt %, or at least 7 wt %, or at least 8 wt %, or at least 9 wt %, or at least 10 wt %.

Embodiment 86. The method of Embodiment 72, wherein the recycled powder includes not greater than 30 wt % organic material for a total weight of the recycled powder or not greater than 25 wt %, or not greater than 20 wt %, or not greater than 15 wt %, or not greater than 10 wt %, or not greater than 8 wt %, or not greater than 6 wt %, or not greater than 5 wt %.

Embodiment 87. The method of Embodiment 72, wherein the recycled powder is captured as loose powder after.

Embodiment 88. The method of Embodiment 72, further including any other features of methods embodied or disclosed herein.

Embodiment 89. The method of Embodiment 72, wherein the green body and/or a finally-formed abrasive article formed from the green body includes any one or more features of the green body and/or finally-formed abrasive article embodied or disclosed herein.

Embodiment 90. A method for forming an article comprising:
  a) forming a layer of powder material comprising a precursor bond material and abrasive particles;
  b) binding at least a portion of the layer with a binder material; and
  c) repeating steps a) and b) to form a green body abrasive article;
  d) removing and capturing loose powder from the green body abrasive article, wherein the loose powder includes at least 0.1 wt % organic material from the binder material for a total weight of the loose powder;
  e) using at least a portion of the loose powder in a subsequent operation as recycled powder to conduct steps a)-c) and forming a second green body abrasive article distinct from the green body abrasive article.

Embodiment 91. The method of Embodiment 90, wherein the loose powder includes at least 0.1 wt % organic material for a total weight of the loose powder or at least 0.5 wt %, or at least 1 wt %, or at least 2 wt %, or at least 3 wt %, or at least 4 wt %, or at least 5 wt %, or at least 6 wt %, or at least 7 wt %, or at least 8 wt %, or at least 9 wt %, or at least 10 wt %.

Embodiment 92. The method of Embodiment 90, wherein the loose powder includes not greater than 30 wt % organic material for a total weight of the loose powder or not greater than 25 wt %, or not greater than 20 wt %, or not greater than 15 wt %, or not greater than 10 wt %, or not greater than 8 wt %, or not greater than 6 wt %, or not greater than 5 wt %.

Embodiment 93. The method of Embodiment 90, further comprising treating the loose powder to form recycled powder, wherein treating includes thermally treating, chemically treating, mechanically treating, or irradiating the loose powder to change the content of organic material in the loose powder.

Embodiment 94. The method of Embodiment 93, wherein treating includes dissolving and/or washing the organic material from the loose powder.

Embodiment 95. The method of Embodiment 94, wherein treating includes washing the loose powder with an organic material, such as alcohol, to reduce the content of organic material contained in the loose powder.

Embodiment 96. The method of Embodiment 93, wherein treating includes removing at least a portion of the organic material from the loose powder.

Embodiment 97. The method of Embodiment 93, wherein treating includes removing at least 0.1 wt % of the organic material from the loose powder to form a recycled powder to be used in a subsequent operation to form a green body abrasive article.

Embodiment 98. The method of Embodiment 90, further comprising performing steps a)-c) multiple times to form a plurality of green body abrasive articles in a series of operations conducted at different times.

Embodiment 99. The method of Embodiment 90, wherein removing and capturing loose powder includes storing loose powder in a storage container.

Embodiment 100. The method of Embodiment 99, wherein removing and capturing includes a pressure differential applied to loose powder to remove it from a build box and the green body and capture it in a storage container.

Embodiment 101. The method of Embodiment 99, wherein the storage container is environmentally controlled having controlled contents of at least one of humidity, temperature, atmospheric composition and/or contaminates, pressure, and the like.

Embodiment 102. The method of Embodiment 99, further comprising treating the loose powder after a duration in the storage container.

Embodiment 103. The method of Embodiment 99, wherein the loose powder is used in a subsequent operation anywhere from 1 hour to 1 year after the process used to form the green body abrasive article.

Embodiment 104. The method of Embodiment 90, further including any other features of methods embodied or disclosed herein.

Embodiment 105. The method of Embodiment 90, wherein the green body and/or a finally-formed abrasive article formed from the green body includes any one or more features of the green body and/or finally-formed abrasive article embodied or disclosed herein.

Embodiment 106. A method of forming an abrasive article comprising:
  forming a green body abrasive article comprising a precursor bond material and abrasive particles, wherein forming is conducted by:
  creating one or more layers of powder material;
  compacting at least a portion of the one or more layers;
  selectively binding portions of the one or more layers with a binder material;
  converting the binder material to at least partially solidify the binder material and bind portions of powder material from the one or more layers;
  wherein forming the green body abrasive article is conducted at a forming rate of at least 120 cc/hr.

Embodiment 107. The method of Embodiment 106, wherein forming includes binder jetting to form a green body abrasive article.

Embodiment 108. The method of Embodiment 106, wherein the forming rate is at least 130 cc/hr, or at least 150 cc/hr, or at least 180 cc/hr, or at least 200 cc/hr, or at least 300 cc/hr, or at least 400 cc/hr, or at least 500 cc/hr, or at least 600 cc/hr, or at least 700 cc/hr, or at least 800 cc/hr, or at least 900 cc/hr, or at least 1000 cc/hr, or at least 1200 cc/hr, or at least 1400 cc/hr, or at least 1600 cc/hr, or at least 1800 cc/hr, or at least 2000 cc/hr, or at least 2200 cc/hr, or at least 2400 cc/hr, or at least 2600 cc/hr, or at least 2800 cc/hr, or at least 3000 cc/hr.

Embodiment 109. The method of Embodiment 106, wherein the forming rate is within a range of at least 130 cc/hr, and not greater than 7000 cc/hr.

Embodiment 110. The method of Embodiment 106, wherein the production efficiency is not greater than 7000 cc/hr, or not greater than 6000 cc/hr, or not greater than 5000 cc/hr.

Embodiment 111. The method of Embodiment 106, wherein the green body abrasive article comprises at least one of:
  i. a length of at least 6 cm;
  ii. a width of at least 2.8 cm;
  iii. a solid volume of at least 9 $cm^3$; and
  iv. a combination of any one of i., ii., and iii.

Embodiment 112. The method of Embodiment 111, wherein the green body comprises a thickness of at least 1 mm and not greater than 50 cm.

Embodiment 113. The method of Embodiment 111, wherein the green body comprises a thickness of not greater than 0.9 mm and at least 0.1 microns.

Embodiment 114. The method of Embodiment 111, wherein the length of the green body is at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm, or at least 18 cm, or at least 20 cm.

Embodiment 115. The method of Embodiment 111, wherein the length of the green body is not greater than 100 cm, or not greater than 90 cm, or not greater than 80 cm, or not greater than 70 cm, or not greater than 60 cm, or not greater than 50 cm, or not greater than 40 cm, or not greater than 30 cm, or not greater than 25 cm.

Embodiment 116. The method of Embodiment 111, wherein the width is at least 3 cm, or at least 3.5 cm, or at least 4 cm, or at least 4.5 cm, or at least 5 cm, or at least 5.5 cm, or at least 6 cm, or at least 6.5 cm, or at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm.

Embodiment 117. The method of Embodiment 111, wherein the width of the green body is not greater than 500 cm, or not greater than 450 cm, or not greater than 400 cm, or not greater than 350 cm, or not greater than 300 cm, or not greater than 250 cm, or not greater than 200 cm, or not greater than 150 cm, or not greater than 100 cm.

Embodiment 118. The method of Embodiment 111, wherein the volume is at least 10 $cm^3$, or at least 11 $cm^3$, or at least 12 $cm^3$, or at least 13 $cm^3$, or at least 14 $cm^3$, or at least 15 $cm^3$, or at least 16 $cm^3$, or at least 17 $cm^3$, or at least 18 $cm^3$, or at least 19 $cm^3$, or at least 20 $cm^3$, or at least 21 $cm^3$, or at least 22 $cm^3$, or at least 23 $cm^3$, or at least 24 $cm^3$, or at least 25 $cm^3$, or at least 26 $cm^3$, or at least 27 $cm^3$, or at least 28 $cm^3$, or at least 29 $cm^3$, or at least 30 $cm^3$, or at least 31 $cm^3$, or at least 32 $cm^3$, or at least 33 $cm^3$, or at least 34 $cm^3$, or at least 35 $cm^3$, or at least 36 $cm^3$, or at least 37 $cm^3$, or at least 38 $cm^3$, or at least 39 $cm^3$, or at least 40 $cm^3$, or at least 42 $cm^3$, or at least 44 $cm^3$, or at least 46 $cm^3$, or at least 48 $cm^3$, or at least 50 $cm^3$.

Embodiment 119. The method of Embodiment 111, wherein the volume is not greater than 5000 $cm^3$, or not greater than 4000 $cm^3$, or not greater than 3000 $cm^3$, or not greater than 2000 $cm^3$, or not greater than 1000 $cm^3$, or not greater than 800 $cm^3$, or not greater than 600 $cm^3$, or not greater than 500 $cm^3$.

Embodiment 120. The method of Embodiment 106, wherein the green body has a primary aspect ratio (length: width) of at least 1:1, or at least 1.1:1, or at least 1.2:1, or at least 1.3:1, or at least 1.4:1, or at least 1.5:1, or at least 1.8:1, or at least 2:1, or at least 3:1, or at least 4:1, or at least 5:1, or at least 6:1, or at least 7:1, or at least 8:1, or at least 9:1, or at least 10:1.

Embodiment 121. The method of Embodiment 106, wherein the green body has a primary aspect ratio (length: width) of not greater than 10000:1, or not greater than 5000:1, or not greater than 1000:1, or not greater than 500:1, or not greater than 200:1, or not greater than 100:1, or not greater than 50:1.

Embodiment 122. The method of Embodiment 106, wherein the green body has a secondary aspect ratio (length: thickness) that is the same as any of the ratios for primary aspect ratio provided in either of Embodiments 120 or 121.

Embodiment 123. The method of Embodiment 106, wherein the green body has a tertiary aspect ratio (width: thickness) that is the same as any of the ratios for primary aspect ratio provided in either of Embodiments 120 or 121.

Embodiment 124. The method of Embodiment 106, further including any other features of methods embodied or disclosed herein.

Embodiment 125. The method of Embodiment 106, wherein the green body and/or a finally-formed abrasive article formed from the green body includes any one or more features of the green body and/or finally-formed abrasive article embodied or disclosed herein.

Embodiment 126. A method of forming a batch comprising:
  forming a plurality of green body abrasive articles defining a batch, wherein each of the green body abrasive articles comprises a precursor bond material and abrasive particles, wherein forming is conducted by:
  creating one or more layers of powder material;
  selectively binding portions of the one or more layers with a binder material;

converting the binder material to at least partially solidify the binder material and bind portions of powder material from the one or more layers; and wherein forming the plurality of green body abrasive articles is conducted at a batch forming rate of at least 120 cc/hr.

Embodiment 127. The method of Embodiment 126, wherein a batch is a plurality of green body abrasive articles or finally-formed abrasive articles formed in a single additive manufacturing processing cycle.

Embodiment 128. The method of Embodiment 126, wherein a batch is a plurality of green body abrasive articles or finally-formed abrasive articles formed in a single bindering jetting processing cycle, such that a plurality of discrete green bodies are formed in a single build box at the same time.

Embodiment 129. The method of Embodiment 126, wherein forming includes binder jetting to form the plurality of green body abrasive articles.

Embodiment 130. The method of Embodiment 126, wherein the batch forming rate is at least 130 cc/hr, or at least 150 cc/hr, or at least 180 cc/hr, or at least 200 cc/hr, or at least 300 cc/hr, or at least 400 cc/hr, or at least 500 cc/hr, or at least 600 cc/hr, or at least 700 cc/hr, or at least 800 cc/hr, or at least 900 cc/hr, or at least 1000 cc/hr, or at least 1200 cc/hr, or at least 1400 cc/hr, or at least 1600 cc/hr, or at least 1800 cc/hr, or at least 2000 cc/hr, or at least 2200 cc/hr, or at least 2400 cc/hr, or at least 2600 cc/hr, or at least 2800 cc/hr, or at least 3000 cc/hr.

Embodiment 131. The method of Embodiment 106, wherein the batch forming rate is within a range of at least 130 cc/hr, and not greater than 7000 cc/hr.

Embodiment 132. The method of Embodiment 106, wherein the batch forming rate is not greater than 7000 cc/hr, or not greater than 6000 cc/hr, or not greater than 5000 cc/hr.

Embodiment 133. The method of Embodiment 126, wherein the plurality of green body abrasive articles comprises a minimum batch volume of at least 9 $cm^3$.

Embodiment 134. The method of Embodiment 126, wherein each green body of the plurality of green body abrasive articles of the batch comprises a thickness of at least 1 mm and not greater than 50 cm.

Embodiment 135. The method of Embodiment 126, wherein each green body of the plurality of green body abrasive articles of the batch comprises a thickness of not greater than 0.9 mm and at least 0.1 microns.

Embodiment 136. The method of Embodiment 126, wherein each green body of the plurality of green body abrasive articles of the batch comprises a length of at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm, or at least 18 cm, or at least 20 cm.

Embodiment 137. The method of Embodiment 126, wherein each green body of the plurality of green body abrasive articles of the batch comprises a length of not greater than 100 cm, or not greater than 90 cm, or not greater than 80 cm, or not greater than 70 cm, or not greater than 60 cm, or not greater than 50 cm, or not greater than 40 cm, or not greater than 30 cm, or not greater than 25 cm.

Embodiment 138. The method of Embodiment 126, wherein each green body of the plurality of green body abrasive articles of the batch comprises a width of at least 3 cm, or at least 3.5 cm, or at least 4 cm, or at least 4.5 cm, or at least 5 cm, or at least 5.5 cm, or at least 6 cm, or at least 6.5 cm, or at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm.

Embodiment 139. The method of Embodiment 126, wherein each green body of the plurality of green body abrasive articles of the batch comprises a width of not greater than 500 cm, or not greater than 450 cm, or not greater than 400 cm, or not greater than 350 cm, or not greater than 300 cm, or not greater than 250 cm, or not greater than 200 cm, or not greater than 150 cm, or not greater than 100 cm.

Embodiment 140. The method of Embodiment 126, wherein each green body of the plurality of green body abrasive articles of the batch comprises a primary aspect ratio (length:width) of at least 1:1, or at least 1.1:1, or at least 1.2:1, or at least 1.3:1, or at least 1.4:1, or at least 1.5:1, or at least 1.8:1, or at least 2:1, or at least 3:1, or at least 4:1, or at least 5:1, or at least 6:1, or at least 7:1, or at least 8:1, or at least 9:1, or at least 10:1.

Embodiment 141. The method of Embodiment 126, wherein each green body of the plurality of green body abrasive articles of the batch comprises a primary aspect ratio (length:width) of not greater than 10000:1, or not greater than 5000:1, or not greater than 1000:1, or not greater than 500:1, or not greater than 200:1, or not greater than 100:1, or not greater than 50:1.

Embodiment 142. The method of Embodiment 126, wherein each green body of the plurality of green body abrasive articles of the batch comprises a secondary aspect ratio (length:thickness) that is the same as any of the ratios for primary aspect ratio provided in Embodiments 140 and 141.

Embodiment 143. The method of Embodiment 126, wherein each green body of the plurality of green body abrasive articles of the batch comprises a tertiary aspect ratio (width:thickness) that is the same as any of the ratios for primary aspect ratio provided in Embodiments 140 and 141.

Embodiment 144. The method of Embodiment 126, wherein the batch comprises a volume of at least 9 $cm^3$ wherein the batch volume is at least 10 $cm^3$, or at least 11 $cm^3$, or at least 12 $cm^3$, or at least 13 $cm^3$, or at least 14 $cm^3$, or at least 15 $cm^3$, or at least 16 $cm^3$, or at least 17 $cm^3$, or at least 18 $cm^3$, or at least 19 $cm^3$, or at least 20 $cm^3$, or at least 21 $cm^3$, or at least 22 $cm^3$, or at least 23 $cm^3$, or at least 24 $cm^3$, or at least 25 $cm^3$, or at least 26 $cm^3$, or at least 27 $cm^3$, or at least 28 $cm^3$, or at least 29 $cm^3$, or at least 30 $cm^3$, or at least 31 $cm^3$, or at least 32 $cm^3$, or at least 33 $cm^3$, or at least 34 $cm^3$, or at least 35 $cm^3$, or at least 36 $cm^3$, or at least 37 $cm^3$, or at least 38 $cm^3$, or at least 39 $cm^3$, or at least 40 $cm^3$, or at least 42 $cm^3$, or at least 44 $cm^3$, or at least 46 $cm^3$, or at least 48 $cm^3$, or at least 50 $cm^3$.

Embodiment 145. The method of Embodiment 126, wherein the batch volume is not greater than 5000 $cm^3$, or not greater than 4000 $cm^3$, or not greater than 3000 $cm^3$, or not greater than 2000 $cm^3$, or not greater than 1000 $cm^3$, or not greater than 800 $cm^3$, or not greater than 600 $cm^3$, or not greater than 500 $cm^3$.

Embodiment 146. The method of Embodiment 126, further including any other features of methods embodied or disclosed herein.

Embodiment 147. The method of Embodiment 126, wherein the batch includes green body abrasive articles having any one or more features of the green bodies and/or finally-formed abrasive articles embodied or disclosed herein.

Embodiment 148. An abrasive article comprising:
a body in the form of a green body abrasive article or a finally-formed abrasive article including abrasive particles contained in a bond material, wherein the body comprises at least one of: a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%; and
or a combination of any one of 1), 2), and 3)
and wherein the body further comprises at least one of:
a density variation-L of not greater than 20% of an average density value of the body, wherein density variation-L is measured along a length of the body;
a density variation-W of not greater than 20% of an average density value of the body, wherein density variation-W is measured along a width of the body;
a density variation-T of not greater than 20% of an average density value of the body, wherein density variation-T is measured along a thickness of the body;
or any combination of a)-c).

Embodiment 149. The abrasive article of Embodiment 148, wherein the density variation-L is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 150. The abrasive article of Embodiment 149, wherein the density variation-L is calculated by making multiple measurements of density spaced apart from each other along the length of the body. The density measurements may be evaluated by cross-sectional images taken in planes substantially perpendicular to the length of the body. Alternatively, ultrasonic or other non-destructive techniques may be used to create a map of the density variations in the body and used to measure density values and the change in density values of the body along the length of the body. The density variation-L can be the percent difference between an average density value of the body and a density value from a body having the greatest difference, plus or minus, in density from the average density value. The number of density values for a body or batch should be of a suitable statistically relevant sample size.

Embodiment 151. The abrasive article of Embodiment 148, wherein the density variation-W is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 152. The abrasive article of Embodiment 151, wherein the density variation-W is calculated by making multiple measurements of density spaced apart from each other along the width of the body. The density measurements may be evaluated by cross-sectional images taken in planes substantially perpendicular to the width of the body at different positions spaced apart from each other along the dimension of width. Alternatively, ultrasonic or other non-destructive techniques may be used to create a map of the density variations in the body and used to measure density values and the change in density values of the body along the width of the body. The density variation-W can be the percent difference between an average density value of the body and a density value from a body having the greatest difference, plus or minus, in density from the average density value. The number of density values for a body or batch should be of a suitable statistically relevant sample size.

Embodiment 153. The abrasive article of Embodiment 148, wherein the density variation-T is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 154. The abrasive article of Embodiment 153, wherein the density variation-T is calculated by making multiple measurements of density spaced apart from each other along the thickness of the body. The density measurements may be evaluated by cross-sectional images taken in planes substantially perpendicular to the thickness of the body at different positions spaced apart from each other along the dimension of thickness. Alternatively, ultrasonic or other non-destructive techniques may be used to create a map of the density variations in the body and used to measure density values and the change in density values of the body along the thickness of the body. The density variation-T can be the percent difference between an average density value of the body and a density value from a body having the greatest difference, plus or minus, in density from the average density value. The number of density values for a body or batch should be of a suitable statistically relevant sample size.

Embodiment 155. The abrasive article of Embodiment 148, wherein the body comprises at least one of:
 i. a length of at least 6 cm;
 ii. a width of at least 2.8 cm;
 iii. a solid volume of at least 9 $cm^3$;
 iv. or any combination of any one or more of i., ii., and iii.

Embodiment 156. The abrasive article of Embodiment 155, wherein the body comprises a thickness of at least 1 mm and not greater than 50 cm.

Embodiment 157. The abrasive article of Embodiment 155, wherein the body comprises a thickness of not greater than 0.9 mm and at least 0.1 microns.

Embodiment 158. The abrasive article of Embodiment 155, wherein the length of the body is at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm, or at least 18 cm, or at least 20 cm.

Embodiment 159. The abrasive article of Embodiment 155, wherein the length of the body is not greater than 100 cm, or not greater than 90 cm, or not greater than 80 cm, or not greater than 70 cm, or not greater than 60 cm, or not greater than 50 cm, or not greater than 40 cm, or not greater than 30 cm, or not greater than 25 cm.

Embodiment 160. The abrasive article of Embodiment 155, wherein the width is at least 3 cm, or at least 3.5 cm, or at least 4 cm, or at least 4.5 cm, or at least 5 cm, or at least 5.5 cm, or at least 6 cm, or at least 6.5 cm, or at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm.

Embodiment 161. The abrasive article of Embodiment 155, wherein the width of green body is not greater than 500 cm, or not greater than 450 cm, or not greater than 400 cm, or not greater than 350 cm, or not greater than 300 cm, or not greater than 250 cm, or not greater than 200 cm, or not greater than 150 cm, or not greater than 100 cm.

Embodiment 162. The abrasive article of Embodiment 155, wherein the body has a primary aspect ratio (length: width) of at least 1:1, or at least 1.1:1, or at least 1.2:1, or at least 1.3:1, or at least 1.4:1, or at least 1.5:1, or at least 1.8:1, or at least 2:1, or at least 3:1, or at least 4:1, or at least 5:1, or at least 6:1, or at least 7:1, or at least 8:1, or at least 9:1, or at least 10:1.

Embodiment 163. The abrasive article of Embodiment 155, wherein the body has a primary aspect ratio (length: width) of not greater than 10000:1, or not greater than 5000:1, or not greater than 1000:1, or not greater than 500:1, or not greater than 200:1, or not greater than 100:1, or not greater than 50:1.

Embodiment 164. The abrasive article of Embodiment 155, wherein the body has a secondary aspect ratio (length: thickness) that is the same as any of the ratios for primary aspect ratio provided in either of Embodiments 61 or 62.

Embodiment 165. The abrasive article of Embodiment 155, wherein the body has a tertiary aspect ratio (width: thickness) that is the same as any of the ratios for primary aspect ratio provided in either of Embodiments 61 or 62.

Embodiment 166. The abrasive article of Embodiment 155, wherein the body comprises a length, a width, and a thickness, and wherein length>width>thickness.

Embodiment 167. The abrasive article of Embodiment 155, wherein the volume is at least 10 cm$^3$, or at least 11 cm$^3$, or at least 12 cm$^3$, or at least 13 cm$^3$, or at least 14 cm$^3$, or at least 15 cm$^3$, or at least 16 cm$^3$, or at least 17 cm$^3$, or at least 18 cm$^3$, or at least 19 cm$^3$, or at least 20 cm$^3$, or at least 21 cm$^3$, or at least 22 cm$^3$, or at least 23 cm$^3$, or at least 24 cm$^3$, or at least 25 cm$^3$, or at least 26 cm$^3$, or at least 27 cm$^3$, or at least 28 cm$^3$, or at least 29 cm$^3$, or at least 30 cm$^3$, or at least 31 cm$^3$, or at least 32 cm$^3$, or at least 33 cm$^3$, or at least 34 cm$^3$, or at least 35 cm$^3$, or at least 36 cm$^3$, or at least 37 cm$^3$, or at least 38 cm$^3$, or at least 39 cm$^3$, or at least 40 cm$^3$, or at least 42 cm$^3$, or at least 44 cm$^3$, or at least 46 cm$^3$, or at least 48 cm$^3$, or at least 50 cm$^3$.

Embodiment 168. The abrasive article of Embodiment 155, wherein the volume is not greater than 5000 cm$^3$, or not greater than 4000 cm$^3$, or not greater than 3000 cm$^3$, or not greater than 2000 cm$^3$, or not greater than 1000 cm$^3$, or not greater than 800 cm$^3$, or not greater than 600 cm$^3$, or not greater than 500 cm$^3$.

Embodiment 169. The abrasive article of Embodiment 148, wherein the body is free of an infiltrant.

Embodiment 170. The abrasive article of Embodiment 155, wherein the body comprises a theoretical density of at least 50%, or at least 51%, or at least 53%, or at least 54%, or at least 55%, or at least 56%, or at least 57%, or at least 58%, or at least 59%, or at least 60%, or at least 61%, or at least 62%, or at least 63%, or at least 64%, or at least 65%, or at least 66%, or at least 67%, or at least 68%, or at least 69%, or at least 70%, or at least 71%, or at least 72%, or at least 73%, or at least 74%, or at least 75%, or at least 76%, or at least 77%, or at least 78%, or at least 79%, or at least 80%, or at least 81%, or at least 82%, or at least 83%, or at least 84%, or at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%.

Embodiment 171. The abrasive article of Embodiment 155, wherein the body comprises a theoretical density of not greater than 99.9%, or not greater than 99.5%, or not greater than 99%.

Embodiment 172. The abrasive article of Embodiment 148, wherein the body includes any one or more features of any other body, green body or finally-formed body, embodied or disclosed herein.

Embodiment 173. An abrasive article comprising:
a body in the form of a green body abrasive article or a finally-formed abrasive article including abrasive particles contained in a bond material, wherein the body comprises at least one of: a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%; and
or a combination of any one of 1), 2), and 3)
and wherein the body further comprises at least one of:
a dimensional variation-L of not greater than 90% of an average dimensional value of the body, wherein dimensional variation-L is measured along a length of the body;
a dimensional variation-W of not greater than 90% of an average dimensional value of the body, wherein dimensional variation-W is measured along a width of the body;
a dimensional variation-T of not greater than 90% of an average dimensional value of the body, wherein dimensional variation-T is measured along a thickness of the body;
or any combination of a)-c).

Embodiment 174. The abrasive article of Embodiment 173, wherein the dimensional variation-L is not greater than 89%, or not greater than 88%, or not greater than 87%, or not greater than 86%, or not greater than 85%, or not greater than 84%, or not greater than 83%, or not greater than 82%, or not greater than 81%, or not greater than 80%, or not greater than 79%, or not greater than 78%, or not greater than 77%, or not greater than 76%, or not greater than 75%, or not greater than 74%, or not greater than 73%, or not greater than 72%, or not greater than 71%, or not greater than 70%, or not greater than 69%, or not greater than 68%, or not greater than 67%, or not greater than 66%, or not greater than 65%, or not greater than 64%, or not greater than 63%, or not greater than 62%, or not greater than 61%, or not greater than 60%, or not greater than 59%, or not greater than 58%, or not greater than 57%, or not greater than 56%, or not greater than 55%, or not greater than 54%, or not greater than 53%, or not greater than 52%, or not greater than 51%, or not greater than 50%, or not greater than 49%, or not greater than 48%, or not greater than 47%, or not greater than 46%, or not greater than 45%, or not greater than 44%, or not greater than 43%, or not greater than 42%, or not greater than 41%, or not greater than 40%, or not greater than 39%, or not greater than 38%, or not greater than 37%, or not greater than 36%, or not greater than 35%, or not greater than 34%, or not greater than 33%, or not greater than 32%, or not greater than 31%, or not greater than 30%, or not greater than 29%, or not greater than 28%, or not greater than 27%, or not greater than 26%, or not greater than 25%, or not greater than 24%, or not greater than 23%, or not greater than 22%, or not greater than 21%, or not greater than 20%, or not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%.

Embodiment 175. The abrasive article of Embodiment 173, wherein the dimensional variation-L is at least 0.0001%, or at least 0.001%, or at least 0.01%, or at least 0.1%.

Embodiment 176. The abrasive article of Embodiment 173, wherein the dimensional variation-W is not greater than 89%, or not greater than 88%, or not greater than 87%, or not greater than 86%, or not greater than 85%, or not greater than 84%, or not greater than 83%, or not greater than 82%, or not greater than 81%, or not greater than 80%, or not greater than 79%, or not greater than 78%, or not greater than 77%, or not greater than 76%, or not greater than 75%, or not greater than 74%, or not greater than 73%, or not greater than 72%, or not greater than 71%, or not greater than 70%, or not greater than 69%, or not greater than 68%, or not greater than 67%, or not greater than 66%, or not greater than 65%, or not greater than 64%, or not greater than 63%, or not greater than 62%, or not greater than 61%, or not greater than 60%, or not greater than 59%, or not greater than 58%, or not greater than 57%, or not greater than 56%, or not greater than 55%, or not greater than 54%, or not greater than 53%, or not greater than 52%, or not greater than 51%, or not greater than 50%, or not greater than 49%, or not greater than 48%, or not greater than 47%, or not greater than 46%, or not greater than 45%, or not greater than 44%, or not greater than 43%, or not greater than 42%, or not greater than 41%, or not greater than 40%, or not greater than 39%, or not greater than 38%, or not greater than 37%, or not greater than 36%, or not greater than 35%, or not greater than 34%, or not greater than 33%, or not greater than 32%, or not greater than 31%, or not greater than 30%, or not greater than 29%, or not greater than 28%, or not greater than 27%, or not greater than 26%, or not greater than 25%, or not greater than 24%, or not greater than 23%, or not greater than 22%, or not greater than 21%, or not greater than 20%, or not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%.

Embodiment 177. The abrasive article of Embodiment 173, wherein the dimensional variation-W is at least 0.0001%, or at least 0.001%, or at least 0.01%, or at least 0.1%.

Embodiment 178. The abrasive article of Embodiment 173, wherein the dimensional variation-T is not greater than 89%, or not greater than 88%, or not greater than 87%, or not greater than 86%, or not greater than 85%, or not greater than 84%, or not greater than 83%, or not greater than 82%, or not greater than 81%, or not greater than 80%, or not greater than 79%, or not greater than 78%, or not greater than 77%, or not greater than 76%, or not greater than 75%, or not greater than 74%, or not greater than 73%, or not greater than 72%, or not greater than 71%, or not greater than 70%, or not greater than 69%, or not greater than 68%, or not greater than 67%, or not greater than 66%, or not greater than 65%, or not greater than 64%, or not greater than 63%, or not greater than 62%, or not greater than 61%, or not greater than 60%, or not greater than 59%, or not greater than 58%, or not greater than 57%, or not greater than 56%, or not greater than 55%, or not greater than 54%, or not greater than 53%, or not greater than 52%, or not greater than 51%, or not greater than 50%, or not greater than 49%, or not greater than 48%, or not greater than 47%, or not greater than 46%, or not greater than 45%, or not greater than 44%, or not greater than 43%, or not greater than 42%, or not greater than 41%, or not greater than 40%, or not greater than 39%, or not greater than 38%, or not greater than 37%, or not greater than 36%, or not greater than 35%, or not greater than 34%, or not greater than 33%, or not greater than 32%, or not greater than 31%, or not greater than 30%, or not greater than 29%, or not greater than 28%, or not greater than 27%, or not greater than 26%, or not greater than 25%, or not greater than 24%, or not greater than 23%, or not greater than 22%, or not greater than 21%, or not greater than 20%, or not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%.

Embodiment 179. The abrasive article of Embodiment 173, wherein the dimensional variation-T is at least 0.0001%, or at least 0.001%, or at least 0.01%, or at least 0.1%.

Embodiment 180. The abrasive article of Embodiment 173, wherein the body comprises at least one of:
  i. a length of at least 6 cm;
  ii. a width of at least 2.8 cm;
  iii. a solid volume of at least 9 $cm^3$;
  iv. or any combination of any one of i., ii., and iii.

Embodiment 181. The abrasive article of Embodiment 180, wherein the body comprises a thickness of at least 1 mm and not greater than 50 cm.

Embodiment 182. The abrasive article of Embodiment 180, wherein the body comprises a thickness of not greater than 0.9 mm and at least 0.1 microns.

Embodiment 183. The abrasive article of Embodiment 180, wherein the length of the body is at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm, or at least 18 cm, or at least 20 cm.

Embodiment 184. The abrasive article of Embodiment 180, wherein the length of the body is not greater than 100 cm, or not greater than 90 cm, or not greater than 80 cm, or not greater than 70 cm, or not greater than 60 cm, or not greater than 50 cm, or not greater than 40 cm, or not greater than 30 cm, or not greater than 25 cm.

Embodiment 185. The article of Embodiment 180, wherein the width is at least 3 cm, or at least 3.5 cm, or at least 4 cm, or at least 4.5 cm, or at least 5 cm, or at least 5.5 cm, or at least 6 cm, or at least 6.5 cm, or at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm.

Embodiment 186. The abrasive article of Embodiment 180, wherein the width of green body is not greater than 500 cm, or not greater than 450 cm, or not greater than 400 cm, or not greater than 350 cm, or not greater than 300 cm, or not greater than 250 cm, or not greater than 200 cm, or not greater than 150 cm, or not greater than 100 cm.

Embodiment 187. The abrasive article of Embodiment 180, wherein the body has a primary aspect ratio (length:width) of at least 1:1, or at least 1.1:1, or at least 1.2:1, or at least 1.3:1, or at least 1.4:1, or at least 1.5:1, or at least 1.8:1, or at least 2:1, or at least 3:1, or at least 4:1, or at least 5:1, or at least 6:1, or at least 7:1, or at least 8:1, or at least 9:1, or at least 10:1.

Embodiment 188. The abrasive article of Embodiment 180, wherein the body has a primary aspect ratio (length:width) of not greater than 10000:1, or not greater than 5000:1, or not greater than 1000:1, or not greater than 500:1, or not greater than 200:1, or not greater than 100:1, or not greater than 50:1.

Embodiment 189. The abrasive article of Embodiment 180, wherein the body has a secondary aspect ratio (length:thickness) that is the same as any of the ratios for primary aspect ratio provided in either of Embodiments 61 or 62.

Embodiment 190. The abrasive article of Embodiment 180, wherein the body has a tertiary aspect ratio (width:thickness) that is the same as any of the ratios for primary aspect ratio provided in either of Embodiments 61 or 62.

Embodiment 191. The abrasive article of Embodiment 180, wherein the body comprises a length, a width, and a thickness, and wherein length>width>thickness.

Embodiment 192. The abrasive article of Embodiment 180, wherein the volume is at least 10 $cm^3$, or at least 11 $cm^3$, or at least 12 $cm^3$, or at least 13 $cm^3$, or at least 14 $cm^3$, or at least 15 $cm^3$, or at least 16 $cm^3$, or at least 17 $cm^3$, or at least 18 $cm^3$, or at least 19 $cm^3$, or at least 20 $cm^3$, or at least 21 $cm^3$, or at least 22 $cm^3$, or at least 23 $cm^3$, or at least 24 $cm^3$, or at least 25 $cm^3$, or at least 26 $cm^3$, or at least 27 $cm^3$, or at least 28 $cm^3$, or at least 29 $cm^3$, or at least 30 $cm^3$, or at least 31 $cm^3$, or at least 32 $cm^3$, or at least 33 $cm^3$, or at least 34 $cm^3$, or at least 35 $cm^3$, or at least 36 $cm^3$, or at least 37 $cm^3$, or at least 38 $cm^3$, or at least 39 $cm^3$, or at least 40 $cm^3$, or at least 42 $cm^3$, or at least 44 $cm^3$, or at least 46 $cm^3$, or at least 48 $cm^3$, or at least 50 $cm^3$.

Embodiment 193. The abrasive article of Embodiment 180, wherein the volume is not greater than 5000 $cm^3$, or not greater than 4000 $cm^3$, or not greater than 3000 $cm^3$, or not greater than 2000 $cm^3$, or not greater than 1000 $cm^3$, or not greater than 800 $cm^3$, or not greater than 600 $cm^3$, or not greater than 500 $cm^3$.

Embodiment 194. The abrasive article of Embodiment 173, wherein the body is free of an infiltrant.

Embodiment 195. The abrasive article of Embodiment 173, wherein the body comprises a theoretical density of at least 50%, or at least 51%, or at least 53%, or at least 54%, or at least 55%, or at least 56%, or at least 57%, or at least 58%, or at least 59%, or at least 60%, or at least 61%, or at least 62%, or at least 63%, or at least 64%, or at least 65%, or at least 66%, or at least 67%, or at least 68%, or at least 69%, or at least 70%, or at least 71%, or at least 72%, or at least 73%, or at least 74%, or at least 75%, or at least 76%, or at least 77%, or at least 78%, or at least 79%, or at least 80%, or at least 81%, or at least 82%, or at least 83%, or at least 84%, or at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%.

Embodiment 196. The abrasive article of Embodiment 173, wherein the body comprises a theoretical density of not greater than 99.9%, or not greater than 99.5%, or not greater than 99%.

Embodiment 197. The abrasive article of Embodiment 173, wherein the body includes any one or more features of any other body, green body or finally-formed body, embodied or disclosed herein.

Embodiment 198. The abrasive article of Embodiment 173, wherein the body further comprises at least one of:
a) a density variation-L of not greater than 20% of an average density value of the body, wherein density variation-L is measured along a length of the body;
b) a density variation-W of not greater than 20% of an average density value of the body, wherein density variation-W is measured along a width of the body;
c) a density variation-T of not greater than 20% of an average density value of the body, wherein density variation-T is measured along a thickness of the body;
d) or any combination of a)-c).

Embodiment 199. An abrasive article comprising:
a body in the form of a green body abrasive article or a finally-formed abrasive article including abrasive particles contained in a bond material, wherein the body comprises at least one of: a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%; and
or a combination of any one of 1), 2), and 3)
and wherein the body further comprises at least one of:
a hardness variation-L of not greater than 20% of an average hardness value of the body, wherein hardness variation-L is measured along a length of the body;
a hardness variation-W of not greater than 20% of an average hardness value of the body, wherein hardness variation-W is measured along a width of the body;
a hardness variation-T of not greater than 20% of an average hardness value of the body, wherein hardness variation-T is measured along a thickness of the body;
or any combination of a)-c).

Embodiment 200. The abrasive article of Embodiment 199, wherein the hardness variation-L is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 201. The abrasive article of Embodiment 199, wherein the hardness variation-W is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 202. The abrasive article of Embodiment 199, wherein the hardness variation-T is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 203. The abrasive article of Embodiment 199, wherein the body comprises at least one of:
  i. a length of at least 6 cm;
  ii. a width of at least 2.8 cm;
  iii. a solid volume of at least 9 $cm^3$;
  iv. or any combination of any one of i., ii., and iii.

Embodiment 204. The abrasive article of Embodiment 203, wherein the body comprises a thickness of at least 1 mm and not greater than 50 cm.

Embodiment 205. The abrasive article of Embodiment 203, wherein the body comprises a thickness of not greater than 0.9 mm and at least 0.1 micron.

Embodiment 206. The abrasive article of Embodiment 203, wherein the length of the body is at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm, or at least 18 cm, or at least 20 cm.

Embodiment 207. The abrasive article of Embodiment 203, wherein the length of the body is not greater than 100 cm, or not greater than 90 cm, or not greater than 80 cm, or not greater than 70 cm, or not greater than 60 cm, or not greater than 50 cm, or not greater than 40 cm, or not greater than 30 cm, or not greater than 25 cm.

Embodiment 208. The abrasive article of Embodiment 203, wherein the width is at least 3 cm, or at least 3.5 cm, or at least 4 cm, or at least 4.5 cm, or at least 5 cm, or at least 5.5 cm, or at least 6 cm, or at least 6.5 cm, or at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm.

Embodiment 209. The abrasive article of Embodiment 203, wherein the width of green body is not greater than 500 cm, or not greater than 450 cm, or not greater than 400 cm, or not greater than 350 cm, or not greater than 300 cm, or not greater than 250 cm, or not greater than 200 cm, or not greater than 150 cm, or not greater than 100 cm.

Embodiment 210. The abrasive article of Embodiment 203, wherein the volume is at least 10 $cm^3$, or at least 11 $cm^3$, or at least 12 $cm^3$, or at least 13 $cm^3$, or at least 14 $cm^3$, or at least 15 $cm^3$, or at least 16 $cm^3$, or at least 17 $cm^3$, or at least 18 $cm^3$, or at least 19 $cm^3$, or at least 20 $cm^3$, or at least 21 $cm^3$, or at least 22 $cm^3$, or at least 23 $cm^3$, or at least 24 $cm^3$, or at least 25 $cm^3$, or at least 26 $cm^3$, or at least 27 $cm^3$, or at least 28 $cm^3$, or at least 29 $cm^3$, or at least 30 $cm^3$, or at least 31 $cm^3$, or at least 32 $cm^3$, or at least 33 $cm^3$, or at least 34 $cm^3$, or at least 35 $cm^3$, or at least 36 $cm^3$, or at least 37 $cm^3$, or at least 38 $cm^3$, or at least 39 $cm^3$, or at least 40 $cm^3$, or at least 42 $cm^3$, or at least 44 $cm^3$, or at least 46 $cm^3$, or at least 48 $cm^3$, or at least 50 $cm^3$.

Embodiment 211. The abrasive article of Embodiment 203, wherein the volume is not greater than 5000 $cm^3$, or not greater than 4000 $cm^3$, or not greater than 3000 $cm^3$, or not greater than 2000 $cm^3$, or not greater than 1000 $cm^3$, or not greater than 800 $cm^3$, or not greater than 600 $cm^3$, or not greater than 500 $cm^3$.

Embodiment 212. The abrasive article of Embodiment 199, wherein the body has a primary aspect ratio (length:width) of at least 1:1, or at least 1.1:1, or at least 1.2:1, or at least 1.3:1, or at least 1.4:1, or at least 1.5:1, or at least 1.8:1, or at least 2:1, or at least 3:1, or at least 4:1, or at least 5:1, or at least 6:1, or at least 7:1, or at least 8:1, or at least 9:1, or at least 10:1.

Embodiment 213. The abrasive article of Embodiment 199, wherein the body has a primary aspect ratio (length:width) of not greater than 10000:1, or not greater than 5000:1, or not greater than 1000:1, or not greater than 500:1, or not greater than 200:1, or not greater than 100:1, or not greater than 50:1.

Embodiment 214. The abrasive article of Embodiment 199, wherein the body has a secondary aspect ratio (length:thickness) that is the same as any of the ratios for primary aspect ratio provided in either of Embodiments 61 or 62.

Embodiment 215. The abrasive article of Embodiment 199, wherein the body has a tertiary aspect ratio (width:thickness) that is the same as any of the ratios for primary aspect ratio provided in either of Embodiments 61 or 62.

Embodiment 216. The abrasive article of Embodiment 199, wherein the body comprises a length, a width, and a thickness, and wherein length>width>thickness.

Embodiment 217. The abrasive article of Embodiment 199, wherein the body is free of an infiltrant.

Embodiment 218. The abrasive article of Embodiment 199, wherein the body comprises a theoretical density of at least 50%, or at least 51%, or at least 53%, or at least 54%, or at least 55%, or at least 56%, or at least 57%, or at least 58%, or at least 59%, or at least 60%, or at least 61%, or at least 62%, or at least 63%, or at least 64%, or at least 65%, or at least 66%, or at least 67%, or at least 68%, or at least 69%, or at least 70%, or at least 71%, or at least 72%, or at least 73%, or at least 74%, or at least 75%, or at least 76%, or at least 77%, or at least 78%, or at least 79%, or at least 80%, or at least 81%, or at least 82%, or at least 83%, or at least 84%, or at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%.

Embodiment 219. The abrasive article of Embodiment 199, wherein the body comprises a theoretical density of not greater than 99.9%, or not greater than 99.5%, or not greater than 99%.

Embodiment 220. The abrasive article of Embodiment 199, wherein the body includes any one or more features of any other body, green body or finally-formed body, embodied or disclosed herein.

Embodiment 221. The abrasive article of Embodiment 199, wherein the body further comprises at least one of:

a) a density variation-L of not greater than 20% of an average density value of the body, wherein density variation-L is measured along a length of the body;
b) a density variation-W of not greater than 20% of an average density value of the body, wherein density variation-W is measured along a width of the body;
c) a density variation-T of not greater than 20% of an average density value of the body, wherein density variation-T is measured along a thickness of the body;
d) or any combination of a)-c).

Embodiment 222. The abrasive article of Embodiment 199, wherein the body further comprises at least one of:
a dimensional variation-L of not greater than 90% of an average dimensional value of the body, wherein dimensional variation-L is measured along a length of the body;
a dimensional variation-W of not greater than 90% of an average dimensional value of the body, wherein dimensional variation-W is measured along a width of the body;
a dimensional variation-T of not greater than 90% of an average dimensional value of the body, wherein dimensional variation-T is measured along a thickness of the body;
or any combination of a)-c).

Embodiment 223. An abrasive article comprising:
a body in the form of a green body abrasive article or a finally-formed abrasive article including abrasive particles contained in a bond material, wherein the body comprises at least one of: a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%; and
or a combination of any one of 1), 2), and 3)
and wherein the body further comprises at least one of:
a MOR variation-L of not greater than 20% of an average MOR value of the body, wherein MOR variation-L is measured along a length of the body;
a MOR variation-W of not greater than 20% of an average MOR value of the body, wherein MOR variation-W is measured along a width of the body;
a MOR variation-T of not greater than 20% of an average MOR value of the body, wherein MOR variation-T is measured along a thickness of the body;
a MOE variation-L of not greater than 20% of an average MOE value of the body, wherein MOE variation-L is measured along a length of the body;
a MOE variation-W of not greater than 20% of an average MOE value of the body, wherein MOE variation-W is measured along a width of the body;
a MOE variation-T of not greater than 20% of an average MOE value of the body, wherein MOE variation-T is measured along a thickness of the body;
or any combination of a)-f).

Embodiment 224. The abrasive article of Embodiment 223, wherein the MOR variation-L is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 225. The abrasive article of Embodiment 223, wherein the MOR variation-W is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 226. The abrasive article of Embodiment 223, wherein the MOR variation-T is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 227. The abrasive article of Embodiment 223, wherein the MOE variation-L is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 228. The abrasive article of Embodiment 223, wherein the MOE variation-W is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 229. The abrasive article of Embodiment 223, wherein the MOE variation-T is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 230. The abrasive article of Embodiment 223, wherein the body includes any one or more features of any other body, green body or finally-formed body, embodied or disclosed herein.

Embodiment 231. The abrasive article of Embodiment 223, wherein the body further comprises at least one of:
a) a density variation-L of not greater than 20% of an average density value of the body, wherein density variation-L is measured along a length of the body;

b) a density variation-W of not greater than 20% of an average density value of the body, wherein density variation-W is measured along a width of the body;

c) a density variation-T of not greater than 20% of an average density value of the body, wherein density variation-T is measured along a thickness of the body;

d) or any combination of a)-c).

Embodiment 232. The abrasive article of Embodiment 223, wherein the body further comprises at least one of:

a dimensional variation-L of not greater than 90% of an average dimensional value of the body, wherein dimensional variation-L is measured along a length of the body;

a dimensional variation-W of not greater than 90% of an average dimensional value of the body, wherein dimensional variation-W is measured along a width of the body;

a dimensional variation-T of not greater than 90% of an average dimensional value of the body, wherein dimensional variation-T is measured along a thickness of the body;

or any combination of a)-c).

Embodiment 233. An abrasive article comprising:

a body in the form of a green body abrasive article or a finally-formed abrasive article including abrasive particles contained in a bond material, wherein the body comprises at least one of: a microstructure Feature greater than 1;

a first surface having a first developed interfacial area ratio (Sdr1) and a second surface having a second developed interfacial area ratio (Sdr2), wherein the difference between Sdr1 and Sdr2 is not greater than 25%;

an exterior surface having a first developed interfacial area ratio (Sdr) of at least 40%; and or a combination of any one of 1), 2), and 3) and wherein the body further comprises at least one of:

a major planar surface having a nWarp of not greater than 50 $\mu m/cm^2$, wherein nWarp is the warp of the major planar surface normalized for the surface area of the major planar surface;

a major planar surface having a nFlatness of not greater than 50 $\mu m/cm^2$, wherein nFlatness is the flatness of the major planar surface normalized for the surface area of the major planar surface;

a major planar surface having a nBow of not greater than 50 $\mu m/cm^2$, wherein nBow is the bow of the major planar surface normalized for the surface area of the major planar surface;

a first major planar surface and a second major planar surface substantially parallel to the first major planar surface, wherein the distance between the first major planar surface and second major planar surface comprises a nDimension variation of not greater than 100 $\mu m/cm^2$, wherein nDimension variation is the variation in the dimension between the first and second major planar surfaces normalized to the area of the first or second major planar surfaces;

or any combination of a)-d).

Embodiment 234. The abrasive article of Embodiment 233, wherein nWarp is not greater than 40 $\mu m/cm^2$ or not greater than 30 $\mu m/cm^2$, or not greater than 20 $\mu m/cm^2$, or not greater than 10 $\mu m/cm^2$, or not greater than or not greater than 9 $\mu m/cm^2$, or not greater than 8 $\mu m/cm^2$, or not greater than 7 $\mu m/cm^2$, or not greater than 6 $\mu m/cm^2$, or not greater than 5 $\mu m/cm^2$, or not greater than 4 $\mu m/cm^2$, or not greater than 3 $\mu m/cm^2$, or not greater than 2 $\mu m/cm^2$, or not greater than 1 $\mu m/cm^2$, or not greater than 0.9 $\mu m/cm^2$, or not greater than 0.8 $\mu m/cm^2$, or not greater than 0.7 $\mu m/cm^2$, or not greater than 0.6 $\mu m/cm^2$, or not greater than 0.5 $\mu m/cm^2$, or not greater than 0.4 $\mu m/cm^2$, or not greater than 0.3 $\mu m/cm^2$, or not greater than 0.2 $\mu m/cm^2$, or not greater than 0.1 $\mu m/cm^2$, or not greater than 0.09 $\mu m/cm^2$, or not greater than 0.08 $\mu m/cm^2$, or not greater than 0.07 $\mu m/cm^2$, or not greater than 0.06 $\mu m/cm^2$, or not greater than 0.05 $\mu m/cm^2$, or not greater than 0.04 $\mu m/cm^2$, or not greater than 0.03 $\mu m/cm^2$ or not greater than 0.02 $\mu m/cm^2$, or not greater than 0.01 $\mu m/cm^2$.

Embodiment 235. The abrasive article of Embodiment 233, wherein nWarp is at least 0.0001 $\mu m/cm^2$, or at least 0.0005 $\mu m/cm^2$, or at least 0.001 $\mu m/cm^2$, or at least 0.005 $\mu m/cm^2$, or at least 0.01 $\mu m/cm^2$, or at least 0.1 $\mu m/cm^2$.

Embodiment 236. The abrasive article of Embodiment 233, wherein nFlatness is not greater than 40 $\mu m/cm^2$, or not greater than 30 $\mu m/cm^2$, or not greater than 20 $\mu m/cm^2$, or not greater than 10 $\mu m/cm^2$, or not greater than or not greater than 9 $\mu m/cm^2$, or not greater than 8 $\mu m/cm^2$, or not greater than 7 $\mu m/cm^2$, or not greater than 6 $\mu m/cm^2$, or not greater than 5 $\mu m/cm^2$, or not greater than 4 $\mu m/cm^2$, or not greater than 3 $\mu m/cm^2$, or not greater than 2 $\mu m/cm^2$, or not greater than 1 $\mu m/cm^2$, or not greater than 0.9 $\mu m/cm^2$, or not greater than 0.8 $\mu m/cm^2$, or not greater than 0.7 $\mu m/cm^2$, or not greater than 0.6 $\mu m/cm^2$, or not greater than 0.5 $\mu m/cm^2$ or not greater than 0.4 $\mu m/cm^2$, or not greater than 0.3 $\mu m/cm^2$, or not greater than 0.2 $\mu m/cm^2$ or not greater than 0.1 $\mu m/cm^2$, or not greater than 0.09 $\mu m/cm^2$, or not greater than 0.08 $\mu m/cm^2$ or not greater than 0.07 $\mu m/cm^2$, or not greater than 0.06 $\mu m/cm^2$, or not greater than 0.05 $\mu m/cm^2$ or not greater than 0.04 $\mu m/cm^2$, or not greater than 0.03 $\mu m/cm^2$, or not greater than 0.02 $\mu m/cm^2$ or not greater than 0.01 $\mu m/cm^2$.

Embodiment 237. The abrasive article of Embodiment 233, wherein nWarp is at least 0.0001 $\mu m/cm^2$, or at least 0.0005 $\mu m/cm^2$, or at least 0.001 $\mu m/cm^2$, or at least 0.005 $\mu m/cm^2$, or at least 0.01 $\mu m/cm^2$, or at least 0.1 $\mu m/cm^2$.

Embodiment 238. The abrasive article of Embodiment 233, wherein nBow is not greater 40 $\mu m/cm^2$ or not greater than 30 $\mu m/cm^2$, or not greater than 20 $\mu m/cm^2$, or not greater than 10 $\mu m/cm^2$, or not greater than 9 $\mu m/cm^2$, or not greater than 8 $\mu m/cm^2$, or not greater than 7 $\mu m/cm^2$, or not greater than 6 $\mu m/cm^2$, or not greater than 5 $\mu m/cm^2$ or not greater than 4 $\mu m/cm^2$, or not greater than 3 $\mu m/cm^2$, or not greater than 2 $\mu m/cm^2$, or not greater than 1 $\mu m/cm^2$, or not greater than 0.9 $\mu m/cm^2$, or not greater than 0.8 $\mu m/cm^2$, or not greater than 0.7 $\mu m/cm^2$, or not greater than 0.6 $\mu m/cm^2$, or not greater than 0.5 $\mu m/cm^2$, or not greater than 0.4 $\mu m/cm^2$, or not greater than 0.3 $\mu m/cm^2$, or not greater than 0.2 $\mu m/cm^2$, or not greater than 0.1 $\mu m/cm^2$, or not greater than 0.09 $\mu m/cm^2$, or not greater than 0.08 $\mu m/cm^2$, or not greater than 0.07 $\mu m/cm^2$, or not greater than 0.06 $\mu m/cm^2$, or not greater than 0.05 $\mu m/cm^2$, or not greater than 0.04 $\mu m/cm^2$, or not greater than 0.03 $\mu m/cm^2$, or not greater than 0.02 $\mu m/cm^2$, or not greater than 0.01 $\mu m/cm^2$.

Embodiment 239. The abrasive article of Embodiment 233, wherein nBow is at least 0.0001 $\mu m/cm^2$, or at least 0.0005 $\mu m/cm^2$, or at least 0.001 $\mu m/cm^2$, or at least 0.005 $\mu m/cm^2$, or at least 0.01 $\mu m/cm^2$, or at least 0.1 $\mu m/cm^2$.

Embodiment 240. The abrasive article of Embodiment 233, wherein nDimension variation is not greater than 90 $\mu m/cm^2$, or not greater than 80 $\mu m/cm^2$, or not greater than 70 $\mu m/cm^2$, or not greater than 60 $\mu m/cm^2$, or not greater than 50 $\mu m/cm^2$, or not greater than 40 $\mu m/cm^2$, or not greater than 30 $\mu m/cm^2$, or not greater than 20 $\mu m/cm^2$, or not greater than 10 $\mu m/cm^2$, or not greater than 9 $\mu m/cm^2$, or not greater than 8 µm/cm², or not greater than 7 µm/cm², or not greater than 6 µm/cm², or not greater than 5 µm/cm², or not greater than 4 µm/cm², or not greater than 3 µm/cm², or not greater than 2 µm/cm², or not greater than 1 µm/cm², or not greater than 0.9 µm/cm², or not greater than 0.8 µm/cm², or not greater than 0.7 µm/cm², or not greater than 0.6 µm/cm², or not greater than 0.5 µm/cm², or not greater than 0.4 µm/cm², or not greater than 0.3 µm/cm², or not greater than 0.2 µm/cm², or not greater than 0.1 µm/cm², or not greater than 0.09 µm/cm², or not greater than 0.08 µm/cm², or not greater than 0.07 µm/cm², or not greater than 0.06 µm/cm², or not greater than 0.05 µm/cm², or not greater than 0.04 µm/cm², or not greater than 0.03 µm/cm², or not greater than 0.02 µm/cm², or not greater than 0.01 µm/cm².

Embodiment 241. The abrasive article of Embodiment 233, wherein nDimension variation is at least 0.0001 µm/cm², or at least 0.0005 µm/cm², or at least 0.001 µm/cm², or at least 0.005 µm/cm², or at least 0.01 µm/cm², or at least 0.1 µm/cm², or at least 1 µm/cm², or at least 5 µm/cm².

Embodiment 242. The abrasive article of Embodiment 233, wherein the body comprises at least one of:
  i. a length of at least 6 cm;
  ii. a width of at least 2.8 cm;
  iii. a solid volume of at least 9 cm³;
  iv. or any combination of any one of i., ii., and iii.

Embodiment 243. The abrasive article of Embodiment 242, wherein the body comprises a thickness of at least 1 mm and not greater than 50 cm.

Embodiment 244. The abrasive article of Embodiment 242, wherein the body comprises a thickness of not greater than 0.9 mm and at least 0.1 microns.

Embodiment 245. The abrasive article of Embodiment 242, wherein the length of the body is at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm, or at least 18 cm, or at least 20 cm.

Embodiment 246. The abrasive article of Embodiment 242, wherein the length of the body is not greater than 100 cm, or not greater than 90 cm, or not greater than 80 cm, or not greater than 70 cm, or not greater than 60 cm, or not greater than 50 cm, or not greater than 40 cm, or not greater than 30 cm, or not greater than 25 cm.

Embodiment 247. The abrasive article of Embodiment 242, wherein the width is at least 3 cm, or at least 3.5 cm, or at least 4 cm, or at least 4.5 cm, or at least 5 cm, or at least 5.5 cm, or at least 6 cm, or at least 6.5 cm, or at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm.

Embodiment 248. The abrasive article of Embodiment 242, wherein the width is not greater than 500 cm, or not greater than 450 cm, or not greater than 400 cm, or not greater than 350 cm, or not greater than 300 cm, or not greater than 250 cm, or not greater than 200 cm, or not greater than 150 cm, or not greater than 100 cm.

Embodiment 249. The abrasive article of Embodiment 242, wherein the volume is at least 10 cm³, or at least 11 cm³, or at least 12 cm³, or at least 13 cm³, or at least 14 cm³, or at least 15 cm³, or at least 16 cm³, or at least 17 cm³, or at least 18 cm³, or at least 19 cm³, or at least 20 cm³, or at least 21 cm³, or at least 22 cm³, or at least 23 cm³, or at least 24 cm³, or at least 25 cm³, or at least 26 cm³, or at least 27 cm³, or at least 28 cm³, or at least 29 cm³, or at least 30 cm³, or at least 31 cm³, or at least 32 cm³, or at least 33 cm³, or at least 34 cm³, or at least 35 cm³, or at least 36 cm³, or at least 37 cm³, or at least 38 cm³, or at least 39 cm³, or at least 40 cm³, or at least 42 cm³, or at least 44 cm³, or at least 46 cm³, or at least 48 cm³, or at least 50 cm³.

Embodiment 250. The abrasive article of Embodiment 242, wherein the volume is not greater than 5000 cm³, or not greater than 4000 cm³, or not greater than 3000 cm³, or not greater than 2000 cm³, or not greater than 1000 cm³, or not greater than 800 cm³, or not greater than 600 cm³, or not greater than 500 cm³.

Embodiment 251. The abrasive article of Embodiment 233, wherein the body has a primary aspect ratio (length:width) of at least 1:1, or at least 1.1:1, or at least 1.2:1, or at least 1.3:1, or at least 1.4:1, or at least 1.5:1, or at least 1.8:1, or at least 2:1, or at least 3:1, or at least 4:1, or at least 5:1, or at least 6:1, or at least 7:1, or at least 8:1, or at least 9:1, or at least 10:1.

Embodiment 252. The abrasive article of Embodiment 233, wherein the body has a primary aspect ratio (length:width) of not greater than 10000:1, or not greater than 5000:1, or not greater than 1000:1, or not greater than 500:1, or not greater than 200:1, or not greater than 100:1, or not greater than 50:1.

Embodiment 253. The abrasive article of Embodiment 233, wherein the body has a secondary aspect ratio (length:thickness) that is the same as any of the ratios for primary aspect ratio.

Embodiment 254. The abrasive article of Embodiment 233, wherein the body has a tertiary aspect ratio (width:thickness) that is the same as any of the ratios for primary aspect ratio.

Embodiment 255. The abrasive article of Embodiment 233, wherein the body comprises a length, a width, and a thickness, and wherein length>width>thickness.

Embodiment 256. The abrasive article of Embodiment 233, wherein the body is free of an infiltrant.

Embodiment 257. The abrasive article of Embodiment 233, wherein the body comprises a theoretical density of at least 50%, or at least 51%, or at least 53%, or at least 54%, or at least 55%, or at least 56%, or at least 57%, or at least 58%, or at least 59%, or at least 60%, or at least 61%, or at least 62%, or at least 63%, or at least 64%, or at least 65%, or at least 66%, or at least 67%, or at least 68%, or at least 69%, or at least 70%, or at least 71%, or at least 72%, or at least 73%, or at least 74%, or at least 75%, or at least 76%, or at least 77%, or at least 78%, or at least 79%, or at least 80%, or at least 81%, or at least 82%, or at least 83%, or at least 84%, or at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%.

Embodiment 258. The abrasive article of Embodiment 233, wherein the body comprises a theoretical density of not greater than 99.9%, or not greater than 99.5%, or not greater than 99%.

Embodiment 259. The abrasive article of Embodiment 233, wherein the body includes any one or more features of any other body, green body or finally-formed body, embodied or disclosed herein.

Embodiment 260. The abrasive article of Embodiment 233, wherein the body comprises at least one of:
  a MOR variation-L of not greater than 20% of an average MOR value of the body, wherein MOR variation-L is measured along a length of the body;

a MOR variation-W of not greater than 20% of an average MOR value of the body, wherein MOR variation-W is measured along a width of the body;

a MOR variation-T of not greater than 20% of an average MOR value of the body, wherein MOR variation-T is measured along a thickness of the body;

a MOE variation-L of not greater than 20% of an average MOE value of the body, wherein MOE variation-L is measured along a length of the body;

a MOE variation-W of not greater than 20% of an average MOE value of the body, wherein MOE variation-W is measured along a width of the body;

a MOE variation-T of not greater than 20% of an average MOE value of the body, wherein MOE variation-T is measured along a thickness of the body;

or any combination of a)-f).

Embodiment 261. The abrasive article of Embodiment 233, wherein the body further comprises at least one of:
a) a density variation-L of not greater than 20% of an average density value of the body, wherein density variation-L is measured along a length of the body;
b) a density variation-W of not greater than 20% of an average density value of the body, wherein density variation-W is measured along a width of the body;
c) a density variation-T of not greater than 20% of an average density value of the body, wherein density variation-T is measured along a thickness of the body; and
d) any combination of a)-c).

Embodiment 262. The abrasive article of Embodiment 233, wherein the body further comprises at least one of:
a dimensional variation-L of not greater than 90% of an average dimensional value of the body, wherein dimensional variation-L is measured along a length of the body;
a dimensional variation-W of not greater than 90% of an average dimensional value of the body, wherein dimensional variation-W is measured along a width of the body;
a dimensional variation-T of not greater than 90% of an average dimensional value of the body, wherein dimensional variation-T is measured along a thickness of the body; and
any combination of a)-c).

Embodiment 263. A batch of abrasive articles comprising:
a plurality of bodies in the form of two or more green body abrasive articles or two or more finally-formed abrasive articles, the plurality of bodies including abrasive particles contained in a bond material, wherein each body comprises at least one of:
a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%; and
or a combination of any one of 1), 2), and 3) wherein the plurality of bodies comprises at least one of:
a) a batch density variation of not greater than 20% of an average density value of the batch;
b) a batch dimensional variation-L of not greater than 90% of an average length value of the batch, wherein dimensional variation-L is measured along a length of each of the bodies in the batch;
c) a batch hardness variation of not greater than 20% of an average density value of the batch;
d) a batch MOR variation of not greater than 20% of an average MOR value of the batch;
e) a batch MOE variation of not greater than 20% of an average MOE value of the batch;
f) a batch nWarp standard deviation of not greater than 10, wherein batch nWarp variation is the standard deviation of nWarp for all bodies of the same shape in a batch;
g) a batch nFlatness standard deviation of not greater than 10, wherein batch nFlatness variation is the standard deviation of nFlatness for all bodies of the same shape in a batch;
h) a batch nBow standard deviation of not greater than 10, wherein batch nBow standard deviation is the standard deviation of nBow for all bodies of the same shape in a batch;
i) a batch nDimensional standard deviation of not greater than 50, wherein batch nDimensional standard deviation is the standard deviation of nDimension variation for all bodies of the same shape in a batch;
j) or any combination of a)-i).

Embodiment 264. The abrasive article of Embodiment 263, wherein the batch density variation is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 265. The abrasive article of Embodiment 263, wherein the batch density variation is at least 0.00001%, or at least 0.0001%.

Embodiment 266. The abrasive article of Embodiment 264, wherein the batch density variation is calculated by measuring the density of each body of the plurality of bodies made via a single operation, wherein the batch density variation is a measure of the percent difference between an average density value of the batch and a density value from a body having the greatest difference, plus or minus, in density from the average density value of the batch. Note that multiple density values can be taken for each body of the plurality of bodies in the batch, and any of the density values taken from a body is relevant for comparison and calculation of the batch density variation. Each density value of the body may be averaged to create an average body density value for each discrete body in the batch. The average batch density value can be calculated by averaging the average density values for each body of the batch. The number of density values for a body or batch should be of a suitable statistically relevant sample size.

Embodiment 267. The abrasive article of Embodiment 263, wherein the batch dimensional variation-L is not greater than 89%, or not greater than 88%, or not greater than 87%, or not greater than 86%, or not greater than 85%, or not greater than 84%, or not greater than 83%, or not greater than 82%, or not greater than 81%, or not greater than 80%, or not greater than 79%, or not greater than 78%, or not greater than 77%, or not greater than 76%, or not greater than 75%, or not greater than 74%, or not greater than 73%, or not greater than 72%, or not greater than 71%, or not greater than 70%, or not greater than 69%, or not greater than 68%, or not greater than 67%, or not greater than 66%, or not greater than 65%, or not greater than 64%, or not greater than 63%, or not greater than 62%, or not greater than 61%, or not greater than 60%, or not greater than 59%, or not greater than 58%, or not greater than 57%, or not greater than 56%, or not greater than 55%, or not greater than 54%, or not greater than 53%, or not greater than 52%, or not greater than 51%, or not greater than 50%, or not greater than 49%, or not greater than 48%, or not greater than 47%, or not greater than 46%, or not greater than 45%, or not greater than 44%, or not greater than 43%, or not greater than 42%, or not greater than 41%, or not greater than 40%, or not greater than 39%, or not greater than 38%, or not greater than 37%, or not greater than 36%, or not greater than 35%, or not greater than 34%, or not greater than 33%, or not greater than 32%, or not greater than 31%, or not greater than 30%, or not greater than 29%, or not greater than 28%, or not greater than 27%, or not greater than 26%, or not greater than 25%, or not greater than 24%, or not greater than 23%, or not greater than 22%, or not greater than 21%, or not greater than 20%, or not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%.

Embodiment 268. The abrasive article of Embodiment 263, wherein the batch dimensional variation-L is at least 0.0001%, or at least 0.001%, or at least 0.01%, or at least 0.1%.

Embodiment 269. The abrasive article of Embodiment 267, wherein the batch dimensional variation-L is calculated by measuring the length of each body of the plurality of bodies made via a single operation, wherein the batch dimensional variation-L is the percent difference between an average length of same-shaped bodies of a batch and a length value of a body having the greatest difference, plus or minus, in length from the average length value of the batch. Note that multiple length values can be taken for each body of the plurality of bodies in the batch, and any of the length values taken from a body is relevant for comparison and calculation of the batch dimensional variation-L. More than one length measurement may be made on an individual body and averaged to create an average length value for each discrete body in the batch. An average length value of the batch can be calculated by averaging the average length values for each same-shaped body of the batch. The number of length values for a body or the batch should be of a suitable statistically relevant sample size.

Embodiment 270. The abrasive article of Embodiment 263, wherein the batch hardness variation is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 271. The abrasive article of Embodiment 263, wherein the batch hardness variation is at least 0.00001%, or at least 0.0001%.

Embodiment 272. The abrasive article of Embodiment 270, wherein the batch hardness variation is calculated by measuring the hardness of each body of the plurality of bodies made via a single operation, wherein the batch hardness variation is a measure of the percent difference between an average hardness value of the batch and a hardness value from a body having the greatest difference, plus or minus, in hardness from the average hardness value of the batch. Note that multiple hardness values can be taken for each body of the plurality of bodies in the batch, and any of the hardness values taken from a body is relevant for comparison and calculation of the batch hardness variation. Each hardness value of the body may be averaged to create an average body hardness value for each discrete body in the batch. The average batch hardness value can be calculated by averaging the average hardness values for each body of the batch. The number of hardness values for a body or batch should be of a suitable statistically relevant sample size.

Embodiment 273. The abrasive article of Embodiment 263, further comprising a batch dimensional variation-W, of not greater than 90% of an average width value of the bodies of the batch, wherein dimensional variation-W is measured along a width of each of the bodies in the batch, wherein the batch dimensional variation-W is not greater than 89%, or not greater than 88%, or not greater than 87%, or not greater than 86%, or not greater than 85%, or not greater than 84%, or not greater than 83%, or not greater than 82%, or not greater than 81%, or not greater than 80%, or not greater than 79%, or not greater than 78%, or not greater than 77%, or not greater than 76%, or not greater than 75%, or not greater than 74%, or not greater than 73%, or not greater than 72%, or not greater than 71%, or not greater than 70%, or not greater than 69%, or not greater than 68%, or not greater than 67%, or not greater than 66%, or not greater than 65%, or not greater than 64%, or not greater than 63%, or not greater than 62%, or not greater than 61%, or not greater than 60%, or not greater than 59%, or not greater than 58%, or not greater than 57%, or not greater than 56%, or not greater than 55%, or not greater than 54%, or not greater than 53%, or not greater than 52%, or not greater than 51%, or not greater than 50%, or not greater than 49%, or not greater than 48%, or not greater than 47%, or not greater than 46%, or not greater than 45%, or not greater than 44%, or not greater than 43%, or not greater than 42%, or not greater than 41%, or not greater than 40%, or not greater than 39%, or not greater than 38%, or not greater than 37%, or not greater than 36%, or not greater than 35%, or not greater than 34%, or not greater than 33%, or not greater than 32%, or not greater than 31%, or not greater than 30%, or not greater than 29%, or not greater than 28%, or not greater than 27%, or not greater than 26%, or not greater than 25%, or not greater than 24%, or not greater than 23%, or not greater than 22%, or not greater than 21%, or not greater than 20%, or not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%.

Embodiment 274. The abrasive article of Embodiment 273, wherein the batch dimensional variation-W is calculated by measuring the width of each body of the plurality of bodies made via a single operation, wherein the batch dimensional variation-W is the percent difference between an average width of same-shaped bodies of a batch and a width value of a body having the greatest difference, plus or minus, in width from the average width value of the batch.

Note that multiple width values can be taken for each body of the plurality of bodies in the batch, and any of the width values taken from a body is relevant for comparison and calculation of the batch dimensional variation-W. More than one width measurement may be made on an individual body and averaged to create an average width value for each discrete body in the batch. An average width value of the batch can be calculated by averaging the average width values for each same-shaped body of the batch. The number of width values for a body or the batch should be of a suitable statistically relevant sample size.

Embodiment 275. The abrasive article of Embodiment 263, further comprising a batch dimensional variation-T, of not greater than 90% of an average thickness value of the bodies of the batch, wherein dimensional variation-T is measured along a thickness of each of the bodies in the batch, wherein the batch dimensional variation-T is not greater than 89%, or not greater than 88%, or not greater than 87%, or not greater than 86%, or not greater than 85%, or not greater than 84%, or not greater than 83%, or not greater than 82%, or not greater than 81%, or not greater than 80%, or not greater than 79%, or not greater than 78%, or not greater than 77%, or not greater than 76%, or not greater than 75%, or not greater than 74%, or not greater than 73%, or not greater than 72%, or not greater than 71%, or not greater than 70%, or not greater than 69%, or not greater than 68%, or not greater than 67%, or not greater than 66%, or not greater than 65%, or not greater than 64%, or not greater than 63%, or not greater than 62%, or not greater than 61%, or not greater than 60%, or not greater than 59%, or not greater than 58%, or not greater than 57%, or not greater than 56%, or not greater than 55%, or not greater than 54%, or not greater than 53%, or not greater than 52%, or not greater than 51%, or not greater than 50%, or not greater than 49%, or not greater than 48%, or not greater than 47%, or not greater than 46%, or not greater than 45%, or not greater than 44%, or not greater than 43%, or not greater than 42%, or not greater than 41%, or not greater than 40%, or not greater than 39%, or not greater than 38%, or not greater than 37%, or not greater than 36%, or not greater than 35%, or not greater than 34%, or not greater than 33%, or not greater than 32%, or not greater than 31%, or not greater than 30%, or not greater than 29%, or not greater than 28%, or not greater than 27%, or not greater than 26%, or not greater than 25%, or not greater than 24%, or not greater than 23%, or not greater than 22%, or not greater than 21%, or not greater than 20%, or not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%.

Embodiment 276. The abrasive article of Embodiment 275, wherein the batch dimensional variation-T is calculated by measuring the thickness of each body of the plurality of bodies made via a single operation, wherein the batch dimensional variation-T is the percent difference between an average thickness of same-shaped bodies of a batch and a thickness value of a body having the greatest difference, plus or minus, in thickness from the average thickness value of the batch. Note that multiple thickness values can be taken for each body of the plurality of bodies in the batch, and any of the thickness values taken from a body is relevant for comparison and calculation of the batch dimensional variation-T. More than one thickness measurement may be made on an individual body and averaged to create an average thickness value for each discrete body in the batch. An average thickness value of the batch can be calculated by averaging the average thickness values for each same-shaped body of the batch. The number of thickness values for a body or the batch should be of a suitable statistically relevant sample size.

Embodiment 277. The abrasive article of Embodiment 263, wherein the batch MOR variation is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 278. The abrasive article of Embodiment 277, wherein the batch MOR variation is at least 0.00001%, or at least 0.0001%.

Embodiment 279. The abrasive article of Embodiment 277, wherein the batch MOR variation is calculated by measuring the MOR of each body of the plurality of bodies made via a single operation, wherein the batch MOR variation is a measure of the percent difference between an average MOR value of the batch and a MOR value from a body having the greatest difference, plus or minus, in MOR from the average MOR value of the batch. The number of MOR values for a batch should be of a suitable statistically relevant sample size.

Embodiment 280. The abrasive article of Embodiment 263, wherein the batch MOE variation is not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2%, or not greater than 1%, or not greater than 0.5%, or not greater than 0.3%, or not greater than 0.1%.

Embodiment 281. The abrasive article of Embodiment 280, wherein the batch MOE variation is at least 0.00001%, or at least 0.0001%.

Embodiment 282. The abrasive article of Embodiment 280, wherein the batch MOE variation is calculated by measuring the MOE of each body of the plurality of bodies made via a single operation, wherein the batch MOE variation is a measure of the percent difference between an average MOE value of the batch and a MOE value from a body having the greatest difference, plus or minus, in MOE from the average MOE value of the batch. The number of MOE values for a batch should be of a suitable statistically relevant sample size.

Embodiment 283. The abrasive article of Embodiment 263, wherein the batch nWarp standard deviation is not greater than 9, or not greater than 8, or not greater than 7, or not greater than 6, or not greater than 5, or not greater than 4, or not greater than 3, or not greater than 2, or not greater than 1, or not greater than 0.9, or not greater than 0.8, or not greater than 0.7, or not greater than 0.6, or not greater than 0.5, or not greater than 0.4, or not greater than 0.3, or not greater than 0.2, or not greater than 0.1, or not greater than 0.09, or not greater than 0.08, or not greater than 0.07, or not greater than 0.06, or not greater than 0.05, or not greater than 0.04, or not greater than 0.03, or not greater than 0.02, or not greater than 0.01.

Embodiment 284. The abrasive article of Embodiment 283, wherein the batch nWarp standard deviation is at least 0.0005, or at least 0.001, or at least 0.005, or at least 0.01, or at least 0.1.

Embodiment 285. The abrasive article of Embodiment 263, wherein the batch nFlatness standard deviation is not greater than 9, or not greater than 8, or not greater than 7, or not greater than 6, or not greater than 5, or not greater than 4, or not greater than 3, or not greater than 2, or not greater than 1, or not greater than 0.9, or not greater than 0.8, or not greater than 0.7, or not greater than 0.6, or not greater than 0.5, or not greater than 0.4, or not greater than 0.3, or not greater than 0.2, or not greater than 0.1, or not greater than 0.09, or not greater than 0.08, or not greater than 0.07, or not greater than 0.06, or not greater than 0.05, or not greater than 0.04, or not greater than 0.03, or not greater than 0.02, or not greater than 0.01.

Embodiment 286. The abrasive article of Embodiment 285, wherein the batch nFlatness standard deviation is at least 0.0005, or at least 0.001, or at least 0.005, or at least 0.01, or at least 0.1.

Embodiment 287. The abrasive article of Embodiment 263, wherein the batch nBow standard deviation is not greater than 9, or not greater than 8, or not greater than 7, or not greater than 6, or not greater than 5, or not greater than 4, or not greater than 3, or not greater than 2, or not greater than 1, or not greater than 0.9, or not greater than 0.8, or not greater than 0.7, or not greater than 0.6, or not greater than 0.5, or not greater than 0.4, or not greater than 0.3, or not greater than 0.2, or not greater than 0.1, or not greater than 0.09, or not greater than 0.08, or not greater than 0.07, or not greater than 0.06, or not greater than 0.05, or not greater than 0.04, or not greater than 0.03, or not greater than 0.02, or not greater than 0.01.

Embodiment 288. The abrasive article of Embodiment 287, wherein the batch nBow standard deviation is at least 0.0005, or at least 0.001, or at least 0.005, or at least 0.01, or at least 0.1.

Embodiment 289. The abrasive article of Embodiment 263, wherein the batch nDimensional variation standard deviation is not greater than 40, or not greater than 30, or not greater than 20, or not greater than 10, or not greater than 9, or not greater than 8, or not greater than 7, or not greater than 6, or not greater than 5, or not greater than 4, or not greater than 3, or not greater than 2, or not greater than 1, or not greater than 0.9, or not greater than 0.8, or not greater than 0.7, or not greater than 0.6, or not greater than 0.5, or not greater than 0.4, or not greater than 0.3, or not greater than 0.2, or not greater than 0.1, or not greater than 0.09, or not greater than 0.08, or not greater than 0.07, or not greater than 0.06, or not greater than 0.05, or not greater than 0.04, or not greater than 0.03, or not greater than 0.02, or not greater than 0.01.

Embodiment 290. The abrasive article of Embodiment 263, wherein the batch nDimensional variation standard deviation is at least 0.005, or at least 0.001, or at least 0.005, or at least 0.01, or at least 0.1, or at least 1, or at least 5.

Embodiment 291. The abrasive article of Embodiment 263, wherein the finally-formed abrasive articles of the batch have a residual stress in an exterior surface from post-forming operations that is at least 1% less than residual stress in conventionally-formed abrasive articles or wherein the residual stress is at least 2% less, or at least 3% less, or at least 4% less, or at least 5% less, or at least 6% less, or at least 7% less, or at least 8% less, or at least 9% less, or at least 10% less, or at least 11% less, or at least 12% less, or at least 13% less, or at least 14% less, or at least 15% less, or at least 16% less, or at least 17% less, or at least 18% less, or at least 19% less, or at least 20% less, or at least 25% less, or at least 30% less, or at least 35% less, or at least 40% less, or at least 45% less, or at least 50% less, or at least 55% less, or at least 60% less, or at least 65% less, or at least 70% less, or at least 75% less, or at least 80% less, or at least 85% less, or at least 90% less, or at least 95% less, or at least 100% less.

Embodiment 292. The abrasive article of Embodiment 263, wherein the residual stress is not greater than 500% less than residual stress in conventionally-formed abrasive articles or not greater than 400% less, or not greater than 300% less, or not greater than 200% less, or not greater than 100% less, or not greater than 90% less.

Embodiment 293. The abrasive article of Embodiment 263, wherein each body of the plurality of bodies comprises at least one of:
  i. a length of at least 6 cm;
  ii. a width of at least 2.8 cm; and
  iii. any combination of any one of i. and ii.

Embodiment 294. The abrasive article of Embodiment 293, wherein each body of the plurality of bodies comprises a thickness of at least 1 mm and not greater than 50 cm.

Embodiment 295. The abrasive article of Embodiment 293, wherein each body of the plurality of bodies comprises a thickness of not greater than 0.9 mm and at least 0.1 microns.

Embodiment 296. The abrasive article of Embodiment 293, wherein the length of each body is at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm, or at least 18 cm, or at least 20 cm.

Embodiment 297. The abrasive article of Embodiment 293, wherein the length of each body is not greater than 100 cm, or not greater than 90 cm, or not greater than 80 cm, or not greater than 70 cm, or not greater than 60 cm, or not greater than 50 cm, or not greater than 40 cm, or not greater than 30 cm, or not greater than 25 cm.

Embodiment 298. The abrasive article of Embodiment 293, wherein the width of each body is at least 3 cm, or at least 3.5 cm, or at least 4 cm, or at least 4.5 cm, or at least 5 cm, or at least 5.5 cm, or at least 6 cm, or at least 6.5 cm, or at least 7 cm, or at least 7.5 cm, or at least 8 cm, or at least 8.5 cm, or at least 9 cm, or at least 9.5 cm, or at least 10 cm, or at least 10.5 cm, or at least 11 cm, or at least 12 cm, or at least 13 cm, or at least 14 cm, or at least 15 cm.

Embodiment 299. The abrasive article of Embodiment 293, wherein the width of each body is not greater than 500 cm, or not greater than 450 cm, or not greater than 400 cm, or not greater than 350 cm, or not greater than 300 cm, or not greater than 250 cm, or not greater than 200 cm, or not greater than 150 cm, or not greater than 100 cm.

Embodiment 300. The abrasive article of Embodiment 263, wherein the volume of the plurality of bodies of the batch includes a batch volume is at least 10 cm$^3$, or at least 11 cm$^3$, or at least 12 cm$^3$, or at least 13 cm$^3$, or at least 14 cm$^3$, or at least 15 cm$^3$, or at least 16 cm$^3$, or at least 17 cm$^3$, or at least 18 cm$^3$, or at least 19 cm$^3$, or at least 20 cm$^3$, or at least 21 cm$^3$, or at least 22 cm$^3$, or at least 23 cm$^3$, or at least 24 cm$^3$, or at least 25 cm$^3$, or at least 26 cm$^3$, or at least 27 cm$^3$, or at least 28 cm$^3$, or at least 29 cm$^3$, or at least 30 cm$^3$, or at least 31 cm$^3$, or at least 32 cm$^3$, or at least 33 cm$^3$, or at least 34 cm³, or at least 35 cm³, or at least 36 cm³, or at least 37 cm³, or at least 38 cm³, or at least 39 cm³, or at least 40 cm³, or at least 42 cm³, or at least 44 cm³, or at least 46 cm³, or at least 48 cm³, or at least 50 cm³.

Embodiment 301. The abrasive article of Embodiment 263, wherein the volume of the plurality of bodies of the batch includes a batch volume is not greater than 5000 cm³, or not greater than 4000 cm³, or not greater than 3000 cm³, or not greater than 2000 cm³, or not greater than 1000 cm³, or not greater than 800 cm³, or not greater than 600 cm³, or not greater than 500 cm³.

Embodiment 302. The abrasive article of Embodiment 263, wherein each body of the plurality of bodies has a primary aspect ratio (length:width) of at least 1:1, or at least 1.1:1, or at least 1.2:1, or at least 1.3:1, or at least 1.4:1, or at least 1.5:1, or at least 1.8:1, or at least 2:1, or at least 3:1, or at least 4:1, or at least 5:1, or at least 6:1, or at least 7:1, or at least 8:1, or at least 9:1, or at least 10:1.

Embodiment 303. The abrasive article of Embodiment 263, wherein each body of the plurality of bodies has a primary aspect ratio (length:width) of not greater than 10000:1, or not greater than 5000:1, or not greater than 1000:1, or not greater than 500:1, or not greater than 200:1, or not greater than 100:1, or not greater than 50:1.

Embodiment 304. The abrasive article of Embodiment 263, wherein each body of the plurality of bodies has a secondary aspect ratio (length:thickness) that is the same as any of the ratios for primary aspect ratio provided in either of Embodiments 302 or 303.

Embodiment 305. The abrasive article of Embodiment 263, wherein each body of the plurality of bodies has a tertiary aspect ratio (width:thickness) that is the same as any of the ratios for primary aspect ratio provided in either of Embodiments 302 or 303.

Embodiment 306. The abrasive article of Embodiment 263, wherein each body of the plurality of bodies has a length, a width, and a thickness, and wherein length>width>thickness.

Embodiment 307. The abrasive article of Embodiment 263, wherein each body of the plurality of bodies is free of an infiltrant.

Embodiment 308. The abrasive article of Embodiment 263, wherein each body of the plurality of bodies has a theoretical density of at least 50%, or at least 51%, or at least 53%, or at least 54%, or at least 55%, or at least 56%, or at least 57%, or at least 58%, or at least 59%, or at least 60%, or at least 61%, or at least 62%, or at least 63%, or at least 64%, or at least 65%, or at least 66%, or at least 67%, or at least 68%, or at least 69%, or at least 70%, or at least 71%, or at least 72%, or at least 73%, or at least 74%, or at least 75%, or at least 76%, or at least 77%, or at least 78%, or at least 79%, or at least 80%, or at least 81%, or at least 82%, or at least 83%, or at least 84%, or at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%.

Embodiment 309. The abrasive article of Embodiment 263, wherein each body of the plurality of bodies has a theoretical density of not greater than 99.9%, or not greater than 99.5%, or not greater than 99%.

Embodiment 310. The abrasive article of Embodiment 263, wherein each body of the plurality of bodies can include any one or more features of any other body, green body or finally-formed body, embodied or disclosed herein.

Embodiment 311. A finally-formed abrasive article comprising:
a body including abrasive particles contained in a bond material, wherein the body comprises at least one of:
a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%; and
or a combination of any one of 1), 2), and 3),
and wherein the body comprises at least one of:
a residual stress in an exterior surface that is at least 1% less than a residual stress in conventionally-formed abrasive article;
subsurface damage or residual stress that extends for at least 0.01% and not greater than 200% of an average particle size (D50) of the abrasive particles; and
a combination of a) and b).

Embodiment 312. The finally-formed abrasive article of Embodiment 311, wherein the residual stress is at least 2% less, or at least 3% less, or at least 4% less, or at least 5% less, or at least 6% less, or at least 7% less, or at least 8% less, or at least 9% less, or at least 10% less, or at least 11% less, or at least 12% less, or at least 13% less, or at least 14% less, or at least 15% less, or at least 16% less, or at least 17% less, or at least 18% less, or at least 19% less, or at least 20% less, or at least 25% less, or at least 30% less, or at least 35% less, or at least 40% less, or at least 45% less, or at least 50% less, or at least 55% less, or at least 60% less, or at least 65% less, or at least 70% less, or at least 75% less, or at least 80% less, or at least 85% less, or at least 90% less, or at least 95% less, or at least 100% less.

Embodiment 313. The finally-formed abrasive article of Embodiment 311, wherein the residual stress is not greater than 500% less than residual stress in conventionally-formed abrasive articles or not greater than 400% less, or not greater than 300% less, or not greater than 200% less, or not greater than 100% less, or not greater than 90% less.

Embodiment 314. The finally-formed abrasive article of Embodiment 311, wherein the subsurface damage or residual stress extends for a distance below an exterior surface of the body for at least 0.05% of the D50 of the abrasive particles or at least 0.08%, or at least 0.1%, or at least 0.5%, or at least 1%, or at least 2%, or at least 3%, or at least 4%, or at least 5%, or at least 6%, or at least 7%, or at least 8%, or at least 9%, or at least 10%, or at least 11%, or at least 12%, or at least 13%, or at least 14%, or at least 15%, or at least 18%, or at least 20%, or at least 22%, or at least 25%, or at least 28%, or at least 30%, or at least 32%, or at least 35%, or at least 38%, or at least 40%, or at least 42%, or at least 45%, or at least 48%, or at least 50%, or at least 52%, or at least 55%, or at least 58%, or at least 60%, or at least 62%, or at least 65%, or at least 67%, or at least 68%, or at least 70%, or at least 72%, or at least 75%, or at least 78%, or at least 80%, or at least 82%, or at least 85%, or at least 88%, or at least 90%, or at least 92%, or at least 95%, or at least 98%, or at least 100%, or at least 102%, or at least 105%, or at least 108%, or at least 110%, or at least 115%, or at least 120%, or at least 125%, or at least 130%, or at least 140%, or at least 150%, or at least 160%, or at least 170%, or at least 180% of the D50 of the abrasive particles.

Embodiment 315. The finally-formed abrasive article of Embodiment 311, wherein the subsurface damage or residual stress extends for a distance below an exterior surface of the body for not greater than 190% of the D50 of the abrasive particles or not greater than 180%, or not greater than 170%, or not greater than 160%, or not greater than 150%, or not greater than 140%, or not greater than 130%, or not greater than 120%, or not greater than 110%, or not greater than 100%, or not greater than 90%, or not greater than 80%, or not greater than 70%, or not greater than 60%, or not greater than 50%, or not greater than 40%, or not greater than 30%, or not greater than 20%, or not greater than 10% of the D50 of the abrasive particles.

Embodiment 316. The finally-formed abrasive article of Embodiment 311, wherein the body includes any one or more features of any other finally-formed body embodied or disclosed herein.

Embodiment 317. The abrasive article or method of forming according to any of the Embodiments herein, wherein body or method for forming the body defines a forming ratio (Add/Sub) of at least 10, wherein "Add" defines the volume of solid material (cm$^3$) formed via additive processes used to form the body and "Sub" defines the volume (cm$^3$) of solid material formed via a substrative process to finish the finally-formed body, wherein the forming ratio is at least 20, or at least 50, or at least 80, or at least 100, or at least 200, or at least 300, or at least 400, or at least 500, or at least 600, or at least 700, or at least 800, or at least 1000, or at least 5000, or at least 10000.

Embodiment 318. The abrasive article of any one of the Embodiments herein, wherein the abrasive articles are formed via binder jetting.

Embodiment 319. The abrasive article or method of forming an article according to any of the Embodiments, wherein reference to a length may be reference to a diameter of a circular shape or surface or reference to a primary axis of an elliptical shape or surface.

Embodiment 320. The abrasive article or method of forming an article according to any of the Embodiments, wherein reference to a width may be reference to a diameter of a circular shape or surface that is substantially perpendicular to a diameter defining the length or reference to a lateral (secondary) axis of an elliptical shape or surface that extends substantially perpendicular to the primary axis.

Embodiment 321. The abrasive article or method of forming an article according to any Embodiments herein, wherein the finally-formed abrasive article can have any one or more features of a green body as embodied or disclosed herein.

Embodiment 322. The abrasive articles of any of the Embodiments herein, wherein the green body or finally-formed abrasive article can be formed via any one or more methods embodied or disclosed herein.

Embodiment 323. The abrasive article or method of any of the Embodiments herein, wherein the Microstructure Feature is greater than 1, or at least 2, or at least 3, or at least 4, or at least 5, or at least 6, or at least 7.

Embodiment 324. The abrasive article or method of any of the Embodiments herein, wherein the body comprises a Microstructure Feature not greater than 10, or not greater than 9, or not greater than 8, or not greater than 7, or not greater than 6, or not greater than 5, or not greater than 4, or not greater than 3.

Embodiment 325. The abrasive article or method of any of the Embodiments herein, the Microstructure Feature comprises a Spacing Value of at least 0.01 or at least 0.03, or at least 0.04, or at least 0.06, or at least 0.08, or at least 0.1, or at least 0.2, at least 0.3, or at least 0.4, or at least 0.5 or at least 0.6, or at least 0.7, or at least 0.8, or at least 0.9, or at least 1, at least 1.1, or at least 1.3, or at least 1.4, or at least 1.5, or at least 1.6, or at least 1.8, or at least 1.9, or at least 2, or at least 2.1, or at least 2.3, or at least 2.5, or at least 2.6, or at least 2.8, or at least 3, or at least 3.1, or at least 3.3, or at least 3.5, or at least 3.6, or at least 3.8, or at least 4, at least 4.2, or at least 4.5, or at least 4.7, or at least 5, or at least 6, or at least 7, or at least 8, or at least 9, or at least 10, or at least 11, or at least 12, or at least 15, or at least 20, or at least 30, or at least, or at least 80, or at least 100, or at least 200, or at least 300, or at least 400, or at least 500.

Embodiment 326. The abrasive article or method of any of the Embodiments herein, wherein the Microstructure Feature comprises a Spacing Value of not greater than 2000, or not greater than 1000, or not greater than 500, or not greater than 400, or not greater than 300, or not greater than 200, or not greater than 100, or not greater than 80, or not greater than 50, or not greater than 40, or not greater than 30, or not greater than 20, or not greater than 10, or not greater than 9.8, not greater than 9.6, not greater than 9.5, not greater than 9.3, or not greater than 9, or not greater than 8.8, not greater than 8.6, not greater than 8.4, not greater than 8.2, or not greater than 8, or not greater than 7.8, not greater than 7.6, not greater than 7.4, not greater than 7.2, or not greater than 7, or not greater than 6.8, not greater than 6.6, not greater than 6.4, not greater than 6.2, or not greater than 6, or not greater than 5.8, not greater than 5.6, not greater than 5.5, not greater than 5.2, or not greater than 5, or not greater than 4.8, not greater than 4.6, not greater than 4.4, not greater than 4.2, or not greater than 4, or not greater than 3.8, not greater than 3.6, not greater than 3.4, not greater than 3.2, or not greater than 3, or not greater than 2.8, not greater than 2.6, not greater than 2.4, not greater than 2.2, or not greater than 2, or not greater than 1.8, or not greater than 1.6, or not greater than 1.5, or not greater than 1.4, or not greater than 1.3, or not greater than 1.2, or not greater than 1, or not greater than 0.8, not greater than 0.6, not greater than 0.4, not greater than 0.2, or not greater than 0.1.

Embodiment 327. The abrasive article or method of any of the Embodiments herein, wherein the body comprises a total porosity of not greater than 10 vol % for a total volume of the body or not greater than 8 vol %, or not greater than 7 vol %, or not greater than 6 vol %, or not greater than 5 vol %, or not greater than 4 vol %, or not greater than 3 vol %, or not greater than 2 vol %, or not greater than 1 vol %.

Embodiment 328. The abrasive article or method of any of the Embodiments herein, wherein the body is a fixed abrasive such as a bonded abrasive article comprising abrasive particles contained in a three dimensional volume of bond material, wherein the bond material substantially surrounds a majority of the abrasive particles.

Embodiment 329. The abrasive article or method of any of the Embodiments herein, wherein the body is a fixed abrasive such as a single-layered abrasive article wherein a substantially single layer of abrasive particles are contained in a layer of bond material.

Embodiment 330. The abrasive article or method of any of the Embodiments herein, wherein the body comprises an abrasive agglomerate, that can be shaped or unshaped, wherein the abrasive agglomerate includes a controlled content of bond material, abrasive particles, and optional porosity.

Embodiment 331. The abrasive article or method of any of the Embodiments herein, wherein the body comprises an abrasive preform having a shape including abrasive regions arranged in a predetermined distribution relative to each other, wherein the abrasive regions are joined by one or more bond regions, which may optionally include bond material that can be the same as or distinct from the composition of the abrasive regions, and wherein the abrasive preform is configured to be incorporated into a fixed abrasive article, such as a bonded abrasive or coated abrasive article.

Embodiment 332. The abrasive article of or method of any of the Embodiments herein, wherein the body comprises a first surface having a first developed interfacial area ratio (Sdr1) and a second surface having a second developed interfacial area ratio (Sdr2), wherein the difference between Sdr1 and Sdr2 is not greater than 25%.

Embodiment 333. The abrasive article of or method of any of the Embodiments herein, wherein Sdr1 is at least 40%, or at least 42%, or at least 44%, or at least 46%, or at least 48%, or at least 50%, or at least 52%, or at least 54%, or at least 56%, or at least 58%, or at least 60%, or at least 62%, or at least 64%, or at least 66%, or at least 68%, or at least 70%.

Embodiment 334. The abrasive article of or method of any of the Embodiments herein, wherein Sdr1 is not greater than 140%, or not greater than 135%, or not greater than 130%, or not greater than 125%, or not greater than 120%, or not greater than 115%, or not greater than 110%, or not greater than 105%, or not greater than 100%, or not greater than 95%, or not greater than 90%, or not greater than 85%, or not greater than 80%.

Embodiment 335. The abrasive article of or method of any of the Embodiments herein, wherein Sdr2 is not greater than 110%, or not greater than 105%, or not greater than 100%, or not greater than 95%, or not greater than 90%, or not greater than 85%, or not greater than 80%, or not greater than 75%.

Embodiment 336. The abrasive article of or method of any of the Embodiments herein, wherein Sdr2 is at least 5%, at least 10%, at least 15%, at least 20%, at least 25%, at least 30%, at least 35%, at least 40%, or at least 45%.

Embodiment 337. The abrasive article of or method of any of the Embodiments herein, wherein the difference between Sdr1 and Sdr2 is at least 1%, or at least 2%, or at least 3%, or at least 4%, or at least 5%, or at least 6%, or at least 7%, or at least 8%, or at least 9%, or at least 10%.

Embodiment 338. The abrasive article of or method of any of the Embodiments herein, wherein the difference between Sdr1 and Sdr2 is not greater than 25%, or not greater than 24%, or not greater than 23%, or not greater than 22%, or not greater than 21%, or not greater than 20%, or not greater than 19%, or not greater than 18%, or not greater than 17%, or not greater than 16%, or not greater than 15%, or not greater than 14%, or not greater than 13%, or not greater than 12%, or not greater than 10%, or not greater than 9%, or not greater than 8%, or not greater than 7%, or not greater than 6%, or not greater than 5%, or not greater than 4%, or not greater than 3%.

Embodiment 339. The abrasive article of or method of any of the Embodiments herein, wherein a ratio of Sdr1 to Sdr2 is not greater than 1:2, or not greater than 1:1.9, or not greater than 1:1.8, or not greater than 1:1.7, or not greater than 1:1.6, or not greater than 1:1.5, or not greater than 1:1.4, or not greater than 1:1.3, or at least 1:1.01, or at least 1:1.02, or at least 1:1.03.

Embodiment 340. The abrasive article of or method of any of the Embodiments herein, wherein the first surface and the second surface are oriented to each other by an angle of at least 2°, at least 5°, at least 8°, at least 10°, at least 12°, at least 15°, at least 18°, at least 19°, at least 20°, at least 22°, at least 25°, at least 27°, at least 30°, at least 33°, at least 35°, at least 37°, at least 40°, at least 41°, at least 43°, at least 45°, at least 47°, at least 48°, at least 50°, at least 52°, at least 55°, at least 58°, at least 60°, at least 62°, at least 64°, at least 66°, at least 68°, at least 70°, at least 72°, at least 74°, at least 76°, at least 78°, at least 80°, at least 82°, at least 85°, at least 88°, or at least 90° or at most 180°, at most 178°, at most 176°, at most 174°, at most 172°, at most 170°, at most 168°, at most 166°, at most 164°, at most 162°, at most 160°, at most 158°, at most 156°, at most 154°, at most 152°, at most 150°, at most 147°, at most 145°, at most 143°, at most 140°, at most 138°, at most 135°, at most 133°, at most 130°, at most 127°, at most 124°, at most 121°, at most 118°, at most 115°, at most 112°, at most 109°, at most 105°, at most 102°, at most 99°, at most 96°, at most 93°, at most 90°, such as at most 88°, at most 86°, at most 84°, at most 82°, at most 80°, at most 78°, at most 75°, at most 74°, at most 72°, at most 70°, at most 68°, at most 66°, at most 64°, at most 62°, at most 60°, at most 58°, at most 66°, at most 64°, at most 62°, at most 60°, at most 58°, at most 55°, at most 54°, at most 52°, at most 50°, at most 48°, at most 46°, at most 44°, at most 42°, at most 40°, at most 38°, at most 36°, at most 34°, at most 32°, or at most 30°.

Embodiment 341. The abrasive article of or method of any of the Embodiments herein, wherein the first surface is oriented orthogonal to the second surface.

Embodiment 342. The abrasive article of or method of any of the Embodiments herein, wherein the first surface has a first surface roughness (Sa1) of at least 1 micron or at least 1.5 microns, or at least 2 microns, or at least 2.5 microns, or at least 3 microns, or at least 3.5 microns, or at least 4 microns, or at least 4.5 microns, or at least 5 microns.

Embodiment 343. The abrasive article of or method of any of the Embodiments herein, wherein the first surface has a first surface roughness (Sa1) of not greater than 28 microns, not greater than 25 microns, not greater than 22 microns, not greater than 18 microns, or not greater than 15 microns.

Embodiment 344. The abrasive article of or method of any of the Embodiments herein, wherein the second surface has a second surface roughness (Sa2) of not greater than 25 microns, not greater than 23 microns, not greater than 21 microns, not greater than 19 microns, not greater than 17 microns, or not greater than 15 microns, or not greater than 14 microns, or not greater than 13 microns.

Embodiment 345. The abrasive article of or method of any of the Embodiments herein, wherein the second surface has a second surface roughness (Sa2) of at least 1 micron, at least 2 microns, at least 3 microns, at least 4 microns, or at least 5 microns.

Embodiment 346. The abrasive article of or method of any of the Embodiments herein, wherein the difference between Sa1 and Sa2 is not greater than 6 microns, or not greater than 5.5 microns, or not greater than 5 microns, or not greater than 4.5 microns, or not greater than 4 microns, or not greater than 3.5 microns, or not greater than 3 microns.

Embodiment 347. The abrasive article of or method of any of the Embodiments herein, wherein the fixed abrasive article is a wheel or an abrasive super finishing stick.

Embodiment 348. The abrasive article of or method of any of the Embodiments herein, wherein the body, a green body abrasive article or finally-formed abrasive article, further comprises at least one of:
  a major planar surface having a nWarp of not greater than 50 µm/cm$^2$, wherein nWarp is the warp of the major planar surface normalized for the surface area of the major planar surface;

a major planar surface having a nFlatness of not greater than 50 μm/cm², wherein nFlatness is the flatness of the major planar surface normalized for the surface area of the major planar surface;

a major planar surface having a nBow of not greater than 50 μm/cm², wherein nBow is the bow of the major planar surface normalized for the surface area of the major planar surface;

a first major planar surface and a second major planar surface substantially parallel to the first major planar surface, wherein the distance between the first major planar surface and second major planar surface comprises a nDimension variation of not greater than 100 μm/cm², wherein nDimension variation is the variation in the dimension between the first and second major planar surfaces normalized to the area of the first or second major planar surfaces;

or any combination of a)-d).

Embodiment 349. An abrasive article comprising:
a body having at least one of:
a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%;
multiple layers of bond material and abrasives bonded to each other; and
or a combination of any one of 1), 2), 3), and 4),
and further wherein the body comprises a Linear Feature Factor that is less than a Linear Feature Factor from a body formed through an uncontrolled compaction process.

Embodiment 350. The abrasive article of Embodiment 349, wherein the abrasive articles and/or batch of abrasive articles can have any one or a combination of features of any of the embodiments herein.

Embodiment 351. The abrasive article of Embodiment 349, wherein the abrasive article comprises a flexural strength of at least 10 MPa.

Embodiment 352. The abrasive article of Embodiment 351, wherein the abrasive article comprises a flexural strength of not greater than 100 GPa.

Embodiment 353. The abrasive article of Embodiment 349, wherein the abrasive article is part of a batch, and wherein the batch of abrasive articles comprise an average batch flexural strength within a range of at least 10 MPa to not greater than 100 GPa.

Embodiment 354. The abrasive article of Embodiment 349, wherein the body is essentially free of Linear Features as viewed in cross-section.

Embodiment 355. The abrasive article of Embodiment 349, wherein the porosity comprises an average aspect ratio (L:W) of not greater than 100 as viewed in cross-section, such as not greater than 90 or not greater than 80 or not greater than 70 or not greater than 60 or not greater than 50 or not greater than 40 or not greater than 30 or not greater than 20 or not greater than 10.

Embodiment 356. The abrasive article of Embodiment 349, wherein the porosity has a substantially randomly oriented porosity as viewed in cross-section.

Embodiment 357. The abrasive article of Embodiment 349, wherein not greater than 80% of the porosity has a longitudinal axis within +−5 degrees of a direction parallel to any surface of the body as viewed in cross-section, or not greater than 70% or not greater than 60% or not greater than 50% or not greater than 40% or not greater than 30% or not greater than 20% or not greater than 10% or not greater than 5%.

Embodiment 358. A green body abrasive article comprising:
a body comprising abrasive articles contained in a bond material, the body having at least one of: a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%;
or a combination of any one of 1), 2), and 3), wherein the green body abrasive article has a linear feature factor of at least 0.126 inches.

Embodiment 359. The green body abrasive article of Embodiment 358, wherein the green body abrasive article comprises Embodiment 360. The green body abrasive article of Embodiment 358, wherein the green body abrasive article comprises a length of at least 10 mm or at least 20 mm or at least 30 mm or at least 40 mm.

Embodiment 361. The green body abrasive article of Embodiment 358, wherein the green body abrasive article comprises a length of not greater than 150 mm.

Embodiment 362. The green body abrasive article of Embodiment 358, wherein the green body abrasive article comprises a width of at least 1 mm or at least 2 mm or at least 3 mm or at least 4 mm or at least 6 mm or at least 8 mm or at least 10 mm.

Embodiment 363. The green body abrasive article of Embodiment 358, wherein the green body abrasive article comprises a width of not greater than 150 mm.

Embodiment 364. The green body abrasive article of Embodiment 358, wherein the green body abrasive article comprises a thickness of at least 1 mm or at least 2 mm or at least 3 mm or at least 4 mm or at least 5 mm.

Embodiment 365. The green body abrasive article of Embodiment 358, wherein the green body abrasive article comprises a thickness of not greater than 150 mm.

Embodiment 366. The green body abrasive article of Embodiment 358, wherein the green body abrasive article comprises a density of at least 1.5 g/cc or at least 1.51 g/cc or at least 1.52 g/cc or at least 1.53 g/cc or at least 1.54 g/cc or at least 1.55 g/cc or at least 1.56 g/cc or at least 1.57 g/cc or at least 1.58 g/cc or at least 1.59 g/cc or at least 1.60 g/cc or at least 1.61 g/cc or at least 1.62 g/cc or at least 1.63 g/cc or at least 1.64 g/cc or at least 1.65 g/cc or at least 1.66 g/cc or at least 1.67 g/cc or at least 1.68 g/cc or at least 1.69 g/cc or at least 1.70 g/cc.

Embodiment 367. The green body abrasive article of Embodiment 358, wherein the green body abrasive article comprises a density of not greater than 3.00 g/cc or not greater than 2.95 g/cc or not greater than 2.90 g/cc or not greater than 2.85 g/cc or not greater than 2.80 g/cc or not greater than 2.75 g/cc or not greater than 2.70 g/cc or not greater than 2.65 g/cc or not greater than 2.60 g/cc or not greater than 2.55 g/cc or not greater than 2.50 g/cc or not greater than 2.45 g/cc or not greater than 2.40 g/cc or not greater than 2.35 g/cc or not greater than 2.30 g/cc or not greater than 2.25 g/cc or not greater than 2.20 g/cc or not greater than 2.15 g/cc or not greater than 2.10 g/cc or not greater than 2.05 g/cc or not greater than 2.00 g/cc.

Embodiment 368. The green body abrasive article of Embodiment 358, wherein the abrasive particles comprises super abrasive particles.

Embodiment 369. The green body abrasive article of Embodiment 358, wherein the abrasive particles comprises abrasive particles having a Mohs hardness of at least 7 or at least 8 or at least 9 or at least 10.

Embodiment 370. The green body abrasive article of Embodiment 358, wherein the abrasive particles comprises diamond or cubic boron nitride.

Embodiment 371. The green body abrasive article of Embodiment 358, wherein the abrasive particles comprise cubic boron nitride.

Embodiment 372. The green body abrasive article of Embodiment 358, wherein the abrasive particles have a median particle size of at least 0.5 microns or at least 1 micron or at least 2 microns or at least 3 microns or at least 4 microns or at least 5 microns or at least 6 microns.

Embodiment 373. The green body abrasive article of Embodiment 358, wherein the abrasive particles have a median particle size of less than 100 microns or less than 90 microns or less than 80 microns or less than 70 microns or less than 60 microns or less than 50 microns or less than 40 microns or less than 30 microns or less than 20 microns or less than 10 microns.

Embodiment 374. The green body abrasive article of Embodiment 358, wherein the bond material is a vitreous bond material.

Embodiment 375. The green body abrasive article of Embodiment 358, wherein the bond material comprises aluminum oxide or silicon dioxide or a combination thereof.

Embodiment 376. A batch of green body abrasive articles having the features of any one of Embodiments 358-375.

Embodiment 377. The batch of Embodiment 376, having a batch density variation of less than 0.05 g/cc or less than 0.048 g/cc or less than 0.045 g/cc or less than 0.043 g/cc or less than 0.040 g/cc or less than 0.038 g/cc or less than 0.035 g/cc or less than 0.033 g/cc or less than 0.030 g/cc or less than 0.028 g/cc.

Embodiment 378. The batch of Embodiment 376, having a batch density variation of at least 0.0001 g/cc.

Embodiment 379. The batch of Embodiment 376, wherein the batch of green body abrasive articles has a batch dimensional variation-L of at least 0.001 mm or at least 0.005 mm mor at least 0.01 mm.

Embodiment 380. The batch of Embodiment 376, wherein the batch of green body abrasive articles has a batch dimensional variation-L of less than 0.25 mm or less than 0.2 mm or less than 0.1 mm or less than 0.09 mm or less than 0.08 mm or less than 0.07 mm or less than 0.06 mm or less than 0.05 mm.

Embodiment 381. The batch of Embodiment 376, wherein the batch of green body abrasive articles has a batch dimensional variation-W of at least 0.001 mm or at least 0.005 mm mor at least 0.01 mm.

Embodiment 382. The batch of Embodiment 376, wherein the batch of green body abrasive articles has a batch dimensional variation-W of less than 0.2 mm or less than 0.18 mm or less than 0.16 mm or less than 0.14 mm or less than 0.12 mm or less than 0.10 mm or less than 0.09 mm or less than 0.08 mm.

Embodiment 383. The batch of Embodiment 376, wherein the batch of green body abrasive articles has a batch dimensional variation-T of at least 0.001 mm or at least 0.005 mm mor at least 0.01 mm.

Embodiment 384. The batch of Embodiment 376, wherein the batch of green body abrasive articles has a batch dimensional variation-T of less than 0.7 mm or less than 0.6 mm or less than 0.5 mm or less than 0.4 mm or less than 0.3 mm or less than 0.2 mm or less than 0.1 mm or less than 0.07 mm.

Embodiment 385. The batch of Embodiment 376, wherein the batch of green body abrasive articles has a batch Volume variation of at least 1 mm$^3$.

Embodiment 386. The batch of Embodiment 376, wherein the batch of green body abrasive articles has a batch Volume variation of less than 350 mm$^3$ or less than 325 mm$^3$ or less than 300 mm$^3$ or less than 275 mm$^3$ or less than 250 mm$^3$ or less than 225 mm$^3$ or less than 200 mm$^3$ or less than 175 mm$^3$ or less than 150 mm$^3$ or less than 125 mm$^3$ or less than 100 mm$^3$ or less than 75 mm$^3$ or less than 50 mm$^3$.

Embodiment 387. The batch of Embodiment 376, wherein each green body abrasive article comprises an
SDV and the green body with the highest SDV comprises an SDV of less than 0.0082 inches or less than 0.0080 inches or less than 0.0078 inches or less than 0.0076 inches or less than 0.0074 inches or less than 0.0072 inches or less than 0.0070 inches or less than 0.0068 inches or less than 0.0066 inches or less than 0.0064 inches or less than 0.0062 inches or less than 0.0060 inches or less than 0.0058 inches or less than 0.0056 inches or less than 0.0054 inches or less than 0.0052 inches.

Embodiment 388. The batch of Embodiment 376, wherein each green body abrasive article comprises an SDV and the green body with the highest SDV comprises an SDV of at least 0.001 inches.

Embodiment 389. The batch of Embodiment 376, wherein each green body abrasive article comprises an SDV and the mean SDV of all green body abrasive articles in the batch is less than 0.0063 inches or less than 0.0062 inches or less than 0.0061 inches or less than 0.0060 inches or less than 0.0059 inches or less than 0.0058 inches or less than 0.0057 inches or less than 0.0056 inches or less than 0.0055 inches or less than 0.0054 inches or less than 0.0053 inches or less than 0.0052 inches or less than 0.0051 inches or less than 0.0050 inches or less than 0.0049 inches or less than 0.0048 inches or less than 0.0047 inches or less than 0.0046 inches or less than 0.0045 inches or less than 0.0043 inches or less than 0.0042 inches or less than 0.0041 inches.

Embodiment 390. The batch of Embodiment 376, wherein each green body abrasive article comprises an SDV and the mean SDV of all green body abrasive articles in the batch is at least 0.001 inches or at least 0.002 inches or at least 0.003 inches or at least 0.004 inches.

Embodiment 391. An abrasive article comprising:

a body comprising abrasive articles contained in a bond material, the body having at least one of: a microstructure Feature greater than 1;

a first surface having a first developed interfacial area ratio (Sdr1) and a second surface having a second developed interfacial area ratio (Sdr2), wherein the difference between Sdr1 and Sdr2 is not greater than 25%;

an exterior surface having a first developed interfacial area ratio (Sdr) of at least 40%;

or a combination of any one of 1), 2), and 3), wherein the abrasive article. has a linear feature factor of at least 0.126 inches.

Embodiment 392. The abrasive article of Embodiment 391, wherein the green body abrasive article comprises Embodiment 393. The abrasive article of Embodiment 391, wherein the green body abrasive article comprises a length of at least 10 mm or at least 20 mm or at least 30 mm or at least 40 mm.

Embodiment 394. The abrasive article of Embodiment 391, wherein the green body abrasive article comprises a length of not greater than 150 mm.

Embodiment 395. The abrasive article of Embodiment 391, wherein the green body abrasive article comprises a width of at least 1 mm or at least 2 mm or at least 3 mm or at least 4 mm or at least 6 mm or at least 8 mm or at least 10 mm.

Embodiment 396. The abrasive article of Embodiment 391, wherein the green body abrasive article comprises a width of not greater than 150 mm.

Embodiment 397. The abrasive article of Embodiment 391, wherein the green body abrasive article comprises a thickness of at least 1 mm or at least 2 mm or at least 3 mm or at least 4 mm or at least 5 mm.

Embodiment 398. The abrasive article of Embodiment 391, wherein the green body abrasive article comprises a thickness of not greater than 150 mm.

Embodiment 399. The abrasive article of Embodiment 391, wherein the abrasive article has a porosity of less than 50 vol % or less than 45 vol % or less than vol % or less than 40 vol % or less than 36 vol %.

Embodiment 400. The abrasive article of Embodiment 391, wherein the abrasive article has a porosity of at least 10 vol % or at least 15 vol % or at least 20 vol % or at least 25 vol % or at least 30 vol %.

Embodiment 401. The abrasive article of Embodiment 391, wherein the abrasive article has an archimedes density of at least 1 g/cc or at least 1.2 g/cc or at least 1.4 g/cc or at least 1.6 g/cc or at least 1.8 g/cc or at least 2.0 g/cc or at least 2.035 g/cc.

Embodiment 402. The abrasive article of Embodiment 391, wherein the abrasive article has an archimedes density of at least 1 g/cc or at least 1.2 g/cc or at least 1.4 g/cc or at least 1.6 g/cc or at least 1.8 g/cc or at least 2.0 g/cc or at least 2.035 g/cc.

Embodiment 403. The abrasive article of Embodiment 391, wherein the abrasive article has an average hardness of at least 50 HRL or at least 60 HRL or at least 70 HRL or at least 80 HRL or at least 90 HRL according to rockwell hardness test L.

Embodiment 404. The abrasive article of Embodiment 391, wherein the abrasive article has an average hardness less than 150 HRL or less than 140 HRL or less than 130 HRL or less than 120 HRL or less than 110 HRL or less than 105 HRL according to rockwell hardness test L.

Embodiment 405. The abrasive article of Embodiment 391, wherein the abrasive article has hardness variation of less than 15 HRL or less than 14 HRL or less than 13 HRL or less than 12 HRL or less than 11 HRL or less than 10 HRL or less than 9 HRL or less than 8 according to at least 3 measurements according to rockwell hardness test L.

Embodiment 406. The abrasive article of Embodiment 391, wherein the abrasive article has hardness variation of at least 50 HRL or at least 55 HRL or at least 60 HRL or at least 65 HRL or at least 70 HRL or at least 75 HRL or at least 80 HRL or at least 85 HRL or at least 90 HRL according to at least 3 measurements according to rockwell hardness test L.

Embodiment 407. The abrasive article of Embodiment 391, wherein the abrasive particles comprises super abrasive particles.

Embodiment 408. The abrasive article of Embodiment 391, wherein the abrasive particles comprises abrasive particles having a Mohs hardness of at least 7 or at least 8 or at least 9 or at least 10.

Embodiment 409. The abrasive article of Embodiment 391, wherein the abrasive particles comprise cubic boron nitride.

Embodiment 410. The abrasive article of Embodiment 391, wherein the abrasive particles have a median particle size of at least 0.5 microns or at least 1 micron or at least 2 microns or at least 3 microns or at least 4 microns or at least 5 microns or at least 6 microns.

Embodiment 411. The abrasive article of Embodiment 391, wherein the abrasive particles have a median particle size of less than 100 microns or less than 90 microns or less than 80 microns or less than 70 microns or less than 60 microns or less than 50 microns or less than 40 microns or less than 30 microns or less than 20 microns or less than 10 microns.

Embodiment 412. The abrasive article of Embodiment 391, wherein the bond material is a vitreous bond material.

Embodiment 413. The abrasive article of Embodiment 391, wherein the bond material comprises aluminum oxide or silicon dioxide or a combination thereof.

Embodiment 414. A batch of abrasive articles, where the abrasive particles have any of the features of Embodiments 391-413.

Embodiment 415. The batch of Embodiment 414, wherein each abrasive article comprises an SDV and the abrasive article with the highest SDV comprises an SDV of less than 0.0082 inches or less than 0.0080 inches or less than 0.0078 inches or less than 0.0076 inches or less than 0.0074 inches or less than 0.0072 inches or less than 0.0070 inches or less than 0.0068 inches or less than 0.0066 inches or less than 0.0064 inches or less than 0.0062 inches or less than 0.0060 inches or less than 0.0058 inches or less than 0.0056 inches or less than 0.0054 inches or less than 0.0052 inches.

Embodiment 416. The batch of Embodiment 414, wherein each abrasive article comprises an SDV and the abrasive article with the highest SDV comprises an SDV of at least 0.001 inches.

Embodiment 417. The batch of Embodiment 414, each abrasive article comprises an SDV and the mean SDV of all abrasive articles in the batch is less than 0.0063 inches or less than 0.0062 inches or less than 0.0061 inches or less than 0.0060 inches or less than 0.0059 inches or less than 0.0058 inches or less than 0.0057 inches or less than 0.0056 inches or less than 0.0055 inches or less than 0.0054 inches or less than 0.0053 inches or less than 0.0052 inches or less than 0.0051 inches or less than 0.0050 inches or less than 0.0049 inches or less than 0.0048 inches or less than 0.0047 inches or less than 0.0046 inches or less than 0.0045 inches or less than 0.0043 inches or less than 0.0042 inches or less than 0.0041 inches.

Embodiment 418. The batch of Embodiment 414, wherein each abrasive article comprises an SDV and the mean SDV of all abrasive articles in the batch is at least 0.001 inches or at least 0.002 inches or at least 0.003 inches or at least 0.004 inches.

Embodiment 419. The batch of Embodiment 414, wherein the batch of abrasive articles has a batch archimedes density variation of at least 0.0001 g/cc.

Embodiment 420. The batch of Embodiment 414, wherein the batch of abrasive articles has a batch archimedes density variation of less than 0.034 g/cc or less than 0.032 g/cc or less than 0.030 g/cc or less than 0.028 g/cc.

Embodiment 421. The batch of Embodiment 414, wherein the batch of abrasive articles has a batch porosity variation of less than 1 vol % or less than 0.9 vol % or less than 0.8 vol % or less than 0.7 vol % or less than 0.6 vol % or less than 0.5 vol % or less than 0.4 vol % or less than 0.3 vol % or less than 0.2 vol % or less than 0.1 vol % or less than 0.05 vol %.

Embodiment 422. The batch of Embodiment 414, wherein the batch of abrasive articles has a batch porosity variation of at least 0.001.

Embodiment 423. The batch of Embodiment 414, wherein the batch of abrasive articles has a batch hardness variation of at least 1 HRL or at least 2 HRL or at least 3 HRL or at least 4 HRL or at least 5 HRL.

Embodiment 424. The batch of Embodiment 414, wherein the batch of abrasive articles has a batch hardness variation of less than 20 HRL or less than 19 HRL or less than 18 HRL or less than 17 HRL or less than 16 HRL or less than 15 HRL or less than 14 HRL or less than 13 HRL.

Embodiment 425. The batch of Embodiment 414, wherein the batch of abrasive articles has a batch Dimensional variation-L of less than 0.3 mm or less than 0.29 mm or less than 0.28 mm or less than 0.27 mm or less than 0.26 mm or less than 0.25 mm or less than 0.24 mm or less than 0.23 mm or less than 0.22 mm or less than 0.21 mm or less than 0.20 mm or less than 0.19 mm or less than 0.18 mm or less than 0.17 mm.

Embodiment 426. The batch of Embodiment 414, wherein the batch of abrasive articles has a batch Dimensional variation-L of at least 0.01.

Embodiment 427. The batch of Embodiment 414, wherein the batch of abrasive articles has a batch Dimensional variation-W of less than 0.3 mm or less than 0.29 mm or less than 0.28 mm or less than 0.27 mm or less than 0.26 mm or less than 0.25 mm or less than 0.24 mm or less than 0.23 mm or less than 0.22 mm or less than 0.21 mm or less than 0.20 mm or less than 0.19 mm or less than 0.18 mm or less than 0.17 mm.

Embodiment 428. The batch of Embodiment 414, wherein the batch of abrasive articles has a batch Dimensional variation-W of at least 0.001.

Embodiment 429. The batch of Embodiment 414, wherein the batch of abrasive articles has a batch Dimensional variation-T of less than 0.9 mm or less than 0.85 mm or less than 0.80 mm or less than 0.75 mm or less than 0.70 mm or less than 0.65 mm or less than 0.60 mm or less than 0.55 mm or less than 0.50 mm or less than 0.45 mm or less than 0.40 mm or less than 0.35 mm or less than 0.30 mm or less than 0.25 mm or less than 0.20 mm or less than 0.15 mm or less than 0.10 mm or less than 0.05 mm.

Embodiment 430. The batch of Embodiment 414, wherein the batch of abrasive articles has a batch Dimensional variation-T of at least 0.001.

Embodiment 431. The batch of Embodiment 414, wherein the batch of abrasive articles has a batch Volume variation of at least 1 $mm^3$.

Embodiment 432. The batch of Embodiment 414, wherein the batch of abrasive articles has a batch Volume variation of less than 400 $mm^3$ 350 $mm^3$ or less than 325 $mm^3$ or less than 300 $mm^3$ or less than 275 $mm^3$ or less than 250 $mm^3$ or less than 225 $mm^3$ or less than 200 $mm^3$ or less than 175 $mm^3$ or less than 150 $mm^3$ or less than 125 $mm^3$ or less than 100 $mm^3$ or less than 75 $mm^3$ or less than 60 $mm^3$.

Embodiment 433. A method for forming an abrasive article via additive manufacturing comprising:
forming a layer of raw material powder including abrasive particles and precursor bond material;
and compacting the layer of powder material by at least 1% to not greater than 99% of an average original layer thickness of the layer of raw material powder.

Embodiment 434. The method of Embodiment 433, wherein the abrasive article has an archimedes density of at least 1 g/cc or at least 1.2 g/cc or at least 1.4 g/cc or at least 1.6 g/cc or at least 1.8 g/cc or at least 2.0 g/cc or at least 2.035 g/cc.

Embodiment 435. The method of Embodiment 433, wherein the abrasive article has an archimedes density of at least 1 g/cc or at least 1.2 g/cc or at least 1.4 g/cc or at least 1.6 g/cc or at least 1.8 g/cc or at least 2.0 g/cc or at least 2.035 g/cc.

Embodiment 436. The method of Embodiment 433, wherein the abrasive article has a porosity of less than 50 vol % or less than 45 vol % or less than vol % or less than 40 vol % or less than 36 vol %.

Embodiment 437. The method of Embodiment 433, wherein the abrasive article has a porosity of at least 10 vol % or at least 15 vol % or at least 20 vol % or at least 25 vol % or at least 30 vol %.

Embodiment 438. The method of Embodiment 433, wherein the abrasive article has a porosity of at least 10 vol % or at least 15 vol % or at least 20 vol % or at least 25 vol % or at least 30 vol %.

Embodiment 439. The method of Embodiment 433, wherein the abrasive article has an average hardness of at least 50 HRL or at least 60 HRL or at least 70 HRL or at least 80 HRL or at least 90 HRL according to rockwell hardness test L.

Embodiment 440. The method of Embodiment 433, wherein the abrasive article has an average hardness less than 150 HRL or less than 140 HRL or less than 130 HRL or less than 120 HRL or less than 110 HRL or less than 105 HRL according to rockwell hardness test L.

Embodiment 441. The method of Embodiment 433, wherein the abrasive article has hardness variation of less than 15 HRL or less than 14 HRL or less than 13 HRL or less than 12 HRL or less than 11 HRL or less than 10 HRL or less than 9 HRL or less than 8 according to at least 3 measurements according to rockwell hardness test L.

Embodiment 442. The method of Embodiment 433, wherein the abrasive article has hardness variation of at least 50 HRL or at least 55 HRL or at least 60 HRL or at least 65 HRL or at least 70 HRL or at least 75 HRL or at least 80 HRL or at least 85 HRL or at least 90 HRL according to at least 3 measurements according to rockwell hardness test L.

Embodiment 443. The method of Embodiment 433, wherein compaction reduces the thickness of the layer by at least 1 micron or at least 2 microns or at least 5 microns or at least 8 microns or at least 10 microns or at least 15 microns or at least 20 microns or at least 25 microns or at least 30 microns or at least 35 microns or at least 40 microns or at least 45 microns or at least 50 microns.

Embodiment 444. The method of Embodiment 433, wherein compaction reduces the thickness of the layer by less than 300 microns or less than 275 microns or less than 250 microns or less than 225 microns or less than 200 microns or less than 175 microns or less than 150 microns or less than 125 microns.

Embodiment 445. The method of Embodiment 433, wherein the layer comprises a thickness of at least 50 microns or at least 75 microns or at least 100 microns or at least 125 microns or at least 150 microns or at least 175 microns.

Embodiment 446. The method of Embodiment 433, wherein the layer comprises a thickness of less than 400 microns or less than 350 microns or less than 300 microns or less than 250 microns.

Embodiment 447. The method of Embodiment 433, wherein compacting include compacting the layer of powder material by at least 1% of the original layer thickness or at least 2%, or at least 3%, or at least 4%, or a least 5%, or at least 6%, or at least 7%, or at least 8%, or at least 9%, or at least 10%, or at least 11%, or at least 12%, or at least 13%, or at least 14%, or at least 15%, or at least 18%, or at least 20%, or at least 22%, or at least 25%, or at least 28%, or at least 30%, or at least 32%, or at least 35%, or at least 38%, or at least 40%, or at least 42%, or at least 45%, or at least 48%, or at least 50%, or at least 52%, or at least 55%, or at least 58%, or at least 60%, or at least 62%, or at least 65%, or at least 67%, or at least 68%, or at least 70%, or at least 72%, or at least 75%, or at least 78%, or at least 80%, or at least 82%, or at least 85%, or at least 88%, or at least 90%, or at least 92%, or at least 95%, or at least 98% of the original layer thickness.

Embodiment 448. The method of Embodiment 433, wherein compacting include compacting the layer of powder material by not greater than 95% of the original layer thickness of the layer or not greater than 94% of the original layer thickness or not greater than 93%, or not greater than 92%, or not greater than 91%, or not greater than 90%, or not greater than 89%, or not greater than 88%, or not greater than 87%, or not greater than 86%, or not greater than 85%, or not greater than 84%, or not greater than 83%, or not greater than 82%, or not greater than 81%, or not greater than 80%, or not greater than 79%, or not greater than 78%, or not greater than 77%, or not greater than 76%, or not greater than 75%, or not greater than 74%, or not greater than 73%, or not greater than 72%, or not greater than 71%, or not greater than 70%, or not greater than 69%, or not greater than 68%, or not greater than 67%, or not greater than 66%, or not greater than 65%, or not greater than 64%, or not greater than 63%, or not greater than 62%, or not greater than 61%, or not greater than 60%, or not greater than 59%, or not greater than 58%, or not greater than 57%, or not greater than 56%, or not greater than 55%, or not greater than 54%, or not greater than 53%, or not greater than 52%, or not greater than 51%, or not greater than 50%, or not greater than 49%, or not greater than 48%, or not greater than 47%, or not greater than 46%, or not greater than 45%, or not greater than 44%, or not greater than 43%, or not greater than 42%, or not greater than 41%, or not greater than 40%, or not greater than 39%, or not greater than 38%, or not greater than 37%, or not greater than 36%, or not greater than 35%, or not greater than 34%, or not greater than 33%, or not greater than 32%, or not greater than 31%, or not greater than 30%, or not greater than 29%, or not greater than 28%, or not greater than 27%, or not greater than 26%, or not greater than 25%, or not greater than 24%, or not greater than 23%, or not greater than 22%, or not greater than 21%, or not greater than 20%, or not greater than 19%, or not greater than 18%, or not greater than 17%, or not greater than 16%, or not greater than 15%, or not greater than 14%, or not greater than 13%, or not greater than 12%, or not greater than 11%, or not greater than 10%, or not greater than 9%, or not greater than 8%, or not greater than 7%, or not greater than 6%, or not greater than 5%, or not greater than 4%, or not greater than 3%, or not greater than 2% of the original thickness of the layer.

Embodiment 449. The method of Embodiment 433, wherein each green body has a linear feature factor of at least 0.126 inches.

Embodiment 450. The method of Embodiment 433, wherein the abrasive particles comprises super abrasive particles.

Embodiment 451. The method of Embodiment 433, wherein the abrasive particles comprises abrasive particles having a Mohs hardness of at least 7 or at least 8 or at least 9 or at least 10.

Embodiment 452. The method of Embodiment 433, wherein the abrasive particles comprises diamond or cubic boron nitride.

Embodiment 453. The method of Embodiment 433, wherein the abrasive particles comprise cubic boron nitride.

Embodiment 454. The method of Embodiment 433, wherein the abrasive particles have a median particle size of at least 0.5 microns or at least 1 micron or at least 2 microns or at least 3 microns or at least 4 microns or at least 5 microns or at least 6 microns.

Embodiment 455. The method of Embodiment 433, wherein the abrasive particles have a median particle size of less than 100 microns or less than 90 microns or less than 80 microns or less than 70 microns or less than 60 microns or less than 50 microns or less than 40 microns or less than 30 microns or less than 20 microns or less than 10 microns.

Embodiment 456. The method of Embodiment 433, wherein the raw material powder comprises at least 25% by weight abrasive particles for a total weight of the mixture or at least 30 wt % or at least 35 wt % or at least 40 wt % or at least 45 wt % or at least 50 wt % or at least 55 wt % or at least 60 wt % or at least 65 wt % or at least 70 wt %.

Embodiment 457. The method of Embodiment 433, wherein the raw material powder comprises no greater than 95 wt % abrasive particles for a total weight of the mixture or no greater than 90 wt % or no greater than 85 wt % or no greater than 80 wt % or no greater than 75 wt %.

Embodiment 458. The method of Embodiment 433, wherein the bond material is a vitreous bond material.

Embodiment 459. The method of Embodiment 433, wherein the bond material comprises aluminum oxide or silicon dioxide or a combination thereof.

Embodiment 460. The method of Embodiment 433, wherein the bond material comprises a median particle size of at least 25 microns or at least 30 microns or at least 40 microns or at least 50 microns or at least 60 microns or at least 70 microns or at least 80 microns or at least 90 microns or at least 100 microns or at least 115 microns.

Embodiment 461. The method of Embodiment 433, wherein the bond material comprises a median particle size of less than 300 microns or less than 275 microns or less than 250 microns or less than 225 microns or less than 200 microns or less than 175 microns or less than 150 microns.

Embodiment 462. The method of Embodiment 433, wherein the raw material powder comprises at least 2% by weight bond material for a total weight of the mixture or at least 4 wt % or at least 6 wt % or at least 8 wt % or at least 10 wt % or at least 12 wt % or at least 14 wt % or at least 16 wt % or at least 18 wt % or at least 20 wt %.

Embodiment 463. The method of Embodiment 433, wherein the raw material powder comprises no greater than 60 wt % bond material for a total weight of the mixture or no greater than 50 wt % or no greater than 40 wt % or no greater than 30 wt % or no greater than 25 wt %.

Embodiment 464. The method of Embodiment 433, further comprising measuring or calculating a relative humidity or a flow characteristic of the powder material.

Embodiment 465. The method of Embodiment 433, further comprising controlling a compaction force applied to the layer of powder material based at least in part upon the average layer thickness of the powder material.

Embodiment 466. The method of Embodiment 465, further comprising controlling compaction force based upon a relative humidity or a flow characteristic of the powder material.

Embodiment 467. The method of Embodiment 465, further comprising changing the compaction force based upon a measured change in a relative humidity or a flow characteristic of the powder material.

Embodiment 468. The method of Embodiment 433, further comprising:
selecting a target average layer thickness for one or more layers; and
selecting a compaction force, translation speed, or other compacting object control variable based upon the target average layer thickness for the one or more layers.

Embodiment 469. The method of Embodiment 468, further comprising:
measuring the average thickness of the layer of powder material after forming the layer of powder material; and
comparing the target average layer thickness to the measured average layer thickness and calculating a difference.

Embodiment 470. The method of Embodiment 469, further comprising changing the compaction force, translation speed, or other compacting object control variable based upon a difference in the measured average height and target average height.

Embodiment 471. The method of Embodiment 470, wherein an alert is generated if the difference between the measured and target extend beyond a threshold value.

Embodiment 472. The method of Embodiment 433, further comprising changing a compaction object control variable between a first compacting process and a second compacting process conducted at a different time relative to the first compacting process.

Embodiment 473. The method of Embodiment 433, further comprising forming a green body abrasive article having a flexural strength of at least 10 MPa and a volume percent shrinkage of not greater than 20% or not greater than 18% or not greater than 15% or not greater than 12% or not greater than 10% or not greater than 8% or not greater than 6% or not greater than 4%.

Embodiment 474. The method of Embodiment 433, wherein the abrasive articles and/or batch of abrasive articles can have any one or a combination of features of any of the embodiments herein.

Embodiment 475. The method of Embodiment 433, wherein the method includes any one or a combination of features of any of the embodiments herein.

Embodiment 476. The method of Embodiment 433, further comprising forming a green body abrasive article comprising the precursor bond material and abrasive particles, wherein forming is conducted by:
creating one or more layers of the powder material;
selectively binding portions of the one or more layers with a binder material; and
converting the binder material to at least partially solidify the binder material and bind portions of powder material from the one or more layers.

Embodiment 477. The method of Embodiment 476, further comprising sintering the green body abrasive article to form the abrasive article.

Embodiment 478. The method of Embodiment 477, wherein sintering includes sintering at a maximum temperature between 50° and 1500° C.

Embodiment 479. The method of Embodiment 477, wherein sintering includes holding the maximum temperature for at least 1 hour and no greater than 5 hours.

Embodiment 480. The method of Embodiment 477, wherein each green body abrasive article shrinks by less than 15 vol % or less than 14.5 vol % or less than 14 vol % or less than 13.5 vol % or less than 13 vol % or less than 12.5 vol % or less than 12 vol %.

Embodiment 481. The method of Embodiment 477, wherein each green body abrasive article shrinks by at least 1 vol % or at least 2 vol % or at least 3 vol % or at least 4 vol % or at least 5 vol %.

Embodiment 482. The method of Embodiment 476, further comprising moving a compaction object over the one or more layers of powder material to apply a force sufficient to compact the layer to a compacted layer thickness that is less than the thickness of the layer prior to compaction.

Embodiment 483. The method of Embodiment 482, wherein the green body abrasive article has a density of at least 1.5 g/cc or at least 1.51 g/cc or at least 1.52 g/cc or at least 1.53 g/cc or at least 1.54 g/cc or at least 1.55 g/cc or at least 1.56 g/cc or at least 1.57 g/cc or at least 1.58 g/cc or at least 1.59 g/cc or at least 1.60 g/cc or at least 1.61 g/cc or at least 1.62 g/cc or at least 1.63 g/cc or at least 1.64 g/cc or at least 1.65 g/cc or at least 1.66 g/cc or at least 1.67 g/cc or at least 1.68 g/cc or at least 1.69 g/cc or at least 1.70 g/cc.

Embodiment 484. The method of Embodiment 482, wherein the green body abrasive article has a density of not greater than 3.00 g/cc or not greater than 2.95 g/cc or not greater than 2.90 g/cc or not greater than 2.85 g/cc or not greater than 2.80 g/cc or not greater than 2.75 g/cc or not greater than 2.70 g/cc or not greater than 2.65 g/cc or not greater than 2.60 g/cc or not greater than 2.55 g/cc or not greater than 2.50 g/cc or not greater than 2.45 g/cc or not greater than 2.40 g/cc or not greater than 2.35 g/cc or not greater than 2.30 g/cc or not greater than 2.25 g/cc or not greater than 2.20 g/cc or not greater than 2.15 g/cc or not greater than 2.10 g/cc or not greater than 2.05 g/cc or not greater than 2.00 g/cc.

Embodiment 485. The method of Embodiment 482, wherein the green body abrasive article has a length of at least 10 mm or at least 20 mm or at least 30 mm or at least 40 mm.

Embodiment 486. The method of Embodiment 482, wherein the green body abrasive article has a length of not greater than 150 mm.

Embodiment 487. The method of Embodiment 482, wherein the green body abrasive article has a width of at least 1 mm or at least 2 mm or at least 3 mm or at least 4 mm or at least 6 mm or at least 8 mm or at least 10 mm.

Embodiment 488. The method of Embodiment 482, wherein the green body abrasive article has a width of not greater than 150 mm.

Embodiment 489. The method of Embodiment 482, wherein the green body abrasive article has a thickness of at least 1 mm or at least 2 mm or at least 3 mm or at least 4 mm or at least 5 mm Embodiment 490. The method of Embodiment 482, wherein the green body abrasive article has a thickness of not greater than 150 mm.

Embodiment 491. The method of Embodiment 482, further comprising controlling at least one of:
a) a force applied by a compaction object to the layer or a plurality of layers of powder material;

b) a traverse speed of a compaction object;
c) average thickness of the layer prior to compaction;
a particle size distribution of the powder;
number of previously formed layers underlying the layer of powder;
the number of compacted layers underlying the layer of powder;
the density of any layers underlying the layer of powder;
the amount of binder in any layers underlying the layer of powder;
the relative dimensions of the layer relative to one or more layers underlying the layer; and
any combination of a)-i).

Embodiment 492. The method of any one of Embodiments 433 to 491, further comprising repeating the method to form a batch of abrasive articles or green body abrasive articles.

Embodiment 493. The method of Embodiment 492, wherein the batch of green body abrasive articles has a density standard deviation of less than 0.05 g/cc or less than 0.048 g/cc or less than 0.045 g/cc or less than 0.043 g/cc or less than 0.040 g/cc or less than 0.038 g/cc or less than 0.035 g/cc or less than 0.033 g/cc or less than 0.030 g/cc or less than 0.028 g/cc.

Embodiment 494. The method of Embodiment 492, wherein the batch of green body abrasive articles has a batch density variation of at least 0.0001 g/cc.

Embodiment 495. The method of Embodiment 492, wherein the batch of green body abrasive articles has a batch dimensional variation-L of at least 0.001 mm or at least 0.005 mm mor at least 0.01 mm.

Embodiment 496. The method of Embodiment 492, wherein the batch of green body abrasive articles has a batch dimensional variation-L of less than 0.25 mm or less than 0.2 mm or less than 0.1 mm or less than 0.09 mm or less than 0.08 mm or less than 0.07 mm or less than 0.06 mm or less than 0.05 mm.

Embodiment 497. The method of Embodiment 492, wherein the batch of green body abrasive articles has a batch dimensional variation-W of at least 0.001 mm or at least 0.005 mm mor at least 0.01 mm.

Embodiment 498. The method of Embodiment 492, wherein the batch of green body abrasive articles has a batch dimensional variation-W of less than 0.2 mm or less than 0.18 mm or less than 0.16 mm or less than 0.14 mm or less than 0.12 mm or less than 0.10 mm or less than 0.09 mm or less than 0.08 mm.

Embodiment 499. The method of Embodiment 492, wherein the batch of green body abrasive articles has a batch dimensional variation-T of at least 0.001 mm or at least 0.005 mm mor at least 0.01 mm.

Embodiment 500. The method of Embodiment 492, wherein the batch of green body abrasive articles has a batch dimensional variation-T of less than 0.7 mm or less than 0.6 mm or less than 0.5 mm or less than 0.4 mm or less than 0.3 mm or less than 0.2 mm or less than 0.1 mm or less than 0.07 mm.

Embodiment 501. The method of Embodiment 492, wherein the batch of green body abrasive articles has a batch Volume variation of at least 1 $mm^3$.

Embodiment 502. The method of Embodiment 492, wherein the batch of green body abrasive articles has a batch Volume variation of less than 350 $mm^3$ or less than 325 $mm^3$ or less than 300 $mm^3$ or less than 275 $mm^3$ or less than 250 $mm^3$ or less than 225 $mm^3$ or less than 200 $mm^3$ or less than 175 $mm^3$ or less than 150 $mm^3$ or less than 125 $mm^3$ or less than 100 $mm^3$ or less than 75 $mm^3$ or less than 50 $mm^3$.

Embodiment 503. The method of Embodiment 492, wherein each green body abrasive article comprises an SDV and the green body with the highest SDV comprises an SDV of less than 0.0082 inches or less than 0.0080 inches or less than 0.0078 inches or less than 0.0076 inches or less than 0.0074 inches or less than 0.0072 inches or less than 0.0070 inches or less than 0.0068 inches or less than 0.0066 inches or less than 0.0064 inches or less than 0.0062 inches or less than 0.0060 inches or less than 0.0058 inches or less than 0.0056 inches or less than 0.0054 inches or less than 0.0052 inches.

Embodiment 504. The method of Embodiment 492, wherein each green body abrasive article comprises an SDV and the green body with the highest SDV comprises an SDV of at least 0.001 inches.

Embodiment 505. The method of Embodiment 492, wherein each green body abrasive article comprises an SDV and the mean SDV of all green body abrasive articles in the batch is less than 0.0063 inches or less than 0.0062 inches or less than 0.0061 inches or less than 0.0060 inches or less than 0.0059 inches or less than 0.0058 inches or less than 0.0057 inches or less than 0.0056 inches or less than 0.0055 inches or less than 0.0054 inches or less than 0.0053 inches or less than 0.0052 inches or less than 0.0051 inches or less than 0.0050 inches or less than 0.0049 inches or less than 0.0048 inches or less than 0.0047 inches or less than 0.0046 inches or less than 0.0045 inches or less than 0.0043 inches or less than 0.0042 inches or less than 0.0041 inches.

Embodiment 506. The method of Embodiment 492, wherein each green body abrasive article comprises an SDV and the mean SDV of all green body abrasive articles in the batch is at least 0.001 inches or at least 0.002 inches or at least 0.003 inches or at least 0.004 inches.

Embodiment 507. The method of Embodiment 492, wherein each abrasive article comprises an SDV and the abrasive article with the highest SDV comprises an SDV of less than 0.0082 inches or less than 0.0080 inches or less than 0.0078 inches or less than 0.0076 inches or less than 0.0074 inches or less than 0.0072 inches or less than 0.0070 inches or less than 0.0068 inches or less than 0.0066 inches or less than 0.0064 inches or less than 0.0062 inches or less than 0.0060 inches or less than 0.0058 inches or less than 0.0056 inches or less than 0.0054 inches or less than 0.0052 inches.

Embodiment 508. The method of Embodiment 492, wherein each abrasive article comprises an SDV and the abrasive article with the highest SDV comprises an SDV of at least 0.001 inches.

Embodiment 509. The method of Embodiment 492, wherein each abrasive article comprises an SDV and the mean SDV of all abrasive articles in the batch is less than 0.0063 inches or less than 0.0062 inches or less than 0.0061 inches or less than 0.0060 inches or less than 0.0059 inches or less than 0.0058 inches or less than 0.0057 inches or less than 0.0056 inches or less than 0.0055 inches or less than 0.0054 inches or less than 0.0053 inches or less than 0.0052 inches or less than 0.0051 inches or less than 0.0050 inches or less than 0.0049 inches or less than 0.0048 inches or less than 0.0047 inches or less than 0.0046 inches or less than 0.0045 inches or less than 0.0043 inches or less than 0.0042 inches or less than 0.0041 inches.

Embodiment 510. The method of Embodiment 492, wherein each abrasive article comprises an SDV and the mean SDV of all abrasive articles in the batch is at least 0.001 inches or at least 0.002 inches or at least 0.003 inches or at least 0.004 inches.

Embodiment 511. The method of Embodiment 492, wherein the batch of abrasive articles has a batch archimedes density variation of at least 0.0001 g/cc.

Embodiment 512. The method of Embodiment 492, wherein the batch of abrasive articles has a batch archimedes density variation of less than 0.034 g/cc or less than 0.032 g/cc or less than 0.030 g/cc or less than 0.028 g/cc.

Embodiment 513. The method of Embodiment 492, wherein the batch of abrasive articles has a batch porosity variation of less than 1 vol % or less than 0.9 vol % or less than 0.8 vol % or less than 0.7 vol % or less than 0.6 vol % or less than 0.5 vol % or less than 0.4 vol % or less than 0.3 vol % or less than 0.2 vol % or less than 0.1 vol % or less than 0.05 vol %.

Embodiment 514. The method of Embodiment 492, wherein the batch of abrasive articles has a batch porosity variation of at least 0.001.

Embodiment 515. The method of Embodiment 492, wherein the batch of abrasive articles has a batch hardness variation of at least 1 HRL or at least 2 HRL or at least 3 HRL or at least 4 HRL or at least 5 HRL.

Embodiment 516. The method of Embodiment 492, wherein the batch of abrasive articles has a batch hardness variation of less than 20 HRL or less than 19 HRL or less than 18 HRL or less than 17 HRL or less than 16 HRL or less than 15 HRL or less than 14 HRL or less than 13 HRL.

Embodiment 517. The method of Embodiment 492, wherein the batch of abrasive articles has a batch Dimensional variation-L of less than 0.3 mm or less than 0.29 mm or less than 0.28 mm or less than 0.27 mm or less than 0.26 mm or less than 0.25 mm or less than 0.24 mm or less than 0.23 mm or less than 0.22 mm or less than 0.21 mm or less than 0.20 mm or less than 0.19 mm or less than 0.18 mm or less than 0.17 mm.

Embodiment 518. The method of Embodiment 492, wherein the batch of abrasive articles has a batch Dimensional variation-L of at least 0.01.

Embodiment 519. The method of Embodiment 492, wherein the batch of abrasive articles has a batch Dimensional variation-W of less than 0.3 mm or less than 0.29 mm or less than 0.28 mm or less than 0.27 mm or less than 0.26 mm or less than 0.25 mm or less than 0.24 mm or less than 0.23 mm or less than 0.22 mm or less than 0.21 mm or less than 0.20 mm or less than 0.19 mm or less than 0.18 mm or less than 0.17 mm.

Embodiment 520. The method of Embodiment 492, wherein the batch of abrasive articles has a batch Dimensional variation-W of at least 0.001.

Embodiment 521. The method of Embodiment 492, wherein the batch of abrasive articles has a batch Dimensional variation-T of less than 0.9 mm or less than 0.85 mm or less than 0.80 mm or less than 0.75 mm or less than 0.70 mm or less than 0.65 mm or less than 0.60 mm or less than 0.55 mm or less than 0.50 mm or less than 0.45 mm or less than 0.40 mm or less than 0.35 mm or less than 0.30 mm or less than 0.25 mm or less than 0.20 mm or less than 0.15 mm or less than 0.10 mm or less than 0.05 mm.

Embodiment 522. The method of Embodiment 492, wherein the batch of abrasive articles has a batch Dimensional variation-T of at least 0.001.

Embodiment 523. The method of Embodiment 492, wherein the batch of abrasive articles has a batch Volume variation of at least 1 $mm^3$.

Embodiment 524. The method of Embodiment 492, wherein the batch of abrasive articles has a batch Volume variation of less than 400 $mm^3$ 350 $mm^3$ or less than 325 $mm^3$ or less than 300 $mm^3$ or less than 275 $mm^3$ or less than 250 $mm^3$ or less than 225 $mm^3$ or less than 200 $mm^3$ or less than 175 $mm^3$ or less than 150 $mm^3$ or less than 125 $mm^3$ or less than 100 $mm^3$ or less than 75 $mm^3$ or less than 60 $mm^3$.

Embodiment 525. The method of Embodiment 433, wherein the abrasive article is part of a batch of abrasive articles comprising:
 a minimum batch volume is at least 9 $cm^3$; and
 wherein the batch of abrasive articles comprises a batch density variation of not greater than 20% of an average density value of the batch.

Embodiment 526. The batch of Embodiment 376, wherein the batch of green body abrasive articles comprises a dimensional variation-L of not greater than 0.5% of the average length of the bodies or not greater than 0.45% of the average length of the bodies or not greater than 0.40% of the average length of the bodies or not greater than 0.35% of the average length of the bodies or not greater than 0.30% of the average length of the bodies or not greater than 0.25% of the average length of the bodies or not greater than 0.20% of the length of the bodies.

Embodiment 527. The batch of Embodiment 376, wherein the batch of green body abrasive articles comprises a dimensional variation-L of at least 0.001% of the average length of the bodies.

Embodiment 528. The batch of Embodiment 376, wherein the batch of green body abrasive articles comprises a dimensional variation-w of less than 1.2% of the average width of the bodies or less than 1.1% of the average width of the bodies or less than 1.0% of the average width of the bodies or less than 0.9% of the average width of the bodies or less than 0.8% of the average width of the bodies or less than 0.7% of the average width of the bodies or less than 0.6% of the average width of the bodies.

Embodiment 529. The batch of Embodiment 376, wherein the batch of green body abrasive articles comprises a dimensional variation-W of at least 0.001% of the average width of the bodies.

Embodiment 530. The batch of Embodiment 376, wherein the batch of green body abrasive articles comprises a dimensional variation-T of less than 9% of the average thickness of the bodies or less than 8% of the average thickness of the bodies or less than 7% of the average thickness of the bodies or less than 6% of the average thickness of the bodies or less than 5% of the average thickness of the bodies or less than 4% of the average thickness of the bodies or less than 3% of the average thickness of the bodies or less than 2% of the average thickness of the bodies or less than 1% of the average thickness of the bodies.

Embodiment 531. The batch of Embodiment 376, wherein the batch of green body abrasive articles comprises a dimensional variation-T of at least 0.001% of the average thickness of the bodies.

Embodiment 532. The batch of Embodiment 376, wherein the batch of green body abrasive articles comprises a volume standard deviation of less than 7% of the volume of the bodies or less than 6% of the volume of the bodies or less than 5% of the volume of the bodies or less than 4% of the volume of the bodies or less than 3% of the volume of the bodies or less than 2% of the volume of the bodies or less than 1% of the volume of the bodies.

Embodiment 533. The batch of Embodiment 376, wherein the batch of green body abrasive articles comprises a volume standard deviation at least 0.001% of the volume of the bodies.

Embodiment 534. The method of Embodiment 492, wherein the batch of green body abrasive articles bodies comprises a dimensional variation-L of not greater than 0.5% of the average length of the bodies or not greater than 0.45% of the average length of the bodies or not greater than 0.40% of the average length of the bodies or not greater than 0.35% of the average length of the bodies or not greater than 0.30% of the average length of the bodies or not greater than 0.25% of the average length of the bodies or not greater than 0.20% of the average length of the bodies.

Embodiment 535. The method of Embodiment 492, wherein the batch of green body abrasive articles comprises a dimensional variation-L of at least 0.001% of the average length of the bodies.

Embodiment 536. The method of Embodiment 492, wherein the batch of green body abrasive articles comprises a dimensional variation-w of less than 1.2% of the average width of the bodies or less than 1.1% of the average width of the bodies or less than 1.0% of the average width of the bodies or less than 0.9% of the average width of the bodies or less than 0.8% of the average width of the bodies or less than 0.7% of the average width of the bodies or less than 0.6% of the average width of the bodies.

Embodiment 537. The method of Embodiment 492, wherein the batch of green body abrasive articles comprises a dimensional variation-W of at least 0.001% of the average width of the bodies.

Embodiment 538. The method of Embodiment 492, wherein the batch of green body abrasive articles comprises a dimensional variation-T of less than 9% of the average thickness of the bodies or less than 8% of the average thickness of the bodies or less than 7% of the average thickness of the bodies or less than 6% of the average thickness of the bodies or less than 5% of the average thickness of the bodies or less than 4% of the average thickness of the bodies or less than 3% of the average thickness of the bodies or less than 2% of the average thickness of the bodies or less than 1% of the average thickness of the bodies.

Embodiment 539. The method of Embodiment 492, wherein the batch of green body abrasive articles comprises a dimensional variation-T of at least 0.001% of the average thickness of the bodies.

Embodiment 540. The method of Embodiment 492, wherein the batch of green body abrasive articles comprises a batch volume variation of less than 7% of the volume of the bodies or less than 6% of the volume of the bodies or less than 5% of the volume of the bodies or less than 4% of the volume of the bodies or less than 3% of the volume of the bodies or less than 2% of the volume of the bodies or less than 1% of the volume of the bodies.

Embodiment 541. The method of Embodiment 492, wherein the batch of green body abrasive articles comprises a batch volume variation of at least 0.001% of the volume of the bodies.

Embodiment 542. The batch of Embodiment 414, wherein the batch of abrasive articles comprises a dimensional variation-L of less than 0.8% of the average length of the bodies or less than 0.75% of the average length of the bodies or less than 0.70% of the average length of the bodies or less than 0.65% of the average length of the bodies or less than 0.60% of the average length of the bodies or less than 0.55% of the average length of the bodies or less than 0.50% of the average length of the bodies or less than 0.45% of the average length of the bodies or less than 0.40.

Embodiment 543. The batch of Embodiment 414, wherein the batch of abrasive articles comprises a dimensional variation-L of at least 0.001% of the average length of the bodies.

Embodiment 544. The batch of Embodiment 414, wherein the batch of abrasive articles comprises a dimensional variation-W of less than 0.3% of the average width of the bodies or less than 0.25% of the average width of the bodies or less than 0.20% of the average width of the bodies or less than 0.15% of the average width of the bodies or less than 0.10% of the average width of the bodies.

Embodiment 545. The batch of Embodiment 414, wherein the batch of abrasive articles comprises a dimensional variation-W of at least 0.001% of the average width of the bodies.

Embodiment 546. The batch of Embodiment 414, wherein the batch of abrasive articles comprises a dimensional variation-T of less than 0.9% of the average thickness of the bodies or less than 0.8% of the average thickness of the bodies or less than 0.7% of the average thickness of the bodies or less than 0.6% of the average thickness of the bodies or less than 0.5% of the average thickness of the bodies or less than 0.4% of the average thickness of the bodies or less than 0.3% of the average thickness of the bodies or less than 0.2% of the average thickness of the bodies or less than 0.1% of the average thickness of the bodies.

Embodiment 547. The batch of Embodiment 414, wherein the batch of abrasive articles comprises a dimensional variation-T of at least 0.001% of the average thickness of the bodies.

Embodiment 548. The batch of Embodiment 414, wherein the batch of abrasive articles comprises a batch volume variation of less than 8% of the volume of the bodies or less than 7% of the volume of the bodies or less than 6% of the volume of the bodies or less than 5% of the volume of the bodies or less than 4% of the volume of the bodies or less than 3% of the volume of the bodies or less than 2% of the volume of the bodies or less than 1% of the volume of the bodies.

Embodiment 549. The batch of Embodiment 414, wherein the batch of abrasive articles comprises a batch volume variation of at least 0.001% of the volume of the bodies.

Embodiment 550. The method of Embodiment 492, wherein the batch of abrasive articles comprises a dimensional variation-L of less than 0.8% of the volume of the bodies or less than 0.75% of the volume of the bodies or less than 0.70% of the volume of the bodies or less than 0.65% of the volume of the bodies or less than 0.60% of the volume of the bodies or less than 0.55% of the volume of the bodies or less than 0.50% of the volume of the bodies or less than 0.45% of the volume of the bodies or less than 0.40.

Embodiment 551. The method of Embodiment 492, wherein the batch of abrasive articles comprises a dimensional variation-L of at least 0.001% of the average thickness of the bodies.

Embodiment 552. The method of Embodiment 492, wherein the batch of abrasive articles comprises a dimensional variation-W of less than 0.3% of the average width of the bodies or less than 0.25% of the average width of the bodies or less than 0.20% of the average width of the bodies or less than 0.15% of the average width of the bodies or less than 0.10% of the average width of the bodies.

Embodiment 553. The method of Embodiment 492, wherein the batch of abrasive articles comprises a dimensional variation-W of at least 0.001% of the average width of the bodies.

Embodiment 554. The method of Embodiment 492, wherein the batch of abrasive articles comprises a dimensional variation-T of less than 0.9% of the average thickness of the bodies or less than 0.8% of the average thickness of the bodies or less than 0.7% of the average thickness of the bodies or less than 0.6% of the average thickness of the bodies or less than 0.5% of the average thickness of the bodies or less than 0.4% of the average thickness of the bodies or less than 0.3% of the average thickness of the bodies or less than 0.2% of the average thickness of the bodies or less than 0.1% of the average thickness of the bodies.

Embodiment 555. The method of Embodiment 492, wherein the batch of abrasive articles comprises a dimensional variation-T of at least 0.001% of the average thickness of the bodies.

Embodiment 556. The method of Embodiment 492, wherein the batch of abrasive articles comprises a batch volume variation of less than 8% of the volume of the bodies or less than 7% of the volume of the bodies or less than 6% of the volume of the bodies or less than 5% of the volume of the bodies or less than 4% of the volume of the bodies or less than 3% of the volume of the bodies or less than 2% of the volume of the bodies or less than 1% of the volume of the bodies.

Embodiment 557. The method of Embodiment 492, wherein the batch of abrasive articles comprises a batch volume variation of at least 0.001% of the volume of the bodies.

Embodiment 558. The green body abrasive article of Embodiment 358, wherein the body has a linear feature factor of at least 0.126 inches or at least 0.128 inches or at least 0.130 inches or at least 0.132 inches or at least 0.134 inches or at least inches or at least 0.136 inches or at least 0.138 inches or at least 0.140 inches.

Embodiment 559. The green body abrasive article of Embodiment 358, wherein the body has a linear feature factor of less than 1 inch or less than 0.5 inches or less than 0.4 inches or less than 0.3 inches or less than 0.2 inches or less than 0.15 inches.

Embodiment 560. The green body abrasive article of Embodiment 358, wherein the body is essentially free of linear features.

Embodiment 561. The abrasive article of Embodiment 391, wherein the abrasive article has a linear feature factor of at least 0.126 inches or at least 0.128 inches or at least 0.130 inches or at least 0.132 inches or at least 0.134 inches or at least inches or at least 0.136 inches or at least 0.138 inches or at least 0.140 inches.

Embodiment 562. The abrasive article of Embodiment 391, wherein the abrasive article has a linear feature factor of less than 1 inch or less than 0.5 inches or less than 0.4 inches or less than 0.3 inches or less than 0.2 inches or less than 0.15 inches.

Embodiment 563. The abrasive article of Embodiment 391, wherein the abrasive article is essentially free of linear features.

Embodiment 564. The method of Embodiment 492, wherein each of the abrasive articles has a linear feature factor of at least 0.126 inches or at least 0.128 inches or at least 0.130 inches or at least 0.132 inches or at least 0.134 inches or at least inches or at least 0.136 inches or at least 0.138 inches or at least 0.140 inches.

Embodiment 565. The method of Embodiment 492, wherein each of the abrasive articles has a linear feature factor of less than 1 inch or less than 0.5 inches or less than 0.4 inches or less than 0.3 inches or less than 0.2 inches or less than 0.15 inches.

Embodiment 566. The method of Embodiment 492, wherein each of the abrasive articles is essentially free of linear features.

EXAMPLES

The following non-limiting examples illustrate the present invention.

Example 1

A mixture is prepared by combining two individual dry powder materials: a precursor bond material and abrasive particles. The precursor bond material is an oxide-containing material that forms a vitreous phase material upon further processing.

The additive manufacturing process is conducted according to embodiments described herein. The additive manufacturing process may be characterized as a binder jetting operation, wherein layers of the powder material are deposited into a build box, the layers are smoothed, compacted, and selectively bound with a binder material to form a batch of green body abrasive articles contained a bed of unbound or loose powder. Each of the green body abrasive articles has any one or more of the features claimed in the embodiments herein. The batch of green body abrasive articles has any one or more of the features claimed in the embodiments herein. The green body abrasive article is converted to finally-formed abrasive article via heating as provided below. Example 1 was formed using an ExOne Innovent+. The printing conditions are summarized in Table 1.

TABLE 1

| Parameter | Samples S1 |
| --- | --- |
| Saturation (%) | 10-200% |
| Layer Thickness [μm] | 1-1000 |
| Foundation Layer Count | 0-200 |
| Oscillator on Delay (sec)Dispenser Delay | 0-20 |
| Dispense coverage parameter (% of bed length for dispensing powder material) | 0-100% |
| Binder Set Time (sec) | 0-30 |
| Recoater Dry Speed (mm/s) | 1-120 |
| Target Bed Temperature (° C.) | 20-100 |
| Recoat Speed (mm/s) | 1-200 |
| Smoothing Roller Rotation Rate(rpm) | 1-1000 |
| Smoothing Roller Speed (mm/s) | 1-200 |
| Binder Droplet Volume (pL)- | 10-80 |
| Binder Droplet Frequency (Hz)- | 955-10,000 |
| Compaction Roller Speed (mm/s) | 1-150 |
| Compaction thickness Δ (μm) | 5-300 |

The build box has dimensions of length of at least 150 mm, a width of at least 60 mm, and a depth of at least 60 mm. The forming process creates a green body abrasive article having dimensions of a length of at least 6 cm and/or a width of at least 2.8 cm and/or a solid volume of at least 9 cm$^3$. The green body abrasive article has a thickness of at least 1 mm.

After forming, the green body is heated at a rate of 5° C./min up to a temperature of 375° C. under air and held for one hour at 375° C. to remove the binder. Thereafter, the air is replaced with argon and the body is heated at a ramp rate of 5° C./min up to a maximum temperature of 1500° C. The temperature is held for four hours at 1500° C., and cooling is conducted at a rate of 5° C./minute.

Example 2

A mixture is prepared by combining two individual dry powder materials: a precursor bond material and abrasive particles. The precursor bond material is a metal-containing material.

The process for forming the green body abrasive article of Example 2 is conducted using an ExOne25 Pro. Printing conditions are provided in Table 2 below.

TABLE 2

| Parameter | Samples S2 |
| --- | --- |
| Saturation (%) | 10-200% |
| Layer Thickness [μm] | 1-1000 |
| Foundation Layer Count | 0-200 |
| Oscillator on Delay (sec)Dispenser Delay | 0-20 |
| Dispense coverage parameter (% of bed length for dispensing powder material) | 0-100% |
| Binder Set Time (sec) | 0-30 |
| Recoater Dry Speed (mm/s) | 1-120 |
| Target Bed Temperature (° C.) | 20-100 |
| Recoat Speed (mm/s) | 1-200 |
| Smoothing Roller Rotation Rate(rpm) | 1-1000 |
| Smoothing Roller Speed (mm/s) | 1-200 |
| Binder Droplet Volume (pL) | 10-80 |
| Binder Droplet Frequency (Hz) | 955-10,000 |
| Compaction Roller Speed (mm/s) | 1-150 |
| Compaction thickness Δ (μm) | 5-300 |

The build box has dimensions of length of at least 150 mm, a width of at least 60 mm, and a depth of at least 60 mm. The forming process creates a green body abrasive article having dimensions of a length of at least 6 cm and/or a width of at least 2.8 cm and/or a solid volume of at least 9 cm$^3$. The green body abrasive article has a thickness of at least 1 mm.

Comparative Example 1

A sample was prepared using a binder jetting operation as generally described in Example 1. However, the powder material was 20 wt % of SP1086 glass powder from Specialty Glass Inc., in Oldsmar, Florida and 80 wt % of 200/230 Mesh, D76 diamond powder from Pinnacle Abrasives (Santa Rosa, CA). The binder used was PM-B-SR1-04 from ExOne. The forming conditions are detailed below in Table 3 and were formed using an Innovent ExOne Printer. FIG. 17 includes images of CS1 samples.

TABLE 3

| Parameter | Samples CS1 |
| --- | --- |
| Saturation (%) | 70 |
| Layer Thickness [μm] | 100 |
| Foundation Layer Count | 5 |
| Oscillator on Delay (sec) | 2 |
| Binder Set (sec) | 1 |
| Dry Time (sec) | 45 |
| Target Temperature (° C.) | 60 |
| Recoat Speed (rpm) | 10 |
| Oscillator Speed (rpm) | 2800 |
| Roller Speed (rpm) | 60 |
| Roller Speed (mm/s) | 1 |

The body was then cured in an ambient atmosphere oven for 2 hours at 195° C. After curing and cooling to 23° C. the cured bodies are placed into a furnace and burned out at 400° C. for 2 hours, followed by sintering at 700° C. for 4 hours, to produce comparative sample CS1.

SDR and Surface Roughness

The Sdr and surface roughness (Sa) of transverse surfaces and other surfaces of representative samples ("Sample") and Sample CS1 were measured and detailed below in Table 4.

TABLE 4

| Sample | Sdr[%] Transverse | Sdr[%] Top | Sdr[%] Difference | Sa[microns] Transverse | Sa[microns] Top |
| --- | --- | --- | --- | --- | --- |
| Sample | 76.5 | 64.7 | 11.8 | 11 | 9.112 |
| CS1 | 130 | 100 | 30 | | |

Notably, Sample had a much smaller transverse Sdr and Sdr difference than CS1.

Compaction and Density-Preparation

Figure 18:
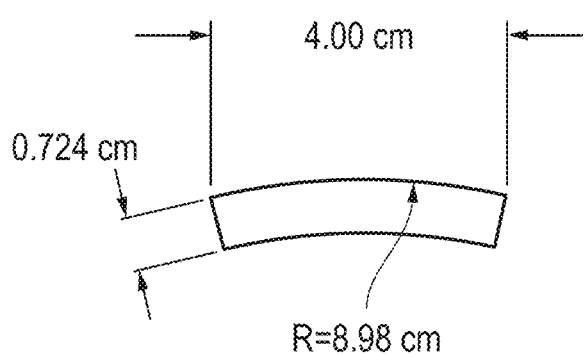
FIG. 18 includes an image of an abrasive segment.
Figure 19A:
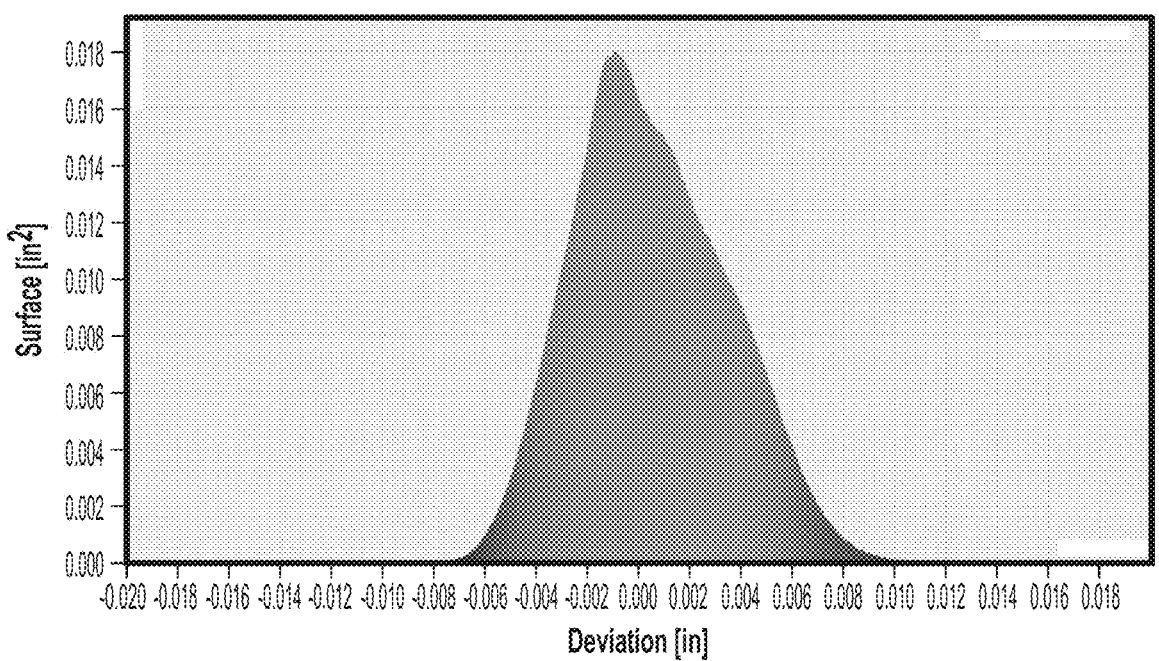
FIGS. 19A-D and 20A-D include curves plotting surface area deviations of abrasive articles.
Figure 19B:
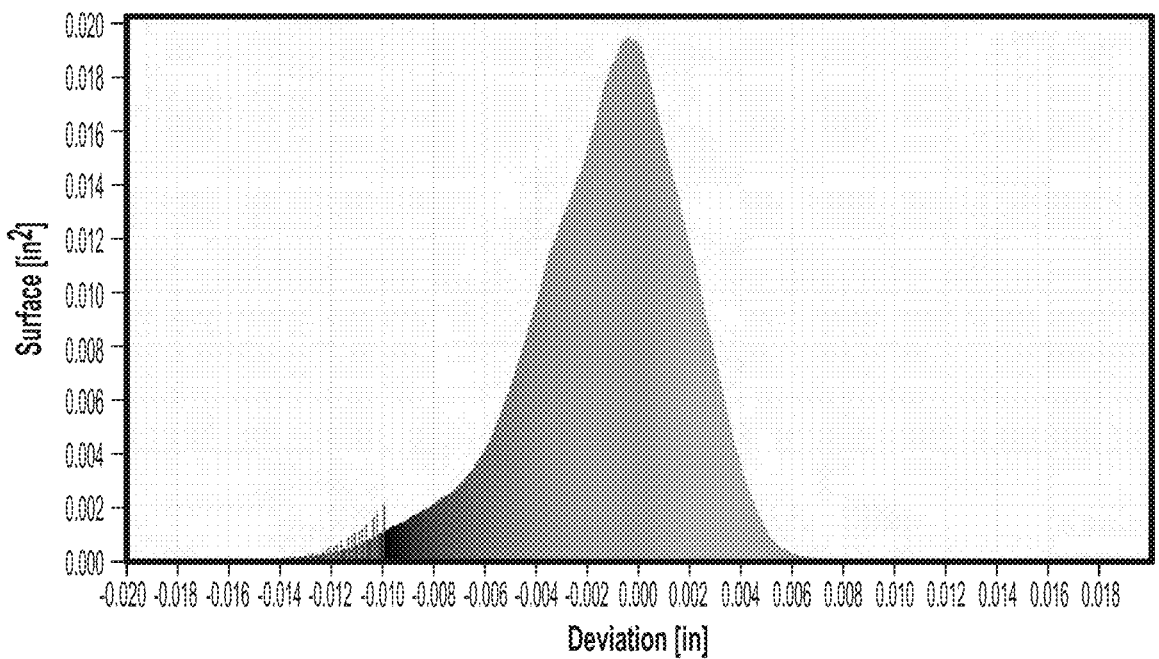
Figure 19C:
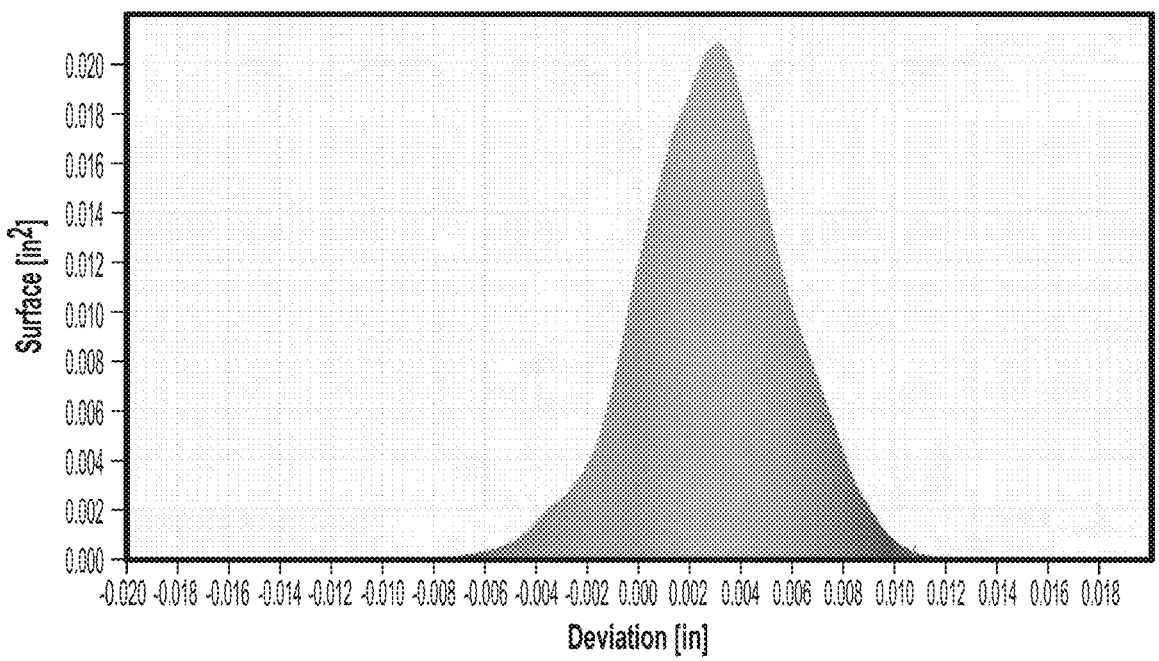
Figure 19D:
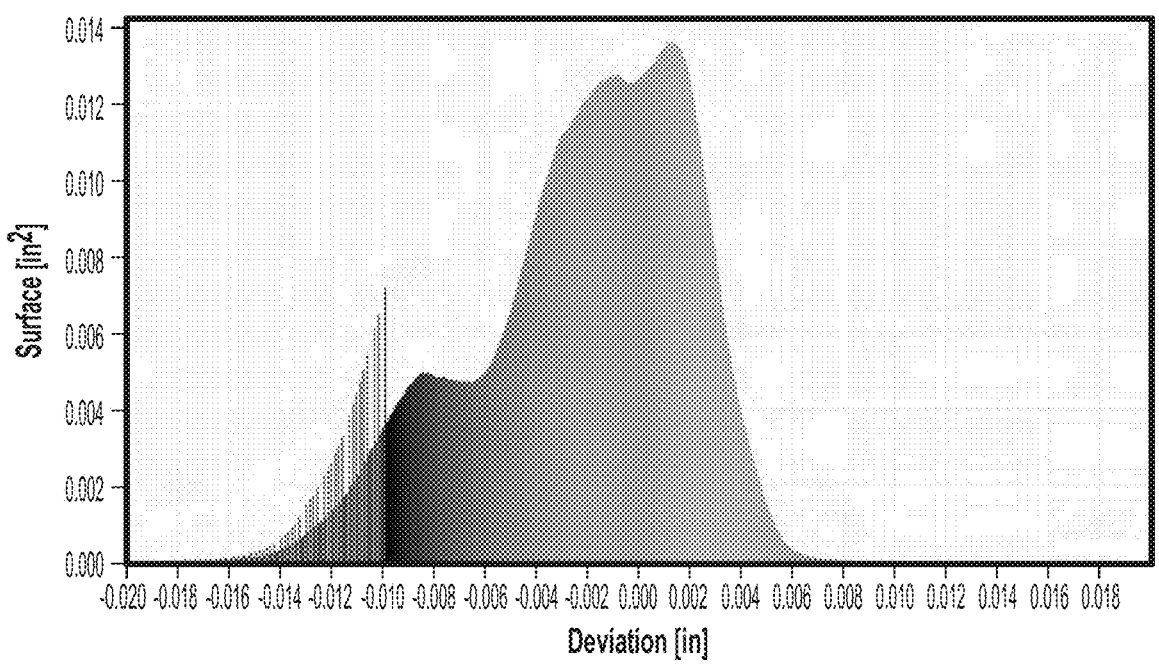
Figure 20A:
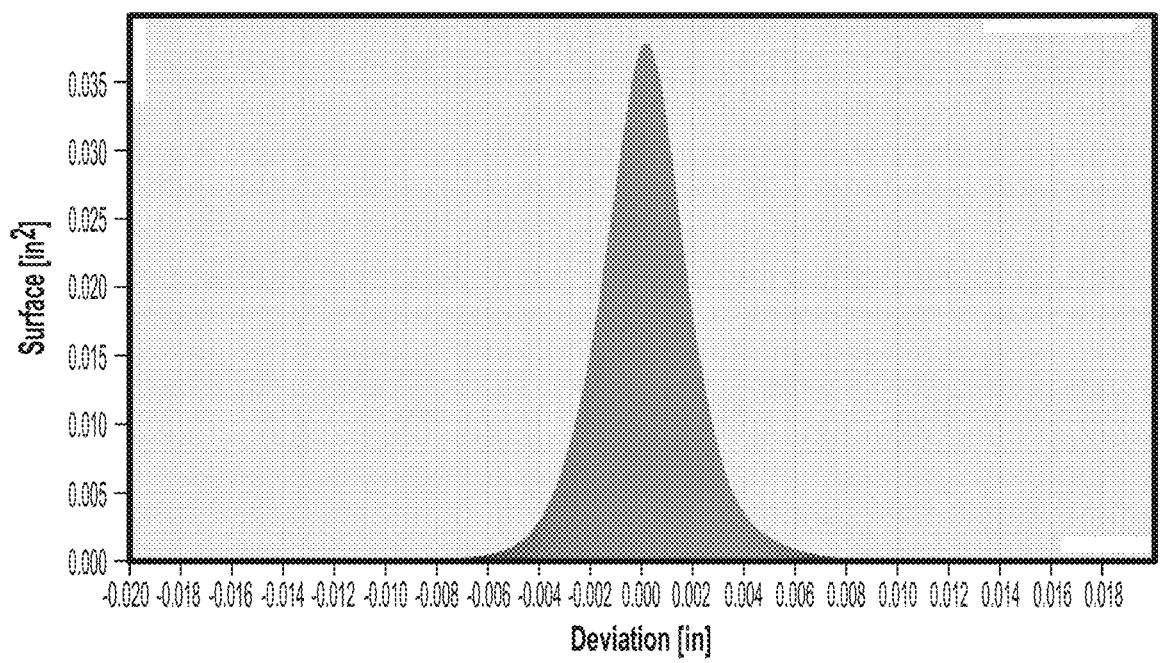
Figure 20B:
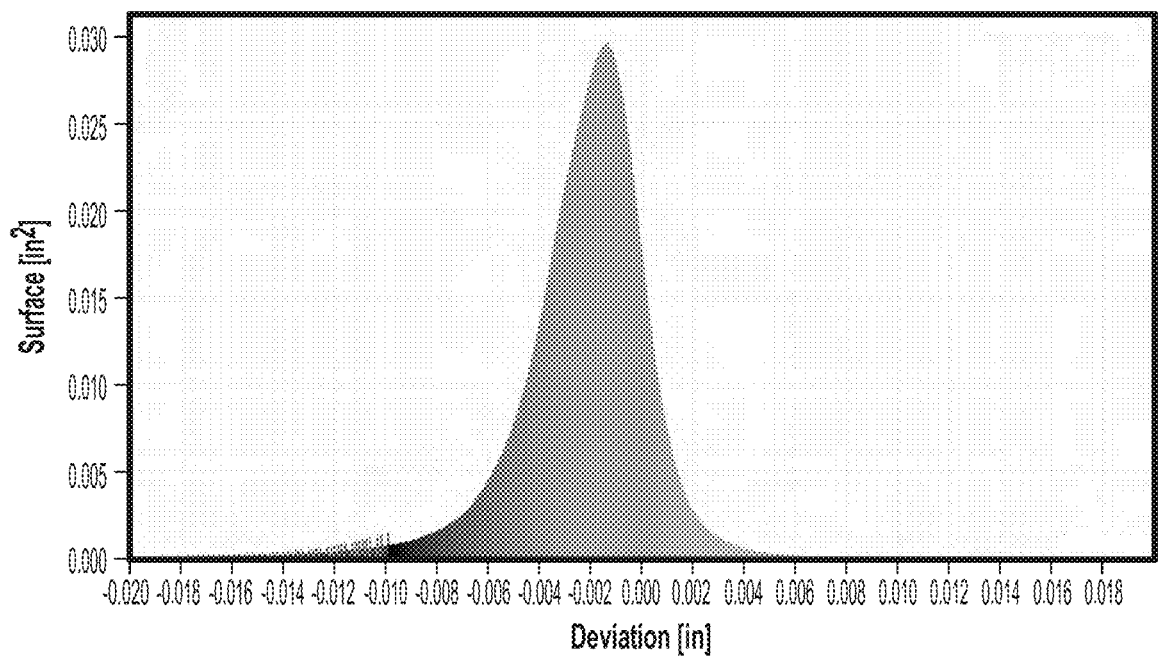
Figure 20C:
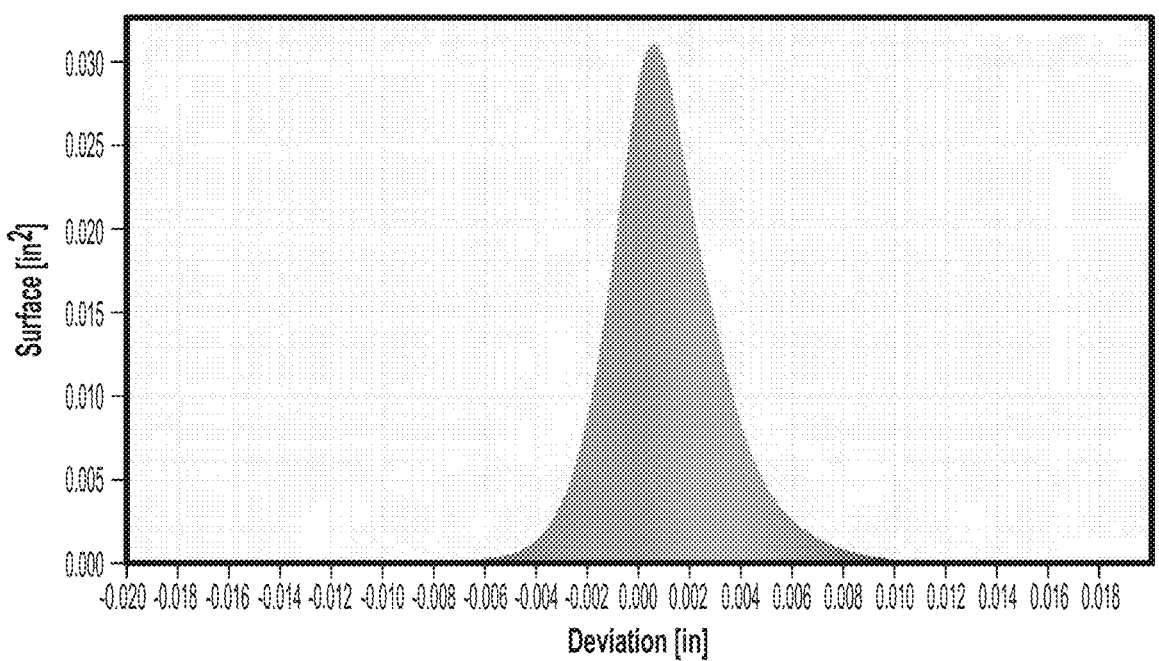
Figure 20D:
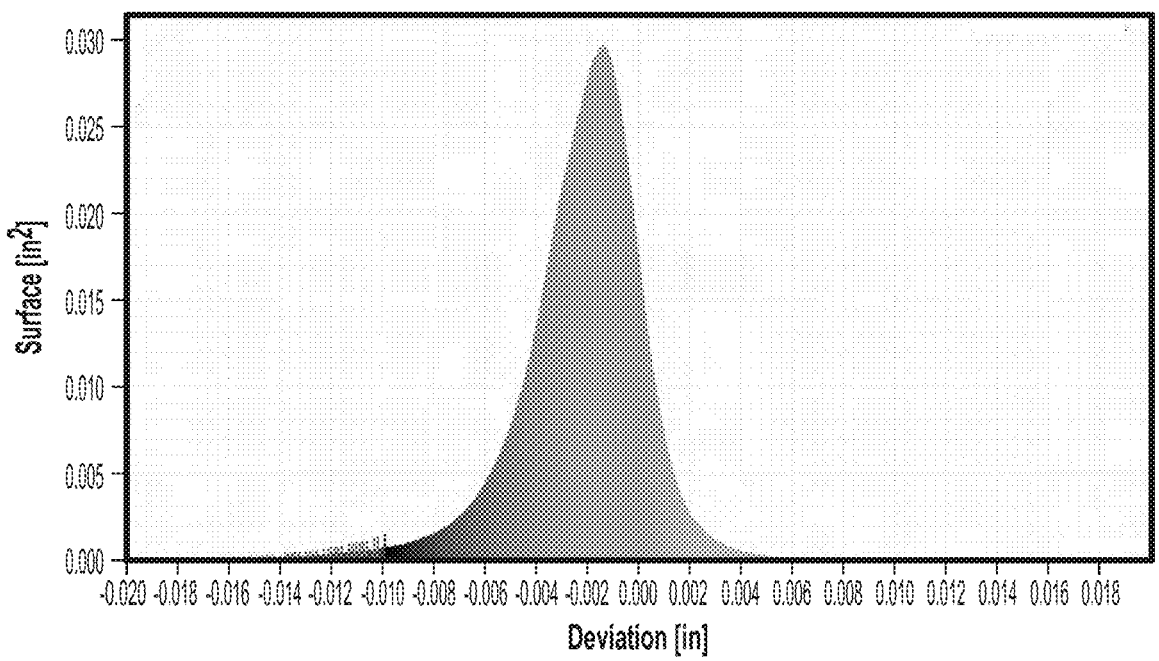

Samples were prepared according to the procedures outlined in Example 1 according to table 5. Samples were formed into green body abrasives having a either 1) rectangular prismatic shape having target dimensions 44.5 mm×16.5 mm×7.3 mm or 50 mm×18 mm×10 mm 2) curved segments having the dimensions shown in FIG. 18. The bond material and abrasive mixture included 76.8 wt % cBN (average particle size 8 microns) and 23.2 wt % glass bond (average particle size 126 microns). The binder used was aqueous binder 7100037CL from ExOne. Sdr measurements for each sample are still being measured.

TABLE 5a

| Parameter | Batch 3A | Batch 3B | Batch 3C | Batch 3D |
| --- | --- | --- | --- | --- |
| Machine | Innovent+ | Innovent+ | Innovent+ | Innovent+ |
| Compaction thickness Δ (μm) | 50 | 50 | 50 | 50 |
| Saturation (%) | 36.6% | 36.6% | 36.6% | 36.6% |
| Layer Thickness [μm] | 200 | 200 | 200 | 200 |
| Foundation Layer Count | 0 | 0 | 0 | 0 |
| Oscillator on Delay (sec) | 2 | 2 | 2 | 2 |
| Binder Set Time (sec) | 50 | 50 | 50 | 50 |
| Dry Time (sec) | 20 | 20 | 20 | 20 |
| Target Bed Temperature (° C.) | 50 | 50 | 50 | 50 |
| Recoat Speed (mm/s) | 70 | 70 | 70 | 70 |
| Smoothing Roller Speed (rpm) | 300 | 300 | 300 | 300 |
| Smoothing Roller Speed (mm/s) | 5 | 5 | 5 | 5 |
| Binder Droplet Volume (pL) | 80 | 80 | 80 | 80 |
| Binder Droplet Frequency (Hz) | 3740 | 3740 | 3740 | 3740 |
| Compaction Roller Speed (mm/s) | 5 | 5 | 5 | 5 |

TABLE 5b

| Parameter | Batch 4A | Batch 4B | Batch 4C | Comparative Batch 2 |
| --- | --- | --- | --- | --- |
| Machine | Innovent+ | Innovent+ | Innovent+ | Innovent+ |
| Compaction thickness Δ (μm) | 150 | 150 | 150 | 0 |
| Saturation (%) | 36.6% | 36.6% | 36.6% | 36.6% |
| Layer Thickness [μm] | 200 | 200 | 200 | 200 |
| Foundation Layer Count | 0 | 0 | 0 | 0 |
| Oscillator on Delay (sec) | 2 | 2 | 2 | 2 |
| Binder Set Time (sec) | 50 | 50 | 50 | 50 |
| Dry Time (sec) | 20 | 20 | 20 | 20 |
| Target Bed Temperature (° C.) | 50 | 50 | 50 | 50 |
| Recoat Speed (mm/s) | 70 | 70 | 70 | 70 |
| Smoothing Roller Speed (rpm) | 300 | 300 | 300 | 300 |
| Smoothing Roller Speed (mm/s) | 5 | 5 | 5 | 5 |
| Binder Droplet Volume (pL) | 80 | 80 | 80 | 80 |

TABLE 5b-continued

| Parameter | Batch 4A | Batch 4B | Batch 4C | Comparative Batch 2 |
|---|---|---|---|---|
| Binder Droplet Frequency (Hz) | 3740 | 3740 | 3740 | 3740 |
| Compaction Roller Speed (mm/s) | 5 | 5 | 5 | 5 |

TABLE 5c

| Parameter | Batch 5 | Comparative Batch 5 |
|---|---|---|
| Machine | Innovent+ | Innovent+ |
| Compaction thickness Δ (μm) | 50 | 0 |
| Saturation (%) | 36.6% | 36.6% |
| Layer Thickness [μm] | 200 | 200 |
| Foundation Layer Count | 0 | 0 |
| Oscillator on Delay (sec) | 2 | 2 |
| Binder Set Time (sec) | 50 | 50 |
| Dry Time (sec) | 20 | 20 |
| Target Bed Temperature (° C.) | 50 | 50 |
| Recoat Speed (mm/s) | 70 | 70 |
| Smoothing Roller Speed (rpm) | 300 | 300 |
| Smoothing Roller Speed (mm/s) | 5 | 5 |
| Binder Droplet Volume (pL) | 80 | 80 |
| Binder Droplet Frequency (Hz) | 3740 | 3740 |
| Compaction Roller Speed (mm/s) | 5 | 5 |

TABLE 5d

| Parameter | Batch 6A | Batch 6B | Batch 6C | Batch 6D |
|---|---|---|---|---|
| Machine | Innovent+ | Innovent+ | Innovent+ | Innovent+ |
| Compaction thickness Δ (μm) | 0 | 25 | 50 | 150 |
| Saturation (%) | 36.6% | 36.6% | 36.6% | 36.6% |
| Layer Thickness [μm] | 200 | 200 | 200 | 200 |
| Foundation Layer Count | 0 | 0 | 0 | 0 |
| Oscillator on Delay (sec) | 2 | 2 | 2 | 2 |
| Binder Set Time (sec) | 50 | 50 | 50 | 50 |
| Dry Time (sec) | 20 | 20 | 20 | 20 |
| Target Bed Temperature (° C.) | 50 | 50 | 50 | 50 |
| Recoat Speed (mm/s) | 70 | 70 | 70 | 70 |
| Smoothing Roller Speed (rpm) | 300 | 300 | 300 | 300 |
| Smoothing Roller Speed (mm/s) | 5 | 5 | 5 | 5 |
| Binder Droplet Volume (pL) | 80 | 80 | 80 | 80 |
| Binder Droplet Frequency (Hz) | 3740 | 3740 | 3740 | 3740 |
| Compaction Roller Speed (mm/s) | 5 | 5 | 5 | 5 |

TABLE 5e

| Parameter | Batch 7A | Batch 7B | Comparative Batch 7 |
|---|---|---|---|
| Machine | Innovent+ | Innovent+ | Innovent+ |
| Compaction thickness Δ (μm) | 50 | 50 | 0 |
| Saturation (%) | 36.6% | 36.6% | 36.6% |
| Layer Thickness [μm] | 200 | 200 | 200 |
| Foundation Layer Count | 0 | 0 | 0 |
| Oscillator on Delay (sec) | 2 | 2 | 2 |
| Binder Set Time (sec) | 50 | 50 | 50 |
| Dry Time (sec) | 20 | 20 | 20 |
| Target Bed Temperature (° C.) | 50 | 50 | 50 |
| Recoat Speed (mm/s) | 70 | 70 | 70 |
| Smoothing Roller Speed (rpm) | 300 | 300 | 300 |
| Smoothing Roller Speed (mm/s) | 5 | 5 | 5 |
| Binder Droplet Volume (pL) | 80 | 80 | 80 |
| Binder Droplet Frequency (Hz) | 3740 | 3740 | 3740 |
| Compaction Roller Speed (mm/s) | 5 | 5 | 5 |

TABLE 5f

| Parameter | Batch 8 | Batch 9 | Batch 10 | Batch 11 |
|---|---|---|---|---|
| Machine | Innovent+ | Innovent+ | Innovent+ | Innovent+ |
| Compaction thickness Δ (μm) | 5 | 10 | 15 | 20 |
| Saturation (%) | 36.6% | 36.6% | 36.6% | 36.6% |
| Layer Thickness [μm] | 200 | 200 | 200 | 200 |
| Foundation Layer Count | 0 | 0 | 0 | 0 |
| Oscillator on Delay (sec) | 2 | 2 | 2 | 2 |
| Binder Set Time (sec) | 50 | 50 | 50 | 50 |
| Dry Time (sec) | 20 | 20 | 20 | 20 |
| Target Bed Temperature (° C.) | 50 | 50 | 50 | 50 |
| Recoat Speed (mm/s) | 70 | 70 | 70 | 70 |
| Smoothing Roller Speed (rpm) | 300 | 300 | 300 | 300 |
| Smoothing Roller Speed (mm/s) | 5 | 5 | 5 | 5 |
| Binder Droplet Volume (pL) | 80 | 80 | 80 | 80 |
| Binder Droplet Frequency (Hz) | 3740 | 3740 | 3740 | 3740 |
| Compaction Roller Speed (mm/s) | 5 | 5 | 5 | 5 |

TABLE 5g

| Parameter | Batch 12 | Batch 13 | Batch 14 | Batch 15 |
|---|---|---|---|---|
| Machine | Innovent+ | Innovent+ | Innovent+ | Innovent+ |
| Compaction thickness Δ (μm) | 200 | 225 | 250 | 300 |
| Saturation (%) | 36.6% | 36.6% | 36.6% | 36.6% |
| Layer Thickness [μm] | 200 | 200 | 200 | 200 |
| Foundation Layer Count | 0 | 0 | 0 | 0 |
| Oscillator on Delay (sec) | 2 | 2 | 2 | 2 |
| Binder Set Time (sec) | 50 | 50 | 50 | 50 |
| Dry Time (sec) | 20 | 20 | 20 | 20 |
| Target Bed Temperature (° C.) | 50 | 50 | 50 | 50 |
| Recoat Speed (mm/s) | 70 | 70 | 70 | 70 |
| Smoothing Roller Speed (rpm) | 300 | 300 | 300 | 300 |
| Smoothing Roller Speed (mm/s) | 5 | 5 | 5 | 5 |
| Binder Droplet Volume (pL) | 80 | 80 | 80 | 80 |
| Binder Droplet Frequency (Hz) | 3740 | 3740 | 3740 | 3740 |
| Compaction Roller Speed (mm/s) | 5 | 5 | 5 | 5 |

Compaction and Density-Green Body Density

Green body density was measured in samples prepared according to batches made from batch 3A-D, 4A-C, 5, 7A and 7B, and comparative batch 2, 5, and 7. Comparative batch 7 was in the shape of segments according to the dimensions in FIG. 18 while the samples 3A-D, 4A-C, 7A, 7B were rectangular prisms having target dimensions 44.5 mm×16.5 mm×7.3 mm. Sample 5 and comparative batches 2 and 5 were formed into rectangular prisms having target dimensions 50 mm×18 mm×10 mm. For each batch of samples, average (mean) density and density standard deviation was calculated. Density measurements for green bodies were geometric density measurements. Density standard deviation may also be referred to as batch density variation. Batches 8-15 have yet to be measured.

TABLE 6

| Batch | No. of samples | Compaction thickness Δ (μm) | Average Density (g/cc) | Target Density (g/cc) | Batch Density Variation (g/cc) |
|---|---|---|---|---|---|
| 3A | 5 | 50 | 1.783 | 1.86 | 0.016 |
| 3B | 5 | 50 | 1.812 | 1.86 | 0.011 |
| 3C | 5 | 50 | 1.808 | 1.86 | 0.005 |
| 3D | 5 | 50 | 1.822 | 1.86 | 0.009 |
| 4A | 5 | 150 | 1.830 | 1.86 | 0.015 |
| 4B | 5 | 150 | 1.832 | 1.86 | 0.015 |
| 4C | 5 | 150 | 1.876 | 1.86 | 0.008 |
| 7A | 5 | 50 | 1.800 | 1.86 | 0.027 |
| 7B | 5 | 50 | 1.803 | 1.86 | 0.004 |
| Comparative 7 | 15 | 0 | 1.701 | 1.86 | 0.028 |
| Comparative 2 | 7 | 0 | 1.57 | 1.86 | 0.047 |
| 5 | 8 | 50 | 1.77 | 1.86 | 0.12 |
| Comparative 5 | 8 | 0 | 1.59 | 1.86 | 0.37 |
| Sample 8 | | 5 | | | |
| Sample 9 | | 10 | | | |
| Sample 10 | | 15 | | | |
| Sample 11 | | 20 | | | |
| Sample 12 | | 200 | | | |
| Sample 13 | | 225 | | | |
| Sample 14 | | 250 | | | |
| Sample 15 | | 300 | | | |

Compaction and Density-Sintered Body Density

Batches of samples 3A-D, 4A-C, 6A-D, 7A and 7B and comparative sample 7 were sintered under nitrogen at a maximum temperature of 1,000° C. for approximately 4 hours. Comparative sample 7 was in the shape of segments according to the dimensions in FIG. 18 while the samples 3A-D, 4A-C, 7A, 7B were rectangular prisms having target dimensions 44.5 mm×16.5 mm×7.3 mm. Samples 6A-D included segments and blocks. Sintered body density was measured in batches prepared according to batches 2A-D, 3A-C, 4 and 5A-D, and comparative samples 2 and 4. Sintered body density averages and standard deviations can be found in table 7. Sintered body density measurements were Archimedes density measurements. Sintered bodies Archimedes density standard deviation may also be referred to as Batch Archimedes Density Variation. Samples 8-15 have yet to be measured.

TABLE 7

| Batch | No. of samples | Compaction thickness Δ (μm) | Average Density (g/cc) | Batch Archimedes Density Variation |
|---|---|---|---|---|
| 3A | 5 | 50 | 2.132 | 0.005 |
| 3B | 5 | 50 | 2.131 | 0.013 |
| 3C | 5 | 50 | 2.119 | 0.007 |
| 3D | 5 | 50 | 2.138 | 0.002 |
| 4A | 5 | 150 | 2.158 | 0.002 |
| 4B | 5 | 150 | 2.160 | 0.013 |
| 4C | 5 | 150 | 2.142 | 0.008 |
| 7A | 5 | 50 | 2.037 | 0.014 |
| 7B | 5 | 50 | 2.135 | 0.006 |
| Comparative 7 | 15 | 0 | 2.035 | 0.034 |
| 6A | 8 | 0 | 2.077 | 0.024 |
| 6B | 17 | 25 | 2.087 | 0.014 |
| 6C | 31 | 50 | 2.126 | 0.019 |
| Sample 8 | | | | |
| Sample 9 | | | | |
| Sample 10 | | | | |
| Sample 11 | | | | |
| Sample 12 | | | | |
| Sample 13 | | | | |
| Sample 14 | | | | |
| Sample 15 | | | | |

Compaction and Dimensional Stability-Green Body Dimensions

The dimensions of articles from batches according to samples 3A-D, 4A-C, 5 and 7A-B, as well as comparative sample 7, were measured. The standard deviation of each dimension within each batch as well as volume standard deviation can be found below in table 8. Dimension standard deviations for length width and thickness may be referred to as Batch Dimensional Variation-L, Batch Dimensional Variation-W, and Batch Dimensional Variation-T respectively. Likewise, volume standard deviation may be referred to as batch volume variation.

TABLE 8a

| Batch | No. of samples | Compaction thickness Δ (μm) | Batch Dimensional Variation-L (mm) | Batch Dimensional Variation-W (mm) | Batch Dimensional Variation-T (mm) | Batch Volume Variation (mm$^3$) |
|---|---|---|---|---|---|---|
| 3A | 5 | 50 | 0.0186 | 0.0136 | 0.0228 | 16.4 |
| 3B | 5 | 50 | 0.0377 | 0.0286 | 0.0141 | 19.1 |
| 3C | 5 | 50 | 0.0231 | 0.0325 | 0.0325 | 32.3 |
| 3D | 5 | 50 | 0.0231 | 0.0242 | 0.0241 | 22.6 |
| 4A | 5 | 150 | 0.0479 | 0.0694 | 0.0272 | 23.0 |
| 4B | 5 | 150 | 0.0426 | 0.0405 | 0.0510 | 42.7 |
| 4C | 5 | 150 | 0.0355 | 0.0376 | 0.0167 | 7.19 |
| 7A | 5 | 50 | 0.0222 | 0.0538 | 0.0127 | 11.6 |
| 7B | 5 | 50 | 0.0189 | 0.0344 | 0.0063 | 12.6 |
| Comparative 7 | 15 | 0 | 0.250 | 0.204 | 0.701 | 395.6 |
| Sample 8 | | 5 | | | | |
| Sample 9 | | 10 | | | | |
| Sample 10 | | 15 | | | | |
| Sample 11 | | 20 | | | | |
| Sample 12 | | 200 | | | | |

TABLE 8a-continued

| Batch | No. of samples | Compaction thickness Δ (μm) | Batch Dimensional Variation-L (mm) | Batch Dimensional Variation-W (mm) | Batch Dimensional Variation-T (mm) | Batch Volume Variation (mm³) |
|---|---|---|---|---|---|---|
| Sample 13 | | 225 | | | | |
| Sample 14 | | 250 | | | | |
| Sample 15 | | 300 | | | | |

TABLE 8b

| Batch | No. of samples | Compaction thickness Δ (μm) | Batch Dimensional Variation-L as a % of length | Batch Dimensional Variation-W as a % of width | Batch Dimensional Variation-T as a % of thickness | Batch Volume Variation as a % of volume |
|---|---|---|---|---|---|---|
| 3A | 5 | 50 | 0.0417 | 0.0824 | 0.3167 | 0.3060 |
| 3B | 5 | 50 | 0.0847 | 0.1733 | 0.1958 | 0.3563 |
| 3C | 5 | 50 | 0.0519 | 0.1969 | 0.4514 | 0.6026 |
| 3D | 5 | 50 | 0.0519 | 0.1466 | 0.3347 | 0.4216 |
| 4A | 5 | 150 | 0.1076 | 0.4206 | 0.3778 | 0.4291 |
| 4B | 5 | 150 | 0.0957 | 0.2454 | 0.7083 | 0.7966 |
| 4C | 5 | 150 | 0.0797 | 0.2278 | 0.2319 | 0.1341 |
| 7A | 5 | 50 | 0.0498 | 0.3260 | 0.1764 | 0.2164 |
| 7B | 5 | 50 | 0.0424 | 0.2084 | 0.0875 | 0.2351 |
| 5 | 8 | 50 | 0.154 | 0.565 | 0.612 | 0.949 |
| Comparative 7 | 15 | 0 | 0.5617 | 1.2363 | 9.7361 | 7.3806 |
| Sample 8 | | 5 | | | | |
| Sample 9 | | 10 | | | | |
| Sample 10 | | 15 | | | | |
| Sample 11 | | 20 | | | | |
| Sample 12 | | 200 | | | | |
| Sample 13 | | 225 | | | | |
| Sample 14 | | 250 | | | | |
| Sample 15 | | 300 | | | | |

Compaction and Dimensional Variability-Sintered Body Dimensions

The change in volume of samples 3A-D, 4A-C, 7A, 7B and 6A-D and comparative sample 7 after sintering was measured. Shrinkage, and dimensional variations can be found below in table 9. Dimension standard deviations for length width and thickness may be referred to as Batch Dimensional Variation-L. Batch Dimensional Variation-W. and Batch Dimensional Variation-T respectively.

TABLE 9a

| Batch | No. of samples | Compaction thickness Δ (μm) | Batch Dimensional Variation-L (mm) | Batch Dimensional Variation-W, (mm) | Batch Dimensional Variation-T, (mm) | Batch Volume Variation (mm³) | Shrinkage |
|---|---|---|---|---|---|---|---|
| 3A | 5 | 50 | 0.0557 | 0.0320 | 0.0293 | 26.42 | 9.89% |
| 3B | 5 | 50 | 0.0402 | 0.0634 | 0.0172 | 25.03 | 8.62% |
| 3C | 5 | 50 | 0.0515 | 0.0496 | 0.0248 | 29.41 | 8.98% |
| 3D | 5 | 50 | 0.0393 | 0.0258 | 0.0120 | 13.32 | 8.40% |
| 4A | 5 | 150 | 0.0615 | 0.0441 | 0.0127 | 16.54 | 10.83% |
| 4B | 5 | 150 | 0.164 | 0.0361 | 0.0196 | 32.13 | 10.31% |
| 4C | 5 | 150 | 0.120 | 0.0233 | 0.0301 | 16.90 | 7.57% |
| 7A | 5 | 50 | 0.169 | 0.0833 | 0.0454 | 58.26 | 11.55% |
| 7B | 5 | 50 | 0.0496 | 0.0438 | 0.0265 | 19.23 | 11.56% |
| Comparative 7 | 15 | 0 | 0.388 | 0.387 | 0.934 | 433.168 | 15.02% |
| 6A | 8 | 0 | | | | | 16.48% |
| 6B | 17 | 25 | | | | | 8.65% |
| 6C | 31 | 50 | | | | | 8.69% |
| 6D | 10 | 150 | | | | | 7.57% |
| 8 | | 5 | | | | | |
| 9 | | 10 | | | | | |
| 10 | | 15 | | | | | |
| 11 | | 20 | | | | | |
| 12 | | 200 | | | | | |

TABLE 9a-continued

| Batch | No. of samples | Compaction thickness Δ (μm) | Batch Dimensional Variation-L (mm) | Batch Dimensional Variation-W, (mm) | Batch Dimensional Variation-T, (mm) | Batch Volume Variation (mm³) | Shrinkage |
|---|---|---|---|---|---|---|---|
| 13 | | 225 | | | | | |
| 14 | | 250 | | | | | |
| 15 | | 300 | | | | | |

TABLE 9b

| Batch | No. of samples | Compaction thickness Δ (μm) | Batch Dimensional Variation-L as a % of length | Batch Dimensional Variation-W as a % of width | Batch Dimensional Variation-T as a % of thickness | Batch Volume Variation as a % of volume |
|---|---|---|---|---|---|---|
| 3A | 5 | 50 | 0.1252 | 0.0320 | 0.0293 | 0.4929 |
| 3B | 5 | 50 | 0.0903 | 0.0634 | 0.0172 | 0.4670 |
| 3C | 5 | 50 | 0.1157 | 0.0496 | 0.0248 | 0.5487 |
| 3D | 5 | 50 | 0.0883 | 0.0258 | 0.0120 | 0.2485 |
| 4A | 5 | 150 | 0.1382 | 0.0441 | 0.0127 | 0.3086 |
| 4B | 5 | 150 | 0.3685 | 0.0361 | 0.0196 | 0.5994 |
| 4C | 5 | 150 | 0.2697 | 0.0233 | 0.0301 | 0.3153 |
| 7A | 5 | 50 | 0.3798 | 0.0833 | 0.0454 | 1.0869 |
| 7B | 5 | 50 | 0.1115 | 0.0438 | 0.0265 | 0.3588 |
| Comparative 7 | 15 | 0 | 0.8719 | 0.387 | 0.934 | 8.0815 |

Blank squares in the table indicate measurements that have yet to be taken.

Compaction and Hardness+Porosity

TABLE 10

| Batch | No. of samples | Compaction thickness Δ (μm) | Avg. POROSITY (Vol %) | Batch POROSITY Variation | Avg. Hardness | Avg. Hardness Variation | Batch Hardness Variation |
|---|---|---|---|---|---|---|---|
| 3A | 5 | 50 | 34.6 | 0.2 | 94.8 | 4.2 | 5.33 |
| 3B | 5 | 50 | 34.6 | 0.4 | 98.1 | 3.7 | 5.51 |
| 3C | 5 | 50 | 35.0 | 0.2 | 100.0 | 4.3 | 5.47 |
| 3D | 5 | 50 | 34.4 | 0.1 | 94.5 | 4.1 | 4.87 |
| 4A | 5 | 150 | 33.8 | 0.1 | 97.5 | 4.5 | 5.85 |
| 4B | 5 | 150 | 33.8 | 0.4 | 94.8 | 4.9 | 6.97 |
| 4C | 5 | 150 | 34.3 | 0.2 | 100.1 | 8.5 | 9.15 |
| 7A | 5 | 50 | 34.5 | 0.4 | | | |
| 7B | 5 | 50 | 34.6 | 0.2 | | | |
| Comparative 7 | 15 | 0 | 36.8 | 1.0 | | | |
| 6A | 8 | 0 | | | 93.5 | | 11.7 |
| 6B | 17 | 25 | | | 100.0 | | 10.75 |
| 6C | 31 | 50 | | | 100.0 | | 10.94 |
| 6D | 10 | 150 | | | 100.0 | | 10.5 |
| 8 | | 5 | | | | | |
| 9 | | 10 | | | | | |
| 10 | | 15 | | | | | |
| 11 | | 20 | | | | | |
| 12 | | 200 | | | | | |
| 13 | | 225 | | | | | |
| 14 | | 250 | | | | | |
| 15 | | 300 | | | | | |

Porosity and hardness was measured for sintered samples in table 10 above. Each individual piece within a sample had 3 different hardness measurements taken. Average hardness standard deviation is the average of the standard deviations for the 3 measurements for each individual sample within a group of samples. Such standard deviation measurements may also be referred to as hardness variation. Batch hardness standard deviation is the standard deviation of all hardness measurements within a group of samples. Such standard deviation measurements may also be referred to as batch hardness variation. Blank squares in the table indicate measurements that have yet to be taken. Porosity was measured by comparing geometric density to Archimedes density. Porosity standard deviation may also be referred to as Batch porosity variation.

Compaction and Surface Consistency

Samples 16A-D and 17A-D were prepared like the methods in example 1 according to the following parameters in table 11. Samples were sintered under nitrogen at a maximum temperature of 1,000° C. for approximately 4 hours. Samples had the dimensions shown in FIG. 18.

TABLE 11

| Parameter | Sample 16A-D | Sample 17A-D |
|---|---|---|
| Machine | Innovent+ | Innovent+ |
| Compaction thickness Δ (μm) | 0 | 150 |
| Saturation (%) | 36.6% | 36.6% |
| Layer Thickness [μm] | 200 | 200 |
| Foundation Layer Count | 0 | 0 |
| Oscillator on Delay (sec) | 2 | 2 |
| Binder Set Time (sec) | 50 | 50 |
| Dry Time (sec) | 20 | 20 |
| Target Bed Temperature (° C.) | 50 | 50 |
| Recoat Speed (mm/s) | 70 | 70 |
| Smoothing Roller Speed (rpm) | 300 | 300 |
| Smoothing Roller Speed (mm/s) | 5 | 5 |
| Binder Droplet Volume (pL) | 80 | 80 |
| Binder Droplet Frequency (Hz) | 3740 | 3740 |
| Compaction Roller Speed (mm/s) | 5 | 5 |

Samples were analyzed by a Zeiss M800130 tomograph in order to generate 3d models of each sample. The models of samples 16A-D were averaged to create an average model for the batch, herein 16M. The models of 16A-D were compared to model 16M and the surface deviation was measured in inches and surface deviation distributions were plotted. For each surface deviation distribution, the width of an interval including 90% of the area of the distribution was calculated and will be referred to herein as SDV (surface deviation value). SDV serves as a quantification of the consistency of the shape of the samples within a batch. This process was repeated for samples 17A-D. Surface deviation distributions can be seen in FIGS. 19A-D corresponding to samples 16A-D and FIGS. 20A-D corresponding to samples 17A-D and SDVs can be found below in Table 12.

TABLE 12

|  | 16A | 16B | 16C | 16D | 16 AVG |
|---|---|---|---|---|---|
| SDV | 0.0050 | 0.0052 | 0.0070 | 0.0082 | 0.00635 |
|  | 17A | 17B | 17C | 17D | 17 AVG |
| SDV | 0.0032 | 0.0039 | 0.0040 | 0.0050 | 0.004025 |

Linear Feature Factor

Two batches of samples were each made using the materials as provided in Example 1 and using the parameters of Table 13. Samples were sintered under nitrogen at a maximum temperature of 1,000° C. for approximately 4 hours. Samples had the dimensions shown in FIG. 18.

TABLE 13

| Parameter | Comparative Sample 18 | Sample 18 |
|---|---|---|
| Machine | Innovent+ | Innovent+ |
| Compaction thickness Δ (μm) | 0 | 150 |
| Saturation (%) | 36.6% | 36.6% |
| Layer Thickness [μm] | 200 | 200 |
| Foundation Layer Count | 0 | 0 |
| Oscillator on Delay (sec) | 2 | 2 |
| Binder Set Time (sec) | 50 | 50 |
| Dry Time (sec) | 20 | 20 |
| Target Bed Temperature (° C.) | 50 | 50 |
| Recoat Speed (mm/s) | 70 | 70 |
| Smoothing Roller Speed (rpm) | 300 | 300 |
| Smoothing Roller Speed (mm/s) | 5 | 5 |
| Binder Droplet Volume (pL) | 80 | 80 |
| Binder Droplet Frequency (Hz) | 3740 | 3740 |
| Compaction Roller Speed (mm/s) | 5 | 5 |

Figure 21A:
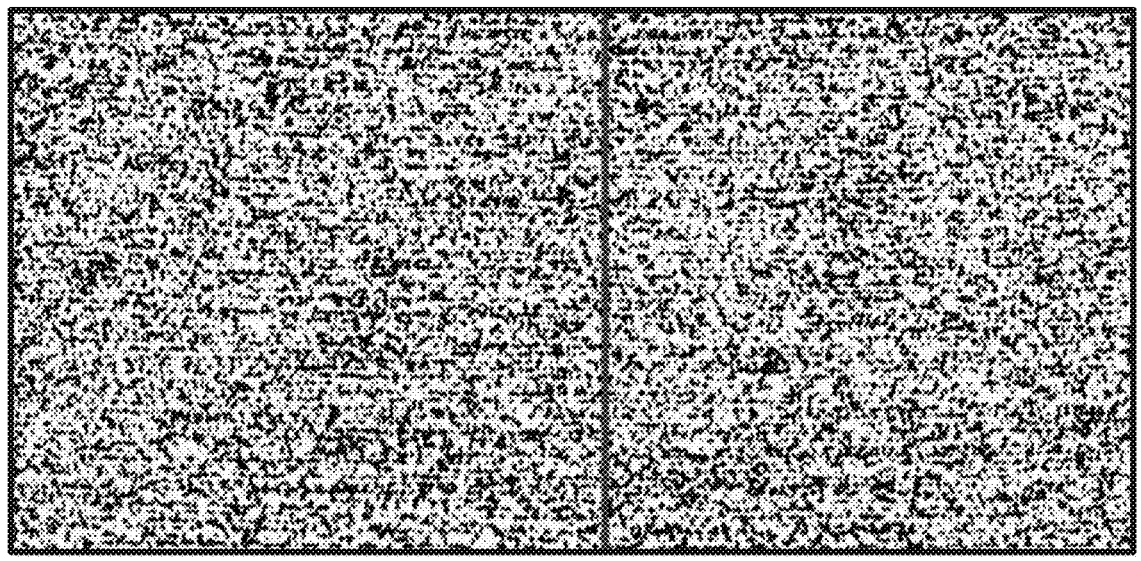
FIG. 21A includes a cross-section of an abrasive article.
Figure 21B:
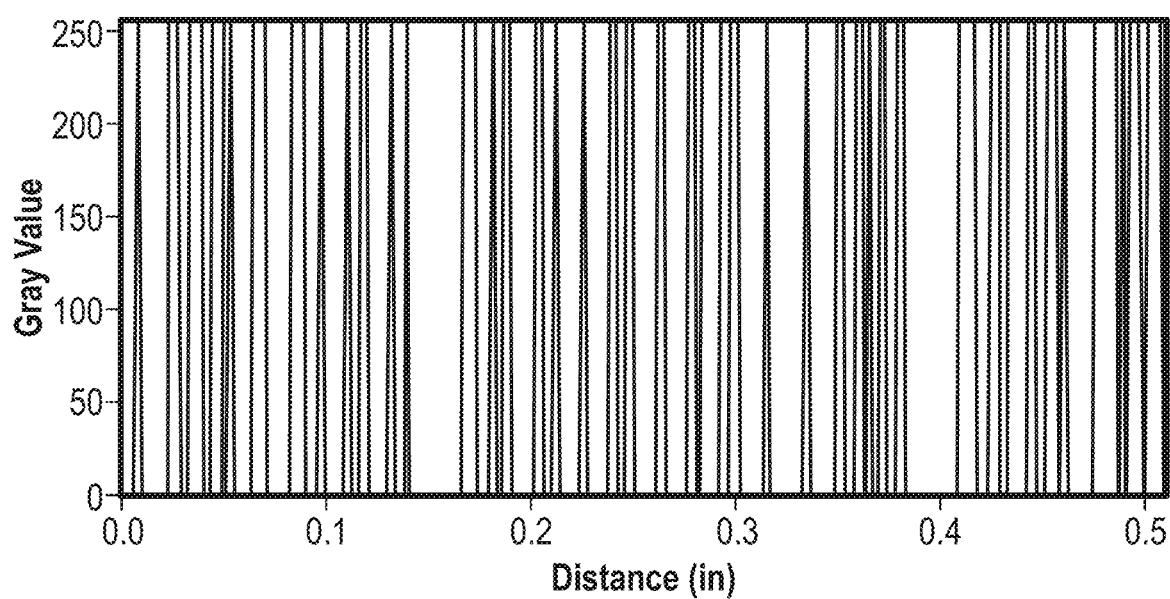
FIG. 21B includes an image of a pore spacing distribution from image 21A.

A cross-sectional image of each sample within the batch was taken at a suitable magnification, such that a cross-sectional image appears as provided in FIG. 21A. Multiple cross-sections are taken in different planes and evaluated. For each cross-sectional image, at least 10 lines are drawn across each image perpendicular to any evident lines in the microstructure, such as shown in FIG. 21A. In particular, if a direction of compaction of the sample is evident, the lines are drawn perpendicular to the known compaction direction. An example of such a line can be seen in FIG. 21A. A threshold black and white image is created from each cross-sectional image using an appropriate thresholding values to separate pores from solid material. From the thresholded image, a gray value vs. distance plot is created as provided in FIG. 21B (second image below). The data is then used to generate a distribution of spacing distance for each sample image. The standard deviation of each distribution is calculated and reported as a linear feature factor. The smaller the standard deviation of spacing distance the more regular the distance between the pores and the greater the evidence of linear porosity (i.e., a less homogenous microstructure). The linear feature factor for comparative batch 18 was 0.0125 inches (0.3175 cm). The linear feature factor for batch 18 was 0.0145 inches (0.368 cm).

According to the embodiments herein, abrasive articles may be created that have a controlled difference in surface features (e.g., Sdr, etc.) between two surfaces, notably two different exterior surfaces of the abrasive articles. Research into the process variables that may be used to control differences in such surface features are complex and not predictable. Certain surface features, such as the difference in Sdr are understood to be related to build direction and orientation of the body during the forming process. Accordingly, the empirical data generated demonstrates that it is possible to engineer abrasive articles having selective surface features on various surfaces by controlling the build direction and build parameters. Such surface features are thought to be technically beneficial with respect to improved abrasive performance and/or anchoring of the abrasive articles with a bond system or other component for formation of a fixed abrasive article.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include a range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method for forming a batch of abrasive articles via additive manufacturing, comprising:
   forming a plurality of discrete green body abrasive articles in a single forming process within a single build box, wherein the single forming process comprises:
   forming a layer of a powder material including abrasive particles and precursor bond material; and
   compacting the layer of the powder material by at least 1% to not greater than 99% of an average original layer thickness of the layer of the powder material.

2. The method of claim 1, wherein compaction reduces the thickness of the layer by at least 1 micron.

3. The method of claim 1, wherein the layer comprises a thickness of at least 50 microns.

4. The method of claim 1, wherein the single forming process comprises measuring or calculating a relative humidity or a flow characteristic of the powder material.

5. The method of claim 1, wherein each green body abrasive article comprises an SDV, wherein the SDV is the width of an interval including 90% of the area of a surface deviation distribution based on a 3D model of each green body abrasive article and 3D model based on the average of all green body abrasive articles in the batch and wherein:
   a green body with a highest SDV comprises an SDV of less than 0.0082 inches;
   a mean SDV of all green body abrasive articles in the batch is less than 0.0063 inches; or
   any combination thereof.

6. The method of claim 1, wherein compaction is controlled relative to one or more variables of the forming process including an average layer thickness of the layer of the powder material, target average layer thickness of the layer of the powder material, a characteristic of property the raw material powder, or any combination thereof.

7. The method of claim 1, wherein each abrasive article comprises an SDV, wherein the SDV is the width of an interval including 90% of the area of a surface deviation distribution based on a 3D model of each abrasive article and 3D model based on the average of all abrasive articles in the batch, and wherein:
   an abrasive an SDV comprises an SDV of less than 0.0082 inches;
   a mean SDV of all abrasive articles in the batch is less than 0.0063 inches; or
   a combination thereof.

8. The method of claim 1, wherein the single forming process comprise changing a variable of compacting between a first compacting process and a second compacting process conducted at a different time relative to the first compactin process.

9. The method of claim 1, wherein the batch of abrasive articles has a batch hardness variation of less than 20 HRL.

10. The method of claim 1, wherein the batch of abrasive articles has a batch Dimensional variation-L of less than 0.3 mm.

11. The method of claim 1, wherein the batch of abrasive articles has a batch Dimensional variation-W of less than 0.3 mm.

12. The method of claim 1, wherein the batch of abrasive articles has a batch Dimensional variation-T of less than 0.9 mm.

13. The method of claim 1, wherein the batch of abrasive articles has a batch Volume variation of less than 400 $mm^3$.

14. The method of claim 1, wherein the plurality of green body abrasive articles comprises a dimensional variation-L of not greater than 0.5% of the average length of the bodies, a dimensional variation-W of less than 1.2% of the average width of the bodies a dimensional variation-T of less than 9% of the average thickness of the bodies, ox any combination thereof.

15. The method of claim 1, wherein compacting comprises moving a compaction object over the layer of the powder material and controlling a force applied by the compaction object to the layer of the powder material.

16. The method of claim 15, wherein controlling the compaction force of the compacting object is based upon a relative humidity or a flow characteristic of the powder material.

17. The method of claim 1, wherein the plurality of green body abrasive articles has a batch density variation of less than 0.05 g/cc.

18. The method of claim 1, wherein the plurality of green body abrasive articles has a volume standard deviation of less than 7% of a volume of all green bodies of the plurality of green body abrasive articles.

19. The method of claim 1, wherein the batch of abrasive articles has a batch porosity variation of less than 1 vol %.

20. The method of claim 1, wherein the batch of abrasive articles has a batch archimedes density variation of less than 0.034 g/cc.

* * * * *